United States Patent [19]

Kaufman et al.

[11] Patent Number: 4,771,401
[45] Date of Patent: Sep. 13, 1988

[54] APPARATUS AND METHOD FOR LINGUISTIC EXPRESSION PROCESSING

[75] Inventors: Ilia Kaufman, Don Mills, Canada; Henry Kucera, Providence, R.I.

[73] Assignee: Houghton Mifflin Company, Boston, Mass.

[21] Appl. No.: 846,366

[22] Filed: Mar. 31, 1986

Related U.S. Application Data

[63] Continuation-in-part of Ser. No. 467,834, Feb. 18, 1983, Pat. No. 4,580,241.

[51] Int. Cl.⁴ .............................................. G06F 15/20
[52] U.S. Cl. ................................. 364/900; 364/300; 364/419
[58] Field of Search ... 364/200 MS File, 900 MS File, 364/419

[56] References Cited

U.S. PATENT DOCUMENTS

| 3,568,156 | 3/1971 | Thompson | 364/300 |
|---|---|---|---|
| 3,704,345 | 11/1972 | Coker | 381/44 |
| 3,760,355 | 9/1973 | Bruckert | 340/146.2 |
| 3,969,698 | 7/1976 | Bollinger | 382/40 |
| 3,995,254 | 11/1976 | Rosenbaum | 382/57 |
| 4,010,445 | 3/1977 | Hoshino | 382/57 |
| 4,041,467 | 8/1977 | Cota | 364/900 |
| 4,068,301 | 1/1978 | Ishino | 364/200 |
| 4,081,607 | 3/1978 | Vitols | 381/45 |
| 4,096,934 | 6/1978 | Kirmser | 400/110 |
| 4,136,395 | 1/1979 | Kolpek et al. | 364/518 |
| 4,145,739 | 3/1979 | Dunning | 364/200 |
| 4,156,868 | 5/1979 | Levinson | 382/1 |
| 4,181,813 | 1/1980 | Marley | 381/44 |
| 4,181,821 | 1/1980 | Pirz et al. | 381/43 |
| 4,270,182 | 5/1981 | Asija | 364/900 |
| 4,284,846 | 8/1981 | Marley | 381/45 |
| 4,336,421 | 6/1982 | Welch et al. | 381/43 |
| 4,342,085 | 7/1982 | Glickman | 364/300 |
| 4,355,302 | 10/1982 | Aldefeld | 382/34 |
| 4,355,370 | 10/1982 | Yanagiuchi | 364/900 |
| 4,355,371 | 10/1982 | Convis et al. | 364/900 |
| 4,373,192 | 2/1983 | Yanagiuchi | 364/900 |
| 4,383,307 | 5/1983 | Gibson, III | 364/900 |
| 4,400,828 | 8/1983 | Pirz | 382/30 |
| 4,435,617 | 3/1984 | Griggs | 381/44 |
| 4,456,969 | 6/1984 | Herzik | 364/900 |
| 4,471,459 | 9/1984 | Dickinson et al. | 364/900 |
| 4,484,305 | 11/1984 | Ho | 364/900 |
| 4,495,566 | 1/1985 | Dickinson | 364/200 |
| 4,498,143 | 2/1985 | Strzelecki | 364/900 |
| 4,498,148 | 2/1985 | Glickman | 364/900 |
| 4,499,553 | 2/1985 | Glickman | 364/900 |
| 4,507,750 | 5/1985 | Frantz | 364/900 |
| 4,566,065 | 1/1986 | Toth | 364/300 |
| 4,567,606 | 1/1986 | Vensko et al. | 381/43 |
| 4,580,241 | 4/1986 | Kucera | 364/900 |
| 4,581,756 | 4/1986 | Togawa et al. | 381/43 |
| 4,674,066 | 6/1987 | Kucera | 364/900 |

FOREIGN PATENT DOCUMENTS

| 0175074 | 10/1983 | Japan | |
| 2062916 | 5/1981 | United Kingdom | 400/110 |

OTHER PUBLICATIONS

"Automatic Spelling Correction in Scientific and Scholarly Text," Joseph J. Pollock and Antonio Zamora, *Communications of the ACM*, Apr. 1984, vol. 27, No. 4, pp. 358–368.

"SPEEDCOP—Final Report," J. J. Pollock, Nov. 1981.

(List continued on next page.)

*Primary Examiner*—Raulfe B. Zache
*Attorney, Agent, or Firm*—Lahive & Cockfield

[57] ABSTRACT

An apparatus and method for linguistic expression processing provides features for spelling verification, correction, and dictionary database storage. The system utilizes a linguistically salient word skeleton-forming process to correct both typographic and cognitive spelling errors. The system also uses a suspect expression modification sequence to recognize and correct typographical spelling errors. A linguistic expression database includes a master lexicon having expression blocks arranged in accord with respective collation ranges of skeletons of expressions contained therein. In one preferred embodiment, these linguistically salient word skeletons corresponding to the master lexicon expressions are not retained in the database.

68 Claims, 12 Drawing Sheets

MASTER LEXICON
DECOMPRESSION TABLE
COMMON EXPRESSION VERIFICATION TABLE
MODIFIED SUSPECT EXPRESSION VERIFICATION TABLE
BLOCK INDEX TABLE
USER DICTIONARY

OTHER PUBLICATIONS

"System Design for Detection and Correction of Spelling Errors in Scientific and Scholarly Text," J. J. Pollock and A. Zamora, *Journal of the American Society for Information Science*, Mar. 1984, pp. 104–109.

"SPEEDCOP—Task A.1: Quantification," J. J. Pollock, Jul. 1980.

"SPEEDCOP—Task A.3: Word Classification," K. A. Hamill, Jun. 1980.

"SPEEDCOP—Task A.3/Task A.5: Trigram Overlap Between Automatically Derived Word Classes," Yelena M. Nayvelt, Nov. 1980.

"SPEEDCOP—Task A.4: Word Structure Analysis," K. A. Hamill and J. J. Pollock, Jan. 1981.

"SPEEDCOP—Task A.5: The Use of Trigrams for Spelling Error Detection," Y. M. Nayvelt, Oct. 1980.

"SPEEDCOP—Task B.1: Automatic Correction of Common Misspellings," J. J. Pollock, Oct. 1981.

"SPEEDCOP—Task C: Evaluation of Spelling Error Detection/Correction System," J. J. Pollock, Sep. 1981.

"Automatic Spelling Error Detection and Correction in Textual Databases," J. J. Pollock and A. Zamora, *International Interaction; Proceedings of the ASIS Annual Meeting*, vol. 19, Oct. 1982, pp. 236–238.

"Spelling Error Detection and Correction by Computer: Some Notes and a Bibliography," J. J. Pollock, *Journal of Documentation*, vol. 3, No. 48, Dec. 1982, pp. 282–291.

"Collection and Characterization of Spelling Errors in Scientific and Scholarly Text," J. J. Pollock and A. Zamora, *Journal of the American Society for Information Science*, Jan. 1983, pp. 51–58.

"The String-to-String Correction Problem," R. A. Wagner and M. J. Fischer, *Journal of the Association for Computing Machinery*, vol. 21, No. 1, Jan. 1974, pp. 168–173.

"The Use of Trigram Analysis for Spelling Error Detection," E. M. Zamora, J. J. Pollock and A. Zamora, *Information Processing & Management*, vol. 17, No. 6, 1981, pp. 305–316.

"Abbreviated Typing for Word Processing," S. J. P. Todd, *IBM Technical Disclosure Bulletin*, vol. 21, No. 9, Feb. 1979, pp. 3796–3797.

H. A. Gleason, Jr., An Introduction to Descriptive Linguitics, Revised Edition, Holt, Rinehart and Winston, N.Y., 1961, pp. 24, 34–35, and 58–61.

"Exact and Approximate Membership Testers," Carter et al., *Proceedings of the 10th Annual ACM Symposium*, May 1978, pp. 59–65.

"Give Your Computer and Ear for Names," J. Munnecke, *Byte Magazine*, vol. 5, No. 5, May 1980, pp. 196–200.

"Reducing Dictionary Size by Using a Hashing Technique," D. J. Dodds, *Communications of the Association for Computing Machinery*, vol. 25, No. 6, 1982, pp. 368–370.

MASTER LEXICON
DECOMPRESSION TABLE
COMMON EXPRESSION VERIFICATION TABLE
MODIFIED SUSPECT EXPRESSION VERIFICATION TABLE
BLOCK INDEX TABLE
USER DICTIONARY

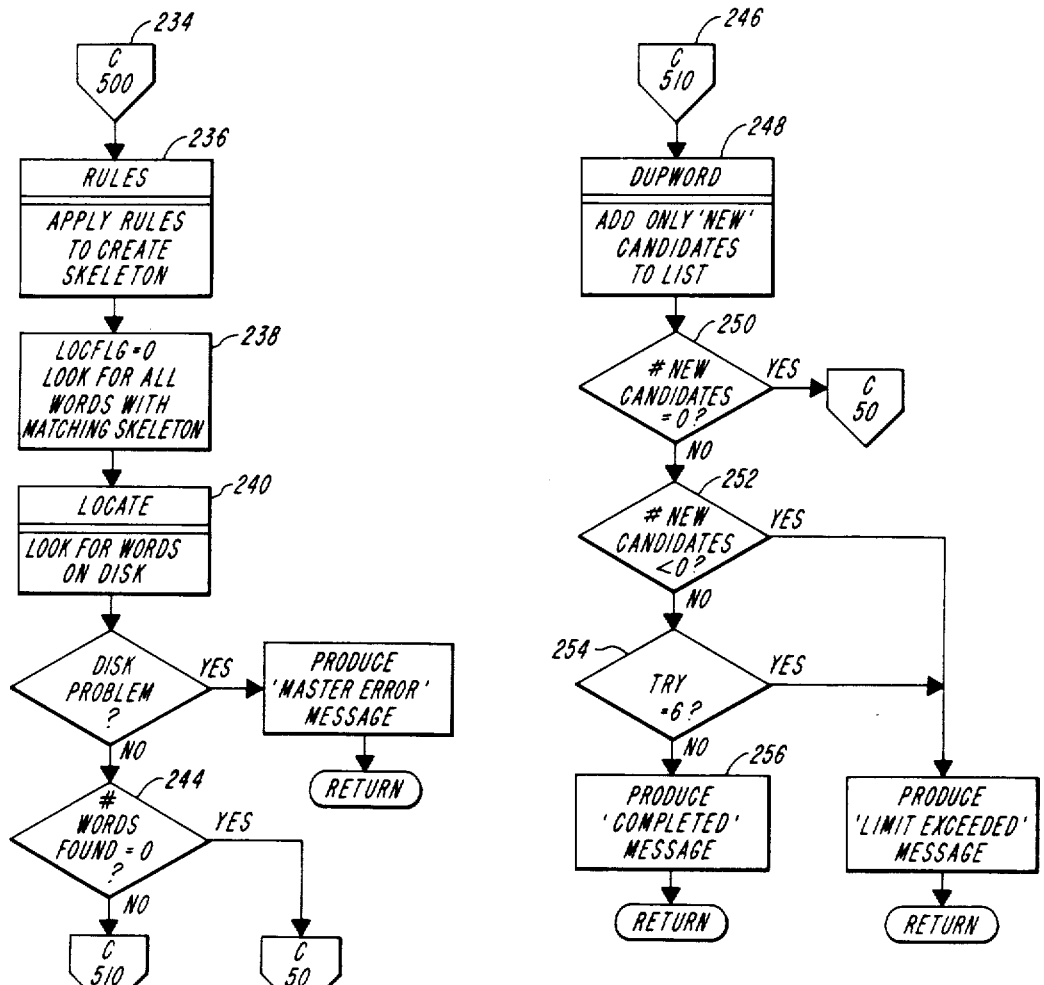
FIG. 14
FIG. 15
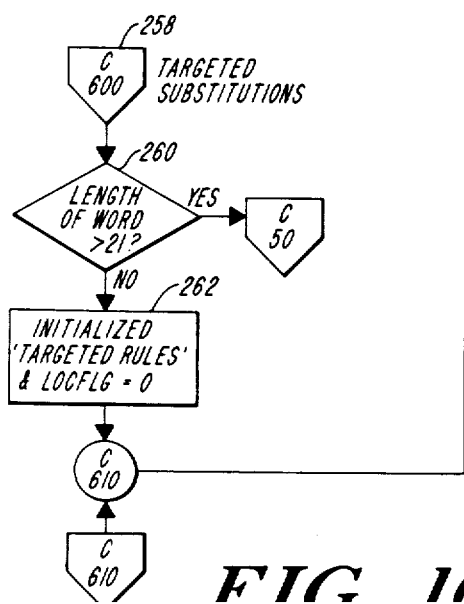 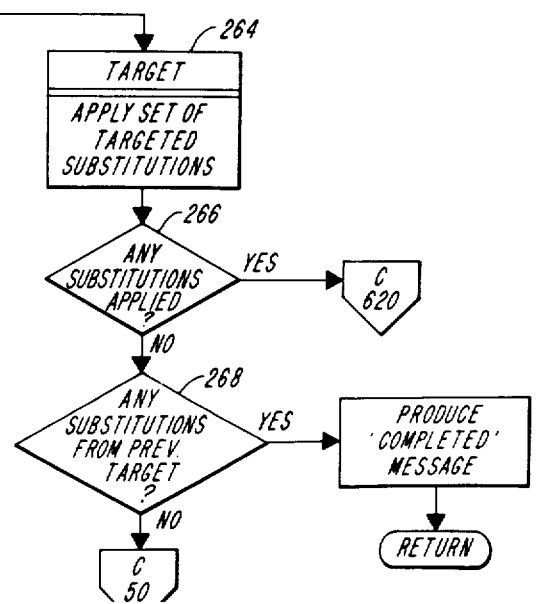
FIG. 16

APPARATUS AND METHOD FOR LINGUISTIC EXPRESSION PROCESSING

REFERENCE TO RELATED APPLICATION

This is a continuation in part of U.S. Pat. No. 4,580,241 (U.S. Ser. No. 467,834 filed Feb. 18, 1983), for "Graphic Word Spelling Correction Using Automated Dictionary Comparisons with Phonetic Word Skeletons."

BACKGROUND OF THE INVENTION

This invention is directed to linguistic expression processing. More particularly, the invention provides a highly compact linguistic expression verification, correction, and storage system. The invention can be used, for example, to provide text processing on word processors and microprocessor-controlled typewriters.

Text processing systems facilitate the production of printed documents. Capabilities of the systems generally include text entry, editing, and justification, as well as spelling verification and correction. Early text processing systems operated on large mainframe computers, where storage requirements and computational efficiency were typically of limited concern.

With the advent of smaller microprocessor-based computing systems, e.g., word processors, the storage requirements and computational efficiency of text processing software have become very important. These smaller systems include only a limited amount of memory and, thus, have little capacity for storage of spelling dictionaries and software. Moreover, the microprocessor speeds and peripheral memory access times of these systems are relatively slow, thereby creating a need for efficient verification and correction code.

To date, the art has failed to provide satisfactory spelling verification and correction software for use on microprocessor systems. In general, the available software compensates for limited storage space by maintaining short or impoverished spelling dictionaries (e.g., having fewer entries or lacking capitalization and hyphenation information), resulting in the recognition of fewer correctly spelled words and the replacement of fewer incorrectly spelled words. Similarly, the software compensates for limited computational power by reducing program complexity, thereby further decreasing verification and correction capabilities.

An object of this invention, therefore, is to provide an improved linguistic expression processor. More particularly, an object is to provide a spelling verifier, a spelling corrector, and a dictionary database which can operate effectively on word processors, microprocessor-controlled typewriters, and other computing systems of reduced processing and storage capacity Another object of the invention is to provide a compact and efficient linguistic expression processor which retains, in addition to word spellings, hyphenation and capitalization information.

A further object of this invention is to provide an improved spelling verification and correction system which corrects a high percentage of misspellings and which operates with sufficiently high speed for convenient on-line use and operator interaction.

Still another object of the invention is to provide improved data storage and data organization techniques for use with digital data processing apparatus text databases.

Other objects of the invention are evident throughout the description which follows.

SUMMARY OF THE INVENTION

The invention provides a system for linguistic expression verification, correction, and storage. The system is based, in part, on a unique method of arranging and storing linguistic information to form a compact linguistic expression database, i.e., a computerized dictionary, designed for rapid data access. The database includes a master lexicon composed of plural blocks, each storing digital signals in the form of entries representing linguistic expressions, e.g., words, and information relating thereto, e.g., hyphenation and capitalization patterns.

The master lexicon blocks are arranged for access according to the range of the linguistically salient word skeletons of the words contained therein. These skeletons, as discussed in greater detail below, are entities which combine the salient graphic components of written word forms with the salient phonetic components of the corresponding spoken forms. A collation, e.g., an alphabetization, of skeletons of the words in any one block provides a sequence having upper and lower bounds. These bounds define each block's "skeletal collation range."

Within the lexicon, the blocks are ordered in accord with their respective skeletal collation ranges. A block having the lowest collation range is stored, for example, at the lowest address within the lexicon, while a block having the highest collation range is stored at the highest address within the lexicon. In order to facilitate the identification of a lexicon block of interest, the database can include a block index table. This table includes a list of entries representing a collation range and address of each block in the lexicon.

The signals stored in each master lexicon entry are encoded to reduce the overall size of the lexicon. For example, in lieu of an explicit representation of each alphanumeric character of a word, a master lexicon entry can store a "differential coding" representing character differences between the word and a word represented by another entry. This differential coding mechanism is preferably used to represent differences between successive entries in a master block. By way of example, where a first entry of a block represents the word "computer" and a second entry represents the word "computerize," the character content of the second entry can be represented by a differential coding. That is, rather than storing codes representative of each and every one of the characters in the second word, the second entry can store signals representing the length of the second word, the number of characters that word has in common with the previous word, and the differential character string, namely "ize".

Within each master lexicon entry, a character sequence can be represented by a series of explicit character codes, each representing a single alphanumeric character. A character sequence can also be represented by an indirect character code indicative of a character sequence common to several lexicon entries. Similar methods can be used to represent hyphenation and capitalization patterns for each lexicon expression.

In addition to a master lexicon, a linguistic expression database can include a common expression verification table and a user-defined expression table. The common expression verification table stores entries representative of commonly used expressions. Each expression in this table is represented by a hash code, i.e., a numeric code which reflects the character content of the expression. The table can also store signals representing expression hyphenation and capitalization patterns. The user-defined expression table, i.e., user dictionary, stores signals representing expressions defined by the user, e.g., proper nouns, acronyms, technical terms, and abbreviations.

According to one aspect of the invention, the database can be combined with various other elements to provide an apparatus for storing digitally encoded linguistic information. The apparatus is characterized, in part, by an input element for accepting a signal representative of a linguistic expression. This signal can be, for example, a database storage address. The apparatus is further characterized by an element for accessing information in the database and, particularly, information in the master lexicon. This access element itself includes an element for accessing the master lexicon blocks according to their skeletal collation ranges. The storage apparatus further includes an output element for providing a signal representative of the accessed linguistic information, e.g., a word and its hyphenation pattern.

In another aspect, the database serves as an element of an electronic spelling verification apparatus. Such an apparatus includes an input element for accepting a signal representative of a suspect expression, a verification element for matching the suspect expression with a database linguistic expression, and an output element for generating a signal representative of the success of finding a matching entry in the database.

A master lexicon verification element can include a binary search element for identifying a candidate master lexicon block, i.e., a block likely to contain an entry of interest. This binary search element can include elements for generating a linguistically salient word skeleton of the suspect expression and for comparing that skeleton with block index table entries. The spelling verification apparatus can also include an element for matching a suspect expression with entries in the common expression verification table and the user expression table.

In another aspect, the invention provides a spelling correction apparatus which incorporates a linguistic expression database of the type described above. This apparatus includes an input element for accepting a signal representative of a suspect linguistic expression, a database matching element for identifying within a linguistic expression database an expression substitutable for the suspect expression, and an output element for generating a signal representative of the success of identifying a substitutable expression. The spelling correction apparatus includes elements for correcting both typographical and cognitive misspellings.

Through use of a unique skeleton-forming process, the invention produces word skeletons which are typically unaffected by cognitive errors, i.e., those which result from not knowing how to spell a word. By comparing the linguistically salient word skeletons of a suspect expression with that of a master lexicon entry, the correction apparatus can identify the entry as being a candidate for substitution for the suspect expression. This correction process can be extended by a skeletal target modification element. This element modifies suspect expression skeletons, according to "targeted" modification rules, to produce other skeletons for further comparison with the master lexicon expressions.

A spelling correction apparatus according to the invention can also include an element for detecting and correcting typographic spelling errors, i.e., those caused by mechanical error. These errors, which can result in the accidental transposition, deletion, insertion, or replacement of characters, do not produce expressions usually correctable by application of the skeletal matching rules. Accordingly, one aspect of the invention contemplates a suspect expression modification element which generates, by modifying the suspect expression, a series of test expressions. Each test expressions incorporates a differing sequence of characters which "reverse" each type of typographic error. That is, the system generates test expressions including newly transposed, deleted, inserted, and replaced characters. The system verifies these test expressions by comparing them with the database entries.

As a majority of the modified suspect expressions are themselves invalid, processing time might be wasted attempting to verify each and every one of them. To avoid this, the suspect modification element can include a filtering element for identifying those test expressions which are likely to be a valid expression. This element includes an element for matching each test expression with entries of a modified suspect expression verification table. This table stores abbreviated hash codes representing a substantial number of the expressions in the master lexicon. By comparing each test expression with the table entries, the corrector can quickly determine if the expression is likely to be valid.

In other aspects, the invention contemplates methods for spelling verification, spelling correction, and linguistic expression storage corresponding to the operation of the apparatus discussed above.

A more complete understanding of the invention may be attained by reference to the description which follows and by reference to aforementioned U.S. Pat. No. 4,580,241 (U.S. Ser. No. 467,834, filed Feb. 18, 1983), which is incorporated herein by reference.

BRIEF DESCRIPTION OF THE ILLUSTRATIONS

FIGS. 9-17 are flow charts depicting a processing sequence for a preferred spelling correction method;

DESCRIPTION OF THE ILLUSTRATED EMBODIMENT

Figure 1:
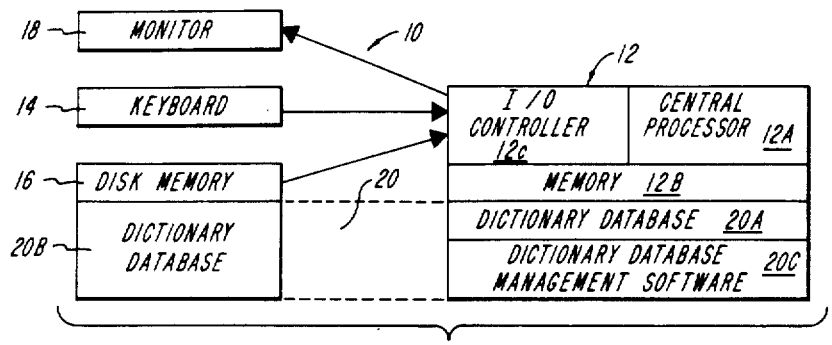
FIG. 1 depicts a text processing system for use in practice of the invention.

A text processing system for practice of the invention typically is configured as shown in FIG. 1. The illustrated system 10 has a programmed digital computer 12 which includes a central processing unit 12A connected with a memory unit 12B and with an input/output control unit 12C. The computer 12 can be any of numerous commercially available programmable digital computers.

The computer 12 is connected with a high speed non-volatile storage device, such as disk memory 16. Computer 12 also connects with a display terminal 18 and with a keyboard 14. The terminal and the keyboard provide an interface between the system user and the computer. Specifically, the keyboard translates user-typed commands into computer-readable signals, while the display terminal 18 displays, in human-readable form, signals output from the computer.

The illustrated system 10 employs portions of various memory elements to store a dictionary database 20, indicated with dashed lines. In particular, the computer memory unit 12B stores a database portion 20A while the disk memory 16 stores database portion 20B. Further, the computer memory unit 12B retains database management software 20C.

The database management software 20C controls the accessing and the decoding of information stored in database portions 20A and 20B and thereby permits the retrieval of database entries in logical form, i.e., in the form of linguistic expressions. The software thus eliminates the requirement that the physical layout and form of the data be defined within the spelling verification and correction modules.

Figure 2:
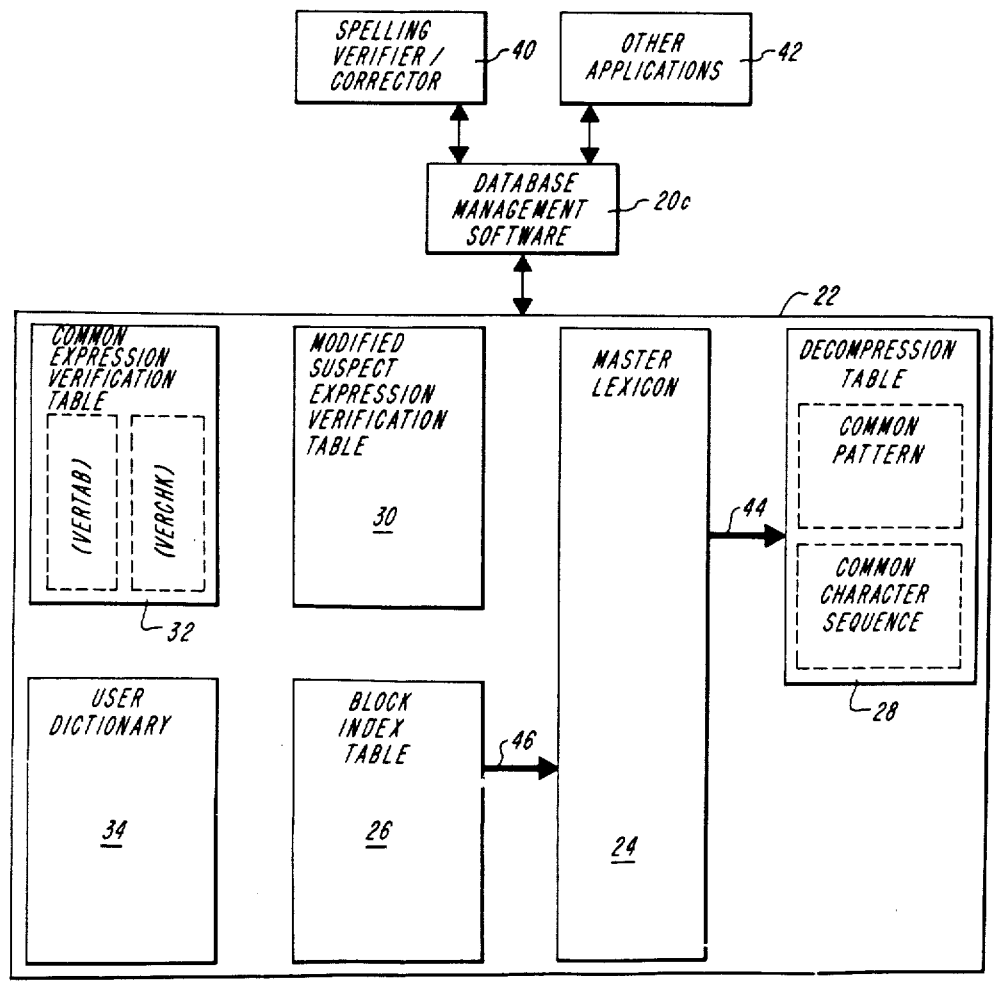
FIG. 2 depicts a linguistic expression database constructed in accord with one practice of the invention.

As shown in greater detail in FIG. 2, the memory element 22 (corresponding to elements 12B and 16, FIG. 1) stores the dictionary database sections, including a master lexicon 24, a block index table 26, a decompression table 28, a modified suspect expression verification table 30, a common expression verification table 32 and a user dictionary 34. In a preferred embodiment these sections, excluding the master lexicon 24, are maintained in RAM. Typically, only a portion of the lexicon 24 resides in RAM at any one time. The content and access of these sections are discussed below.

The Master Lexicon

A first portion of memory element 22 stores the master lexicon 24 representing a majority of the linguistic expressions in the database 20. In the illustrated embodiment, this data includes digital codings representing English words, as well as capitalization, hyphenation, and suffix information. Each word is represented by a single lexicon entry, the entries being grouped together to form lexicon blocks. In a preferred embodiment, these entries store words of twenty-one characters or less in length. The digital codings, as noted above, represent only differences in character content between successive entries.

With regard to character sequence representation, each lexicon entry stores from one to three different sequence coding patterns. According to a first sequence coding pattern, a five-bit code is employed to explicitly represent individual characters in lower case form. More particularly, the characters (blank), "a", "b", "c", ..., "z", "'", "-", ".", and "/" are represented by binary codes having the decimal values 0, 1, 2, . . ., and 30, respectively.

According to a second sequence coding pattern, an entry stores an address directed to the decompression table 28. As discussed below, this table stores entries representing common character sequences. By way of example, the character sequence "ize" is common to many master lexicon expressions and, as such, is represented by an entry in the decompression table. For many of the words in the master lexicon which include the sequence "ize", the corresponding lexicon entries store the address of the "ize" decompression table entry. The addressing mechanism is also used to represent common suffix and hyphenation patterns.

According to a third sequence coding pattern, a lexicon entry stores a six-bit digital code representing a suffix map. The first two bits of this map indicate the permissibility of the "ing" suffix; the next two bits indicate the permissibility of a "'s" suffix; and the remaining two bits indicate the permissibility of a "s" suffix. With regard to each of these two-bit patterns, if both bits are "0", the word does not occur with the suffix; if both bits are "1", the word occurs only with the suffix; and if only the high-order bit of the pattern is "1", the word may occur with or without the suffix.

In addition to storing a digital coding representative of character content, each master lexicon entry stores a capitalization code. The capitalization code is three bits in length and indicates whether the word can occur with all lower case letters (represented, for example, by a binary code "000"); whether the word must include an initial capital letter (binary code "001"); whether the word must include all capital letters (binary code "010"); whether the word includes an initial capital letter and a capital letter after each hard hyphen (binary code "011"); whether the word includes a capital letter only after a hard hyphen (binary code "100"); or whether the word includes an irregular combination of upper and lower case letters (binary code "110").

Hyphenation information for each master lexicon word is represented by an n-bit string, where "n" is the number of characters in the word. Hyphenation points within the word are indicated by a bit having the value "1". Each such bit indicates that a hyphen is permissible following the corresponding character in the word. For example, in the hyphenation map of the word "dictionary," for which hyphens are permitted after the third and seventh characters, the third and seventh bits have values of "1"; the other bits have the value "0". The hyphenation string is not used to represent hard hyphens, i.e., those present in the conventional form of the word (as in "shake-up"): these hyphens are represented within the character sequence coding of the word itself.

The content of the master lexicon entries, as applied in a preferred embodiment, is presented in greater detail below. According to this embodiment, each entry includes a sequence of sections. The first section, the "header," is either sixteen or thirty-two bits in length. A 32-bit header entry includes the following information:

| Descriptor | Length of Descriptor |
| --- | --- |
| Type (value "0") | 1 bit |
| Suffix | 6 bits |
| Hyphen | 6 bits |
| Capital | 3 bits |
| Difference | 5 bits |
| Common | 5 bits |
| Character | 5 bits |

-continued

| Descriptor | Length of Descriptor |
|---|---|
| Hyphen Flag | 1 bit |

Where "Type" indicates that the header is thirty-two bits long;
"Suffix" is a suffix map;
"Hyphen" is a high-order portion of a hyphenation map;
"Capital" is a capitalization pattern;
"Difference" indicates the number of characters in the word which are different from those of the previous word;
"Common" indicates the number of characters in the word which are the same as those in a previous word;
"Character" is an explicit representation of a first differential character; and,
"Hyphen Flag" is a flag indicating whether the next section includes a continuation of the hyphenation string.

A 16-bit header includes the following information:

| Descriptor | Length of Descriptor |
|---|---|
| Type (value "1") | 1 bit |
| Index | 10 bits |
| Difference | 4 bits |
| Hyphen Flag | 1 bit |

Where "Type" indicates that the header is sixteen bits long;
"Index" is an address of an entry in the decompression table;
"Difference" indicates the number of characters in the word which are different from those of the previous word; and
"Hyphen Flag" is a flag indicating whether the next section includes a continuation of the hyphenation map.

Following the header section, each master lexicon entry includes a section representing either one or two differential characters. This section is either eight or sixteen bits in length depending on the remaining number of differential characters. Where the remainder of differential characters modulo three is equal to one, the entry includes an 8-bit section, having the following information:

| Descriptor | Length of Descriptor |
|---|---|
| Character | 5 bits |
| Hyphen | 2 bits |
| Hyphen Flag | 1 bit |

Where "Character" is an explicit representation of a differential character;
"Hyphen" is a portion of the hyphenation map; and
"Hyphen Flag" is a flag indicating whether the next section includes a continuation of the hyphenation string.

Where the remaining number of differential characters modulo three is equal to two, the entry includes a 16-bit section having the following information:

| Descriptor | Length of Descriptor |
|---|---|
| Character | 5 bits |
| Character | 5 bits |
| Hyphen | 5 bits |
| Hyphen Flag | 1 bit |

Where "Character" is an explicit representation of a differential character;
"Character" is an explicit representation of a differential character;
"Hyphen" is a portion of the hyphenation string; and
"Hyphen Flag" is a flag indicating whether the next section includes a continuation of the hyphenation string.

A subsequent section of each master lexicon entry is either a eight or sixteen bits in length. A 16-bit section includes:

| Descriptor | Length of Descriptor |
|---|---|
| Type (value "0") | 1 bit |
| Character 1 | 5 bits |
| Character 2 | 5 bits |
| Character 3 | 5 bits |

Where "Type" indicates that the section is sixteen bits long;
"Character 1" is an explicit representation of a differential character;
"Character 2" is an explicit representation of a differential character; and
"Character 3" is an explicit representation of a differential character;

An 8-bit section includes the following information:

| Descriptor | Length of Descriptor |
|---|---|
| Type (value "1") | 1 bit |
| Table Index | 7 bits |

Where "Type" indicates that the section is eight bits long; and
"Index" is an address of an entry in the common character sequence section of the decompression table.

To find a suspect word in the master lexicon, a master lexicon access routine strips a suffix, namely, "s", "'s", or "ing", from the word and sets a flag indicating the type of suffix, if any. Subsequently, the routine generates a compressed representation of the word by converting each of the characters from its standard digital representation, e.g., 7-bit ASCII, to a corresponding 5-bit representation. The access routine then generates a linguistically salient word skeleton of the suspect word. The characters of this skeleton are also represented by a 5-bit code.

To identify a master lexicon block likely to contain an expression matching a designated suspect word, the access routine performs a binary search on the block index table, comparing the first six characters of the suspect word compacted skeletal representation with the block index table entries. Upon identifying a block of interest, the routine decodes the block.

In verification mode, the access routine compares the suspect word with expressions decoded from the block. If a matching expression is found, the routine returns a "success" flag. Otherwise, the routine returns a "no success" flag.

In correction mode, the access routine compares the suspect word skeleton with skeletons of the block expressions. If matching skeletons are found, the corresponding linguistic expressions are returned to the calling routine. If no matching skeletons are found, the routine can expand the search to compensate for differing suffixes. For example, the routine can change the state of an "s" suffix flag, which indicates whether the suspect expression ends with an "s", prior to comparing the modified skeletal expression with the block skeletal expressions.

The Common Expression Verification Table

Another component of the memory element 22, the common expression verification table 32, stores commonly used linguistic expressions. In the illustrated embodiment, the table 32 is organized in two parallel arrays. The corresponding entries of each of these arrays represents a single word. Each entry of the first array, VERTAB, stores a 14-bit hash code and a 2-bit S-map. The hash code is computed from the words character content by the routine FUNCTN. This routine operates according to a standard alphanumeric hash-generating sequence to produce a 14-bit hash code and a 12-bit index. The S-map is similar to the "s" portion of the suffix pattern discussed above. The entries of the array VERCHK are eight bits long and include an "'s" suffix pattern, an index pattern, and a length code. The index pattern stores a 3-bit portion of the index returned by FUNCTN. The pattern is used to eliminate redundancy, if any, introduced in the generation of hash codes. The length code indicates the length of the represented word. The "'s" suffix pattern is similar to that discussed above. Entries within VERTAB, as well as those of the second array, VERCHK, are ordered according to the index value returned by FUNCTN.

In order to locate within the common expression verification table an entry matching a suspect word, the process strips a trailing "s" or "'s" from the word. The process than invokes FUNCTN to determine a hash code and index. The process addresses the indexed verification table entry and compares the hash code and S-map with the corresponding entry codes. If the hash codes do not match, the process generates a new index which is a function of the original hash code index. According to a preferred procedure, for example, the new index is set equal to the additive sum of three terms: (a) the original index; (b) two-times the value of the eight low-order bits of the original hash code; and (c) three minus the value of the eight low-order bits of the original hash code. In the event this summation produces a value larger than the table size, that size is subtracted from the summation value.

Upon computing the new index, the process compares the verification table entry codes at this index with the suspect expression codes to determine if a match exists. If not, the process repeats itself until the maximum number of allowable rehashes (e.g., two rehashes) have been performed. Alternatively, the process can terminate upon identifying an indexed entry containing a null flag, e.g., the hexadecimal code "FFFF").

In the event the suspect expression hash code or rehash code matches that of a verification table entry, the process compares the three high-order bits of the index, as well as the length of the input word, with the corresponding codes in the verification table entry. Where these codes match, the process finally compares the suspect expression suffix with the stored suffix pattern.

The Modified Suspect Expression Verification Table

A third portion of the memory element 22, the modified suspect expression verification table 30, stores an abbreviated hash codes representing a majority of the expressions in the master lexicon. Each entry of the table represents one or more lexicon entries and contains an eight-bit low-order portion of a hash code returned by the routine FUNCTN. Entries within the table 30 are arranged according to the index returned by FUNCTN.

To find a test expression in the modified suspect expression verification table, the access routine initially strips a suffix "s" or "'s" from the test expression. The routine then invokes FUNCTN to generate a hash code and index for the modified test expression. By accessing the modified suspect expression table at the indexed entry and comparing the hash code stored there with that of the test expression, the access routine can determine whether the test expression itself is likely to be in the master lexicon. In the event of an unfavorable comparison, the access routine re-invokes FUNCTN to generates a new index using a process similar to that discussed above. The values are used in a repeat of the process described above. The access routine terminates upon matching the test expression hash code with a table entry, or upon failing to identify a matching entry after performing a rehash.

The User Dictionary

A further portion of the memory element 22, the User Dictionary 34, stores a list of user-defined expressions. In the illustrated embodiment, the dictionary includes a pointer table and a word list. The pointer table comprises a series of 2-byte entries. Apart from a header entry, these entries provide information pertaining to each word in the word list. In particular, each entry includes a 3-bit capitalization code, of the type discussed above, and a 13-bit word list address. The header entry of the pointer table contains control information: the first word indicates the number of words in the word list, the second word indicates the address of the next available character storage byte in the list.

The User Dictionary word list is a serial array storing character sequences for each user-defined expression. Each word in the array is terminated by a null character.

To locate a suspect word within the User Dictionary, the access routine invokes FUNCTN to compute a word index. The routine then examines the pointer table entry at this index. If the entry is null, the routine returns a message indicating that the word is not in the database; otherwise, the routine examines the expression stored in the word list at the address indicated by the pointer table. If the dictionary expression matches the suspect word, the access routine returns a "word found" flag, along with a capitalization code. If the dictionary expression and the suspect word do not match, the routine generates a new index according to a process similar to that discussed in conjunction with the common expression verification table. The above process is repeated with this new index. The process continues until a matching entry is identified, until the rehash limit is exceeded, or until a null entry is identified.

FIGS. 8-19 depict a preferred processing sequence for adding words to and deleting words from the User Dictionary. In word-addition mode, the illustrated routine, MODUSE, reads new words from either a text file, e.g., during database initialization, or directly from the user, e.g., during document verification. Each new word is processed in accord with the illustrated method. The routine is responsive to an "auto-delete" flag which indicates that new words added to an already full dictionary are to be inserted in place of existing entries. In a preferred mode of operation, such replacement occurs at the middle of the User Dictionary.

Figure 20:
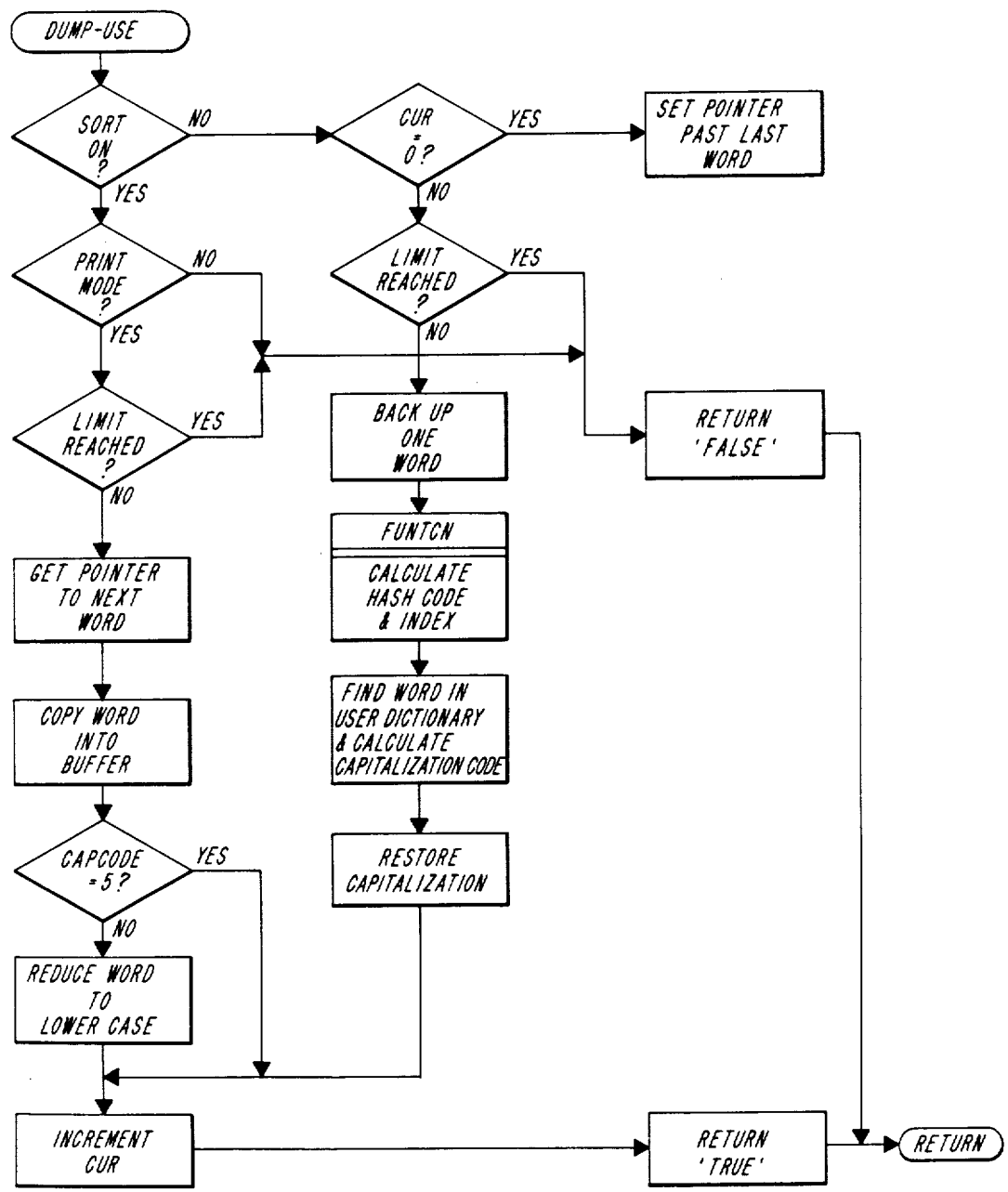

FIG. 20 depicts a processing sequence for the user dictionary access routine DUMP-USE. This routine permits the sequential access of words in the User Dictionary. An input parameter, LIMIT, specifies the maximum number of words which can be returned in successive calls to DUMP-USE, each call returning an individual entry or groups of entries, e.g., to print a sorted list of user-defined expressions. For this purpose, the User Dictionary pointer table can be sorted, e.g., by way of a shell sort, so that its successive entries point to an ascending or descending sequence of user expressions. Subsequent to setting the entry pointer variable CUR to zero, indicating that the listing is to begin at the start of the dictionary, DUMP-USER is called to retrieve the expressions. Subsequently, the pointer table is restored by rehashing the user expressions and storing pointers to them at the indexed addresses within the pointer table.

The Decompression Table

The memory element 22 also includes the decompression table 28 which stores common character sequences and common expression information, e.g., hyphenation and suffix information, for words in the master lexicon 24. The table is comprised of two sections: the common pattern section and the common character sequence section. Each entry of the common pattern section stores suffix, hyphenation, and characters-in-common information, including the following:

| Descriptor | Length of Descriptor |
|---|---|
| Suffix | 6 bits |
| Common | 4 bits |
| Hyphen | 6 bits |

Where, "Suffix" is a suffix pattern;
"Common" indicates the number of characters that the word represented by the addressing master lexicon entry has in common with the prior entry in the lexicon; and
"Hyphen" is a portion of a hyphenation map.

Each entry of the second decompression table section stores one common character sequence, including the following information:

| Descriptor | Length of Descriptor |
|---|---|
| Character 1 | 5 bits |
| Character 2 | 5 bits |
| Character 3 | 5 bits |
| (Unused) | 1 bit |

Where, "Character 1" is an explicit coding of a first differential character in the sequence;
"Character 2" is an explicit coding of a second differential character in the sequence; and
"Character 3" is an explicit coding of a third differential character in the sequence.

The content of the decompression table 28 of a preferred embodiment of the invention is listed in Appendix I.

The Block Index Table

The block index table 26, which also resides in memory element 22, stores information representing collation ranges and addressing of master lexicon blocks. The table 26 consists of a series of 4-byte entries. Each entry contains, in 5-bit compressed character form, the first six characters of the lower collation sequence bound, i.e., lowest skeleton, of each block. The two high-order bits of each entry are unused.

The Interrelationship of Database Sections

Figure 3:
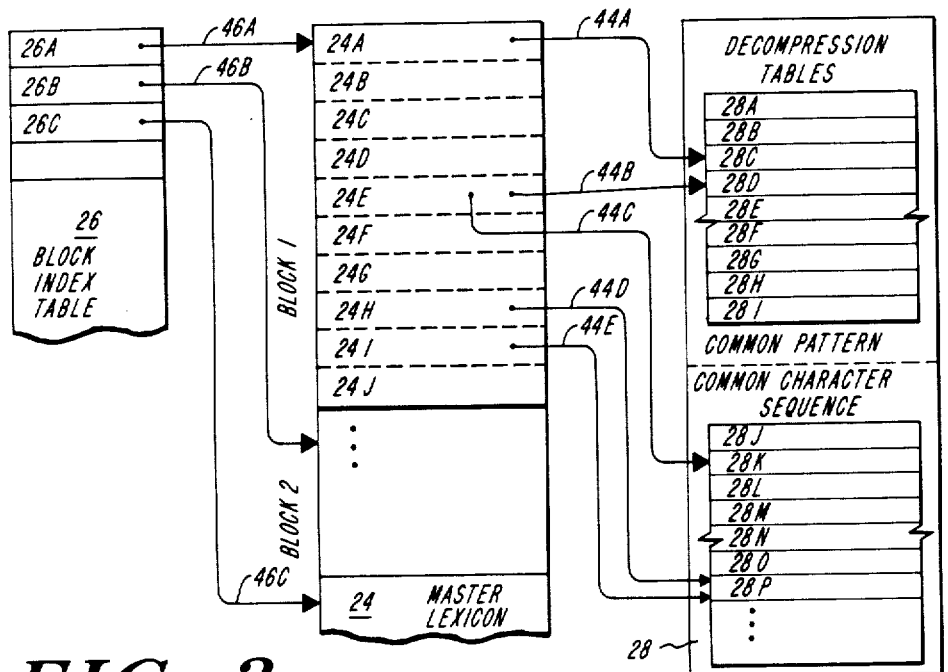
FIG. 3 depicts the interrelationship of the master lexicon and the associated database tables.

The interrelationship of the master lexicon 24 and the decompression table 28 is shown in greater detail in FIG. 3. There, several entries of the master lexicon are shown to include addressing information directed to entries within the common pattern and the common character sequence sections of the decompression table 28. In particular, master lexicon entry 24A includes addressing information directed to common pattern section entry 28C. This addressing information is indicated by way of pointer element 44A. Similarly, master lexicon entry 24E contains addressing information directed to common pattern section entry 28D, as indicated by pointer element 44B. The master lexicon entry 24E also contains addressing information directed to common character sequence entry 28K. Further, master lexicon entries 24H and 24I contain addressing information directed to common character sequence entry 28P, as indicated by pointer elements 44D and 44E.

In the illustrated embodiment, the entries in the master lexicon 24 are stored in blocks. In a preferred embodiment, these blocks are 512 bytes in length. In FIG. 3, two of these blocks are shown as elements "BLOCK 1" and "BLOCK 2". In a preferred embodiment, the entries within the blocks are arranged in skeletal collation sequence, i.e., a sequence determined in accord with skeletal values. According to an alternate embodiment, the block entries are arranged in alphabetical sequence. While this latter embodiment achieves substantial space savings, the time required to locate an expression within the block is increased. While in either embodiment skeletons can be stored with each entry, in a preferred embodiment they are not; rather, the skeletons are generated at run-time.

As discussed above, the collation of linguistically salient word skeletons associated with each block forms a skeletal collation range defined by upper and lower bounds. In a preferred embodiment, the lexicon blocks are sequenced according to their respective collation ranges. In the illustration, BLOCK 1 represents a group of entries having the lowest collation range and stored at the beginning of the lexicon. Similarly, BLOCK 2 represents a group of entries having the next-to-lowest collation range and stored adjacent to BLOCK 1.

The interrelationship of the block index table 26 and the master lexicon 24 is also shown in FIG. 3. There, as indicated by pointer element 46A, block index table entry 26A is associated with BLOCK 1 of the master lexicon 24. Similarly, the block index table 26B is associated with the BLOCK 2 of the master lexicon, as indicated by pointer element 46B. While each block index table entry can include actual addressing information, implicit addressing is attained by providing a parallel structure for the block index table and the master lexicon. That is, the first entry of the block index table can correspond to the first block of the master lexicon, while the second entry of the block index table can correspond to the second block of the master lexicon, and so forth.

Operational Overview

Figure 4:
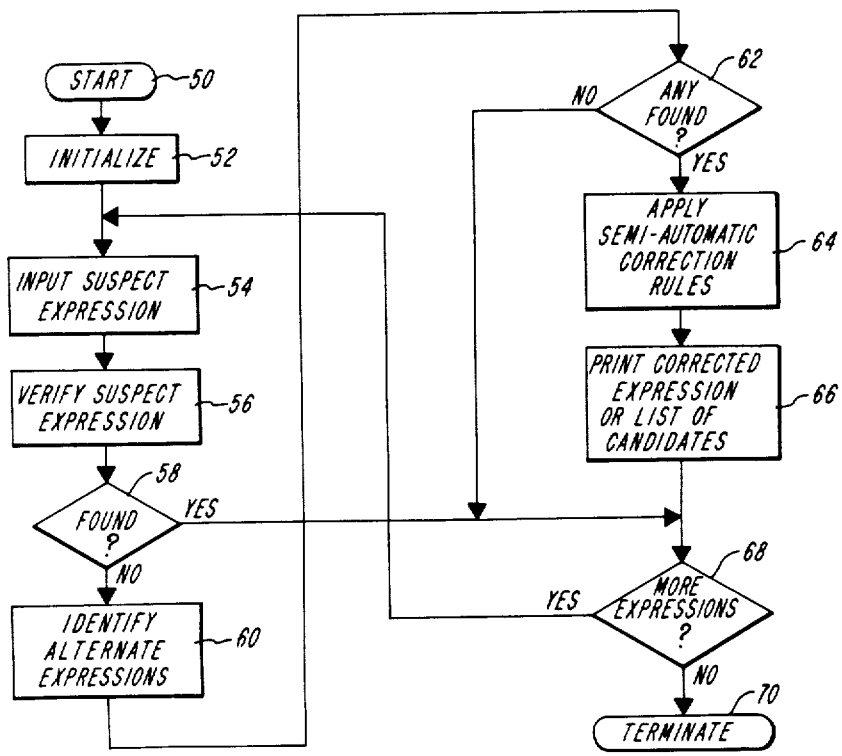
FIG. 4 is a flow chart depicting a processing sequence for a spelling verification and correction system operating in accord with one practice of the invention.
Figure 5:
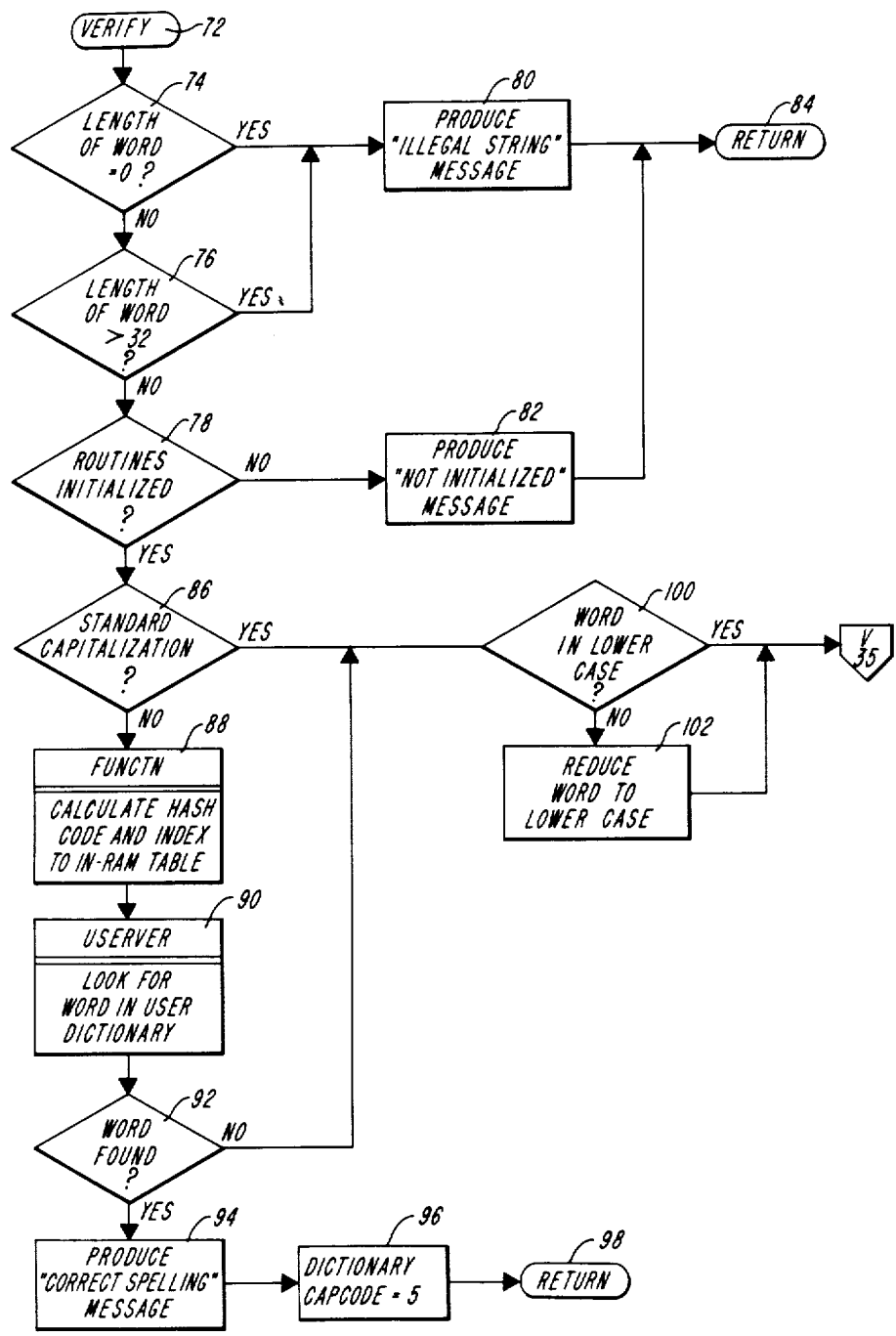
FIGS. 5-8 are flow charts depicting a processing sequence for a preferred spelling verification method.

FIG. 4 depicts one process for spelling verification and correction contemplated by the invention. In step 52, the process initializes program variables and database storage sections. This initialization is governed, in part, by database management software 20C (FIG. 1) and, in part, by the applications software. In step 54, the sequence accepts a suspect expression, furnished either by the user, via the keyboard, or by the central processing unit as part of a batch mode verification task. In a verification phase, step 56, the process compares the suspect expression with the linguistic expression database in order to identify matching database entries. If successful, the process proceeds to step 68; otherwise the process control is directed to a correction phase, at step 60.

In step 60, the process identifies candidate substitute expressions, i.e., those which are similar to the suspect expression, within the database. As indicated in steps 62–64, these alternate expressions can be arranged for display or selected for automatic substitution in accord with the semi-automatic correction procedure described in co-pending, commonly assigned U.S. Ser. No. 699,202, filed Feb. 5, 1985 for "Method and Apparatus for Semi-Automatic Spelling Correction." In step 66, the process prints the corrected suspect expression or a list of candidate alternate expressions.

In step 68, the process determines whether other suspect expressions require verification and correction. If so, the process is redirected to input step 54; otherwise, the process terminates at step 70.

According to one mode of operation, the illustrated sequence processes text on a page-by-page basis. For example, upon transmission of a page of text by the operator, the process checks and corrects any misspelled expressions. Where required, the process requests that operator select the desired substitute expression from a list of candidates. The illustrated process can also verify and correct an entire document. In accord with this mode of operation, the process produces an error file indicating the location of misspelled words and possible substitute expressions. Further, the process can operate solely in spelling verification mode or solely in spelling correction mode.

The object code for a preferred spelling verification and correction system is listed in Appendix II.

The Spelling Verifier

A preferred suspect expression verification sequence is depicted in FIGS. 5-8. The sequence begins at step 72 of FIG. 5. As indicated in steps 74-78, the sequence determines whether the input expression is of permissible length and whether the database routines have been initialized. If not, an error message is returned to the calling routine, as indicated in steps 80-84.

In step 86, the process examines the suspect word capitalization pattern. If the pattern is irregular, the process matches the suspect expression with expressions in the User Dictionary; see steps 88-90. If the suspect expression matches a User Dictionary expression, the process returns a success indication to the calling routine; see steps 92-98.

If the word is not found in the User Dictionary or the suspect expression capitalization pattern is regular, the process converts the suspect expression to all lower case characters; see steps 100-102. Subsequently, the process proceeds to the "V35" sequence.

Figure 6:
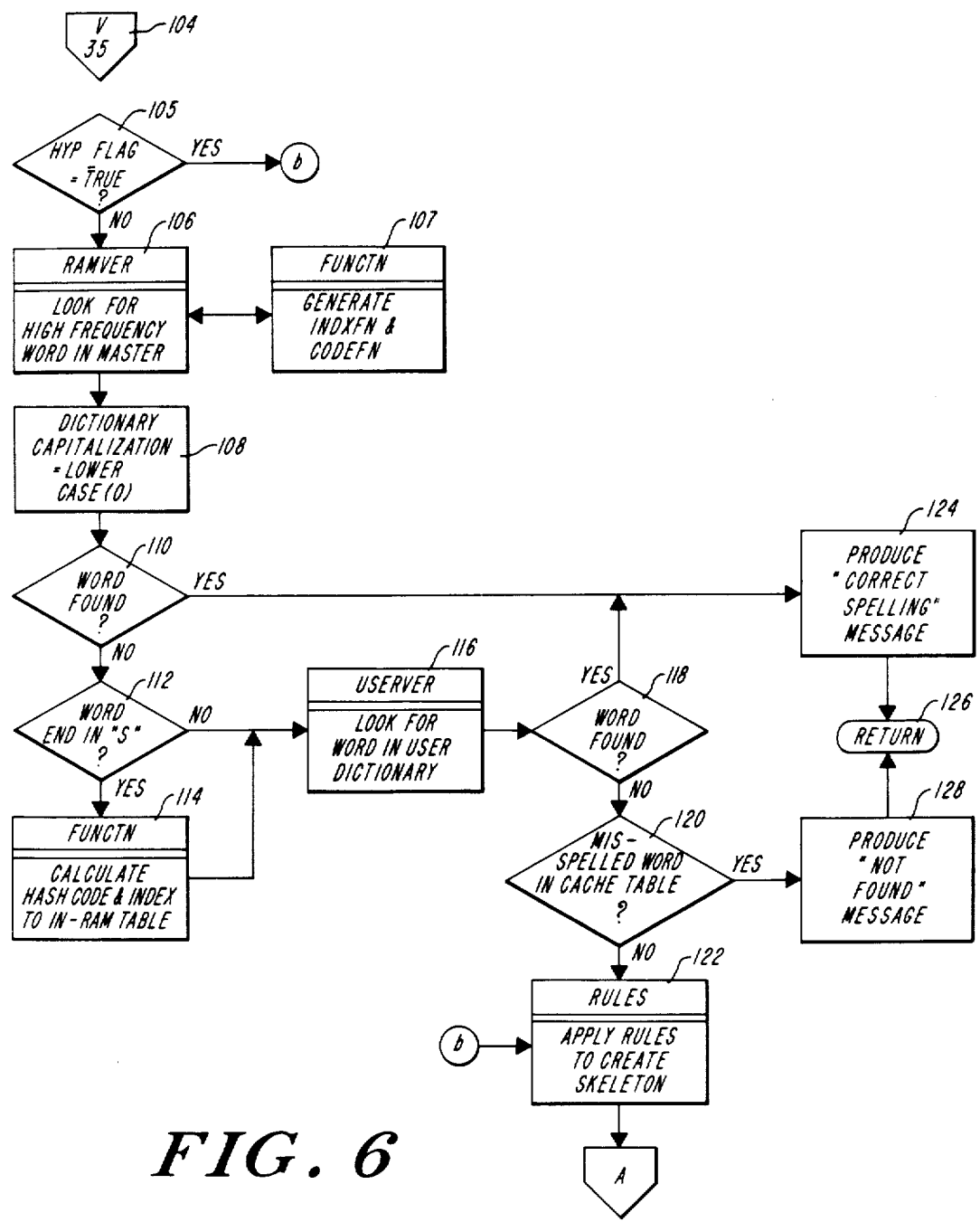

FIG. 6 depicts the "V35" sequence, which begins at step 104. According to that sequence, if the hyphenation flag is true—indicating that a hyphenation pattern is to be returned for the suspect expression—the process proceeds to step 122. Otherwise, the process proceeds to step 106 where it checks the common expression verification table for an occurrence of the expression.

In the event the suspect word does not match an entry in the common expression verification table, the process matches the expression with the User Dictionary, see step 112-116. If the suspect word matches an entry in the user dictionary, the process proceeds to step 124. Otherwise, the process can check a memory cache table to determine whether the word has already been identified as a misspelling; see steps 118-120. In an embodiment in which there exists limited RAM storage, a cache table is not utilized.

As indicated in the illustration, if the suspect word has not otherwise been identified as a misspelling, the process proceeds to step 122. There, the process generates a linguistically salient word skeleton of the word and proceeds to sequence "A".

In steps 124-128, the process sets a return code indicating whether the suspect expression is correctly spelled. The process then returns to the calling routine.

Figure 7:
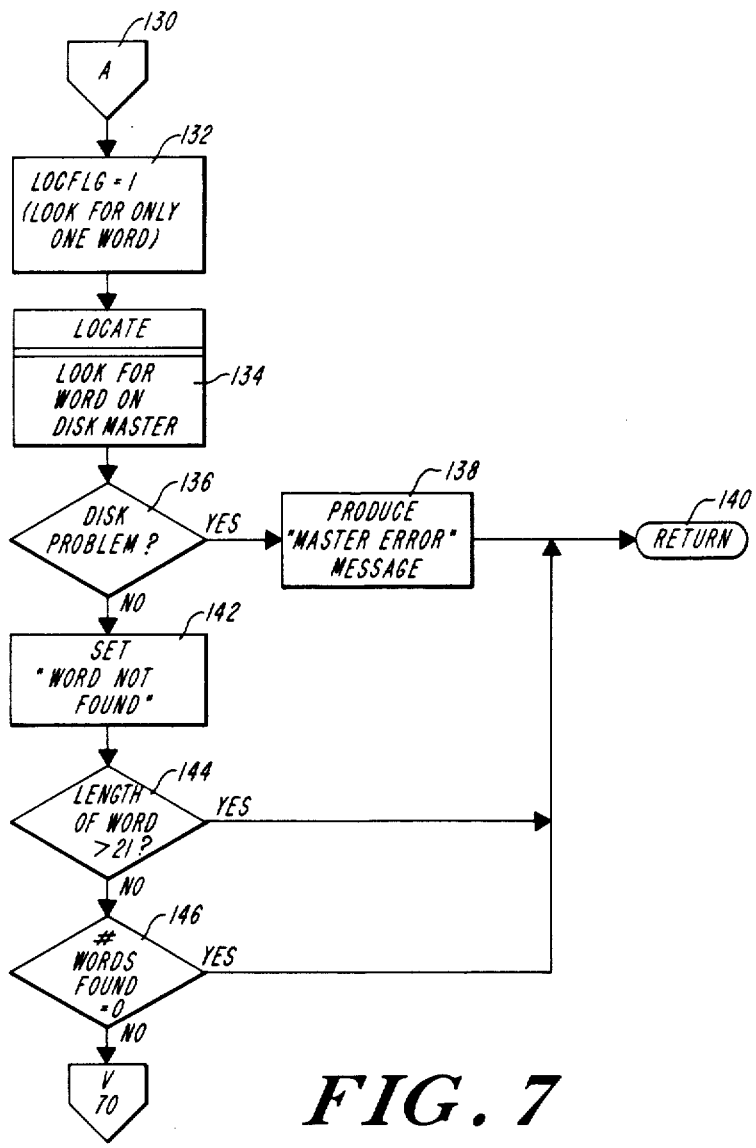

FIG. 7 depicts the "A" processing sequence, beginning at block 130, in which the process determines whether the suspect word is in the master version. Initially, a flag, LOCFLG, is set to indicate that the master lexicon is to be accessed in "verification" mode; see step 132. In step 134, the process matches the suspect word with the master lexicon entries. If a disk error occurs in searching the master lexicon, the process returns an error message to the calling routine; see steps 136-140. The process then examines the suspect word length and the number of matching master lexicon entries returned by the database routines. If the word length is greater than twenty-one or no matching entries were identified, the process returns a "word not found" indication to the calling routine; see steps 142-146. Otherwise, the process proceeds to the "V70" processing sequence.

Figure 8:
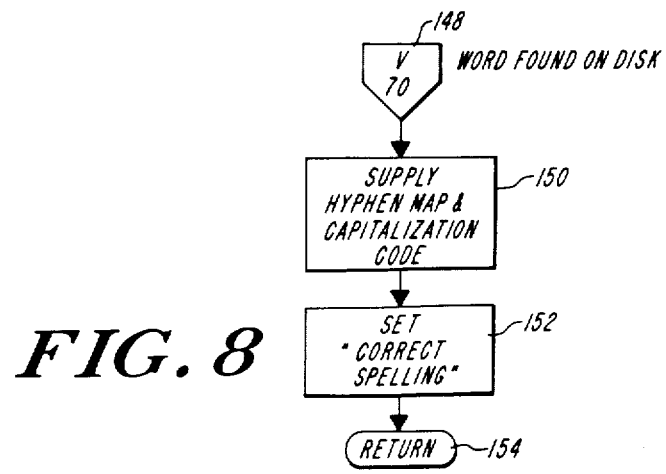
Figure 9:
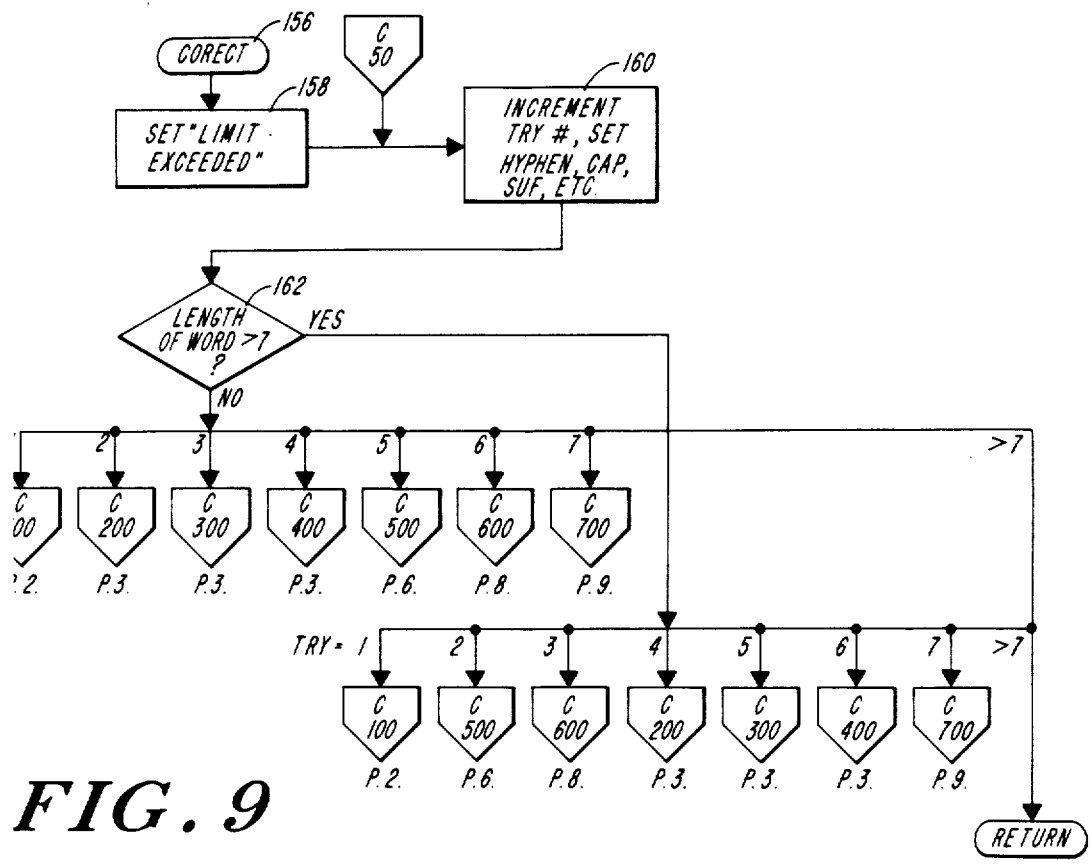

FIG. 8 depicts the "V70" processing sequence, which begins at block 148. In step 150, the process obtains from the database hyphenation and capitalization information for the verified suspect word. This information is returned to the calling routine along with an indication that the suspect expression is correctly spelled; see steps 152-154.

The Spelling Corrector

FIGS. 9-17 depict the operational sequence of a preferred spelling correction apparatus. The sequence begins at step 156, FIG. 9. In steps 158-160, the process initializes process variables, including, limit, hyphenation, capitalization, and suffix flags. The process then directs control in accord with the length of the suspect word. In particular, if the suspect word character length is less than or equal to seven, the process proceeds sequentially through the "C100", "C200", "C300", "C400", "C500", "C600", and "C700" processing sequences. Otherwise, the process proceeds sequentially through the "C100", "C500", "C600", "C200", "C300", "C400", "C700" processing sequences. Control of the sequential movement through each of these sequences is determined by the value of a "try" variable, which is incremented at the completion of each sequence. The process returns to the calling routine upon successfully identifying candidate expression during a "try" or upon unsuccessfully completing the seventh "try."

Figure 10:
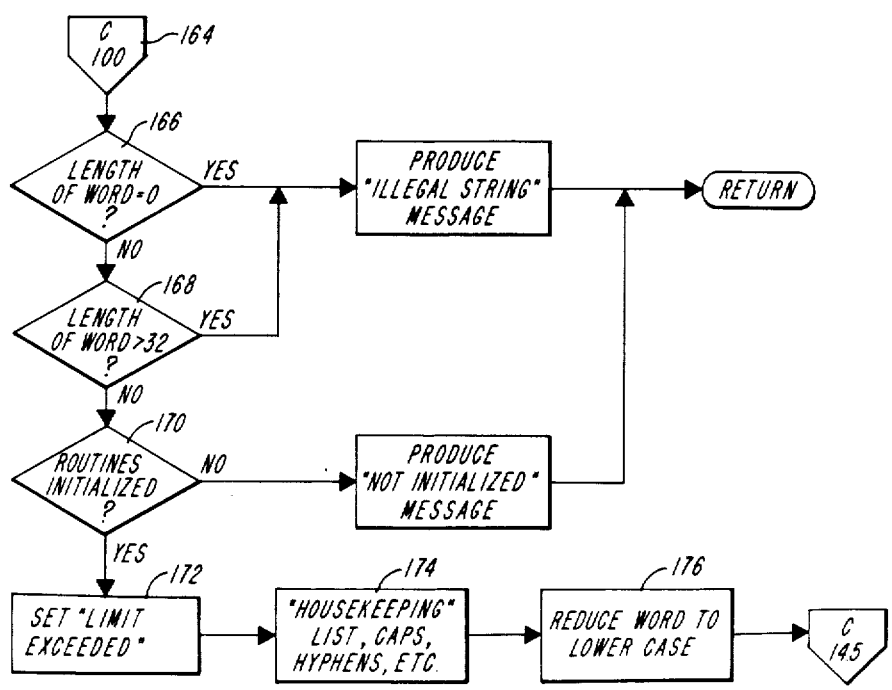

FIG. 10 depicts the "C100" processing sequence, which begins at step 164. In steps 166-170, the process checks the length of the suspect word and examines the initialization flag. In the event of error, the process returns to the calling routine. In steps 172-176, the process updates sequence processing variables and converts the suspect word to lower case. The process then proceeds to sequence "C145".

Figure 11:
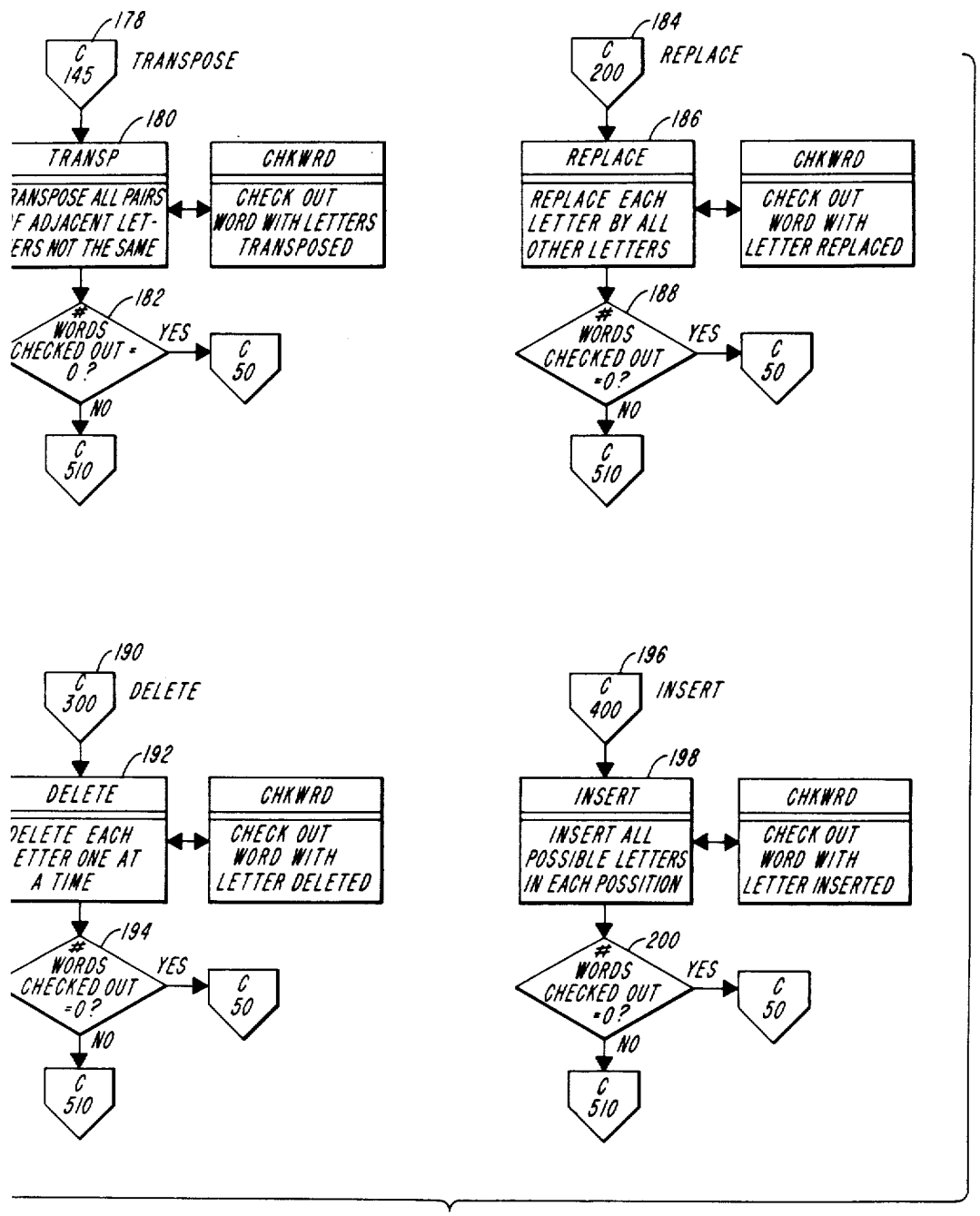

FIG. 11 depicts the "C145" processing sequence, which begins at step 178. In step 180, the process generates modified forms of the suspect expression by sequentially transposing each pair of adjacent characters. The modified expressions are checked for validity in the CHKWRD routine. In the event none of these modified expressions produce valid word forms, the process proceeds to the "C50" sequence; otherwise, the process proceeds to the "C510" sequence, i.e., step 246 (FIG. 15).

With continued reference to FIG. 11, the "C200" sequence begins at step 184. In block 186, the process generates modified forms of the suspect expression by replacing each letter in that expression with other letters of the alphabet. As above, the routine CHKWRD is invoked to verify each modified suspect expression. If any of the modified expressions match a database expression, the process proceeds to the "C50" sequence; otherwise, the process proceeds to the "C510" sequence.

The "C300" processing sequence begins at step 190. In step 192, the process generates modified forms of the suspect expression by sequentially deleting each character in the expression. These expressions are verified by the CHKWRD routine. As indicated in step 194, if any of the modified expressions are valid, processing proceeds to the "C510" sequence. Otherwise, processing proceeds to the "C50" sequence.

The "C400" processing sequence begins at step 196. In block 198, the process generates modified forms of the suspect word by inserting letters in each position of the suspect word. If any of the modified expressions are valid, as indicated by the CHKWRD routine, the process proceeds to sequence "C510." Otherwise, the process proceeds to sequence "C50."

Figure 12:
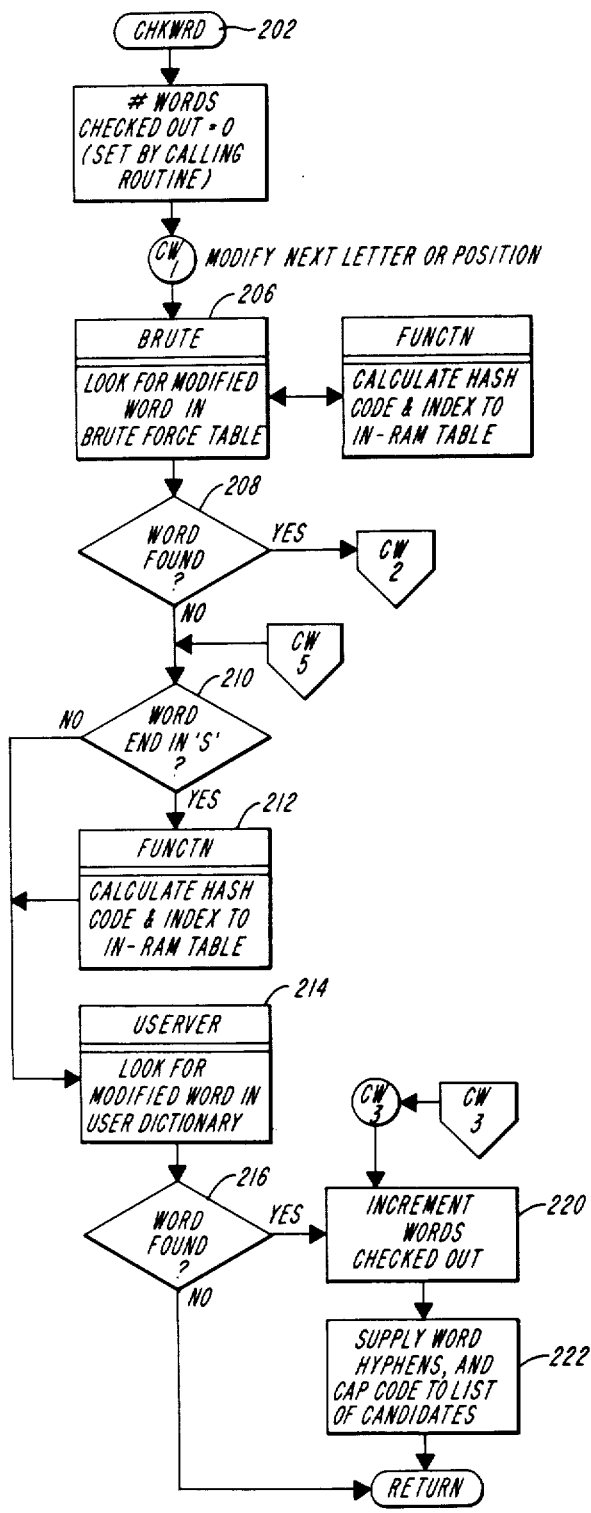

FIG. 12 depicts a preferred operational sequence for the CHKWRD routine, which begins at block 202. In step 206, the process compares a hash of the suspect word with the entries of the modified suspect expression verification table. This comparison permits the process to determine whether the modified suspect expression is likely to be valid. In steps 208-214, the process compares those modified expressions which do not match entries in the suspect expression modification table with the User Dictionary. If the modified expression is not found in the dictionary, the processor returns to the calling routine; see step 216.

If the modified suspect expression matches an entry in the modified suspect expression table, the process proceeds to processing sequence "CW2". Upon successful return from that sequence, as indicated by marker "CW3", the process proceeds through steps 220-222. There, the validated expression is added to the list of candidate replacement expressions.

Figure 13:
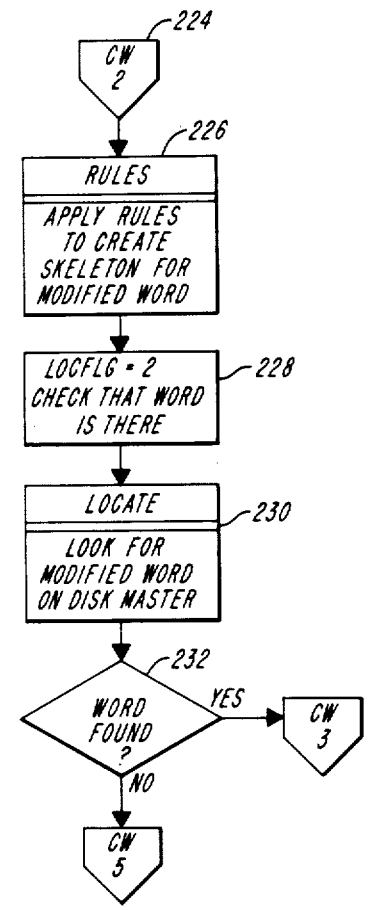

FIG. 13 depicts the "CW2" processing sequence, which begins at step 224. In step 226, the process generates a linguistically salient word skeleton of the modified suspect expression. In steps 228-230, the process identifies within the master lexicon entries matching the modified suspect expression. If the modified suspect expression is found in the database, the process proceeds to the "CW3" processing sequence. Otherwise, the process proceeds to the "CW5" processing sequence.

FIG. 14 depicts the "C500" processing sequence, which begins at block 234. In step 236, the process generates a linguistically salient word skeleton of the suspect word. In steps 238-240, the process compares this skeleton with skeletons of master lexicon entries. In the event a disk error occurs in matching skeletal entities, an error code is returned to the calling routine; otherwise, processing proceeds to either the "C50" or "C510" processing sequences, dependent upon whether any matching skeletons were identified.

FIG. 15 depicts the "C510" processing sequence, which begins at block 246. In step 248, the process adds to the candidate expression list each master lexicon entry identified as having a skeleton matching that of the suspect expression. According to step 250, where no candidate entries were identified, processing proceeds to the "C50" processing sequence. In steps 252-254, the process determines whether the number of candidate expressions is too large. If so, the "limit exceeded" flag is set and the process returns to the calling routine. Otherwise, in step 256, the candidate list "completed" flag is set, indicating that a suitable number of candidate expressions have been identified. Processing then returns to the calling routine.

FIG. 16 depicts the "C600" processing sequence, which begins at step 258. According to step 260, if the suspect word has a length greater than 21 characters, processing returns to the "C50" processing sequence; otherwise, in step 262, the process initializes routine variables. In step 264, the linguistically word skeleton of the suspect word is modified according to the target skeletal modification rules. Application of these rules involves examination of the suspect word skeleton for specific skeletal character sequences and, if found, replacing them with other sequences. According to step 266, where target substitution rules have been applied to the suspect word skeleton, a modified skeleton is passed to processing sequence "C620". If any candidates were identified from previous applications of the target rules, the "completed" flag is set and processing returns to the calling routine. If no such previous substitutions were effected, processing proceeds to the "C50" processing sequence.

Figure 17:
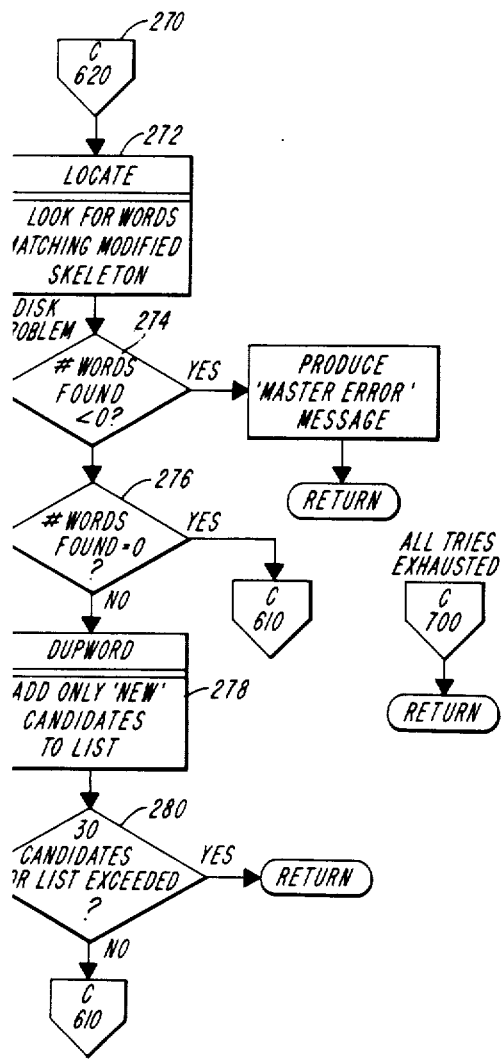
Figure 18:
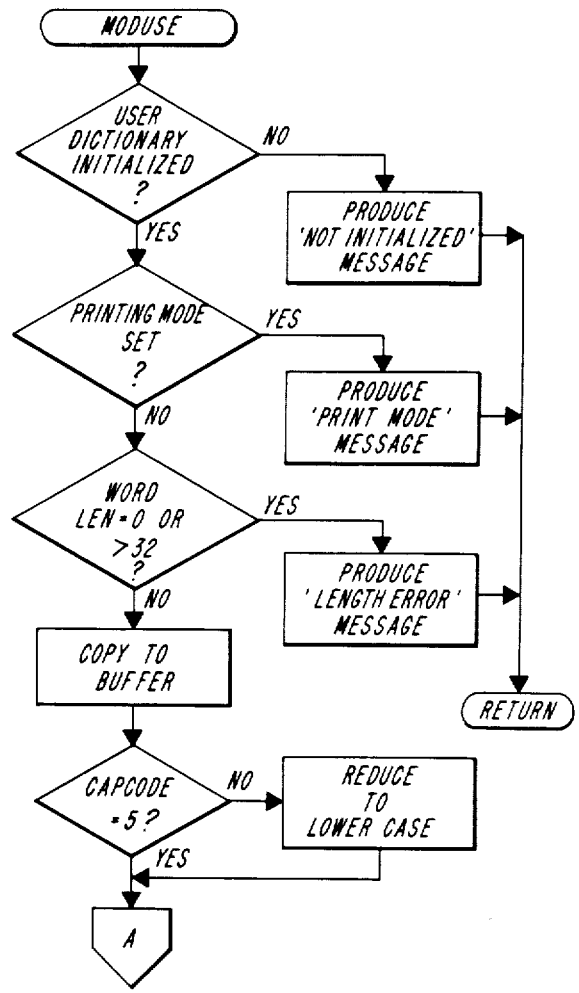
FIGS. 18-20 are flow charts depicting a processing sequence for a preferred user dictionary maintenance routine.
Figure 19:
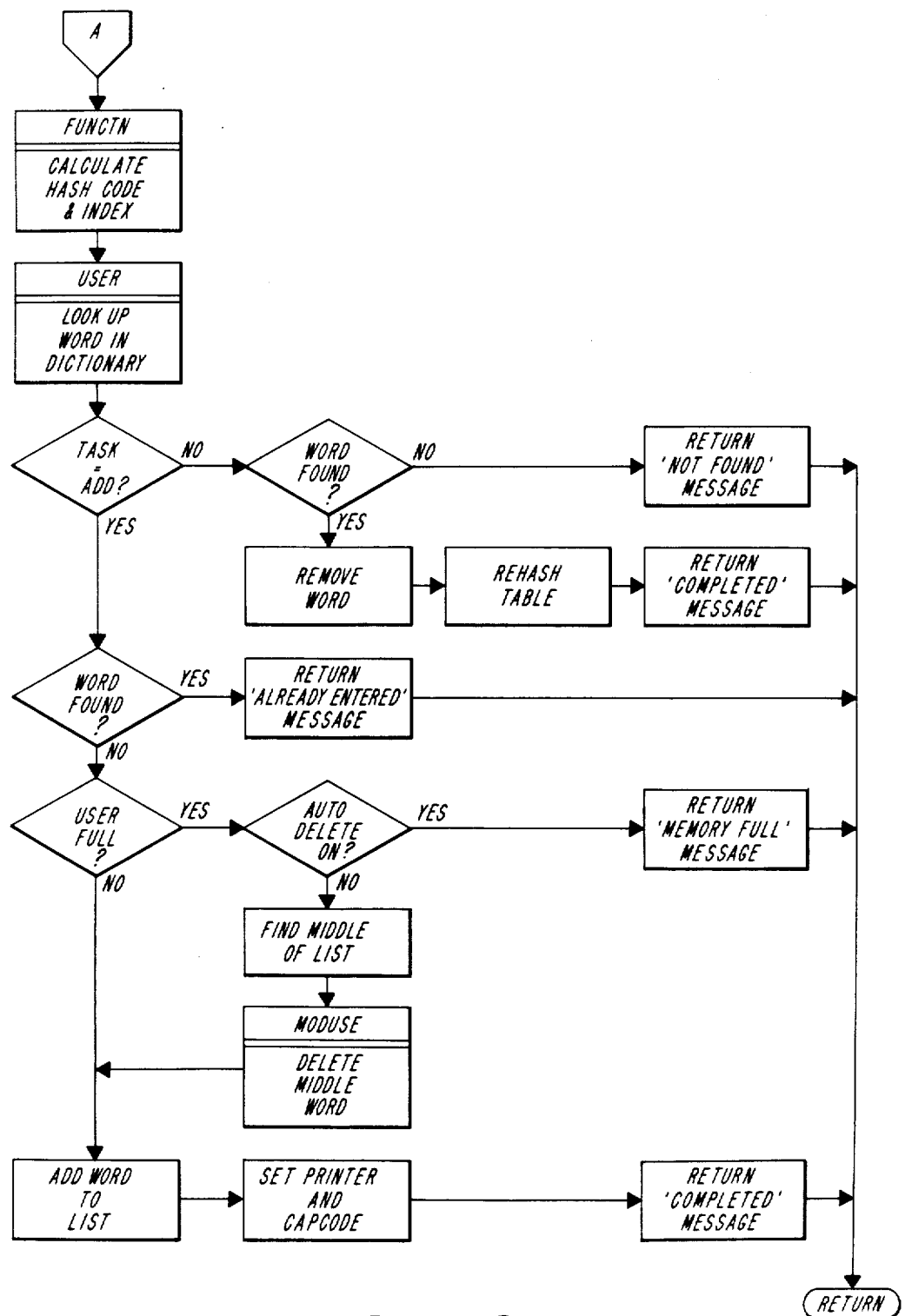

FIG. 17 depicts the "C620" processing sequence, which begins at step 270. In block 272, the process identifies master lexicon entries having skeletons matching the modified suspect expression skeleton. This identification step involves searching the block index table and decoding blocks of interest. In step 274, the process determines whether a disk error occurred in the identification step. If so, an error message is returned to the calling routine. If the process failed to identify matching skeletal expressions, the process returns to the C610 calling sequence; see steps 274-276. Otherwise, the master lexicon entries corresponding to the matching expressions are added to the candidate expression list. In step 280, the process sets "limit exceeded" flag if more than 30 candidate expressions were identified. The process then returns to the calling routine. If the candidate limit has not been exceeded, the process returns to "C610" sequence.

Skeleton-Forming Instruction Set

A spelling verification and correction apparatus constructed in accord with the invention operates, in part, by identifying and correcting cognitive spelling errors. These errors commonly arise because of a lack of correspondence, or isomorphy, between the graphic form of a word and the phonetic, or spoken form of that word. As one example, the following four words all have the same phonetic long "e" sound in the second syllable, but use four different spellings to represent that sound: "proceed", "precede", "receive" and "believe".

In English, discrepancies between the graphic and the phonetic forms of words arise in part from the spelling of unstressed vowels, of stressed long vowels and of some short stressed vowels, of single and of double consonants, and of silent vowels and consonants. Other discrepancies stem from different historical origins for words. This factor, for example, gives rise to different pronunciations of the same letters, such as the different pronunciations of the letters "ch" in the words "chronic", "cheat", and "chauffeur".

According to the invention a linguistically, salient word skeleton anticipates the foregoing discrepancies. One skeleton-forming process reduces, simplifies, or even eliminates the word parts which embody a discrepancy. For example, the four words "proceed", "precede", "receive", and "believe" noted above are transformed into skeletons by eliminating the troublesome letters "ee", the penultimate "e", and the terminal "e", "ei", and "ie". A word skeleton incorporates more salient parts of each word to identify its unique, distinguishing pattern of alphabetic characters, i.e., letters.

A linguistically salient word skeleton formed in accord with the invention also provides more linguistic distinctions in the skeleton of a short word than in the skeleton of a long word. The embodiment described below provides a four-way linguistic distinction for vowel sounds in short words: front, back, long, and short. It employs only a two-way, i.e., front and back, vocalic distinction for long words. More than two distinctions are deemed undesirable for long words because the added distinctions may interfere with the correction of certain misspellings. The two distinctions selected have been found sufficient, with other structures of long words, to characterize the word skeleton sufficiently and ensure that the correction system does not produce a large number of correctly spelled, but inappropriate suggestions. In short words, on the other hand, the stated four distinctions provide a finer initial differentiation which enables the system to produce a small number of correctly spelled suggestions for correcting the misspelling.

In forming the skeleton of a word, a process operating according to the invention carries out groups of conjunctively ordered steps. The output from one such step is the input to a subsequent step in the skeletonizing process. Other steps, however are complementary, i.e., disjunctive, and may be applied in different sequential orderings. The formation of a word skeleton is further characterized by the use of context-sensitive rules. These rules process parts of a word selectively, depending on such word-context factors as position in the word, letters, and the following or preceding letters.

The skeleton-forming process may be characterized, in part, as a set of ordered transformation rules on the word character string, including the steps of (i) omitting from the word skeleton a selected alpha set, i.e., character sequence, of the expression being converted which lacks isomorphy with a phonetic representation of that selected set, and (ii) replacing with a different linguistic symbol another selected alphabetic set, if any, of the expression being connected which lacks isomorphy with a phonetic representation of that other selected set.

A preferred set of computer program rules or instructions for forming the word skeleton of a correctly spelled word for the data bank and the skeleton of suspect expression, are set forth below.

The instruction set uses the following definitions:
- position: each letter in the word occupies a numbered position, starting with one for the left most position, i.e., the first letter of the word.
- word-initial: the letter occupying position one is the word-initial.
- word boundary: the end of the word is marked by the symbol "#", which immediately follows the last letter in the word.
- word-final: word-final position is defined as the position immediately preceding; #.

Lower case letters in this program are alpha characters of the English language, "E", "I", "O", "W", and "Y" are linguistic vocalic symbols; and "_" is a trace and represents a generic non-phonetic vocalic symbol.

The instructions are listed in a preferred execution sequence.
- Every "c" followed immediately by "e", "i", or "y" is rewritten as "s".
- Every non-word-initial "z" is rewritten as "s".
- Every "qu" sequence is rewritten as "kw".
- Word-initial "wr" sequences are rewritten as "r".
- Word-initial "wh" sequences are rewritten as "h" when followed immediately by "o".
- All sequences of "wh" are rewritten as "w" when followed immediately by "e", "i", "a", or "y".
- Every "tch" sequence is rewritten as "kh"
- Sequences of "tu" are rewritten as "kh" when followed by a single occurrence of "r", "n", "m", or "l" which is followed by "e", "a", "i", "o", or "y". Position restrictions: This operation does not apply to sequences beginning in position one or position two of the word.
- Sequences of "tu" are rewritten as "kh" when followed by "o", "a", or "e". The letter "o", "a", or "e" in this sequence is then rewritten as "o". Position restrictions: This operation does not apply to sequences beginning in position one or position two.
- Word-final "y" is rewritten as "Y". Position restrictions: This operation does not apply to words of less than three letters.
- Word-final "ie" sequences are rewritten as "Y". Position restrictions: This operation does not apply to words of less than four letters.
- Word-final "i" is rewritten as "Y". Position restrictions: This operation does not apply to words of less than three letters.
- Every intervocalic "i" or "y" is rewritten as "Y". In other words, every "i" or "y" that is both preceded and followed by any member of the set "e, i, o, a, u" is rewritten as "Y".
- Every "y" that is immediately preceded by a consonant (a member of the set "t, n, r, s, h, d, c, f, m, p, g, b, v, w, x, q, j, z") is rewritten as "i".
- Sequences of "si" and "ti" are rewritten as "sh" when followed immediately by "a", "o", or "u". Position restrictions: This operation does not apply to sequences beginning in position one or position two.
- Word-final sequences of "gue" are rewritten as "ge". Position restrictions: This rule does not apply to sequences beginning in position one or position two.
- Every remaining "ue" sequence is rewritten as "oo".
- Sequences of "e", "a", or "o" followed by "u" or "w" are rewritten as "oo" when followed by a consonant (member of the set "t, n, r, s, h, d, c, f, m, p, g, b, v, k, x, q, j") or when word-final.
- Word-final sequences "ea" and "ia" are rewritten as a trace ("_"). Position restrictions: This operation does not apply to words of less than four letters.
- Word-final "a" is rewritten as a trace ("_") in words of four or more letters.
- Word-final "ae" sequences are rewritten as a trace ("_") in words of five or more letters.
- All word-initial vowels or (word-initial) sequences of vowels (members of the set "a, e, i, o, u") are rewritten as a trace ("_")
- Every "dg" sequence is rewritten as "g".
- Every remaining "c" is rewritten as "k".
- Every sequence of two or three identical consonants (members of the set "t, n, r, s, h, d, f, m, p, g, b, v, w, y, k, x, q, j") is rewritten as a single consonant.

Every "ks" sequence is rewritten as "x".

Sequences of "xion" are rewritten as "xhon". Position restriction: This operation does not apply to word-initial sequences.

Word-initial "ps" sequences are rewritten as "s".

Every "rh" sequence is rewritten as "r".

Non-word-initial sequences of "ght" are rewritten as "te".

Every "ph" sequence is rewritten as "f".

Every "gn" sequence is rewritten as "n".

Word-initial sequences of "kn" or "pn" are rewritten as "n".

Every "sx" sequence is rewritten as "x".

The letters "e", "i", and "a" are rewritten as "E" when preceded exclusively by consonants and/or preceded by the trace of word-initial vowels.

The letters "o" and "u" are rewritten as "O" when preceded exclusively by consonants and/or preceded by the trace of word-initial vowels.

The symbol "E" is rewritten as "O" when it is followed by a single "r" which is followed by any other consonant (member of the set "t, n, s, d, f, m, p, g, b, v, k, q, j, z") or a word boundary. Position restriction: This operation does not apply to letters in word-initial position.

Word-final "o" and "u" are rewritten as "O". Position restriction: This operation applies only to words of two or more letters.

Word-final "oe" sequences are rewritten as "O". Position restriction: This operation applies only to words of two or more letters.

The symbol "E" is rewritten as "I" when it is followed exclusively by consonants (up to nine without any intervening vowels).

The symbol "O" is rewritten as "W" when it is followed exclusively by consonants (up to nine without any intervening vowels).

Every remaining "a", "e", "i", "o", "u", and "y" is deleted. Position restriction: This operation does not apply in word-initial position.

Every hard hyphen and period is deleted.

Targeted Skeletal Modifications

The target skeletal modifications are applied to a skeleton to produce another skeleton. Each skeletal modification substitutes one skeletal character sequence with another skeletal character sequence. In the preferred embodiment, there are 73 targeted substitutions. These are identified in the table below.

| Skeletal Character Sequence | Sequence Substitution |
|---|---|
| 'E' | 'I' |
| 'O' | 'W' |
| 'I' | 'E' |
| 'W' | 'O' |
| 'rI' | 'Wr' |
| 'Wr' | 'rE' |
| 'E' | 'O' |
| 'O' | 'E' |
| 'W' | 'I' |
| 'I' | 'W' |
| 'rE' | 'Or' |
| 'I' | 'O' |
| 'Wr' | 'Er' |
| 'Or' | 'rO' |
| 'Or' | 'rE' |
| 'E' | 'Or' |
| 'fs' | 'vs' |
| 'k' | 'kh' |
| 'rtk' | 'rktk' |
| 'mt' | 'mpt' |
| 'g' | 'gh' |
| 'Of' | 'Ogh' |
| 'j' | 'g' |
| 'nb' | 'mb' |
| 'np' | 'mp' |
| 'nf' | 'mf' |
| 'sm' | 'sthm' |
| 'sh' | 'kh' |
| 'kht' | 'sht' |
| 'Ed' | 'Et' |
| 'Od' | 'Ot' |
| 'jl' | 'dl' |
| 'sh' | 's' |
| 'sh' | 't' |
| 'rE' | 'rE_' |
| 'k' | 'kw' |
| 'kY' | 'kw' |
| 'kY' | 'kwt' |
| 'Y' | 't' |
| 'j' | 'dj' |
| 'Wf' | 'Ogh' |
| 'gs' | 'x' |
| 'sl' | 'stl' |
| 'khn' | 'tn' |
| 'rmn' | 'mmn' |
| 'W' | 'Wr' |
| 'E' | 'E_' |
| 'O' | 'Or' |
| 'rO' | 'Or' |
| 'Or' | 'O' |
| 'g' | 'j' |
| 'ns' | 'nsw' |
| 'm' | 'mn' |
| 'm' | 'mb' |
| 'Y' | '' |
| 't' | 'tY' |
| 'sn' | 'stn' |
| 'sE' | 'skE' |
| 'km' | 'sm' |
| 'sh' | 'xh' |
| 'tn' | 'shn' |
| 'O' | 'Ogh' |
| 'E' | 'Egh' |
| 'I' | 'll' |
| '.' | 'O' |
| '_' | 'r' |
| 'r' | '' |
| 'O' | 'OO' |
| 'O' | '' |
| 'p' | 'pt' |
| 'k' | 'kt' |
| 'nth' | 'ngth' |
| 'sE' | 'kO' |

The foregoing skeletal creation rules and targeted substitutions are merely illustrative and may be modified. By way of non-limiting examples, the number of steps in the set can be changed. Additional steps may increase the percentage of misspellings which are corrected and may decrease the number of suggestions which the system produces for correcting a misspelling. A corrector having a lesser number of steps, as by eliminating steps that deal with vowels, may have the opposite result. For example, the suggested order of the first four steps of the skeletal creation rules can be changed at will.

A system for spelling verification, spelling correction, and linguistic expression storage of the type provided by the invention and described above has a number of advantages. The linguistic expression database is highly compact, permitting the representation of a large spelling dictionary within the memory constraints of a word processing system or microprocessor-controlled typewriter. Further the database has a structure which can be rapidly accessed to locate either a specific expression or its linguistically salient word skeleton.

Spelling verification and correction systems constructed in accord with the invention require minimal programming and storage. Accordingly, these systems are readily adapted for relatively low-cost implementation. The systems can recognize and correct spelling errors resulting from both cognitive and typographic errors. The systems operate at relatively high speed so as to reduce the amount of time required to correct a document. Additionally, the systems can interface with other text processing software to provide word processing capabilities tailored to different user-specific needs.

In accord with the above description, the invention attains the objects set forth. It is intended that all matter in the description and drawings be interpreted as illustrative and not in a limiting sense. For example, differing methods of character sequence representation, including explicit, indirect, suffix, capitalization, and hyphen-codings, may be used; the master lexicon coding complexity may be reduced, e.g., by providing merely differential character sequences in place of the above-mentioned entry section sequences; similarly, the various other database section, e.g. the block index table, modified suspect expression verification table, user dictionary, etc., may be simplified or eliminated entirely.

Further, the encoding techniques discussed above and, particularly, those directed to master lexicon entry and decompression table coding may be used in conjunction with any of the currently available computerized dictionary databases. Moreover, the spelling correction techniques discussed above may be utilized in the absence of the above-described data compaction techniques.

Of course, the exemplary modifications outlined above may result in reduced database, verifier, or corrector efficiency.

Those skilled in the art may make changes described in the embodiment, and in other teachings herein, for further practices which are within the scope of the invention described and claimed herein.

Appendix I

The Decompression Tables

Common Pattern Section

The listing on the following pages represents the content of a preferred common pattern section of the decompression table. Each element of the common pattern section is shown as an entry in the array COMMON. The array entry number is indicated in brackets. The numerical field following the equal sign represents the hexadecimal code stored in each entry. The two-digit hexadecimal code following the initial colon represents a suffix pattern. The single-digit hexadecimal code following the next colon represents the number of common characters. Further, the final two-digit hexadecimal code represents a portion of the hyphenation map.

Common Table

```
common[    0] = 0000 : 00 : 0 : 00
common[    1] = 0002 : 00 : 0 : 02
common[    2] = 0004 : 00 : 0 : 04
common[    3] = 0005 : 00 : 0 : 05
common[    4] = 0008 : 00 : 0 : 08
```

```
common[  5] = 0009 : 00 : 0 : 09
common[  6] = 000A : 00 : 0 : 0A
common[  7] = 0010 : 00 : 0 : 10
common[  8] = 0011 : 00 : 0 : 11
common[  9] = 0012 : 00 : 0 : 12
common[ 10] = 0014 : 00 : 0 : 14
common[ 11] = 0015 : 00 : 0 : 15
common[ 12] = 0040 : 00 : 1 : 00
common[ 13] = 0041 : 00 : 1 : 01
common[ 14] = 0042 : 00 : 1 : 02
common[ 15] = 0044 : 00 : 1 : 04
common[ 16] = 0045 : 00 : 1 : 05
common[ 17] = 0048 : 00 : 1 : 08
common[ 18] = 0049 : 00 : 1 : 09
common[ 19] = 004A : 00 : 1 : 0A
common[ 20] = 0050 : 00 : 1 : 10
common[ 21] = 0051 : 00 : 1 : 11
common[ 22] = 0052 : 00 : 1 : 12
common[ 23] = 0054 : 00 : 1 : 14
common[ 24] = 0055 : 00 : 1 : 15
common[ 25] = 0080 : 00 : 2 : 00
common[ 26] = 0081 : 00 : 2 : 01
common[ 27] = 0082 : 00 : 2 : 02
common[ 28] = 0084 : 00 : 2 : 04
common[ 29] = 0085 : 00 : 2 : 05
common[ 30] = 0088 : 00 : 2 : 08
common[ 31] = 0089 : 00 : 2 : 09
common[ 32] = 008A : 00 : 2 : 0A
common[ 33] = 0090 : 00 : 2 : 10
common[ 34] = 0091 : 00 : 2 : 11
common[ 35] = 0092 : 00 : 2 : 12
common[ 36] = 0094 : 00 : 2 : 14
common[ 37] = 0095 : 00 : 2 : 15
common[ 38] = 00C0 : 00 : 3 : 00
common[ 39] = 00C1 : 00 : 3 : 01
common[ 40] = 00C2 : 00 : 3 : 02
common[ 41] = 00C4 : 00 : 3 : 04
common[ 42] = 00C5 : 00 : 3 : 05
common[ 43] = 00C8 : 00 : 3 : 08
common[ 44] = 00C9 : 00 : 3 : 09
common[ 45] = 00CA : 00 : 3 : 0A
common[ 46] = 00D0 : 00 : 3 : 10
common[ 47] = 00D1 : 00 : 3 : 11
common[ 48] = 00D2 : 00 : 3 : 12
common[ 49] = 00D4 : 00 : 3 : 14
common[ 50] = 00D5 : 00 : 3 : 15
common[ 51] = 0100 : 00 : 4 : 00
common[ 52] = 0101 : 00 : 4 : 01
common[ 53] = 0102 : 00 : 4 : 02
common[ 54] = 0104 : 00 : 4 : 04
common[ 55] = 0105 : 00 : 4 : 05
common[ 56] = 0108 : 00 : 4 : 08
common[ 57] = 0109 : 00 : 4 : 09
common[ 58] = 010A : 00 : 4 : 0A
common[ 59] = 0110 : 00 : 4 : 10
common[ 60] = 0111 : 00 : 4 : 11
```

```
common[  61] = 0112 : 00 : 4 : 12
common[  62] = 0114 : 00 : 4 : 14
common[  63] = 0115 : 00 : 4 : 15
common[  64] = 0140 : 00 : 5 : 00
common[  65] = 0141 : 00 : 5 : 01
common[  66] = 0142 : 00 : 5 : 02
common[  67] = 0144 : 00 : 5 : 04
common[  68] = 0145 : 00 : 5 : 05
common[  69] = 0148 : 00 : 5 : 08
common[  70] = 0149 : 00 : 5 : 09
common[  71] = 014A : 00 : 5 : 0A
common[  72] = 0150 : 00 : 5 : 10
common[  73] = 0151 : 00 : 5 : 11
common[  74] = 0152 : 00 : 5 : 12
common[  75] = 0154 : 00 : 5 : 14
common[  76] = 0155 : 00 : 5 : 15
common[  77] = 0180 : 00 : 6 : 00
common[  78] = 0181 : 00 : 6 : 01
common[  79] = 0182 : 00 : 6 : 02
common[  80] = 0184 : 00 : 6 : 04
common[  81] = 0185 : 00 : 6 : 05
common[  82] = 0188 : 00 : 6 : 08
common[  83] = 0189 : 00 : 6 : 09
common[  84] = 018A : 00 : 6 : 0A
common[  85] = 0190 : 00 : 6 : 10
common[  86] = 0191 : 00 : 6 : 11
common[  87] = 0192 : 00 : 6 : 12
common[  88] = 0194 : 00 : 6 : 14
common[  89] = 0195 : 00 : 6 : 15
common[  90] = 01C0 : 00 : 7 : 00
common[  91] = 01C1 : 00 : 7 : 01
common[  92] = 01C2 : 00 : 7 : 02
common[  93] = 01C4 : 00 : 7 : 04
common[  94] = 01C5 : 00 : 7 : 05
common[  95] = 01C8 : 00 : 7 : 08
common[  96] = 01C9 : 00 : 7 : 09
common[  97] = 01CA : 00 : 7 : 0A
common[  98] = 01D0 : 00 : 7 : 10
common[  99] = 01D1 : 00 : 7 : 11
common[ 100] = 01D2 : 00 : 7 : 12
common[ 101] = 01D4 : 00 : 7 : 14
common[ 102] = 01D5 : 00 : 7 : 15
common[ 103] = 0200 : 00 : 8 : 00
common[ 104] = 0201 : 00 : 8 : 01
common[ 105] = 0202 : 00 : 8 : 02
common[ 106] = 0204 : 00 : 8 : 04
common[ 107] = 0205 : 00 : 8 : 05
common[ 108] = 0208 : 00 : 8 : 08
common[ 109] = 0209 : 00 : 8 : 09
common[ 110] = 020A : 00 : 8 : 0A
common[ 111] = 0210 : 00 : 8 : 10
common[ 112] = 0211 : 00 : 8 : 11
common[ 113] = 0212 : 00 : 8 : 12
common[ 114] = 0214 : 00 : 8 : 14
common[ 115] = 0215 : 00 : 8 : 15
common[ 116] = 0240 : 00 : 9 : 00
common[ 117] = 0241 : 00 : 9 : 01
```

```
common[ 118] = 0242 : 00 : 9 : 02
common[ 119] = 0244 : 00 : 9 : 04
common[ 120] = 0245 : 00 : 9 : 05
common[ 121] = 0248 : 00 : 9 : 08
common[ 122] = 0249 : 00 : 9 : 09
common[ 123] = 024A : 00 : 9 : 0A
common[ 124] = 0250 : 00 : 9 : 10
common[ 125] = 0251 : 00 : 9 : 11
common[ 126] = 0252 : 00 : 9 : 12
common[ 127] = 0254 : 00 : 9 : 14
common[ 128] = 0255 : 00 : 9 : 15
common[ 129] = 0280 : 00 : A : 00
common[ 130] = 0281 : 00 : A : 01
common[ 131] = 0282 : 00 : A : 02
common[ 132] = 0284 : 00 : A : 04
common[ 133] = 0285 : 00 : A : 05
common[ 134] = 0288 : 00 : A : 08
common[ 135] = 0289 : 00 : A : 09
common[ 136] = 028A : 00 : A : 0A
common[ 137] = 0290 : 00 : A : 10
common[ 138] = 0291 : 00 : A : 11
common[ 139] = 0292 : 00 : A : 12
common[ 140] = 0294 : 00 : A : 14
common[ 141] = 0295 : 00 : A : 15
common[ 142] = 02C0 : 00 : B : 00
common[ 143] = 02C1 : 00 : B : 01
common[ 144] = 02C2 : 00 : B : 02
common[ 145] = 02C4 : 00 : B : 04
common[ 146] = 02C5 : 00 : B : 05
common[ 147] = 02C8 : 00 : B : 08
common[ 148] = 02C9 : 00 : B : 09
common[ 149] = 02CA : 00 : B : 0A
common[ 150] = 02D0 : 00 : B : 10
common[ 151] = 02D1 : 00 : B : 11
common[ 152] = 02D2 : 00 : B : 12
common[ 153] = 02D4 : 00 : B : 14
common[ 154] = 02D5 : 00 : B : 15
common[ 155] = 0300 : 00 : C : 00
common[ 156] = 0301 : 00 : C : 01
common[ 157] = 0302 : 00 : C : 02
common[ 158] = 0304 : 00 : C : 04
common[ 159] = 0305 : 00 : C : 05
common[ 160] = 0308 : 00 : C : 08
common[ 161] = 0309 : 00 : C : 09
common[ 162] = 030A : 00 : C : 0A
common[ 163] = 0310 : 00 : C : 10
common[ 164] = 0311 : 00 : C : 11
common[ 165] = 0312 : 00 : C : 12
common[ 166] = 0314 : 00 : C : 14
common[ 167] = 0315 : 00 : C : 15
common[ 168] = 0340 : 00 : D : 00
common[ 169] = 0342 : 00 : D : 02
common[ 170] = 0344 : 00 : D : 04
common[ 171] = 0345 : 00 : D : 05
common[ 172] = 0348 : 00 : D : 08
common[ 173] = 0349 : 00 : D : 09
common[ 174] = 034A : 00 : D : 0A
```

```
common[ 175 ] = 0351 : 00 : D : 11
common[ 176 ] = 0352 : 00 : D : 12
common[ 177 ] = 0354 : 00 : D : 14
common[ 178 ] = 0380 : 00 : E : 00
common[ 179 ] = 0384 : 00 : E : 04
common[ 180 ] = 0385 : 00 : E : 05
common[ 181 ] = 0389 : 00 : E : 09
common[ 182 ] = 038A : 00 : E : 0A
common[ 183 ] = 0392 : 00 : E : 12
common[ 184 ] = 03D2 : 00 : F : 12
common[ 185 ] = 0400 : 01 : 0 : 00
common[ 186 ] = 0401 : 01 : 0 : 01
common[ 187 ] = 0402 : 01 : 0 : 02
common[ 188 ] = 0404 : 01 : 0 : 04
common[ 189 ] = 0405 : 01 : 0 : 05
common[ 190 ] = 0408 : 01 : 0 : 08
common[ 191 ] = 0409 : 01 : 0 : 09
common[ 192 ] = 040A : 01 : 0 : 0A
common[ 193 ] = 0410 : 01 : 0 : 10
common[ 194 ] = 0411 : 01 : 0 : 11
common[ 195 ] = 0412 : 01 : 0 : 12
common[ 196 ] = 0414 : 01 : 0 : 14
common[ 197 ] = 0415 : 01 : 0 : 15
common[ 198 ] = 0440 : 01 : 1 : 00
common[ 199 ] = 0441 : 01 : 1 : 01
common[ 200 ] = 0442 : 01 : 1 : 02
common[ 201 ] = 0444 : 01 : 1 : 04
common[ 202 ] = 0445 : 01 : 1 : 05
common[ 203 ] = 0448 : 01 : 1 : 08
common[ 204 ] = 0449 : 01 : 1 : 09
common[ 205 ] = 044A : 01 : 1 : 0A
common[ 206 ] = 0450 : 01 : 1 : 10
common[ 207 ] = 0451 : 01 : 1 : 11
common[ 208 ] = 0452 : 01 : 1 : 12
common[ 209 ] = 0454 : 01 : 1 : 14
common[ 210 ] = 0455 : 01 : 1 : 15
common[ 211 ] = 0480 : 01 : 2 : 00
common[ 212 ] = 0481 : 01 : 2 : 01
common[ 213 ] = 0482 : 01 : 2 : 02
common[ 214 ] = 0484 : 01 : 2 : 04
common[ 215 ] = 0485 : 01 : 2 : 05
common[ 216 ] = 0488 : 01 : 2 : 08
common[ 217 ] = 0489 : 01 : 2 : 09
common[ 218 ] = 048A : 01 : 2 : 0A
common[ 219 ] = 0490 : 01 : 2 : 10
common[ 220 ] = 0491 : 01 : 2 : 11
common[ 221 ] = 0492 : 01 : 2 : 12
common[ 222 ] = 0494 : 01 : 2 : 14
common[ 223 ] = 0495 : 01 : 2 : 15
common[ 224 ] = 04C0 : 01 : 3 : 00
common[ 225 ] = 04C1 : 01 : 3 : 01
common[ 226 ] = 04C2 : 01 : 3 : 02
common[ 227 ] = 04C4 : 01 : 3 : 04
common[ 228 ] = 04C5 : 01 : 3 : 05
common[ 229 ] = 04C8 : 01 : 3 : 08
common[ 230 ] = 04C9 : 01 : 3 : 09
common[ 231 ] = 04CA : 01 : 3 : 0A
```

```
common[ 232] = 04D0 : 01 : 3 : 10
common[ 233] = 04D1 : 01 : 3 : 11
common[ 234] = 04D2 : 01 : 3 : 12
common[ 235] = 04D4 : 01 : 3 : 14
common[ 236] = 04D5 : 01 : 3 : 15
common[ 237] = 0500 : 01 : 4 : 00
common[ 238] = 0502 : 01 : 4 : 02
common[ 239] = 0504 : 01 : 4 : 04
common[ 240] = 0505 : 01 : 4 : 05
common[ 241] = 0508 : 01 : 4 : 08
common[ 242] = 0509 : 01 : 4 : 09
common[ 243] = 050A : 01 : 4 : 0A
common[ 244] = 0510 : 01 : 4 : 10
common[ 245] = 0511 : 01 : 4 : 11
common[ 246] = 0512 : 01 : 4 : 12
common[ 247] = 0514 : 01 : 4 : 14
common[ 248] = 0515 : 01 : 4 : 15
common[ 249] = 0540 : 01 : 5 : 00
common[ 250] = 0541 : 01 : 5 : 01
common[ 251] = 0542 : 01 : 5 : 02
common[ 252] = 0544 : 01 : 5 : 04
common[ 253] = 0545 : 01 : 5 : 05
common[ 254] = 0548 : 01 : 5 : 08
common[ 255] = 0549 : 01 : 5 : 09
common[ 256] = 054A : 01 : 5 : 0A
common[ 257] = 0550 : 01 : 5 : 10
common[ 258] = 0551 : 01 : 5 : 11
common[ 259] = 0552 : 01 : 5 : 12
common[ 260] = 0554 : 01 : 5 : 14
common[ 261] = 0555 : 01 : 5 : 15
common[ 262] = 0580 : 01 : 6 : 00
common[ 263] = 0581 : 01 : 6 : 01
common[ 264] = 0582 : 01 : 6 : 02
common[ 265] = 0584 : 01 : 6 : 04
common[ 266] = 0585 : 01 : 6 : 05
common[ 267] = 0588 : 01 : 6 : 08
common[ 268] = 0589 : 01 : 6 : 09
common[ 269] = 058A : 01 : 6 : 0A
common[ 270] = 0590 : 01 : 6 : 10
common[ 271] = 0591 : 01 : 6 : 11
common[ 272] = 0592 : 01 : 6 : 12
common[ 273] = 0594 : 01 : 6 : 14
common[ 274] = 0595 : 01 : 6 : 15
common[ 275] = 05C0 : 01 : 7 : 00
common[ 276] = 05C1 : 01 : 7 : 01
common[ 277] = 05C2 : 01 : 7 : 02
common[ 278] = 05C4 : 01 : 7 : 04
common[ 279] = 05C5 : 01 : 7 : 05
common[ 280] = 05C8 : 01 : 7 : 08
common[ 281] = 05C9 : 01 : 7 : 09
common[ 282] = 05CA : 01 : 7 : 0A
common[ 283] = 05D0 : 01 : 7 : 10
common[ 284] = 05D1 : 01 : 7 : 11
common[ 285] = 05D2 : 01 : 7 : 12
common[ 286] = 05D4 : 01 : 7 : 14
common[ 287] = 05D5 : 01 : 7 : 15
common[ 288] = 0600 : 01 : 8 : 00
```

```
common[ 289] = 0601 : 01 : 8 : 01
common[ 290] = 0602 : 01 : 8 : 02
common[ 291] = 0604 : 01 : 8 : 04
common[ 292] = 0605 : 01 : 8 : 05
common[ 293] = 0608 : 01 : 8 : 08
common[ 294] = 0609 : 01 : 8 : 09
common[ 295] = 060A : 01 : 8 : 0A
common[ 296] = 0610 : 01 : 8 : 10
common[ 297] = 0611 : 01 : 8 : 11
common[ 298] = 0612 : 01 : 8 : 12
common[ 299] = 0614 : 01 : 8 : 14
common[ 300] = 0615 : 01 : 8 : 15
common[ 301] = 0641 : 01 : 9 : 01
common[ 302] = 0642 : 01 : 9 : 02
common[ 303] = 0644 : 01 : 9 : 04
common[ 304] = 0645 : 01 : 9 : 05
common[ 305] = 0648 : 01 : 9 : 08
common[ 306] = 0649 : 01 : 9 : 09
common[ 307] = 064A : 01 : 9 : 0A
common[ 308] = 0650 : 01 : 9 : 10
common[ 309] = 0651 : 01 : 9 : 11
common[ 310] = 0652 : 01 : 9 : 12
common[ 311] = 0654 : 01 : 9 : 14
common[ 312] = 0655 : 01 : 9 : 15
common[ 313] = 0680 : 01 : A : 00
common[ 314] = 0682 : 01 : A : 02
common[ 315] = 0684 : 01 : A : 04
common[ 316] = 0685 : 01 : A : 05
common[ 317] = 0688 : 01 : A : 08
common[ 318] = 0689 : 01 : A : 09
common[ 319] = 068A : 01 : A : 0A
common[ 320] = 0690 : 01 : A : 10
common[ 321] = 0691 : 01 : A : 11
common[ 322] = 0692 : 01 : A : 12
common[ 323] = 0694 : 01 : A : 14
common[ 324] = 06C0 : 01 : B : 00
common[ 325] = 06C2 : 01 : B : 02
common[ 326] = 06C4 : 01 : B : 04
common[ 327] = 06C8 : 01 : B : 08
common[ 328] = 06C9 : 01 : B : 09
common[ 329] = 06CA : 01 : B : 0A
common[ 330] = 06D0 : 01 : B : 10
common[ 331] = 06D2 : 01 : B : 12
common[ 332] = 06D4 : 01 : B : 14
common[ 333] = 0700 : 01 : C : 00
common[ 334] = 0701 : 01 : C : 01
common[ 335] = 0709 : 01 : C : 09
common[ 336] = 070A : 01 : C : 0A
common[ 337] = 0712 : 01 : C : 12
common[ 338] = 0714 : 01 : C : 14
common[ 339] = 0740 : 01 : D : 00
common[ 340] = 0748 : 01 : D : 08
common[ 341] = 0749 : 01 : D : 09
common[ 342] = 0752 : 01 : D : 12
common[ 343] = 0800 : 02 : 0 : 00
common[ 344] = 0802 : 02 : 0 : 02
common[ 345] = 0804 : 02 : 0 : 04
```

```
common[ 346] = 0805 : 02 : 0 : 05
common[ 347] = 0808 : 02 : 0 : 08
common[ 348] = 0809 : 02 : 0 : 09
common[ 349] = 080A : 02 : 0 : 0A
common[ 350] = 0810 : 02 : 0 : 10
common[ 351] = 0811 : 02 : 0 : 11
common[ 352] = 0812 : 02 : 0 : 12
common[ 353] = 0814 : 02 : 0 : 14
common[ 354] = 0815 : 02 : 0 : 15
common[ 355] = 0840 : 02 : 1 : 00
common[ 356] = 0842 : 02 : 1 : 02
common[ 357] = 0844 : 02 : 1 : 04
common[ 358] = 0845 : 02 : 1 : 05
common[ 359] = 0848 : 02 : 1 : 08
common[ 360] = 0849 : 02 : 1 : 09
common[ 361] = 084A : 02 : 1 : 0A
common[ 362] = 0850 : 02 : 1 : 10
common[ 363] = 0851 : 02 : 1 : 11
common[ 364] = 0852 : 02 : 1 : 12
common[ 365] = 0854 : 02 : 1 : 14
common[ 366] = 0855 : 02 : 1 : 15
common[ 367] = 0880 : 02 : 2 : 00
common[ 368] = 0881 : 02 : 2 : 01
common[ 369] = 0882 : 02 : 2 : 02
common[ 370] = 0884 : 02 : 2 : 04
common[ 371] = 0885 : 02 : 2 : 05
common[ 372] = 0888 : 02 : 2 : 08
common[ 373] = 0889 : 02 : 2 : 09
common[ 374] = 088A : 02 : 2 : 0A
common[ 375] = 0890 : 02 : 2 : 10
common[ 376] = 0891 : 02 : 2 : 11
common[ 377] = 0892 : 02 : 2 : 12
common[ 378] = 0894 : 02 : 2 : 14
common[ 379] = 08C0 : 02 : 3 : 00
common[ 380] = 08C1 : 02 : 3 : 01
common[ 381] = 08C2 : 02 : 3 : 02
common[ 382] = 08C4 : 02 : 3 : 04
common[ 383] = 08C5 : 02 : 3 : 05
common[ 384] = 08C8 : 02 : 3 : 08
common[ 385] = 08C9 : 02 : 3 : 09
common[ 386] = 08CA : 02 : 3 : 0A
common[ 387] = 08D0 : 02 : 3 : 10
common[ 388] = 08D1 : 02 : 3 : 11
common[ 389] = 08D2 : 02 : 3 : 12
common[ 390] = 08D4 : 02 : 3 : 14
common[ 391] = 08D5 : 02 : 3 : 15
common[ 392] = 0900 : 02 : 4 : 00
common[ 393] = 0902 : 02 : 4 : 02
common[ 394] = 0904 : 02 : 4 : 04
common[ 395] = 0905 : 02 : 4 : 05
common[ 396] = 0908 : 02 : 4 : 08
common[ 397] = 0909 : 02 : 4 : 09
common[ 398] = 090A : 02 : 4 : 0A
common[ 399] = 0910 : 02 : 4 : 10
common[ 400] = 0911 : 02 : 4 : 11
common[ 401] = 0912 : 02 : 4 : 12
common[ 402] = 0914 : 02 : 4 : 14
```

```
common[ 403] = 0940 : 02 : 5 : 00
common[ 404] = 0942 : 02 : 5 : 02
common[ 405] = 0944 : 02 : 5 : 04
common[ 406] = 0945 : 02 : 5 : 05
common[ 407] = 0948 : 02 : 5 : 08
common[ 408] = 0949 : 02 : 5 : 09
common[ 409] = 094A : 02 : 5 : 0A
common[ 410] = 0950 : 02 : 5 : 10
common[ 411] = 0951 : 02 : 5 : 11
common[ 412] = 0952 : 02 : 5 : 12
common[ 413] = 0954 : 02 : 5 : 14
common[ 414] = 0955 : 02 : 5 : 15
common[ 415] = 0980 : 02 : 6 : 00
common[ 416] = 0981 : 02 : 6 : 01
common[ 417] = 0982 : 02 : 6 : 02
common[ 418] = 0984 : 02 : 6 : 04
common[ 419] = 0985 : 02 : 6 : 05
common[ 420] = 0988 : 02 : 6 : 08
common[ 421] = 0989 : 02 : 6 : 09
common[ 422] = 098A : 02 : 6 : 0A
common[ 423] = 0990 : 02 : 6 : 10
common[ 424] = 0991 : 02 : 6 : 11
common[ 425] = 0992 : 02 : 6 : 12
common[ 426] = 0994 : 02 : 6 : 14
common[ 427] = 09C0 : 02 : 7 : 00
common[ 428] = 09C2 : 02 : 7 : 02
common[ 429] = 09C4 : 02 : 7 : 04
common[ 430] = 09C5 : 02 : 7 : 05
common[ 431] = 09C8 : 02 : 7 : 08
common[ 432] = 09C9 : 02 : 7 : 09
common[ 433] = 09CA : 02 : 7 : 0A
common[ 434] = 09D0 : 02 : 7 : 10
common[ 435] = 09D1 : 02 : 7 : 11
common[ 436] = 09D2 : 02 : 7 : 12
common[ 437] = 09D4 : 02 : 7 : 14
common[ 438] = 09D5 : 02 : 7 : 15
common[ 439] = 0A00 : 02 : 8 : 00
common[ 440] = 0A02 : 02 : 8 : 02
common[ 441] = 0A04 : 02 : 8 : 04
common[ 442] = 0A05 : 02 : 8 : 05
common[ 443] = 0A08 : 02 : 8 : 08
common[ 444] = 0A09 : 02 : 8 : 09
common[ 445] = 0A0A : 02 : 8 : 0A
common[ 446] = 0A10 : 02 : 8 : 10
common[ 447] = 0A11 : 02 : 8 : 11
common[ 448] = 0A12 : 02 : 8 : 12
common[ 449] = 0A14 : 02 : 8 : 14
common[ 450] = 0A15 : 02 : 8 : 15
common[ 451] = 0A40 : 02 : 9 : 00
common[ 452] = 0A42 : 02 : 9 : 02
common[ 453] = 0A44 : 02 : 9 : 04
common[ 454] = 0A45 : 02 : 9 : 05
common[ 455] = 0A48 : 02 : 9 : 08
common[ 456] = 0A49 : 02 : 9 : 09
common[ 457] = 0A4A : 02 : 9 : 0A
common[ 458] = 0A50 : 02 : 9 : 10
common[ 459] = 0A51 : 02 : 9 : 11
```

```
common[ 460] = 0A52 : 02 : 9 : 12
common[ 461] = 0A54 : 02 : 9 : 14
common[ 462] = 0A55 : 02 : 9 : 15
common[ 463] = 0A80 : 02 : A : 00
common[ 464] = 0A82 : 02 : A : 02
common[ 465] = 0A84 : 02 : A : 04
common[ 466] = 0A88 : 02 : A : 08
common[ 467] = 0A89 : 02 : A : 09
common[ 468] = 0A8A : 02 : A : 0A
common[ 469] = 0A90 : 02 : A : 10
common[ 470] = 0A91 : 02 : A : 11
common[ 471] = 0A92 : 02 : A : 12
common[ 472] = 0A94 : 02 : A : 14
common[ 473] = 0A95 : 02 : A : 15
common[ 474] = 0AC0 : 02 : B : 00
common[ 475] = 0AC2 : 02 : B : 02
common[ 476] = 0AC4 : 02 : B : 04
common[ 477] = 0AC8 : 02 : B : 08
common[ 478] = 0AC9 : 02 : B : 09
common[ 479] = 0ACA : 02 : B : 0A
common[ 480] = 0AD1 : 02 : B : 11
common[ 481] = 0AD2 : 02 : B : 12
common[ 482] = 0AD4 : 02 : B : 14
common[ 483] = 0B00 : 02 : C : 00
common[ 484] = 0B04 : 02 : C : 04
common[ 485] = 0B05 : 02 : C : 05
common[ 486] = 0B08 : 02 : C : 08
common[ 487] = 0B09 : 02 : C : 09
common[ 488] = 0B12 : 02 : C : 12
common[ 489] = 0B14 : 02 : C : 14
common[ 490] = 0B44 : 02 : D : 04
common[ 491] = 0B4A : 02 : D : 0A
common[ 492] = 1000 : 04 : 0 : 00
common[ 493] = 1002 : 04 : 0 : 02
common[ 494] = 1004 : 04 : 0 : 04
common[ 495] = 1008 : 04 : 0 : 08
common[ 496] = 1010 : 04 : 0 : 10
common[ 497] = 1040 : 04 : 1 : 00
common[ 498] = 1042 : 04 : 1 : 02
common[ 499] = 1044 : 04 : 1 : 04
common[ 500] = 1048 : 04 : 1 : 08
common[ 501] = 1049 : 04 : 1 : 09
common[ 502] = 104A : 04 : 1 : 0A
common[ 503] = 1050 : 04 : 1 : 10
common[ 504] = 1054 : 04 : 1 : 14
common[ 505] = 1080 : 04 : 2 : 00
common[ 506] = 1082 : 04 : 2 : 02
common[ 507] = 1084 : 04 : 2 : 04
common[ 508] = 1088 : 04 : 2 : 08
common[ 509] = 1090 : 04 : 2 : 10
common[ 510] = 10C0 : 04 : 3 : 00
common[ 511] = 10C2 : 04 : 3 : 02
common[ 512] = 10C4 : 04 : 3 : 04
common[ 513] = 10C8 : 04 : 3 : 08
common[ 514] = 10D0 : 04 : 3 : 10
common[ 515] = 1102 : 04 : 4 : 02
common[ 516] = 1104 : 04 : 4 : 04
```

```
common[ 517] = 1108 : 04 : 4 : 08
common[ 518] = 110A : 04 : 4 : 0A
common[ 519] = 1110 : 04 : 4 : 10
common[ 520] = 1142 : 04 : 5 : 02
common[ 521] = 1144 : 04 : 5 : 04
common[ 522] = 1148 : 04 : 5 : 08
common[ 523] = 114A : 04 : 5 : 0A
common[ 524] = 1152 : 04 : 5 : 12
common[ 525] = 1154 : 04 : 5 : 14
common[ 526] = 1181 : 04 : 6 : 01
common[ 527] = 1182 : 04 : 6 : 02
common[ 528] = 1184 : 04 : 6 : 04
common[ 529] = 1185 : 04 : 6 : 05
common[ 530] = 1188 : 04 : 6 : 08
common[ 531] = 1189 : 04 : 6 : 09
common[ 532] = 118A : 04 : 6 : 0A
common[ 533] = 1191 : 04 : 6 : 11
common[ 534] = 1192 : 04 : 6 : 12
common[ 535] = 1194 : 04 : 6 : 14
common[ 536] = 11C1 : 04 : 7 : 01
common[ 537] = 11C2 : 04 : 7 : 02
common[ 538] = 11C4 : 04 : 7 : 04
common[ 539] = 11C5 : 04 : 7 : 05
common[ 540] = 11C8 : 04 : 7 : 08
common[ 541] = 11C9 : 04 : 7 : 09
common[ 542] = 11CA : 04 : 7 : 0A
common[ 543] = 11D1 : 04 : 7 : 11
common[ 544] = 11D2 : 04 : 7 : 12
common[ 545] = 11D4 : 04 : 7 : 14
common[ 546] = 11D5 : 04 : 7 : 15
common[ 547] = 1202 : 04 : 8 : 02
common[ 548] = 1204 : 04 : 8 : 04
common[ 549] = 1205 : 04 : 8 : 05
common[ 550] = 1208 : 04 : 8 : 08
common[ 551] = 1209 : 04 : 8 : 09
common[ 552] = 120A : 04 : 8 : 0A
common[ 553] = 1210 : 04 : 8 : 10
common[ 554] = 1211 : 04 : 8 : 11
common[ 555] = 1212 : 04 : 8 : 12
common[ 556] = 1214 : 04 : 8 : 14
common[ 557] = 1215 : 04 : 8 : 15
common[ 558] = 1241 : 04 : 9 : 01
common[ 559] = 1242 : 04 : 9 : 02
common[ 560] = 1244 : 04 : 9 : 04
common[ 561] = 1245 : 04 : 9 : 05
common[ 562] = 1248 : 04 : 9 : 08
common[ 563] = 1249 : 04 : 9 : 09
common[ 564] = 124A : 04 : 9 : 0A
common[ 565] = 1251 : 04 : 9 : 11
common[ 566] = 1252 : 04 : 9 : 12
common[ 567] = 1254 : 04 : 9 : 14
common[ 568] = 1282 : 04 : A : 02
common[ 569] = 1284 : 04 : A : 04
common[ 570] = 1285 : 04 : A : 05
common[ 571] = 1288 : 04 : A : 08
common[ 572] = 1289 : 04 : A : 09
common[ 573] = 128A : 04 : A : 0A
```

```
common[ 574] = 1291 : 04 : A : 11
common[ 575] = 1292 : 04 : A : 12
common[ 576] = 1294 : 04 : A : 14
common[ 577] = 1295 : 04 : A : 15
common[ 578] = 12C1 : 04 : B : 01
common[ 579] = 12C2 : 04 : B : 02
common[ 580] = 12C4 : 04 : B : 04
common[ 581] = 12C5 : 04 : B : 05
common[ 582] = 12C9 : 04 : B : 09
common[ 583] = 12CA : 04 : B : 0A
common[ 584] = 12D1 : 04 : B : 11
common[ 585] = 12D2 : 04 : B : 12
common[ 586] = 12D4 : 04 : B : 14
common[ 587] = 1309 : 04 : C : 09
common[ 588] = 1312 : 04 : C : 12
common[ 589] = 1351 : 04 : D : 11
common[ 590] = 1352 : 04 : D : 12
common[ 591] = 1800 : 06 : 0 : 00
common[ 592] = 1804 : 06 : 0 : 04
common[ 593] = 1808 : 06 : 0 : 08
common[ 594] = 1810 : 06 : 0 : 10
common[ 595] = 1814 : 06 : 0 : 14
common[ 596] = 1840 : 06 : 1 : 00
common[ 597] = 1842 : 06 : 1 : 02
common[ 598] = 1844 : 06 : 1 : 04
common[ 599] = 1848 : 06 : 1 : 08
common[ 600] = 184A : 06 : 1 : 0A
common[ 601] = 1850 : 06 : 1 : 10
common[ 602] = 1852 : 06 : 1 : 12
common[ 603] = 1854 : 06 : 1 : 14
common[ 604] = 1880 : 06 : 2 : 00
common[ 605] = 1882 : 06 : 2 : 02
common[ 606] = 1884 : 06 : 2 : 04
common[ 607] = 1888 : 06 : 2 : 08
common[ 608] = 1890 : 06 : 2 : 10
common[ 609] = 18C0 : 06 : 3 : 00
common[ 610] = 18C4 : 06 : 3 : 04
common[ 611] = 18C8 : 06 : 3 : 08
common[ 612] = 18D0 : 06 : 3 : 10
common[ 613] = 18D2 : 06 : 3 : 12
common[ 614] = 18D4 : 06 : 3 : 14
common[ 615] = 1904 : 06 : 4 : 04
common[ 616] = 1908 : 06 : 4 : 08
common[ 617] = 190A : 06 : 4 : 0A
common[ 618] = 1910 : 06 : 4 : 10
common[ 619] = 1942 : 06 : 5 : 02
common[ 620] = 1944 : 06 : 5 : 04
common[ 621] = 1948 : 06 : 5 : 08
common[ 622] = 1952 : 06 : 5 : 12
common[ 623] = 1981 : 06 : 6 : 01
common[ 624] = 1984 : 06 : 6 : 04
common[ 625] = 1989 : 06 : 6 : 09
common[ 626] = 198A : 06 : 6 : 0A
common[ 627] = 1994 : 06 : 6 : 14
common[ 628] = 19C2 : 06 : 7 : 02
common[ 629] = 19C4 : 06 : 7 : 04
common[ 630] = 19CA : 06 : 7 : 0A
```

```
common[ 631] = 19D2 : 06 : 7 : 12
common[ 632] = 1A01 : 06 : 8 : 01
common[ 633] = 1A05 : 06 : 8 : 05
common[ 634] = 1A09 : 06 : 8 : 09
common[ 635] = 1A11 : 06 : 8 : 11
common[ 636] = 1A15 : 06 : 8 : 15
common[ 637] = 1A42 : 06 : 9 : 02
common[ 638] = 1A44 : 06 : 9 : 04
common[ 639] = 1A48 : 06 : 9 : 08
common[ 640] = 1A4A : 06 : 9 : 0A
common[ 641] = 1A50 : 06 : 9 : 10
common[ 642] = 1A52 : 06 : 9 : 12
common[ 643] = 1A82 : 06 : A : 02
common[ 644] = 1A84 : 06 : A : 04
common[ 645] = 1A85 : 06 : A : 05
common[ 646] = 1A88 : 06 : A : 08
common[ 647] = 1A89 : 06 : A : 09
common[ 648] = 1A92 : 06 : A : 12
common[ 649] = 1AC2 : 06 : B : 02
common[ 650] = 1AC4 : 06 : B : 04
common[ 651] = 1ACA : 06 : B : 0A
common[ 652] = 1AD2 : 06 : B : 12
common[ 653] = 2000 : 08 : 0 : 00
common[ 654] = 2004 : 08 : 0 : 04
common[ 655] = 2008 : 08 : 0 : 08
common[ 656] = 2010 : 08 : 0 : 10
common[ 657] = 2012 : 08 : 0 : 12
common[ 658] = 2040 : 08 : 1 : 00
common[ 659] = 2042 : 08 : 1 : 02
common[ 660] = 2044 : 08 : 1 : 04
common[ 661] = 2048 : 08 : 1 : 08
common[ 662] = 2050 : 08 : 1 : 10
common[ 663] = 2080 : 08 : 2 : 00
common[ 664] = 2082 : 08 : 2 : 02
common[ 665] = 2084 : 08 : 2 : 04
common[ 666] = 2088 : 08 : 2 : 08
common[ 667] = 20C0 : 08 : 3 : 00
common[ 668] = 20C2 : 08 : 3 : 02
common[ 669] = 20C4 : 08 : 3 : 04
common[ 670] = 20C8 : 08 : 3 : 08
common[ 671] = 20D0 : 08 : 3 : 10
common[ 672] = 20D2 : 08 : 3 : 12
common[ 673] = 2100 : 08 : 4 : 00
common[ 674] = 2102 : 08 : 4 : 02
common[ 675] = 2104 : 08 : 4 : 04
common[ 676] = 2108 : 08 : 4 : 08
common[ 677] = 2142 : 08 : 5 : 02
common[ 678] = 2144 : 08 : 5 : 04
common[ 679] = 2180 : 08 : 6 : 00
common[ 680] = 2181 : 08 : 6 : 01
common[ 681] = 2182 : 08 : 6 : 02
common[ 682] = 2184 : 08 : 6 : 04
common[ 683] = 2189 : 08 : 6 : 09
common[ 684] = 2192 : 08 : 6 : 12
common[ 685] = 21C1 : 08 : 7 : 01
common[ 686] = 21C4 : 08 : 7 : 04
common[ 687] = 21C9 : 08 : 7 : 09
```

```
common[ 688] = 21D1 : 08 : 7  : 11
common[ 689] = 2204 : 08 : 8  : 04
common[ 690] = 2800 : 0A : 0  : 00
common[ 691] = 2802 : 0A : 0  : 02
common[ 692] = 2804 : 0A : 0  : 04
common[ 693] = 2805 : 0A : 0  : 05
common[ 694] = 2808 : 0A : 0  : 08
common[ 695] = 280A : 0A : 0  : 0A
common[ 696] = 2810 : 0A : 0  : 10
common[ 697] = 2811 : 0A : 0  : 11
common[ 698] = 2812 : 0A : 0  : 12
common[ 699] = 2814 : 0A : 0  : 14
common[ 700] = 2815 : 0A : 0  : 15
common[ 701] = 2840 : 0A : 1  : 00
common[ 702] = 2842 : 0A : 1  : 02
common[ 703] = 2844 : 0A : 1  : 04
common[ 704] = 2845 : 0A : 1  : 05
common[ 705] = 2848 : 0A : 1  : 08
common[ 706] = 2849 : 0A : 1  : 09
common[ 707] = 284A : 0A : 1  : 0A
common[ 708] = 2850 : 0A : 1  : 10
common[ 709] = 2851 : 0A : 1  : 11
common[ 710] = 2852 : 0A : 1  : 12
common[ 711] = 2854 : 0A : 1  : 14
common[ 712] = 2855 : 0A : 1  : 15
common[ 713] = 2880 : 0A : 2  : 00
common[ 714] = 2882 : 0A : 2  : 02
common[ 715] = 2884 : 0A : 2  : 04
common[ 716] = 2885 : 0A : 2  : 05
common[ 717] = 2888 : 0A : 2  : 08
common[ 718] = 2889 : 0A : 2  : 09
common[ 719] = 288A : 0A : 2  : 0A
common[ 720] = 2890 : 0A : 2  : 10
common[ 721] = 2891 : 0A : 2  : 11
common[ 722] = 2892 : 0A : 2  : 12
common[ 723] = 2894 : 0A : 2  : 14
common[ 724] = 2895 : 0A : 2  : 15
common[ 725] = 28C0 : 0A : 3  : 00
common[ 726] = 28C2 : 0A : 3  : 02
common[ 727] = 28C4 : 0A : 3  : 04
common[ 728] = 28C5 : 0A : 3  : 05
common[ 729] = 28C8 : 0A : 3  : 08
common[ 730] = 28C9 : 0A : 3  : 09
common[ 731] = 28CA : 0A : 3  : 0A
common[ 732] = 28D0 : 0A : 3  : 10
common[ 733] = 28D1 : 0A : 3  : 11
common[ 734] = 28D2 : 0A : 3  : 12
common[ 735] = 28D4 : 0A : 3  : 14
common[ 736] = 28D5 : 0A : 3  : 15
common[ 737] = 2900 : 0A : 4  : 00
common[ 738] = 2902 : 0A : 4  : 02
common[ 739] = 2904 : 0A : 4  : 04
common[ 740] = 2905 : 0A : 4  : 05
common[ 741] = 2908 : 0A : 4  : 08
common[ 742] = 2909 : 0A : 4  : 09
common[ 743] = 290A : 0A : 4  : 0A
```

```
common[ 744] = 2910 : 0A : 4 : 10
common[ 745] = 2911 : 0A : 4 : 11
common[ 746] = 2912 : 0A : 4 : 12
common[ 747] = 2914 : 0A : 4 : 14
common[ 748] = 2940 : 0A : 5 : 00
common[ 749] = 2942 : 0A : 5 : 02
common[ 750] = 2944 : 0A : 5 : 04
common[ 751] = 2945 : 0A : 5 : 05
common[ 752] = 2948 : 0A : 5 : 08
common[ 753] = 2949 : 0A : 5 : 09
common[ 754] = 294A : 0A : 5 : 0A
common[ 755] = 2950 : 0A : 5 : 10
common[ 756] = 2951 : 0A : 5 : 11
common[ 757] = 2952 : 0A : 5 : 12
common[ 758] = 2954 : 0A : 5 : 14
common[ 759] = 2955 : 0A : 5 : 15
common[ 760] = 2980 : 0A : 6 : 00
common[ 761] = 2981 : 0A : 6 : 01
common[ 762] = 2982 : 0A : 6 : 02
common[ 763] = 2984 : 0A : 6 : 04
common[ 764] = 2985 : 0A : 6 : 05
common[ 765] = 2988 : 0A : 6 : 08
common[ 766] = 2989 : 0A : 6 : 09
common[ 767] = 298A : 0A : 6 : 0A
common[ 768] = 2990 : 0A : 6 : 10
common[ 769] = 2991 : 0A : 6 : 11
common[ 770] = 2992 : 0A : 6 : 12
common[ 771] = 2994 : 0A : 6 : 14
common[ 772] = 2995 : 0A : 6 : 15
common[ 773] = 29C0 : 0A : 7 : 00
common[ 774] = 29C1 : 0A : 7 : 01
common[ 775] = 29C2 : 0A : 7 : 02
common[ 776] = 29C4 : 0A : 7 : 04
common[ 777] = 29C5 : 0A : 7 : 05
common[ 778] = 29C8 : 0A : 7 : 08
common[ 779] = 29C9 : 0A : 7 : 09
common[ 780] = 29CA : 0A : 7 : 0A
common[ 781] = 29D0 : 0A : 7 : 10
common[ 782] = 29D1 : 0A : 7 : 11
common[ 783] = 29D2 : 0A : 7 : 12
common[ 784] = 29D4 : 0A : 7 : 14
common[ 785] = 2A02 : 0A : 8 : 02
common[ 786] = 2A04 : 0A : 8 : 04
common[ 787] = 2A05 : 0A : 8 : 05
common[ 788] = 2A08 : 0A : 8 : 08
common[ 789] = 2A09 : 0A : 8 : 09
common[ 790] = 2A0A : 0A : 8 : 0A
common[ 791] = 2A10 : 0A : 8 : 10
common[ 792] = 2A11 : 0A : 8 : 11
common[ 793] = 2A12 : 0A : 8 : 12
common[ 794] = 2A14 : 0A : 8 : 14
common[ 795] = 2A15 : 0A : 8 : 15
common[ 796] = 2A42 : 0A : 9 : 02
common[ 797] = 2A44 : 0A : 9 : 04
common[ 798] = 2A45 : 0A : 9 : 05
common[ 799] = 2A48 : 0A : 9 : 08
common[ 800] = 2A49 : 0A : 9 : 09
```

```
common[ 801] = 2A4A : 0A : 9 : 0A
common[ 802] = 2A51 : 0A : 9 : 11
common[ 803] = 2A52 : 0A : 9 : 12
common[ 804] = 2A54 : 0A : 9 : 14
common[ 805] = 2A55 : 0A : 9 : 15
common[ 806] = 2A84 : 0A : A : 04
common[ 807] = 2A88 : 0A : A : 08
common[ 808] = 2A89 : 0A : A : 09
common[ 809] = 2A8A : 0A : A : 0A
common[ 810] = 2A92 : 0A : A : 12
common[ 811] = 2AC9 : 0A : B : 09
common[ 812] = 2ACA : 0A : B : 0A
common[ 813] = 2AD2 : 0A : B : 12
common[ 814] = 2B09 : 0A : C : 09
common[ 815] = 4000 : 10 : 0 : 00
common[ 816] = 4001 : 10 : 0 : 01
common[ 817] = 4002 : 10 : 0 : 02
common[ 818] = 4004 : 10 : 0 : 04
common[ 819] = 4005 : 10 : 0 : 05
common[ 820] = 4008 : 10 : 0 : 08
common[ 821] = 4009 : 10 : 0 : 09
common[ 822] = 400A : 10 : 0 : 0A
common[ 823] = 4010 : 10 : 0 : 10
common[ 824] = 4011 : 10 : 0 : 11
common[ 825] = 4012 : 10 : 0 : 12
common[ 826] = 4014 : 10 : 0 : 14
common[ 827] = 4015 : 10 : 0 : 15
common[ 828] = 4040 : 10 : 1 : 00
common[ 829] = 4042 : 10 : 1 : 02
common[ 830] = 4044 : 10 : 1 : 04
common[ 831] = 4045 : 10 : 1 : 05
common[ 832] = 4048 : 10 : 1 : 08
common[ 833] = 4049 : 10 : 1 : 09
common[ 834] = 404A : 10 : 1 : 0A
common[ 835] = 4050 : 10 : 1 : 10
common[ 836] = 4051 : 10 : 1 : 11
common[ 837] = 4052 : 10 : 1 : 12
common[ 838] = 4054 : 10 : 1 : 14
common[ 839] = 4055 : 10 : 1 : 15
common[ 840] = 4080 : 10 : 2 : 00
common[ 841] = 4081 : 10 : 2 : 01
common[ 842] = 4082 : 10 : 2 : 02
common[ 843] = 4084 : 10 : 2 : 04
common[ 844] = 4085 : 10 : 2 : 05
common[ 845] = 4088 : 10 : 2 : 08
common[ 846] = 4089 : 10 : 2 : 09
common[ 847] = 408A : 10 : 2 : 0A
common[ 848] = 4090 : 10 : 2 : 10
common[ 849] = 4091 : 10 : 2 : 11
common[ 850] = 4092 : 10 : 2 : 12
common[ 851] = 4094 : 10 : 2 : 14
common[ 852] = 40C0 : 10 : 3 : 00
common[ 853] = 40C1 : 10 : 3 : 01
common[ 854] = 40C2 : 10 : 3 : 02
common[ 855] = 40C4 : 10 : 3 : 04
common[ 856] = 40C5 : 10 : 3 : 05
common[ 857] = 40C8 : 10 : 3 : 08
```

```
common[ 858] = 40C9 : 10 : 3 : 09
common[ 859] = 40CA : 10 : 3 : 0A
common[ 860] = 40D0 : 10 : 3 : 10
common[ 861] = 40D1 : 10 : 3 : 11
common[ 862] = 40D2 : 10 : 3 : 12
common[ 863] = 40D4 : 10 : 3 : 14
common[ 864] = 40D5 : 10 : 3 : 15
common[ 865] = 4100 : 10 : 4 : 00
common[ 866] = 4101 : 10 : 4 : 01
common[ 867] = 4102 : 10 : 4 : 02
common[ 868] = 4104 : 10 : 4 : 04
common[ 869] = 4105 : 10 : 4 : 05
common[ 870] = 4108 : 10 : 4 : 08
common[ 871] = 4109 : 10 : 4 : 09
common[ 872] = 410A : 10 : 4 : 0A
common[ 873] = 4110 : 10 : 4 : 10
common[ 874] = 4111 : 10 : 4 : 11
common[ 875] = 4112 : 10 : 4 : 12
common[ 876] = 4114 : 10 : 4 : 14
common[ 877] = 4140 : 10 : 5 : 00
common[ 878] = 4141 : 10 : 5 : 01
common[ 879] = 4142 : 10 : 5 : 02
common[ 880] = 4144 : 10 : 5 : 04
common[ 881] = 4145 : 10 : 5 : 05
common[ 882] = 4148 : 10 : 5 : 08
common[ 883] = 4149 : 10 : 5 : 09
common[ 884] = 414A : 10 : 5 : 0A
common[ 885] = 4150 : 10 : 5 : 10
common[ 886] = 4151 : 10 : 5 : 11
common[ 887] = 4152 : 10 : 5 : 12
common[ 888] = 4154 : 10 : 5 : 14
common[ 889] = 4155 : 10 : 5 : 15
common[ 890] = 4180 : 10 : 6 : 00
common[ 891] = 4181 : 10 : 6 : 01
common[ 892] = 4182 : 10 : 6 : 02
common[ 893] = 4184 : 10 : 6 : 04
common[ 894] = 4185 : 10 : 6 : 05
common[ 895] = 4188 : 10 : 6 : 08
common[ 896] = 4189 : 10 : 6 : 09
common[ 897] = 418A : 10 : 6 : 0A
common[ 898] = 4191 : 10 : 6 : 11
common[ 899] = 4192 : 10 : 6 : 12
common[ 900] = 4194 : 10 : 6 : 14
common[ 901] = 4195 : 10 : 6 : 15
common[ 902] = 41C0 : 10 : 7 : 00
common[ 903] = 41C2 : 10 : 7 : 02
common[ 904] = 41C4 : 10 : 7 : 04
common[ 905] = 41C5 : 10 : 7 : 05
common[ 906] = 41C8 : 10 : 7 : 08
common[ 907] = 41C9 : 10 : 7 : 09
common[ 908] = 41CA : 10 : 7 : 0A
common[ 909] = 41D1 : 10 : 7 : 11
common[ 910] = 41D2 : 10 : 7 : 12
common[ 911] = 41D4 : 10 : 7 : 14
common[ 912] = 4200 : 10 : 8 : 00
common[ 913] = 4201 : 10 : 8 : 01
common[ 914] = 4202 : 10 : 8 : 02
```

```
common[ 915] = 4204 : 10 : 8 : 04
common[ 916] = 4205 : 10 : 8 : 05
common[ 917] = 4209 : 10 : 8 : 09
common[ 918] = 420A : 10 : 8 : 0A
common[ 919] = 4211 : 10 : 8 : 11
common[ 920] = 4212 : 10 : 8 : 12
common[ 921] = 4214 : 10 : 8 : 14
common[ 922] = 4215 : 10 : 8 : 15
common[ 923] = 4240 : 10 : 9 : 00
common[ 924] = 4242 : 10 : 9 : 02
common[ 925] = 4244 : 10 : 9 : 04
common[ 926] = 4245 : 10 : 9 : 05
common[ 927] = 4248 : 10 : 9 : 08
common[ 928] = 4249 : 10 : 9 : 09
common[ 929] = 4251 : 10 : 9 : 11
common[ 930] = 4252 : 10 : 9 : 12
common[ 931] = 4254 : 10 : 9 : 14
common[ 932] = 4255 : 10 : 9 : 15
common[ 933] = 4280 : 10 : A : 00
common[ 934] = 4284 : 10 : A : 04
common[ 935] = 4288 : 10 : A : 08
common[ 936] = 4289 : 10 : A : 09
common[ 937] = 428A : 10 : A : 0A
common[ 938] = 4290 : 10 : A : 10
common[ 939] = 4292 : 10 : A : 12
common[ 940] = 42C0 : 10 : B : 00
common[ 941] = 4300 : 10 : C : 00
common[ 942] = 4340 : 10 : D : 00
common[ 943] = 8000 : 20 : 0 : 00
common[ 944] = 8010 : 20 : 0 : 10
common[ 945] = 8040 : 20 : 1 : 00
common[ 946] = 8044 : 20 : 1 : 04
common[ 947] = 8048 : 20 : 1 : 08
common[ 948] = 8050 : 20 : 1 : 10
common[ 949] = 8080 : 20 : 2 : 00
common[ 950] = 8090 : 20 : 2 : 10
common[ 951] = 80C8 : 20 : 3 : 08
common[ 952] = 80D0 : 20 : 3 : 10
common[ 953] = 8108 : 20 : 4 : 08
common[ 954] = 8110 : 20 : 4 : 10
common[ 955] = 8144 : 20 : 5 : 04
common[ 956] = 81C4 : 20 : 7 : 04
common[ 957] = 81C8 : 20 : 7 : 08
common[ 958] = 8800 : 22 : 0 : 00
common[ 959] = 8810 : 22 : 0 : 10
common[ 960] = 8812 : 22 : 0 : 12
common[ 961] = 8840 : 22 : 1 : 00
common[ 962] = 8844 : 22 : 1 : 04
common[ 963] = 8848 : 22 : 1 : 08
common[ 964] = 884A : 22 : 1 : 0A
common[ 965] = 8850 : 22 : 1 : 10
common[ 966] = 8880 : 22 : 2 : 00
common[ 967] = 8884 : 22 : 2 : 04
common[ 968] = 8888 : 22 : 2 : 08
common[ 969] = 8890 : 22 : 2 : 10
common[ 970] = 8894 : 22 : 2 : 14
common[ 971] = 88C0 : 22 : 3 : 00
```

```
common[  972] = 88C4 : 22 : 3 : 04
common[  973] = 88C8 : 22 : 3 : 08
common[  974] = 88CA : 22 : 3 : 0A
common[  975] = 88D0 : 22 : 3 : 10
common[  976] = 88D2 : 22 : 3 : 12
common[  977] = 8904 : 22 : 4 : 04
common[  978] = 8908 : 22 : 4 : 08
common[  979] = 890A : 22 : 4 : 0A
common[  980] = 8910 : 22 : 4 : 10
common[  981] = 8944 : 22 : 5 : 04
common[  982] = 8948 : 22 : 5 : 08
common[  983] = 8950 : 22 : 5 : 10
common[  984] = 8952 : 22 : 5 : 12
common[  985] = 8984 : 22 : 6 : 04
common[  986] = 8988 : 22 : 6 : 08
common[  987] = 8992 : 22 : 6 : 12
common[  988] = 89D2 : 22 : 7 : 12
common[  989] = 8A12 : 22 : 8 : 12
common[  990] = 9048 : 24 : 1 : 08
common[  991] = 9108 : 24 : 4 : 08
common[  992] = 9144 : 24 : 5 : 04
common[  993] = 9148 : 24 : 5 : 08
common[  994] = 9910 : 26 : 4 : 10
common[  995] = 9948 : 26 : 5 : 08
common[  996] = 9984 : 26 : 6 : 04
common[  997] = 99C2 : 26 : 7 : 02
common[  998] = A040 : 28 : 1 : 00
common[  999] = A048 : 28 : 1 : 08
common[ 1000] = A080 : 28 : 2 : 00
common[ 1001] = A0C0 : 28 : 3 : 00
common[ 1002] = A800 : 2A : 0 : 00
common[ 1003] = A810 : 2A : 0 : 10
common[ 1004] = A840 : 2A : 1 : 00
common[ 1005] = A844 : 2A : 1 : 04
common[ 1006] = A848 : 2A : 1 : 08
common[ 1007] = A84A : 2A : 1 : 0A
common[ 1008] = A850 : 2A : 1 : 10
common[ 1009] = A880 : 2A : 2 : 00
common[ 1010] = A884 : 2A : 2 : 04
common[ 1011] = A888 : 2A : 2 : 08
common[ 1012] = A890 : 2A : 2 : 10
common[ 1013] = A8C0 : 2A : 3 : 00
common[ 1014] = A8C4 : 2A : 3 : 04
common[ 1015] = A8C8 : 2A : 3 : 08
common[ 1016] = A8D0 : 2A : 3 : 10
common[ 1017] = A904 : 2A : 4 : 04
common[ 1018] = A908 : 2A : 4 : 08
common[ 1019] = A944 : 2A : 5 : 04
common[ 1020] = A948 : 2A : 5 : 08
common[ 1021] = A982 : 2A : 6 : 02
common[ 1022] = A984 : 2A : 6 : 04
common[ 1023] = 046B : 01 : 1 : 2B
^C

C>
```

Common Character Sequence Section

The listing on the following pages represents the content of a preferred common character sequence section of the decompression table. Each element of the common character section is shown as an entry in the array DIFFER. The array entry number is indicated in brackets. The numerical field following the equal sign represents the hexadecimal code stored in each entry. The characters following the colon represent the common character sequence.

Differ Table

```
differ[  0] = 046B   :   a c k
differ[  1] = 0474   :   a c t
differ[  2] = 04E5   :   a g e
differ[  3] = 052C   :   a i l
differ[  4] = 052E   :   a i n
differ[  5] = 058C   :   a l l
differ[  6] = 05C4   :   a n d
differ[  7] = 05D4   :   a n t
differ[  8] = 0644   :   a r d
differ[  9] = 0645   :   a r e
differ[ 10] = 0659   :   a r y
differ[ 11] = 0674   :   a s t
differ[ 12] = 0685   :   a t e
differ[ 13] = 08B2   :   b e r
differ[ 14] = 0985   :   b l e
differ[ 15] = 0C2C   :   c a l
differ[ 16] = 0C34   :   c a t
differ[ 17] = 0CA4   :   c e d
differ[ 18] = 0D25   :   c i e
differ[ 19] = 0D73   :   c k s
differ[ 20] = 10A4   :   d e d
differ[ 21] = 10B2   :   d e r
differ[ 22] = 1424   :   e a d
differ[ 23] = 1432   :   e a r
differ[ 24] = 1434   :   e a t
differ[ 25] = 1474   :   e c t
differ[ 26] = 158C   :   e l l
differ[ 27] = 1599   :   e l y
differ[ 28] = 15C4   :   e n d
differ[ 29] = 15D4   :   e n t
differ[ 30] = 1641   :   e r a
differ[ 31] = 1645   :   e r e
differ[ 32] = 1659   :   e r y
differ[ 33] = 1673   :   e s s
differ[ 34] = 1674   :   e s t
```

```
differ[ 35] =   1925    :   f i e
differ[ 36] =   1AAC    :   f u l
differ[ 37] =   1CA4    :   g e d
differ[ 38] =   1CB2    :   g e r
differ[ 39] =   1D14    :   g h t
differ[ 40] =   1D25    :   g i e
differ[ 41] =   1D99    :   g l y
differ[ 42] =   20A4    :   h e d
differ[ 43] =   20B2    :   h e r
differ[ 44] =   2130    :   h i p
differ[ 45] =   242C    :   i a l
differ[ 46] =   242E    :   i a n
differ[ 47] =   2434    :   i a t
differ[ 48] =   2465    :   i c e
differ[ 49] =   246B    :   i c k
differ[ 50] =   2473    :   i c s
differ[ 51] =   2485    :   i d e
differ[ 52] =   24A4    :   i e d
differ[ 53] =   24B2    :   i e r
differ[ 54] =   2585    :   i l e
differ[ 55] =   2589    :   i l i
differ[ 56] =   258C    :   i l l
differ[ 57] =   2599    :   i l y
differ[ 58] =   25C1    :   i n a
differ[ 59] =   25C4    :   i n d
differ[ 60] =   25C5    :   i n e differ[ 61] =   25C7    :   i n g
differ[ 62] =   25D4    :   i n t
differ[ 63] =   25EE    :   i o n
differ[ 64] =   25F5    :   i o u
differ[ 65] =   2665    :   i s e
differ[ 66] =   2668    :   i s h
differ[ 67] =   266D    :   i s m
differ[ 68] =   2674    :   i s t
differ[ 69] =   2685    :   i t e
differ[ 70] =   2699    :   i t y
differ[ 71] =   26AD    :   i u m
differ[ 72] =   26C5    :   i v e
differ[ 73] =   2CA4    :   k e d
differ[ 74] =   2CB2    :   k e r
differ[ 75] =   3032    :   l a r
differ[ 76] =   3034    :   l a t
differ[ 77] =   30A4    :   l e d
differ[ 78] =   30B2    :   l e r
differ[ 79] =   30B3    :   l e s
differ[ 80] =   3199    :   l l y
differ[ 81] =   342E    :   m a n
differ[ 82] =   34A4    :   m e d
differ[ 83] =   382C    :   n a l
differ[ 84] =   3834    :   n a t
differ[ 85] =   3865    :   n c e
differ[ 86] =   3868    :   n c h
differ[ 87] =   38A4    :   n e d
differ[ 88] =   38B2    :   n e r
differ[ 89] =   38B3    :   n e s
differ[ 90] =   3923    :   n i c
differ[ 91] =   3C6B    :   o c k
```

```
differ[ 92] =   3D8F    :   o l o
differ[ 93] =   3DA5    :   o m e
differ[ 94] =   3DC5    :   o n e
differ[ 95] =   3E45    :   o r e
differ[ 96] =   3E54    :   o r t
differ[ 97] =   3E59    :   o r y
differ[ 98] =   3EB4    :   o u t
differ[ 99] =   40A4    :   p e d
differ[100] =   40B2    :   p e r
differ[101] =   482C    :   r a l
differ[102] =   4834    :   r a t
differ[103] =   48A4    :   r e d
differ[104] =   48B3    :   r e s
differ[105] =   4923    :   r i c
differ[106] =   4925    :   r i e
differ[107] =   4CA4    :   s e d
differ[108] =   4CB2    :   s e r
differ[109] =   4D99    :   s l y
differ[110] =   4E65    :   s s e
differ[111] =   502C    :   t a l
differ[112] =   5034    :   t a t
differ[113] =   5068    :   t c h
differ[114] =   50A4    :   t e d
differ[115] =   50AE    :   t e n
differ[116] =   50B2    :   t e r
differ[117] =   5123    :   t i c
differ[118] =   5125    :   t i e
differ[119] =   512F    :   t i o
differ[120] =   51F2    :   t o r
differ[121] =   5285    :   t t e
differ[122] =   55C4    :   u n d
differ[123] =   5645    :   u r e
differ[124] =   5665    :   u s e
differ[125] =   58B2    :   v e r
differ[126] =   5C39    :   w a y
differ[127] =   26B1    :   i t a
```

Appendix II

Executable Module

The listing on the following pages represents the object code of a preferred spelling verification and correction system operating in accord with the invention. The listing is presented in 512-word blocks. The object code is suitable for execution on an IBM XT computer, operating under the MS-DOS operating system. Latter portions of this appendix include data representing portions of a Master Lexicon, Common Expression Verification Table, Block Index Table, and Modified Suspect Expression Verification Table.

```
Block 0
00000000 : 4D 5A A0 00 52 00 02 00 20 00 08 00 FF FF 0A 0A
00000010 : 80 00 12 29 02 00 00 00 20 00 00 00 43 0D 00 00
00000020 : 04 00 00 00 09 00 00 00 00 00 00 00 00 00 00 00
00000030 : 00 00 00 00 00 00 00 00 00 00 00 00 00 00 00 00
00000040 : 00 00 00 00 00 00 00 00 00 00 00 00 00 00 00 00
00000050 : 00 00 00 00 00 00 00 00 00 00 00 00 00 00 00 00
00000060 : 00 00 00 00 00 00 00 00 00 00 00 00 00 00 00 00
00000070 : 00 00 00 00 00 00 00 00 00 00 00 00 00 00 00 00
00000080 : 00 00 00 00 00 00 00 00 00 00 00 00 00 00 00 00
00000090 : 00 00 00 00 00 00 00 00 00 00 00 00 00 00 00 00
000000A0 : 00 00 00 00 00 00 00 00 00 00 00 00 00 00 00 00
000000B0 : 00 00 00 00 00 00 00 00 00 00 00 00 00 00 00 00
000000C0 : 00 00 00 00 00 00 00 00 00 00 00 00 00 00 00 00
000000D0 : 00 00 00 00 00 00 00 00 00 00 00 00 00 00 00 00
000000E0 : 00 00 00 00 00 00 00 00 00 00 00 00 00 00 00 00
000000F0 : 00 00 00 00 00 00 00 00 00 00 00 00 00 00 00 00
00000100 : 00 00 00 00 00 00 00 00 00 00 00 00 00 00 00 00
00000110 : 00 00 00 00 00 00 00 00 00 00 00 00 00 00 00 00
00000120 : 00 00 00 00 00 00 00 00 00 00 00 00 00 00 00 00
00000130 : 00 00 00 00 00 00 00 00 00 00 00 00 00 00 00 00
00000140 : 00 00 00 00 00 00 00 00 00 00 00 00 00 00 00 00
00000150 : 00 00 00 00 00 00 00 00 00 00 00 00 00 00 00 00
00000160 : 00 00 00 00 00 00 00 00 00 00 00 00 00 00 00 00
00000170 : 00 00 00 00 00 00 00 00 00 00 00 00 00 00 00 00
00000180 : 00 00 00 00 00 00 00 00 00 00 00 00 00 00 00 00
00000190 : 00 00 00 00 00 00 00 00 00 00 00 00 00 00 00 00
000001A0 : 00 00 00 00 00 00 00 00 00 00 00 00 00 00 00 00
000001B0 : 00 00 00 00 00 00 00 00 00 00 00 00 00 00 00 00
000001C0 : 00 00 00 00 00 00 00 00 00 00 00 00 00 00 00 00
000001D0 : 00 00 00 00 00 00 00 00 00 00 00 00 00 00 00 00
000001E0 : 00 00 00 00 00 00 00 00 00 00 00 00 00 00 00 00
000001F0 : 00 00 00 00 00 00 00 00 00 00 00 00 00 00 00 00

Block 1
00000200 : 00 00 FA B8 7E 07 8E D8 B8 0A 0A 8E D0 BC 80 00
00000210 : FB B4 30 CD 21 0A C0 75 03 B8 01 00 A3 10 00 8C
00000220 : 06 5C 00 80 3E 10 00 02 7C 27 26 A1 2C 00 A3 6E
00000230 : 00 0B C0 74 1C 06 FC C4 3E 6C 00 33 C0 B9 FF 7F
00000240 : F2 AE 75 0C AE 75 F9 47 81 E7 FE FF 89 3E 70 00
00000250 : 07 BE 80 00 26 8A 0C 32 ED E3 24 46 26 8A 04 80
00000260 : 3E 10 00 02 7D 08 3C 3C 74 18 3C 3E 74 1A 3C 3D
00000270 : 74 41 3C 20 74 04 3C 09 75 05 49 7F DE 33 C9 EB
00000280 : 75 90 BF 1A 00 EB 04 90 BF 3A 00 32 E4 49 74 18
00000290 : 46 26 8A 04 3C 20 74 10 3C 09 74 0C 88 05 47 FE
000002A0 : C4 80 FC 20 74 07 EB E5 C6 05 00 EB CD BA 87 00
000002B0 : E9 3B 01 33 DB 49 74 2E 46 26 8A 04 3C 20 74 26
000002C0 : 3C 09 74 22 2C 30 7C 28 3C 09 7F 24 03 DB 72 20
000002D0 : 8B D3 03 DB 72 1A 03 DB 72 16 03 DA 72 12 32 E4
000002E0 : 03 D8 72 0C EB CF 0B DB 74 06 89 1E F4 1A EB 8A
000002F0 : BA 72 00 E9 F8 00 A1 70 00 8B 1E F4 1A D1 EB 03
00000300 : DB 81 FB 00 02 77 07 BB 00 02 89 1E F4 1A 03 D8
00000310 : 72 27 26 8B 16 02 00 8C D0 2B D0 F7 C2 00 F0 75
00000320 : 0B D1 E2 D1 E2 D1 E2 D1 E2 EB 04 90 BA F0 FF 03
00000330 : 1E 18 00 72 04 3B D0 77 06 BA A1 00 E9 AF 00 FA
00000340 : 89 1E 16 00 8B E3 8C D8 8E D0 8C 16 12 00 FB 51
00000350 : 83 C3 0F B1 04 D3 EB 8C D0 03 C3 A3 60 00 A3 64
```

```
00000360 : 00 26 8B 1E 02 00 2B D8 76 CF B1 04 D3 C3 8B C3
00000370 : 25 0F 00 81 E3 F0 FF 89 1E 66 00 A3 68 00 E8 9E
00000380 : 56 0B C0 75 B4 5A 06 33 C0 50 8B EC C4 3E 6C 00
00000390 : 8B 3E 70 00 83 EF 02 7C 05 26 FF 35 EB F6 8E 06
000003A0 : 5C 00 89 26 6C 00 8C 16 6E 00 8B DA 8B CA 83 C3
000003B0 : 04 81 E3 FE FF 2B E3 8B FC 36 C6 05 63 47 E3 0F
000003C0 : 36 C6 05 20 47 26 8A 04 36 88 05 46 47 E2 F6 36
000003D0 : C6 05 00 89 26 14 00 8B C4 50 1E 07 E8 5B 57 80
000003E0 : 3E 10 00 02 7C 05 B8 00 4C CD 21 8B E5 CB B4 09
000003F0 : CD 21 80 3E 10 00 02 7C 05 B8 01 4C CD 21 06 33
```

Block 2
```
00000400 : C0 50 CB A1 16 00 2D 04 00 8B E0 BA B7 00 B4 09
00000410 : CD 21 80 3E 10 00 02 7C 05 B8 01 4C CD 21 CB 80
00000420 : 3E 10 00 02 7C 09 8B EC 8B 46 02 B4 4C CD 21 A1
00000430 : 16 00 2D 04 00 8B E0 CB 55 81 EC D8 02 72 06 3B
00000440 : 26 18 00 77 03 E9 BB FF 8B EC C6 46 06 00 B8 EA
00000450 : 00 50 E8 FB 44 8B E5 B8 19 01 50 E8 F2 44 8B E5
00000460 : 83 BE DC 02 02 7E 09 8B B6 DE 02 8B 44 02 EB 03
00000470 : B8 D0 00 83 BE DC 02 02 A3 E2 00 7E 09 8B B6 DE
00000480 : 02 8B 44 04 EB 03 B8 D9 00 50 A3 E4 00 E8 44 0D
00000490 : 8B E5 3D 03 00 74 12 B8 4D 01 50 E8 B2 44 8B E5
000004A0 : B8 01 00 50 E8 C1 43 8B E5 B8 00 80 50 FF 36 E2
000004B0 : 00 E8 F1 45 8B E5 A3 E8 00 40 75 59 B8 71 01 50
000004C0 : E8 8D 44 8B E5 B8 95 01 50 E8 84 44 8B E5 A1 5E
000004D0 : 23 48 85 C0 A3 5E 23 78 0E 8B 36 5C 23 FF 06 5C
000004E0 : 23 8A 04 30 E4 EB 09 B8 5C 23 50 E8 9E 4E 8B E5
000004F0 : B8 00 80 50 FF 36 E2 00 E8 AA 45 8B E5 A3 E8 00
00000500 : 40 75 12 B8 4D 01 50 E8 46 44 8B E5 B8 01 00 50
00000510 : E8 55 43 8B E5 33 C0 89 46 11 89 46 15 89 46 13
00000520 : 83 7E 11 00 74 03 E9 2B 05 C6 86 DF 00 00 FF 46
00000530 : 15 FF 76 15 B8 B4 01 50 E8 15 44 8B E5 8D 86 B7
00000540 : 00 50 B8 E8 01 50 E8 B5 41 8B E5 B8 EB 01 50 E8
00000550 : FE 43 8B E5 B8 EE 01 50 8D 86 B7 00 50 E8 B2 57
00000560 : 8B E5 85 C0 75 39 82 7E 06 00 74 0B B8 F3 01 50
00000570 : E8 DD 43 8B E5 EB 09 B8 18 02 50 E8 D2 43 8B E5
00000580 : B8 3D 02 50 E8 D3 04 8B E5 85 C0 74 93 82 7E 06
00000590 : 00 74 04 33 C0 EB 03 33 C0 40 88 46 06 EB 81 B8
000005A0 : 3E 02 50 8D 86 B7 00 50 E8 67 57 8B E5 85 C0 75
000005B0 : 3F 83 3E F2 1A 00 74 0B B8 46 02 50 E8 91 43 8B
000005C0 : E5 EB 09 B8 65 02 50 E8 86 43 8B E5 B8 3D 02 50
000005D0 : E8 87 04 8B E5 85 C0 75 03 E9 44 FF 83 3E F2 1A
000005E0 : 00 74 04 33 C0 EB 03 33 C0 40 A3 F2 1A E9 30 FF
000005F0 : B8 84 02 50 8D 86 B7 00 50 E8 16 57 8B E5 85 C0
```

Block 3
```
00000600 : 74 03 E9 6C 01 83 3E 66 06 00 75 0C B8 89 02 50
00000610 : E8 3D 43 8B E5 E9 08 FF FF 36 66 06 B8 A5 02 50
00000620 : E8 2D 43 8B E5 8D 86 D6 02 50 B8 CA 02 50 E8 CD
00000630 : 40 8B E5 8B 86 D6 02 85 C0 89 46 0F 75 0C B8 CD
00000640 : 02 50 E8 0B 43 8B E5 E9 D6 FE 8B 46 0F 8B 1E 66
00000650 : 06 3B C3 76 03 89 5E 0F B8 E0 02 50 E8 FB 03 8B
00000660 : E5 88 86 D3 02 84 C0 74 0B B8 FE 02 50 E8 E0 42
00000670 : 8B E5 EB 09 B8 2D 03 50 E8 D5 42 8B E5 C7 86 D4
00000680 : 02 00 00 82 BE D3 02 00 74 39 E8 30 07 8A 86 D3
00000690 : 02 30 E4 8D 9E B7 00 53 8D 9E D4 02 53 FF 76 0F
```

```
000006A0 : 50 E8 E5 05 8B E5 85 C0 74 14 8D 86 B7 00 50 FF
000006B0 : B6 D4 02 B8 4C 03 50 E8 96 42 8B E5 EB CF E8 63
000006C0 : 07 EB 64 8A 86 D3 02 30 E4 8D 9E B7 00 53 8D 9E
000006D0 : D4 02 53 FF 76 0F 50 E8 AF 05 8B E5 85 C0 74 47
000006E0 : 8D 86 B7 00 50 FF B6 D4 02 B8 58 03 50 E8 60 42
000006F0 : 8B E5 8D 86 B7 00 50 E8 B0 0C 8B E5 BB 63 03 53
00000700 : A2 E7 00 E8 54 03 8B E5 85 C0 74 B7 A0 E7 00 30
00000710 : E4 8A 5E 06 30 FF 33 C9 51 53 50 8D 86 B7 00 50
00000720 : E8 F8 11 8B E5 EB 9C B8 86 03 50 E8 22 42 8B E5
00000730 : B8 A8 03 50 E8 19 42 8B E5 FF 36 66 06 B8 C8 03
00000740 : 50 E8 0C 42 8B E5 B8 80 01 2B 06 66 06 50 BB DC
00000750 : 03 53 89 46 0F E8 F8 41 8B E5 B8 00 0C 2B 06 68
00000760 : 06 50 BB F2 03 53 89 46 0F E8 E4 41 8B E5 E9 AF
00000770 : FD 8D 86 B7 00 50 E8 31 0C 8B E5 BB 06 04 53 8D
00000780 : 9E B7 00 53 A2 E7 00 E8 88 55 8B E5 85 C0 75 03
00000790 : E9 B9 02 A0 E7 00 30 E4 8D 9E 97 00 53 8D 5E 1B
000007A0 : 53 50 8D 86 B7 00 50 E8 9C 14 8B E5 48 74 03 E9
000007B0 : DC 00 33 C0 8A 9E 97 00 8B 4E 1D 8B 56 1B 89 46
000007C0 : 0F 89 46 0B 8D 86 B7 00 50 8D 86 DF 00 50 89 4E
000007D0 : 21 89 56 1F 88 9E 98 00 E8 F9 52 8B E5 A0 E6 00
000007E0 : 30 E4 3D 55 00 75 0B B8 0B 04 50 E8 62 41 8B E5
000007F0 : EB 09 B8 2B 04 50 E8 57 41 8B E5 8D 46 0F 50 8D

Block 4
00000800 : 46 0B 50 8D 46 0D 50 8D 86 98 00 50 8D 46 1F 50
00000810 : 8D 86 DF 00 50 E8 E9 02 8B E5 B8 47 04 50 E8 2F
00000820 : 41 8B E5 A0 E6 00 30 E4 3D 55 00 74 03 E9 F0 FC
00000830 : A0 E7 00 30 E4 3D 05 00 75 0E 8A 86 97 00 30 E4
00000840 : 3D 05 00 74 03 E9 D8 FC B8 49 04 50 E8 0B 02 8B
00000850 : E5 85 C0 75 03 E9 C8 FC 8A 86 97 00 30 E4 33 DB
00000860 : 53 53 50 8D 86 B7 00 50 E8 B0 10 8B E5 3D 03 00
00000870 : 89 46 07 74 0D 50 B8 6A 04 50 E8 D3 40 8B E5 E9
00000880 : 9E FC B8 8D 04 50 E8 C7 40 8B E5 E9 92 FC 8D 86
00000890 : B7 00 50 B8 97 04 50 E8 B6 40 8B E5 B8 BF 04 50
000008A0 : E8 AD 40 8B E5 B8 DE 04 50 E8 A4 40 8B E5 B8 FE
000008B0 : 04 50 E8 9B 40 8B E5 A1 5E 23 48 85 C0 A3 5E 23
000008C0 : 78 0E 8B 36 5C 23 FF 06 5C 23 8A 04 30 E4 EB 09
000008D0 : B8 5C 23 50 E8 B5 4A 8B E5 88 86 B6 00 30 E4 3D
000008E0 : 61 00 89 46 00 7C 2E 3D 7A 00 7F 29 8A 86 B6 00
000008F0 : 30 E4 89 46 00 40 8B F0 8A 84 E8 20 30 E4 25 02
00000900 : 00 74 08 8B 46 00 2D 20 00 EB 06 8A 86 B6 00 30
00000910 : E4 88 86 B6 00 8A 86 B6 00 30 E4 3D 43 00 89 46
00000920 : 00 74 10 3D 54 00 74 0B 8A 86 B6 00 30 E4 3D 41
00000930 : 00 75 84 8A 86 B6 00 30 E4 E9 F8 00 B8 18 05 50
00000940 : E8 0D 40 8B E5 A0 E7 00 30 E4 8A 5E 06 30 FF B9
00000950 : 01 00 51 53 50 8D 86 B7 00 50 E8 BE 0F 8B E5 3D
00000960 : 03 00 89 46 07 74 0D 50 B8 31 05 50 E8 E1 3F 8B
00000970 : E5 E9 AC FB B8 49 05 50 E8 D5 3F 8B E5 E9 A0 FB
00000980 : B8 51 05 50 E8 C9 3F 8B E5 33 C0 8D 5E 13 53 8D
00000990 : 9E 98 00 53 8D 5E 1F 53 8D 9E DF 00 53 8D 9E B7
000009A0 : 00 53 89 46 09 89 46 0F 89 46 0B 89 46 13 E8 BB
000009B0 : 04 8B E5 89 46 07 83 7E 07 04 75 03 E9 61 FB 83
000009C0 : 7E 09 00 74 03 E9 58 FB 8D 46 0F 50 8D 46 0B 50
000009D0 : 8D 46 0D 50 8D 86 98 00 50 8D 46 1F 50 8D 86 DF
000009E0 : 00 50 E8 1C 01 8B E5 B8 5E 05 50 E8 6C 00 8B E5
000009F0 : 85 C0 74 04 33 DB EB 03 33 DB 43 85 DB 89 5E 09
```

```
Block 5
00000A00 : 75 B4 8D 46 13 50 8D 86 98 00 50 8D 46 1F 50 8D
00000A10 : 86 DF 00 50 8D 86 B7 00 50 E8 50 04 8B E5 89 46
00000A20 : 07 EB 93 C7 46 09 01 00 B8 7D 05 50 E8 21 3F 8B
00000A30 : E5 E9 EC FA 3D 54 00 74 EA 3D 43 00 75 03 E9 3F
00000A40 : FF 3D 41 00 75 03 E9 F3 FE E9 D4 FA C7 46 11 01
00000A50 : 00 E9 CC FA 81 C4 D8 02 5D C3 55 83 EC 06 72 06
00000A60 : 3B 26 18 00 77 03 E9 9A F9 8B EC FF 76 0A E8 DF
00000A70 : 3E 8B E5 B8 8B 05 50 E8 D6 3E 8B E5 A1 5E 23 48
00000A80 : 85 C0 A3 5E 23 78 0E 8B 36 5C 23 FF 06 5C 23 8A
00000A90 : 04 30 E4 EB 09 B8 5C 23 50 E8 F0 48 8B E5 88 46
00000AA0 : 04 30 E4 89 46 00 40 8B F0 8A 84 E8 20 30 E4 25
00000AB0 : 01 00 74 08 8B 46 00 05 20 00 EB 05 8A 46 04 30
00000AC0 : E4 88 46 04 8A 46 04 30 E4 3D 79 00 89 46 00 74
00000AD0 : 05 3D 6E 00 75 A6 8A 46 04 30 E4 3D 79 00 75 11
00000AE0 : B8 95 05 50 E8 69 3E 8B E5 B8 01 00 83 C4 06 5D
00000AF0 : C3 B8 9B 05 50 E8 58 3E 8B E5 33 C0 83 C4 06 5D
00000B00 : C3 55 83 EC 3A 72 06 3B 26 18 00 77 03 E9 F3 F8
00000B10 : 8B EC FF 76 3E E8 96 4F 8B E5 8B 76 46 8B 1C 3B
00000B20 : C3 7F 03 E9 55 01 8B 76 44 89 1C 8B 76 3E 8B 7E
00000B30 : 46 03 35 8A 04 30 E4 3D 20 00 89 46 00 74 08 85
00000B40 : C0 74 04 FF 05 EB E4 B8 47 04 50 E8 02 3E 8B E5
00000B50 : C7 46 0A 00 00 C7 46 06 00 80 C7 46 04 00 00 8B
00000B60 : 76 44 8B 04 89 46 08 8B 46 08 8B 76 46 8B 1C 3B
00000B70 : D8 7E 55 8B 5E 0A 89 5E 00 43 8B 76 00 8B 7E 3E
00000B80 : 03 F8 8A 05 88 42 0C 8B 76 48 8B 04 D1 E0 D1 E0
00000B90 : 8B 76 40 03 F0 8B 44 02 23 46 06 8B 0C 23 4E 04
00000BA0 : 0B C1 89 5E 0A 74 09 FF 46 0A 8B F3 C6 42 0C 2F
00000BB0 : 8B 46 06 8B 5E 04 D1 F8 D1 DB 25 FF 7F 89 46 06
00000BC0 : 89 5E 04 FF 46 08 EB 9F 8B 76 0A C6 42 0C 00 8B
00000BD0 : 76 42 8B 7E 48 03 35 8A 04 30 E4 8A 1E E7 00 30
00000BE0 : FF 53 50 8D 46 0C 50 E8 75 08 8B E5 8D 46 0C 50
00000BF0 : B8 A0 05 50 E8 59 3D 8B E5 8B 76 42 8B 7E 48 03

Block 6
00000C00 : 35 8A 04 30 E4 EB 4E B8 B4 05 50 E8 42 3D 8B E5
00000C10 : EB 53 B8 CC 05 50 E8 37 3D 8B E5 EB 48 B8 D8 05
00000C20 : 50 E8 2C 3D 8B E5 EB 3D B8 E6 05 50 E8 21 3D 8B
00000C30 : E5 EB 32 B8 10 06 50 E8 16 3D 8B E5 EB 27 B8 29
00000C40 : 06 50 E8 0B 3D 8B E5 EB 1C 07 0A 12 0A 1D 0A 28
00000C50 : 0A 33 0A 3E 0A 8B F0 83 FE 06 73 07 D1 E6 2E FF
00000C60 : A4 49 0A EB D9 B8 45 06 50 E8 E4 3C 8B E5 8B 76
00000C70 : 48 FF 04 8B 76 46 FF 04 E9 97 FE B8 47 04 50 E8
00000C80 : CE 3C 8B E5 83 C4 3A 5D C3 55 83 EC 0E 72 06 3B
00000C90 : 26 18 00 77 03 E9 6B F7 8B EC 82 7E 12 00 74 69
00000CA0 : 83 3E F0 1A 00 75 07 33 C0 83 C4 0E 5D C3 8B 76
00000CB0 : 16 8B 04 3B 06 66 06 73 49 3B 46 14 7D 44 40 40
00000CC0 : D1 E0 8B F0 8B 84 66 06 80 E4 1F 48 05 66 0A 50
00000CD0 : FF 76 18 A3 48 06 E8 FB 4D 8B E5 FF 36 48 06 E8
00000CE0 : C8 06 8B E5 89 46 02 85 C0 75 03 E9 C2 00 3D 05
00000CF0 : 00 75 03 E9 BA 00 FF 36 48 06 E8 1B 08 8B E5 E9
00000D00 : AE 00 33 C0 83 C4 0E 5D C3 8B 76 16 83 3C 00 75
00000D10 : 09 A1 68 06 05 66 0A A3 48 06 B8 66 0A 8B 1E 48
00000D20 : 06 3B D8 73 03 E9 81 00 8B 76 16 8B 04 3B 46 14
00000D30 : 7D 77 C7 46 02 00 00 FF 0E 48 06 B8 66 0A 8B 1E
00000D40 : 48 06 3B D8 72 12 8A 47 FF 30 E4 85 C0 74 09 FF
00000D50 : 0E 48 06 FF 46 02 EB E3 FF 36 48 06 FF 76 18 E8
```

```
00000D60 : 72 4D 8B E5 FF 76 02 FF 76 18 8D 46 06 50 8D 46
00000D70 : 0A 50 E8 BF 27 8B E5 FF 76 02 8D 46 04 50 FF 76
00000D80 : 18 8D 46 0A 50 8D 46 06 50 E8 16 14 8B E5 48 74
00000D90 : 07 33 C0 83 C4 0E 5D C3 B8 05 00 50 FF 76 04 FF
00000DA0 : 76 18 E8 BA 06 8B E5 EB 07 33 C0 83 C4 0E 5D C3
00000DB0 : 8B 76 16 FF 04 B8 01 00 83 C4 0E 5D C3 55 83 EC
00000DC0 : 08 72 06 3B 26 18 00 77 03 E9 37 F6 8B EC C7 46
00000DD0 : 06 02 00 8B 46 06 3D 00 02 7D 3B D1 E0 8B F0 8B
00000DE0 : 9C 66 06 80 E7 1F 85 DB 89 46 00 74 24 8B 9C 66
00000DF0 : 06 80 E7 1F 4B 81 C3 66 0A B1 0D 8B 84 66 06 D3
```

Block 7
```
00000E00 : E8 25 07 00 30 E4 B9 05 00 51 50 53 E8 50 06 8B
00000E10 : E5 FF 46 06 EB BD E8 49 08 C7 06 F0 1A 01 00 83
00000E20 : C4 08 5D C3 55 83 EC 04 72 06 3B 26 18 00 77 03
00000E30 : E9 D0 F5 8B EC C7 46 02 02 00 8B 46 02 3D 00 02
00000E40 : 7D 17 D1 E0 8B F0 81 C6 66 06 33 C0 8B 1C 81 E3
00000E50 : 00 E0 89 1C FF 46 02 EB E1 33 C0 50 E8 93 09 8B
00000E60 : E5 C7 06 F0 1A 00 00 83 C4 04 5D C3 55 83 EC 28
00000E70 : 72 06 3B 26 18 00 77 03 E9 88 F5 8B EC FF 76 2C
00000E80 : E8 2B 4C 8B E5 85 C0 A3 70 16 74 05 3D 20 00 7E
00000E90 : 08 B8 04 00 83 C4 28 5D C3 C7 46 14 00 00 C7 46
00000EA0 : 10 04 00 83 7E 14 00 74 03 E9 20 03 8B 76 34 8B
00000EB0 : 04 40 89 04 3D 07 00 7E 03 E9 CF 02 C7 46 04 00
00000EC0 : 00 8B 46 04 3D 19 00 7D 26 BB 2A 00 F7 EB 8B F0
00000ED0 : B3 00 88 9C D6 16 C7 84 D2 16 00 00 C7 84 D0 16
00000EE0 : 00 00 88 9C D4 16 88 9C D5 16 FF 46 04 EB D2 83
00000EF0 : 3E 70 16 07 7E 04 33 C0 EB 03 B8 01 00 89 46 12
00000F00 : BB 0E 00 F7 EB 8B F0 8B 7E 34 8B 05 48 D1 E0 03
00000F10 : F0 8B 84 4A 06 E9 5D 02 83 3E 6A 16 19 74 08 B8
00000F20 : 08 00 83 C4 28 5D C3 C7 46 10 04 00 8B 76 2E C6
00000F30 : 04 00 C7 46 04 00 00 8B 46 04 3D 1E 00 7D 1E 8B
00000F40 : 5E 32 03 D8 D1 E0 D1 E0 8B 76 30 03 F0 33 C0 33
00000F50 : C9 89 44 02 89 0C 88 0F FF 46 04 EB DA FF 76 2C
00000F60 : B8 AD 16 50 E8 6D 4B 8B E5 C7 46 04 00 00 8B 46
00000F70 : 04 8B 1E 70 16 3B D8 7E 35 8B F0 8A 9C AD 16 30
00000F80 : FF 43 8A 8F E8 20 30 ED 81 E1 01 00 74 0B 8A 84
00000F90 : AD 16 30 E4 05 20 00 EB 09 8B 76 04 8A 84 AD 16
00000FA0 : 30 E4 8B 76 04 88 84 AD 16 FF 46 04 EB C0 B8 AD
00000FB0 : 16 50 B8 8A 16 50 E8 1B 4B 8B E5 FF 76 2C E8 ED
00000FC0 : 4A 8B E5 8B F0 C6 84 8B 16 00 8D 46 08 50 E8 B0
00000FD0 : 13 8B E5 83 7E 08 00 75 03 E9 AF 01 C7 46 14 01
00000FE0 : 00 E9 A7 01 8D 46 08 50 E8 9A 21 8B E5 83 7E 08
00000FF0 : 00 75 03 E9 95 01 C7 46 14 01 00 E9 8D 01 8D 46
```

Block 8
```
00001000 : 08 50 E8 F9 11 8B E5 83 7E 08 00 75 03 E9 7B 01
00001010 : C7 46 14 01 00 E9 73 01 8D 46 08 50 E8 B9 20 8B
00001020 : E5 83 7E 08 00 75 03 E9 61 01 C7 46 14 01 00 E9
00001030 : 59 01 83 3E 70 16 15 7E 03 E9 4F 01 A1 70 16 BB
00001040 : 72 16 53 BB 74 16 53 BB AD 16 53 A3 72 16 E8 96
00001050 : 14 8B E5 83 3E 72 16 0E 7E 03 E9 2E 01 33 C0 50
00001060 : B8 D0 16 50 FF 36 70 16 B8 AD 16 50 FF 36 72 16
00001070 : B8 74 16 50 E8 DC 0D 8B E5 85 C0 89 46 08 78 08
00001080 : C7 46 14 01 00 E9 03 01 8B 46 08 85 C0 78 03 E9
00001090 : F9 00 B8 07 00 83 C4 28 5D C3 83 3E 70 16 15 7E
000010A0 : 03 E9 E7 00 83 3E 72 16 0E 7E 03 E9 DD 00 33 C0
```

```
000010B0 : C7 46 0A 01 00 89 46 16 89 46 08 89 46 0C 89 46
000010C0 : 0E 83 7E 16 00 74 03 E9 C1 00 8D 46 0C 50 8D 46
000010D0 : 0A 50 8D 46 06 50 8D 46 18 50 E8 32 21 8B E5 85
000010E0 : C0 74 58 33 C0 50 B8 D0 16 50 FF 36 70 16 B8 AD
000010F0 : 16 50 FF 76 06 8D 46 18 50 E8 57 0D 8B E5 85 C0
00001100 : 89 46 08 79 08 B8 07 00 83 C4 28 5D C3 83 7E 08
00001110 : 00 7E AE 8D 46 08 50 FF 76 32 FF 76 30 FF 76 2E
00001120 : B8 D0 16 50 E8 E3 12 8B E5 8B 46 08 01 46 0E 85
00001130 : C0 79 8E 8B 46 10 83 C4 28 5D C3 83 7E 0E 00 74
00001140 : 08 B8 03 00 83 C4 28 5D C3 C7 46 16 01 00 E9 70
00001150 : FF B8 04 00 83 C4 28 5D C3 BC 02 51 0F 58 02 9A
00001160 : 0E F4 01 32 0E 90 01 18 0E 2C 01 FE 0D C8 00 E4
00001170 : 0D 64 00 18 0D BE 18 00 2E 3B 84 59 0F 75 05 2E
00001180 : FF A4 5B 0F 83 EE 04 79 EF EB C6 83 7E 08 00 75
00001190 : 08 C7 46 14 00 00 E9 0A FD 8D 46 08 50 FF 76 32
000011A0 : FF 76 30 FF 76 2E B8 D0 16 50 E8 5D 12 8B E5 83
000011B0 : 7E 08 00 75 05 C7 46 14 00 00 8B 46 08 85 C0 78
000011C0 : 03 E9 DF FC 8B 46 10 83 C4 28 5D C3 B8 03 00 83
000011D0 : C4 28 5D C3 55 83 EC 10 72 06 3B 26 18 00 77 03
000011E0 : E9 20 F2 8B EC B8 00 80 50 FF 76 14 E8 B6 38 8B
000011F0 : E5 89 46 06 40 75 08 B8 08 00 83 C4 10 5D C3 B8
```

Block 9
```
00001200 : 00 09 50 E8 B0 36 8B E5 85 C0 A3 EA 1A 75 08 B8
00001210 : 09 00 83 C4 10 5D C3 B8 00 0A 50 E8 98 36 8B E5
00001220 : 85 C0 A3 EE 1A 75 11 A1 EA 1A 50 E8 02 37 8B E5
00001230 : B8 09 00 83 C4 10 5D C3 B8 00 30 50 E8 77 36 8B
00001240 : E5 85 C0 A3 66 16 75 1A A1 EE 1A 50 E8 E1 36 8B
00001250 : E5 A1 EA 1A 50 E8 D8 36 8B E5 B8 09 00 83 C4 10
00001260 : 5D C3 B8 00 20 50 E8 4D 36 8B E5 85 C0 A3 6C 16
00001270 : 75 23 A1 EE 1A 50 E8 B7 36 8B E5 A1 EA 1A 50 E8
00001280 : AE 36 8B E5 A1 66 16 50 E8 A5 36 8B E5 B8 09 00
00001290 : 83 C4 10 5D C3 A1 EA 1A 05 FE 07 8B 1E 66 16 81
000012A0 : C3 00 20 8B 0E 6C 16 81 C1 00 10 8B 16 EA 1A A3
000012B0 : EC 1A B8 00 09 50 52 FF 76 06 89 0E 6E 16 89 1E
000012C0 : 68 16 E8 04 3A 8B E5 3D 00 09 74 08 B8 08 00 83
000012D0 : C4 10 5D C3 A1 EE 1A BB 00 0A 53 50 FF 76 06 E8
000012E0 : E7 39 8B E5 3D 00 0A 74 08 B8 08 00 83 C4 10 5D
000012F0 : C3 A1 66 16 BB 00 30 53 50 FF 76 06 E8 CA 39 8B
00001300 : E5 3D 00 30 74 08 B8 08 00 83 C4 10 5D C3 C7 46
00001310 : 0E 00 00 C7 46 0C 00 00 8B 46 0E 8B 5E 0C 33 C9
00001320 : BA 00 20 E8 2D 4B 7D 2A A1 6C 16 03 C3 BB 00 20
00001330 : 53 50 FF 76 06 E8 91 39 8B E5 3D 00 20 74 08 B8
00001340 : 08 00 83 C4 10 5D C3 81 46 0C 00 20 83 56 0E 00
00001350 : EB C6 FF 76 06 E8 6F 3F 8B E5 85 C0 74 08 B8 08
00001360 : 00 83 C4 10 5D C3 C7 46 04 00 00 8B 46 04 3D 00
00001370 : 02 7D 24 D1 E0 8B F0 33 DB 8B 8C 66 06 81 E1 00
00001380 : E0 89 8C 66 06 81 C6 66 06 33 C0 8B 1C 80 E7 1F
00001390 : 89 1C FF 46 04 EB D4 C6 06 66 0A 00 C7 06 6A 16
000013A0 : 19 00 B8 03 00 83 C4 10 5D C3 55 83 EC 0A 72 06
000013B0 : 3B 26 18 00 77 03 E9 4A F0 8B EC FF 76 0E E8 ED
000013C0 : 46 8B E5 C6 46 04 00 33 DB 89 46 02 89 5E 07 89
000013D0 : 5E 05 8B 46 05 8B 5E 02 3B D8 7E 6D 8B 76 0E 03
000013E0 : F0 8A 1C 30 FF 43 8A 8F E8 20 30 ED 81 E1 01 00
000013F0 : 74 36 85 C0 75 07 C7 46 07 01 00 EB 47 8B 46 05
```

```
Block 10
00001400 : 48 8B 76 0E 03 F0 8A 04 30 E4 3D 2D 00 75 12 8B
00001410 : 46 07 3D 02 00 7D 2D BB 04 00 2B D8 89 5E 07 EB
00001420 : 23 C7 46 07 05 00 EB 1C 8B 76 0E 03 76 05 8A 04
00001430 : 30 E4 40 8B F0 8A 84 E8 20 30 E4 25 02 00 74 04
00001440 : C6 46 04 01 FF 46 05 EB 89 82 7E 04 00 75 08 B8
00001450 : 02 00 83 C4 0A 5D C3 BB 46 07 83 C4 0A 5D C3 55
00001460 : 83 EC 04 72 06 3B 26 18 00 77 03 E9 95 EF 8B EC
00001470 : 83 7E 0A 02 74 06 83 7E 0C 02 75 0B FF 76 08 E8
00001480 : FF 00 8B E5 E9 8C 00 83 7E 0A 05 74 04 33 C0 EB
00001490 : 03 33 C0 40 83 7E 0C 05 74 04 33 DB EB 03 33 DB
000014A0 : 43 33 C3 74 08 FF 76 08 E8 6D 00 8B E5 8B 46 0A
000014B0 : 3D 01 00 74 11 3D 03 00 74 0C 83 7E 0C 01 74 06
000014C0 : 83 7E 0C 03 75 2C 8B 76 08 8A 04 30 E4 89 46 00
000014D0 : 40 8B F0 8A 84 E8 20 30 E4 25 02 00 74 08 8B 46
000014E0 : 00 2D 20 00 EB 07 8B 76 08 8A 04 30 E4 8B 76 08
000014F0 : 88 04 8B 46 0A 3D 03 00 74 11 3D 04 00 74 0C 83
00001500 : 7E 0C 03 74 06 83 7E 0C 04 75 08 FF 76 08 E8 D9
00001510 : 00 8B E5 83 C4 04 5D C3 55 83 EC 0A 72 06 3B 26
00001520 : 18 00 77 03 E9 DC EE 8B EC FF 76 0E E8 7F 45 8B
00001530 : E5 C7 46 08 00 00 89 46 06 8B 46 08 8B 5E 06 3B
00001540 : D8 7E 39 8B 76 0E 03 F0 8A 04 30 E4 89 46 02 40
00001550 : 8B F8 8A 85 E8 20 30 E4 25 01 00 89 76 00 74 08
00001560 : 8B 46 02 05 20 00 EB 0A 8B 76 0E 03 76 08 8A 04
00001570 : 30 E4 8B 76 00 88 04 FF 46 08 EB BD 83 C4 0A 5D
00001580 : C3 55 83 EC 0A 72 06 3B 26 18 00 77 03 E9 73 EE
00001590 : 8B EC FF 76 0E E8 16 45 8B E5 C7 46 08 00 00 89
000015A0 : 46 06 8B 46 08 8B 5E 06 3B D8 7E 39 8B 76 0E 03
000015B0 : F0 8A 04 30 E4 89 46 02 40 8B F8 8A 85 E8 20 30
000015C0 : E4 25 02 00 89 76 00 74 08 8B 46 02 2D 20 00 EB
000015D0 : 0A 8B 76 0E 03 76 08 8A 04 30 E4 8B 76 00 88 04
000015E0 : FF 46 08 EB BD 83 C4 0A 5D C3 55 83 EC 0A 72 06
000015F0 : 3B 26 18 00 77 03 E9 0A EE 8B EC FF 76 0E E8 AD Block 11
00001600 : 44 8B E5 C7 46 08 02 00 89 46 06 8B 46 08 8B 5E
00001610 : 06 3B D8 7E 48 48 8B F0 8B 5E 0E 03 F3 8A 04 30
00001620 : E4 3D 2D 00 75 32 03 5E 08 8A 07 30 E4 89 46 02
00001630 : 40 8B F0 8A 84 E8 20 30 E4 25 02 00 89 5E 00 74
00001640 : 08 8B 46 02 2D 20 00 EB 0A 8B 76 0E 03 76 08 8A
00001650 : 04 30 E4 8B 76 00 88 04 FF 46 08 EB AE 83 C4 0A
00001660 : 5D C3 55 83 EC 0E 72 06 3B 26 18 00 77 03 E9 92
00001670 : ED 8B EC C7 46 0C FE 01 8B 46 0C D1 F8 89 46 0C
00001680 : 7F 03 E9 C5 00 40 89 46 06 8B 46 06 3D FE 01 7F
00001690 : E7 2B 46 0C 89 46 08 8B 46 08 85 C0 7F 03 E9 A3
000016A0 : 00 8B 5E 0C 03 D8 D1 E3 8B 8F 68 06 80 E5 1F 85
000016B0 : C9 75 03 E9 8E 00 D1 E0 8B F0 8B 9C 68 06 80 E7
000016C0 : 1F 85 DB 89 46 00 74 2D 8B 84 68 06 80 E4 1F 48
000016D0 : BB 66 0A 03 C3 8B 5E 08 43 03 5E 0C D1 E3 8B 8F
000016E0 : 66 06 80 E5 1F 49 81 C1 66 0A 51 50 E8 60 00 8B
000016F0 : E5 85 C0 7E 4F 8B 46 08 D1 E0 8B F0 8B 9C 68 06
00001700 : 80 E7 1F 8B 46 08 40 8B 4E 0C 03 C1 D1 E0 8B F8
00001710 : 8B 95 66 06 80 E6 1F 80 E6 1F 8B 8C 68 06 81 E1
00001720 : 00 E0 0B CA 89 8C 68 06 89 5E 0A 80 E7 1F 8B 85
00001730 : 66 06 25 00 E0 0B C3 89 85 66 06 8B 46 0C 29 46
00001740 : 08 E9 53 FF FF 46 06 E9 3F FF 83 C4 0E 5D C3 55
00001750 : 83 EC 0A 72 06 3B 26 18 00 77 03 E9 A5 EC 8B EC
```

```
00001760 : 33 C0 89 46 06 89 46 08 8B 46 06 8B 76 0E 03 F0
00001770 : 8A 1C 30 FF 85 DB 74 72 8B 76 0E 03 F0 8A 04 30
00001780 : E4 89 46 00 40 8B F0 8A 84 E8 20 30 E4 25 01 00
00001790 : 74 08 8B 46 00 05 20 00 EB 0A 8B 76 0E 03 76 06
000017A0 : 8A 04 30 E4 8B 76 10 03 76 06 8A 1C 30 FF 89 5E
000017B0 : 02 43 8A 8F E8 20 30 ED 81 E1 01 00 89 46 00 74
000017C0 : 08 8B 46 02 05 20 00 EB 0A 8B 76 10 03 76 06 8A
000017D0 : 04 30 E4 8B 5E 00 2B D8 89 5E 08 74 07 8B C3 83
000017E0 : C4 0A 5D C3 FF 46 06 E9 7E FF 8B 46 08 83 C4 0A
000017F0 : 5D C3 55 83 EC 38 72 06 3B 26 18 00 77 03 E9 02
```

Block 12
```
00001800 : EC 8B EC 8B 46 3C 3B 06 68 06 72 03 E9 07 01 33
00001810 : C0 89 46 06 89 46 0C 8B 76 3C 8A 84 66 0A 30 E4
00001820 : 85 C0 74 18 8B 46 06 FF 46 06 8B F8 8B C6 FF 46
00001830 : 3C 8B F0 8A 84 66 0A 88 43 0E EB DB 8B 76 06 C6
00001840 : 42 0E 00 FF 46 3C 56 8D 46 0E 50 8D 46 33 50 8D
00001850 : 46 2F 50 E8 DE 1C 8B E5 8D 46 0C 50 8D 46 0E 50
00001860 : FF 76 31 FF 76 2F FF 76 35 FF 76 33 E8 F8 09 8B
00001870 : E5 3D 02 00 89 46 08 75 8A 8B 46 0C 89 46 0A D1
00001880 : E0 8B F0 81 C6 66 06 8B 46 3C 2B 46 06 80 E4 1F
00001890 : 8B 1C 81 E3 00 E0 0B D8 89 1C 8B 46 0C 3B 46 0A
000018A0 : 75 1E 8D 46 0C 50 8D 46 0E 50 FF 76 31 FF 76 2F
000018B0 : FF 76 35 FF 76 33 E8 AE 09 8B E5 89 46 08 EB DA
000018C0 : 83 7E 08 01 74 03 E9 3A FF 8B 46 0A D1 E0 8B F0
000018D0 : 8B 46 0C D1 E0 8B F8 B1 0D 8B 9D 66 06 D3 EB 81
000018E0 : E3 07 00 B1 0D D3 E3 81 E3 00 E0 8B 8C 66 06 80
000018F0 : E5 1F 0B CB 89 8C 66 06 33 DB 8B 8D 66 06 80 E5
00001900 : 1F 89 8D 66 06 81 C7 66 06 33 C0 8B 1D 81 E3 00
00001910 : E0 89 1D E9 ED FE 83 C4 38 5D C3 55 83 EC 3E 72
00001920 : 06 3B 26 18 00 77 03 E9 D9 EA 8B EC 33 C0 FF 76
00001930 : 42 89 46 28 89 46 3C E8 74 41 8B E5 3D 20 00 89
00001940 : 46 38 7F 04 85 C0 75 08 B8 06 00 83 C4 3E 5D C3
00001950 : 8A 46 44 84 C0 74 4D 30 E4 3D 05 00 74 46 C7 46
00001960 : 32 00 00 8B 46 32 8B 5E 38 3B D8 7C 58 8B 76 42
00001970 : 03 F0 8A 04 30 E4 89 46 02 40 8B F0 8A 84 E8 20
00001980 : 30 E4 25 01 00 74 08 8B 46 02 05 20 00 EB 0A 8B
00001990 : 76 42 03 76 32 8A 04 30 E4 8B 76 32 88 42 06 FF
000019A0 : 46 32 EB BF C7 46 32 00 00 8B 46 32 8B 5E 38 3B
000019B0 : D8 7C 12 8B 76 42 03 F0 8A 04 8B 7E 32 88 43 06
000019C0 : FF 46 32 EB E4 FF 76 38 8D 46 06 50 8D 46 2E 50
000019D0 : 8D 46 2A 50 E8 5D 1B 8B E5 8D 46 3C 50 8D 46 06
000019E0 : 50 FF 76 2C FF 76 2A FF 76 30 FF 76 2E E8 77 08
000019F0 : 8B E5 3D 02 00 89 46 36 74 03 E9 F7 00 82 7E 48
```

Block 13
```
00001A00 : 00 75 03 E9 E6 00 81 3E 66 06 80 01 73 0F 8B 46
00001A10 : 38 8B 1E 68 06 03 D8 81 FB 00 0C 72 75 82 7E 46
00001A20 : 00 74 67 83 7E 28 00 75 19 A1 68 06 D1 E8 05 66
00001A30 : 0A 89 46 28 8B 76 28 FF 46 28 8A 04 30 E4 85 C0
00001A40 : 75 F2 C7 46 32 00 00 83 7E 32 06 7D 19 33 C0 50
00001A50 : 50 FF 76 32 FF 76 28 E8 C1 FE 8B E5 3D 02 00 75
00001A60 : 05 FF 46 32 EB E1 C7 46 3C 00 00 8D 46 3C 50 8D
00001A70 : 46 06 50 FF 76 2C FF 76 2A FF 76 30 FF 76 2E E8
00001A80 : E5 07 8B E5 89 46 36 E9 7C FF B8 09 00 83 C4 3E
00001A90 : 5D C3 8B 46 3C D1 E0 8B F0 8B 1E 68 06 43 80 E7
00001AA0 : 1F 8B 8C 66 06 81 E1 00 E0 0B CB 89 8C 66 06 8A
```

```
00001AB0 : 46 44 30 E4 B1 0D D3 E0 25 00 E0 8B 8C 66 06 80
00001AC0 : E5 1F 0B C8 89 8C 66 06 A1 68 06 05 66 0A 8D 5E
00001AD0 : 06 53 50 E8 FE 3F 8B E5 8B 46 38 40 01 06 68 06
00001AE0 : FF 06 66 06 B8 03 00 83 C4 3E 5D C3 B8 02 00 83
00001AF0 : C4 3E 5D C3 83 7E 36 01 74 03 E9 41 01 82 7E 48
00001B00 : 00 74 48 8B 46 3C D1 E0 8B F0 B1 0D 8B 9C 66 06
00001B10 : D3 EB 81 E3 07 00 8A 4E 44 30 ED 3B CB 89 46 00
00001B20 : 74 21 8A 46 44 30 E4 B1 0D D3 E0 25 00 E0 8B 8C
00001B30 : 66 06 80 E5 1F 0B C8 89 8C 66 06 B8 03 00 83 C4
00001B40 : 3E 5D C3 B8 09 00 83 C4 3E 5D C3 8B 46 3C D1 E0
00001B50 : 8B F0 B1 0D 8B 9C 66 06 D3 EB 81 E3 07 00 8A 4E
00001B60 : 44 30 ED 3B CB 89 46 00 74 03 E9 C9 00 8B 9C 66
00001B70 : 06 80 E7 1F 4B 33 C9 8B 94 66 06 81 E2 00 E0 89
00001B80 : 94 66 06 33 C0 8B 8C 66 06 80 E5 1F 89 8C 66 06
00001B90 : 8B 46 38 40 29 06 68 06 FF 0E 66 06 C7 46 34 02
00001BA0 : 00 89 46 38 89 5E 3A 89 5E 32 8B 46 34 3D 00 02
00001BB0 : 7D 35 D1 E0 8B F0 8B 9C 66 06 80 E7 1F 8B 4E 3A
00001BC0 : 3B D9 89 46 00 76 1B 81 C6 66 06 8B 04 80 E4 1F
00001BD0 : 8B 5E 38 2B C3 80 E4 1F 8B 1C 81 E3 00 E0 0B D8
00001BE0 : 89 1C FF 46 34 EB C3 8B 46 3A 03 46 38 89 46 34
00001BF0 : 8B 46 32 3B 06 68 06 73 17 FF 46 32 8B F0 8B 46
```

Block 14
```
00001C00 : 34 FF 46 34 8B F8 8A 85 66 0A 88 84 66 0A EB E0
00001C10 : 8B 46 32 8B 5E 34 3B D8 7E 0C FF 46 32 8B F0 C6
00001C20 : 84 66 0A 00 EB EA FF 76 3A E8 C6 FB 8B E5 B8 03
00001C30 : 00 83 C4 3E 5D C3 B8 02 00 83 C4 3E 5D C3 B8 09
00001C40 : 00 83 C4 3E 5D C3 55 81 EC 5E 04 72 06 3B 26 18
00001C50 : 00 77 03 E9 AD E7 8B EC C6 06 E6 00 55 8B B6 66
00001C60 : 04 C7 44 02 00 00 C7 04 00 00 8B B6 68 04 C6 04
00001C70 : 00 FF B6 62 04 E8 36 3E 8B E5 85 C0 89 46 34 74
00001C80 : 05 3D 20 00 7E 09 B8 06 00 81 C4 5E 04 5D C3 83
00001C90 : 3E 6A 16 19 74 09 B8 08 00 81 C4 5E 04 5D C3 FF
00001CA0 : B6 62 04 8D 46 04 50 E8 2A 3E 8B E5 8A 86 64 04
00001CB0 : 30 E4 3D 05 00 75 40 FF 76 34 8D 46 04 50 8D 86
00001CC0 : 56 04 50 8D 86 5A 04 50 E8 69 18 8B E5 FF B6 68
00001CD0 : 04 8D 46 04 50 8D 86 5A 04 50 8D 86 56 04 50 E8
00001CE0 : C0 04 8B E5 48 75 10 8B B6 68 04 C6 04 05 B8 01
00001CF0 : 00 81 C4 5E 04 5D C3 8A 86 64 04 30 E4 85 C0 74
00001D00 : 40 C7 46 36 00 00 8B 46 36 8B 5E 34 3B D8 7E 31
00001D10 : 8B F0 8A 5A 04 30 FF 43 8A 8F E8 20 30 ED 81 E1
00001D20 : 01 00 74 0A 8A 42 04 30 E4 05 20 00 EB 08 8B 76
00001D30 : 36 8A 42 04 30 E4 8B 76 36 88 42 04 FF 46 36 EB
00001D40 : C5 83 3E F2 1A 00 75 27 8D 86 5A 04 50 8D 86 56
00001D50 : 04 50 FF 76 34 8D 46 04 50 E8 1C 16 8B E5 48 75
00001D60 : 0E C6 06 E6 00 52 B8 01 00 81 C4 5E 04 5D C3 FF
00001D70 : 76 34 8D 46 04 50 8D 86 56 04 50 8D 86 5A 04 50
00001D80 : E8 B1 17 8B E5 FF B6 68 04 8D 46 04 50 8D 86 5A
00001D90 : 04 50 8D 86 56 04 50 E8 08 04 8B E5 48 75 09 B8
00001DA0 : 01 00 81 C4 5E 04 5D C3 83 7E 34 15 7E 09 B8 02
00001DB0 : 00 81 C4 5E 04 5D C3 8B 46 34 8D 5E 38 53 8D 5E
00001DC0 : 25 53 8D 5E 04 53 89 46 38 E8 1B 07 8B E5 B8 01
00001DD0 : 00 50 8D 46 3C 50 FF 76 34 8D 46 04 50 FF 76 38
00001DE0 : 8D 46 25 50 E8 6C 00 8B E5 85 C0 89 46 3A 79 09
00001DF0 : B8 07 00 81 C4 5E 04 5D C3 83 7E 34 15 7E 09 B8
```

```
Block 15
00001E00 : 02 00 81 C4 5E 04 5D C3 83 7E 3A 00 74 3C C6 06
00001E10 : E6 00 44 83 3E F2 1A 01 75 11 8B 46 3E 8B 5E 3C
00001E20 : 8B B6 66 04 89 44 02 89 1C EB 0D 8B B6 66 04 C7
00001E30 : 44 02 00 00 C7 04 00 00 8A 46 40 8B B6 68 04 88
00001E40 : 04 B8 01 00 81 C4 5E 04 5D C3 B8 02 00 81 C4 5E
00001E50 : 04 5D C3 55 83 EC 42 72 06 3B 26 18 00 77 03 E9
00001E60 : A1 E5 8B EC 83 7E 4C 15 7F 06 83 7E 48 0E 7E 07
00001E70 : 33 C0 83 C4 42 5D C3 33 C0 8B 5E 48 8B 4E 4C 89
00001E80 : 4E 35 49 8B 76 4A 03 F1 8A 0C 30 ED 83 F9 73 89
00001E90 : 46 3F 89 46 3D 89 5E 33 75 03 E9 8F 00 83 7E 4C
00001EA0 : 03 7F 03 E9 1C 01 83 FB 02 7F 03 E9 14 01 8B 46
00001EB0 : 4C 2D 03 00 8B 76 4A 03 F0 8A 04 30 E4 3D 69 00
00001EC0 : 74 03 E9 FD 00 8B 46 4C 48 48 8B 76 4A 03 F0 8A
00001ED0 : 04 30 E4 3D 6E 00 74 03 E9 E7 00 8B 46 4C 48 8B
00001EE0 : 76 4A 03 F0 8A 04 30 E4 3D 67 00 74 03 E9 D2 00
00001EF0 : 4B 4B 8B 76 46 03 F3 8A 04 30 E4 3D 6E 00 74 03
00001F00 : E9 BF 00 8B 46 48 48 8B 76 46 03 F0 8A 04 30 E4
00001F10 : 3D 67 00 74 03 E9 AA 00 C7 46 3F 30 00 8B 46 48
00001F20 : 48 48 83 6E 35 03 89 46 33 E9 96 00 83 7E 4C 02
00001F30 : 7D 03 E9 8D 00 83 7E 48 02 7D 03 E9 84 00 8B 46
00001F40 : 4C 48 48 8B 76 4A 03 F0 8A 04 30 E4 3D 27 00 74
00001F50 : 3C 8B 46 48 48 8B 76 46 03 F0 8A 04 30 E4 3D 73
00001F60 : 00 75 2A 83 7E 50 00 75 13 8B 46 48 48 48 8B 76
00001F70 : 46 03 F0 8A 04 30 E4 3D 27 00 74 11 C7 46 3F 03
00001F80 : 00 8B 46 48 48 FF 4E 35 89 46 33 EB 35 8B 46 48
00001F90 : 48 48 8B F0 8B 5E 46 03 F3 8A 04 30 E4 3D 27 00
00001FA0 : 75 20 8B 46 48 48 03 D8 8A 07 30 E4 3D 73 00 75
00001FB0 : 11 C7 46 3F 0C 00 8B 46 48 48 48 83 6E 35 02 89
00001FC0 : 46 33 C7 46 37 00 00 8B 46 37 8B 5E 33 3B D8 7E
00001FD0 : 30 8B 76 46 03 F0 8A 04 30 E4 3D 7F 00 7E 07 33
00001FE0 : C0 83 C4 42 5D C3 8B 76 46 03 76 37 8A 04 30 E4
00001FF0 : 8B F0 8A 84 F6 1A 8B 7E 37 88 43 0C FF 46 37 EB Block 16
00002000 : C6 C7 46 37 00 00 8B 46 37 8B 5E 35 3B D8 7E 65
00002010 : 8B 76 4A 03 F0 8A 04 30 E4 89 46 00 2D 61 00 40
00002020 : 83 7E 00 27 88 46 30 75 04 C6 46 30 1B 8B 76 4A
00002030 : 03 76 37 8A 04 30 E4 3D 2D 00 89 46 00 7C 10 3D
00002040 : 2F 00 7F 0B 8A 46 30 30 E4 05 4F 00 88 46 30 8A
00002050 : 46 30 30 E4 85 C0 89 46 00 7E 05 3D 1E 00 7E 07
00002060 : 33 C0 83 C4 42 5D C3 8A 46 30 8B 76 37 88 42 1A
00002070 : FF 46 37 EB 91 33 C0 89 46 3B 89 46 39 83 7E 3B
00002080 : 00 74 03 E9 17 01 C7 46 0A 00 00 C7 46 08 00 00
00002090 : C7 46 37 00 00 8B 46 37 3D 06 00 7D 43 B9 05 00
000020A0 : 8B 5E 0A 8B 56 08 D1 E2 D1 D3 E2 FA 8B 4E 33 3B
000020B0 : C8 89 56 00 89 5E 02 7E 09 8B F0 8A 42 0C 30 E4
000020C0 : EB 02 33 C0 33 DB 85 C0 79 01 4B 8B 4E 02 0B CB
000020D0 : 8B 56 00 0B D0 89 4E 0A 89 56 08 FF 46 37 EB B5
000020E0 : 83 7E 08 FF 75 05 81 7E 0A FF 7F 75 07 33 C0 83
000020F0 : C4 42 5D C3 8D 46 31 50 FF 76 0A FF 76 08 E8 C2
00002100 : 17 8B E5 FF 76 35 FF 76 33 FF 76 4E 8D 4E 39 51
00002110 : 50 53 FF 76 3F 8D 46 31 50 FF 76 50 8D 46 0C 50
00002120 : E8 7E 18 8B E5 83 7E 50 00 74 08 8B 46 39 83 C4
00002130 : 42 5D C3 83 7E 3D 00 74 08 8B 46 39 83 C4 42 5D
00002140 : C3 B8 01 00 83 7E 3F 03 89 46 3D 75 12 C7 46 3F
00002150 : 00 00 8B 76 48 C6 42 0B 13 FF 46 33 E9 1E FF 8B
```

```
00002160 : 46 48 48 8B 76 46 03 F0 8A 04 30 E4 3D 73 00 75
00002170 : 12 8B 46 4C 48 8B 76 4A 03 F0 8A 04 30 E4 3D 73
00002180 : 00 75 08 8B 46 39 83 C4 42 5D C3 C7 46 3F 03 00
00002190 : 8B 76 48 C6 42 0B 00 FF 4E 33 E9 E0 FE 83 C4 42
000021A0 : 5D C3 55 83 EC 04 72 06 3B 26 18 00 77 03 E9 52
000021B0 : E2 8B EC C7 46 02 00 00 8D 46 02 50 FF 76 0C 8B
000021C0 : 76 0A FF 74 02 FF 34 8B 76 08 FF 74 02 FF 34 E8
000021D0 : 95 00 8B E5 48 75 1F 8B 46 02 D1 E0 8B F0 B1 0D
000021E0 : 8B 84 66 06 D3 E8 25 07 00 8B 76 0E 88 04 B8 01
000021F0 : 00 83 C4 04 5D C3 B8 02 00 83 C4 04 5D C3 55 83
```

Block 17
```
00002200 : EC 06 72 06 3B 26 18 00 77 03 E9 F6 E1 8B EC 8B
00002210 : 76 0A C7 04 00 00 83 3E 70 16 01 7F 05 83 C4 06
00002220 : 5D C3 A1 70 16 48 8B F0 C6 84 8A 16 00 89 46 04
00002230 : 8B 46 04 85 C0 78 1E FF 76 0A E8 F0 13 8B E5 8B
00002240 : 46 04 85 C0 7E 0A 8B F0 8A 84 AD 16 88 84 89 16
00002250 : FF 4E 04 EB DB B8 AD 16 50 B8 8A 16 50 E8 74 38
00002260 : 8B E5 83 C4 06 5D C3 55 83 EC 08 72 06 3B 26 18
00002270 : 00 77 03 E9 8D E1 8B EC 8B 46 12 8B 5E 10 33 C0
00002280 : 81 E3 3F 00 8B 76 16 83 3C 00 89 46 06 89 5E 04
00002290 : 75 3F C7 06 7E 1B 00 00 33 C9 BA 03 00 2B D3 1B
000022A0 : C8 8B 46 0E 8B 5E 0C 33 C0 81 E3 FF 01 89 0E 78
000022B0 : 1B 33 C9 89 16 76 1B BA FD 01 E8 96 3B A3 7C 1B
000022C0 : 89 1E 7A 1B 7E 0B 81 2E 7A 1B FD 01 83 1E 7C 1B
000022D0 : 00 A1 7A 1B 05 02 00 8B 1E 7C 1B 83 D3 00 8B 76
000022E0 : 16 89 04 FF 06 7E 1B 8B 46 06 8B 5E 04 D1 E3 D1
000022F0 : D0 8B 0E 76 1B 03 D9 8B 16 78 1B 13 C2 01 1E 7A
00002300 : 1B 11 06 7C 1B A3 78 1B 89 1E 76 1B A1 7C 1B 8B
00002310 : 1E 7A 1B 33 C9 BA FD 01 E8 38 3B 7C 0D 81 2E 7A
00002320 : 1B FD 01 83 1E 7C 1B 00 EB E2 8B 76 16 8B 04 D1
00002330 : E0 8B F0 8B 84 66 06 80 E4 1F 85 C0 75 08 B8 02
00002340 : 00 83 C4 08 5D C3 8B 76 16 8B 04 D1 E0 8B F0 8B
00002350 : 84 66 06 80 E4 1F 48 05 66 0A 50 FF 76 14 E8 B1
00002360 : 39 8B E5 85 C0 75 08 B8 01 00 83 C4 08 5D C3 83
00002370 : 3E 7E 1B 18 77 03 E9 58 FF B8 09 00 83 C4 08 5D
00002380 : C3 55 83 EC 08 72 06 3B 26 18 00 77 03 E9 73 E0
00002390 : 8B EC 8B 76 0C C7 04 00 00 83 3E 70 16 01 7F 05
000023A0 : 83 C4 08 5D C3 A1 70 16 48 89 46 06 8B 46 06 85
000023B0 : C0 7E 45 8B F0 8A 84 AD 16 30 E4 8A 9C AC 16 30
000023C0 : FF 3B D8 74 2E 8B 76 06 8A 84 AD 16 88 84 89 16
000023D0 : 8A 84 AC 16 88 84 8A 16 FF 76 0C E8 4F 12 8B E5
000023E0 : 8B 76 06 8A 84 AC 16 88 84 89 16 8A 84 AD 16 88
000023F0 : 84 8A 16 FF 4E 06 EB B4 B8 AD 16 50 B8 8A 16 50
```

Block 18
```
00002400 : E8 D1 36 8B E5 83 C4 08 5D C3 55 83 EC 0E 72 06
00002410 : 3B 26 18 00 77 03 E9 EA DF 8B EC C7 46 0C 00 00
00002420 : 8B 76 1A 8B 04 FF 76 14 89 46 0A E8 80 36 8B E5
00002430 : 85 C0 75 06 C7 06 80 1B 00 00 C7 46 08 00 00 8B
00002440 : 46 08 8B 5E 0A 3B D8 7F 03 E9 8E 00 BB 2A 00 F7
00002450 : EB 8B 5E 12 03 D8 83 C3 06 53 FF 76 14 E8 EC 12
00002460 : 8B E5 40 75 6F 8B 76 1A C7 04 FF FF 83 3E 80 1B
00002470 : 1E 7C 05 83 C4 0E 5D C3 8B 46 08 BB 2A 00 F7 EB
00002480 : 8B 5E 12 03 D8 83 C3 06 53 FF 76 14 E8 4E 39 8B
00002490 : E5 B8 82 1B 50 FF 76 14 E8 42 39 8B E5 A1 80 1B
000024A0 : D1 E0 D1 E0 8B 76 16 03 F0 8B 46 08 BB 2A 00 F7
```

```
000024B0 : EB 8B 7E 12 03 F8 8B 45 02 8B 1D 89 44 02 89 1C
000024C0 : A1 80 1B FF 06 80 1B 8B 76 18 03 F0 8A 45 04 88
000024D0 : 04 FF 46 0C FF 46 08 E9 65 FF 8B 46 0C 8B 76 1A
000024E0 : 89 04 83 C4 0E 5D C3 55 83 EC 74 72 06 3B 26 18
000024F0 : 00 77 03 E9 0D DF 8B EC 8B 76 7C 83 3C 21 7E 05
00002500 : 83 C4 74 5D C3 8B 76 7C 8B 04 48 FF 76 78 8D 5E
00002510 : 53 53 89 46 48 E8 BC 35 8B E5 C7 46 4C 00 00 8B
00002520 : 46 4C 3D 21 00 7D 0E D1 E0 8B F0 C7 42 06 01 00
00002530 : FF 46 4C EB EA C7 46 4C 00 00 8B 46 4C 8B 76 7C
00002540 : 8B 1C 3B D8 7E 77 8B 76 78 03 F0 8A 04 30 E4 EB
00002550 : 52 8B 46 4C D1 E0 8B F0 C7 42 06 FF FF EB 58 8B
00002560 : 46 4C D1 E0 8B F0 C7 42 06 00 00 EB 4A 8B 46 4C
00002570 : D1 E0 8B F0 C7 42 06 62 00 EB 3C 2F 00 6D 23 27
00002580 : 00 6D 23 2E 00 6D 23 2D 00 6D 23 79 00 5F 23 75
00002590 : 00 51 23 6F 00 51 23 69 00 51 23 65 00 51 23 61
000025A0 : 00 51 23 BE 24 00 2E 3B 84 7B 23 75 05 2E FF A4
000025B0 : 7D 23 83 EE 04 79 EF FF 46 4C E9 7D FF C7 46 4C
000025C0 : 00 00 8B 46 4C 8B 5E 48 3B D8 7E 37 8B F0 8A 5A
000025D0 : 53 30 FF 83 FB 63 75 26 8A 42 54 88 46 52 30 E4
000025E0 : 3D 65 00 89 46 00 74 0F 3D 69 00 74 0A 8A 46 52
000025F0 : 30 E4 3D 79 00 75 07 8B 76 4C C6 42 53 73 FF 46

Block 19
00002600 : 4C EB BF C7 46 4C 01 00 8B 46 4C 8B 76 7C 8B 1C
00002610 : 3B D8 7E 15 8B F0 8A 5A 53 30 FF 83 FB 7A 75 04
00002620 : C6 42 53 73 FF 46 4C EB DF C7 46 4C 00 00 8B 46
00002630 : 4C 8B 5E 48 3B D8 7E 2E 8B F0 8A 5A 53 30 FF 83
00002640 : FB 71 75 1D 8A 42 54 30 E4 3D 75 00 75 13 C6 42
00002650 : 53 6B C6 42 54 77 8B C6 D1 E0 8B F0 C7 42 08 01
00002660 : 00 FF 46 4C EB C8 8A 46 53 30 E4 3D 77 00 75 0E
00002670 : 8A 46 54 30 E4 3D 72 00 75 04 C6 46 53 2B 8A 46
00002680 : 53 30 E4 3D 77 00 75 18 8A 46 54 30 E4 3D 68 00
00002690 : 75 0E 8A 46 55 30 E4 3D 6F 00 75 04 C6 46 53 2B
000026A0 : C7 46 4C 00 00 8B 76 7C 8B 04 48 48 8B 5E 4C 3B
000026B0 : C3 7E 4E 8B F3 8A 42 53 30 E4 3D 77 00 75 3D 8A
000026C0 : 42 54 30 E4 3D 68 00 75 33 8A 42 55 88 46 52 30
000026D0 : E4 3D 61 00 89 46 00 74 19 3D 65 00 74 14 8A 46
000026E0 : 52 30 E4 3D 69 00 74 0A 8A 46 52 30 E4 3D 79 00
000026F0 : 75 0A 8B 76 4C C6 42 54 2B FF 46 4C FF 46 4C EB
00002700 : A4 C7 46 4C 00 00 8B 76 7C 8B 04 48 48 8B 5E 4C
00002710 : 3B C3 7E 31 8B F3 8A 42 53 30 E4 3D 74 00 75 20
00002720 : 8A 42 54 30 E4 3D 63 00 75 16 8A 42 55 30 E4 3D
00002730 : 68 00 75 0C C6 42 53 2B C6 42 54 6B 83 46 4C 02
00002740 : FF 46 4C EB C1 C7 46 4C 01 00 8B 76 7C 8B 04 48
00002750 : 48 8B 5E 4C 3B C3 7F 03 E9 B1 00 8B F3 8A 42 53
00002760 : 30 E4 3D 74 00 74 03 E9 9C 00 8A 42 54 30 E4 3D
00002770 : 75 00 74 03 E9 8F 00 8A 42 55 30 E4 EB 74 8B 46
00002780 : 4C 40 40 89 46 4C D1 E0 8B F0 83 7A 08 00 7F 76
00002790 : 8B 76 4C 8A 42 54 30 E4 3D 75 00 74 69 C6 42 51
000027A0 : 6B C6 42 52 68 8B C6 D1 E0 8B F8 B8 01 00 89 43
000027B0 : 04 FF 46 4C EB 50 8B 76 4C C6 42 53 6B C6 42 54
000027C0 : 68 C6 42 55 6F 8B C6 D1 E0 8B F8 C7 43 08 01 00
000027D0 : 83 46 4C 02 EB 30 6F 00 B6 25 61 00 B6 25 65 00
000027E0 : B6 25 6C 00 7E 25 6D 00 7E 25 6E 00 7E 25 72 00
000027F0 : 7E 25 BE 18 00 2E 3B 84 D6 25 75 05 2E FF A4 D8
```

```
Block 20
00002800 : 25 83 EE 04 79 EF FF 46 4C E9 3E FF 8B 76 7C 8B
00002810 : 04 3D 03 00 7C 2F 48 8B F0 8A 5A 53 30 FF 83 FB
00002820 : 79 89 46 00 74 0A 8A 42 53 30 E4 3D 69 00 75 15
00002830 : 8B 76 7C 8B 04 48 8B F0 C6 42 53 59 D1 E0 8B F0
00002840 : C7 42 06 63 00 8B 76 7C 8B 04 3D 04 00 7C 42 48
00002850 : 48 8B F0 8A 42 53 30 E4 3D 69 00 75 34 8B 76 7C
00002860 : 8B 04 48 8B F0 8A 42 53 30 E4 3D 65 00 75 22 8B
00002870 : 76 7C 8B 04 48 8B F0 C6 42 53 59 D1 E0 8B F0 C7
00002880 : 42 06 63 00 8B 76 7C 8B 04 48 48 8B F0 C6 42 53
00002890 : 2B C7 46 4C 01 00 8B 46 4C 8B 76 7C 8B 1C 3B D8
000028A0 : 7E 66 8B F0 8A 5A 53 30 FF 83 FB 69 74 0A 8A 42
000028B0 : 53 30 E4 3D 79 00 75 4B 8B 46 4C D1 E0 8B F0 8B
000028C0 : 5A 04 85 DB 89 46 00 79 07 8B 42 08 85 C0 78 1E
000028D0 : 8B 46 4C D1 E0 8B F0 83 7A 04 01 89 46 00 75 23
000028E0 : 8B 7E 4C C6 43 53 69 C7 42 06 FF FF EB 15 8B 76
000028F0 : 4C C6 42 53 59 8B C6 D1 E0 8B F8 C7 43 06 63 00
00002900 : FF 46 4C FF 46 4C EB 8E C7 46 4C 02 00 8B 76 7C
00002910 : 8B 04 2D 03 00 8B 5E 4C 3B C3 7E 61 8B F3 8A 42
00002920 : 53 30 E4 3D 73 00 74 0A 8A 42 53 30 E4 3D 74 00
00002930 : 75 46 8B 76 4C 8A 42 54 30 E4 3D 69 00 75 39 8A
00002940 : 42 55 88 46 52 30 E4 3D 61 00 89 46 00 74 0F 3D
00002950 : 6F 00 74 0A 8A 46 52 30 E4 3D 75 00 75 1A 8B 76
00002960 : 4C C6 42 53 73 C6 42 54 68 8B C6 D1 E0 8B F8 C7
00002970 : 43 08 01 00 83 46 4C 02 FF 46 4C EB 90 8B 76 7C
00002980 : 8B 04 3D 05 00 7C 41 2D 03 00 8B F0 8A 42 53 30
00002990 : E4 3D 67 00 75 32 8B 76 7C 8B 04 48 48 8B F0 8A
000029A0 : 42 53 30 E4 3D 75 00 75 1F 8B 76 7C 8B 04 48 8B
000029B0 : F0 8A 42 53 30 E4 3D 65 00 75 0D 8B 76 7C 8B 04
000029C0 : 48 48 8B F0 C6 42 53 2B C7 46 4C 00 00 8B 46 4C
000029D0 : 8B 76 7C 8B 1C 3B D8 7E 23 8B F0 8A 5A 53 30 FF
000029E0 : 83 FB 75 75 12 8A 42 54 30 E4 3D 65 00 75 08 B0
000029F0 : 6F 88 42 54 88 42 53 FF 46 4C EB D1 C7 46 4C 01

Block 21
00002A00 : 00 8B 46 4C 8B 76 7C 8B 1C 3B D8 7F 03 E9 86 00
00002A10 : 8B F0 8A 5A 53 30 FF 83 FB 77 74 0A 8A 42 53 30
00002A20 : E4 3D 75 00 75 6A 8B 76 4C 8A 42 52 88 46 52 30
00002A30 : E4 3D 65 00 89 46 00 74 0F 3D 6F 00 74 0A 8A 46
00002A40 : 52 30 E4 3D 61 00 75 48 8B 76 4C 8A 42 54 30 E4
00002A50 : 3D 77 00 74 3B 8A 42 54 30 E4 3D 7A 00 74 31 8B
00002A60 : 76 7C 8B 04 48 8B 5E 4C 3B C3 74 0A D1 E3 8B F3
00002A70 : 83 7A 08 01 75 1A B0 6F 8B 76 4C 88 42 53 88 42
00002A80 : 52 8B C6 D1 E0 8B F8 C7 43 06 FF FF 83 46 4C 02
00002A90 : FF 46 4C E9 6B FF 8B 76 7C 8B 04 3D 04 00 7C 4F
00002AA0 : 48 8B F0 8A 42 53 30 E4 3D 61 00 75 42 8B 76 7C
00002AB0 : 8B 04 48 48 8B F0 8A 5A 53 30 FF 83 FB 65 89 46
00002AC0 : 00 74 0A 8A 42 53 30 E4 3D 69 00 75 22 8B 76 7C
00002AD0 : 8B 04 48 8B F0 C6 42 53 2B 8B 76 7C 8B 04 48 48
00002AE0 : 8B F0 C6 42 53 5F D1 E0 8B F0 C7 42 06 64 00 8B
00002AF0 : 76 7C 8B 04 3D 04 00 7C 22 48 8B F0 8A 42 53 30
00002B00 : E4 3D 61 00 75 15 8B 76 7C 8B 04 48 8B F0 C6 42
00002B10 : 53 5F D1 E0 8B F0 C7 42 06 64 00 8B 76 7C 8B 04
00002B20 : 3D 05 00 7C 42 48 48 8B F0 8A 42 53 30 E4 3D 61
00002B30 : 00 75 34 8B 76 7C 8B 04 48 8B F0 8A 42 53 30 E4
00002B40 : 3D 65 00 75 22 8B 76 7C 8B 04 48 8B F0 C6 42 53
00002B50 : 5F 8B 7E 7C 8B 1D 4B 4B 8B FB C6 43 53 2B D1 E0
```

```
00002B60 : 8B F0 C7 42 06 64 00 8D 46 48 50 FF 76 7C 8D 46
00002B70 : 06 50 8D 46 53 50 E8 95 0C 8B E5 8B 46 06 85 C0
00002B80 : 79 3A C7 46 4C 00 00 8B 46 4C 8B 76 7C 8B 1C 3B
00002B90 : D8 7E 17 D1 E0 8B F0 8B 42 06 85 C0 79 0C 8B 76
00002BA0 : 4C C6 42 53 2B FF 46 4C EB DD 8B 76 4C C6 42 52
00002BB0 : 5F 8B C6 D1 E0 8B F0 C7 42 04 64 00 C7 46 4C 00
00002BC0 : 00 8B 76 7C 8B 04 48 8B 5E 4C 3B C3 7E 1F 8B F3
00002BD0 : 8A 42 53 30 E4 3D 64 00 75 0E 8A 42 54 30 E4 3D
00002BE0 : 67 00 75 04 C6 42 53 2B FF 46 4C EB D4 C7 46 4C
00002BF0 : 00 00 8B 46 4C 8B 76 7C 8B 1C 3B D8 7E 15 8B F0
```

Block 22
```
00002C00 : 8A 5A 53 30 FF 83 FB 63 75 04 C6 42 53 6B FF 46
00002C10 : 4C EB DF C7 46 4C 00 00 8B 76 7C 8B 04 48 8B 5E
00002C20 : 4C 3B C3 7E 32 D1 E3 8B F3 8B 42 06 85 C0 78 22
00002C30 : 8B 76 4C 8A 42 53 30 E4 3D 7A 00 74 15 8B 76 4C
00002C40 : 8A 42 54 30 E4 8A 5A 53 30 FF 3B D8 75 04 C6 42
00002C50 : 53 2B FF 46 4C EB C1 8D 46 48 50 FF 76 7C 8D 46
00002C60 : 06 50 8D 46 53 50 E8 A5 0B 8B E5 C7 46 4C 00 00
00002C70 : 8B 46 4C 8B 5E 48 3B D8 7E 23 8B F0 8A 5A 53 30
00002C80 : FF 83 FB 6B 75 12 8A 42 54 30 E4 3D 73 00 75 08
00002C90 : C6 42 53 2B C6 42 54 78 FF 46 4C EB D3 C7 46 4C
00002CA0 : 01 00 8B 76 7C 8B 04 2D 03 00 8B 5E 4C 3B C3 7E
00002CB0 : 40 8B F3 8A 42 53 30 E4 3D 78 00 75 2F 8A 42 54
00002CC0 : 30 E4 3D 69 00 75 25 8A 42 55 30 E4 3D 6F 00 75
00002CD0 : 1B 8A 42 56 30 E4 3D 6E 00 75 11 C6 42 54 68 D1
00002CE0 : E3 8B FB C7 43 08 FF FF 83 46 4C 03 FF 46 4C EB
00002CF0 : B1 8A 46 53 30 E4 3D 70 00 75 0E 8A 46 54 30 E4
00002D00 : 3D 73 00 75 04 C6 46 53 2B C7 46 4C 01 00 8B 46
00002D10 : 4C 8B 76 7C 8B 1C 3B D8 7E 6F 8B F0 8A 42 53 30
00002D20 : E4 3D 68 00 75 5E 8B 76 4C 8A 42 52 30 E4 EB 45
00002D30 : 8B 76 4C C6 42 53 2B FF 46 4C EB 48 8B 76 4C C6
00002D40 : 42 52 2B C6 42 53 66 FF 46 4C EB 38 8B 76 4C 8A
00002D50 : 42 54 30 E4 3D 74 00 75 2B C6 42 53 65 8B C6 D1
00002D60 : E0 8B F8 C7 43 06 FF FF C6 42 54 2B C6 42 52 74
00002D70 : FF 46 4C EB 0F 3D 67 00 74 D2 3D 70 00 74 BD 3D
00002D80 : 72 00 74 AC FF 46 4C EB 85 C7 46 4C 00 00 8B 46
00002D90 : 4C 8B 5E 48 3B D8 7E 1F 8B F0 8A 5A 53 30 FF 83
00002DA0 : FB 67 75 0E 8A 42 54 30 E4 3D 6E 00 75 04 C6 42
00002DB0 : 53 2B FF 46 4C EB D7 8A 46 54 30 E4 3D 6E 00 75
00002DC0 : 16 8A 46 53 30 E4 3D 6B 00 89 46 00 74 05 3D 70
00002DD0 : 00 75 04 C6 46 53 2B C7 46 4C 00 00 8B 46 4C 8B
00002DE0 : 5E 48 3B D8 7E 1F 8B F0 8A 5A 53 30 FF 83 FB 78
00002DF0 : 75 0E 8A 42 54 30 E4 3D 73 00 75 04 C6 42 54 2B
```

Block 23
```
00002E00 : FF 46 4C EB D7 8D 46 48 50 FF 76 7C 8D 46 06 50
00002E10 : 8D 46 53 50 E8 F7 09 8B E5 C7 46 4C 00 00 8B 46
00002E20 : 4C 8B 76 7C 8B 1C 3B D8 7E 5D 8B F0 8A 42 53 30
00002E30 : E4 3D 59 00 74 51 8B C6 D1 E0 8B F0 8B 42 06 85
00002E40 : C0 79 3F 8B 76 4C 8A 42 53 30 E4 3D 6F 00 74 0A
00002E50 : 8A 42 53 30 E4 3D 75 00 75 14 8B 76 4C C6 42 53
00002E60 : 4F 8B C6 D1 E0 8B F0 C7 42 06 65 00 EB 19 8B 76
00002E70 : 4C C6 42 53 45 8B C6 D1 E0 8B F0 C7 42 06 66 00
00002E80 : EB 05 FF 46 4C EB 97 C7 46 4C 01 00 8B 76 7C 8B
00002E90 : 04 48 8B 5E 4C 3B C3 7E 6E 8B F3 8A 42 53 30 E4
00002EA0 : 3D 45 00 75 5D 8B 76 4C 8A 42 54 30 E4 3D 72 00
```

```
00002EB0 : 75 50 8B 46 4C D1 E0 8B F0 83 7A 0A 01 75 2E 8B
00002EC0 : 76 4C 8A 42 55 88 46 52 30 E4 3D 78 00 74 1E 8A
00002ED0 : 46 52 30 E4 3D 68 00 74 14 8A 46 52 30 E4 3D 72
00002EE0 : 00 74 0A 8A 46 52 30 E4 3D 77 00 75 0E 8B 76 7C
00002EF0 : 8B 04 48 48 8B 5E 4C 3B D8 75 07 8B 76 4C C6 42
00002F00 : 53 4F FF 46 4C EB 85 8B 76 7C 8B 04 48 8B F0 8A
00002F10 : 5A 53 30 FF 83 FB 6F 89 46 00 74 0A 8A 42 53 30
00002F20 : E4 3D 75 00 75 15 8B 76 7C 8B 04 48 8B F0 C6 42
00002F30 : 53 4F D1 E0 8B F0 C7 42 06 65 00 8B 76 7C 8B 04
00002F40 : 3D 02 00 7C 42 48 48 8B F0 8A 42 53 30 E4 3D 6F
00002F50 : 00 75 34 8B 76 7C 8B 04 48 8B F0 8A 42 53 30 E4
00002F60 : 3D 65 00 75 22 8B 76 7C 8B 04 48 48 8B F0 C6 42
00002F70 : 53 4F D1 E0 8B F0 C7 42 06 65 00 8B 76 7C 8B 04
00002F80 : 48 8B F0 C6 42 53 2B 8D 46 48 50 FF 76 7C 8D 46
00002F90 : 06 50 8D 46 53 50 E8 75 08 8B E5 C7 46 4C 00 00
00002FA0 : 8B 46 4C 8B 5E 48 3B D8 7E 1B 8B F0 8A 42 53 30
00002FB0 : E4 3D 4F 00 74 0F 8A 42 53 30 E4 3D 45 00 74 05
00002FC0 : FF 46 4C EB DB 8B 46 4C 8B 5E 48 3B D8 7E 6A 8B
00002FD0 : F0 8A 5A 53 40 C7 46 50 00 00 89 46 4A 89 46 4E
00002FE0 : 88 5E 52 8B 46 4A 8B 76 7C 3B 04 7D 23 83 7E 50
00002FF0 : 00 75 1D D1 E0 8B F0 83 7A 06 01 89 46 00 74 0B

Block 24
00003000 : 83 7A 06 62 74 05 C7 46 50 01 00 FF 46 4A EB D3
00003010 : 83 7E 50 00 75 23 8A 46 52 30 E4 3D 4F 00 75 05
00003020 : B8 57 00 EB 03 B8 49 00 8B 76 4E 88 42 52 8B C6
00003030 : D1 E0 8B F0 C7 42 04 67 00 C7 46 4C 01 00 8B 46
00003040 : 4C 8B 76 7C 8B 1C 3B D8 7E 27 8B F0 8A 5A 53 30
00003050 : FF 83 FB 2D 74 0A 8A 42 53 30 E4 3D 2E 00 75 0C
00003060 : 8B 46 4C D1 E0 8B F0 C7 42 06 FF FF FF 46 4C EB
00003070 : CD C7 46 4C 01 00 8B 46 4C 8B 76 7C 8B 1C 3B D8
00003080 : 7E 16 D1 E0 8B F0 83 7A 06 00 7F 07 8B 76 4C C6
00003090 : 42 53 2B FF 46 4C EB DE 8D 46 48 50 FF 76 7C 8D
000030A0 : 46 06 50 8D 46 53 50 E8 64 07 8B E5 C7 46 4C 00
000030B0 : 00 8B 46 4C 8B 76 7C 8B 1C 3B D8 7E 16 3D 0E 00
000030C0 : 7D 11 8B 76 7A 03 F0 8B F8 8A 43 53 88 04 FF 46
000030D0 : 4C EB DE 83 C4 74 5D C3 55 83 EC 08 72 06 3B 26
000030E0 : 18 00 77 03 E9 1C D3 8B EC 8B 76 0C C7 04 00 00
000030F0 : A1 70 16 3D 03 00 7E 05 3D 20 00 7C 05 83 C4 08
00003100 : 5D C3 A1 70 16 40 8B F0 C6 84 8A 16 00 A1 70 16
00003110 : 89 46 04 8B 46 04 85 C0 78 59 C7 46 06 5E 00 8B
00003120 : 46 06 3D 7A 00 7F 36 8B 76 04 8A 9C 8A 16 30 FF
00003130 : 3B C3 74 24 8B 46 06 3D 61 00 7D 0A 8B F0 8A 84
00003140 : 26 1B 30 E4 EB 03 8B 46 06 8B 76 04 88 84 8A 16
00003150 : FF 76 0C E8 D7 04 8B E5 FF 46 06 EB C2 8B 46 04
00003160 : 85 C0 7E 0A 8B F0 8A 84 AC 16 88 84 8A 16 FF 4E
00003170 : 04 EB A0 B8 AD 16 50 B8 8A 16 50 E8 56 29 8B E5
00003180 : 83 C4 08 5D C3 55 83 EC 2E 72 06 3B 26 18 00 77
00003190 : 03 E9 6F D2 8B EC 8B 76 32 C7 04 00 00 83 3E 70
000031A0 : 16 03 7F 05 83 C4 2E 5D C3 A1 70 16 48 89 46 04
000031B0 : 8B 46 04 85 C0 78 53 C7 46 06 5E 00 8B 46 06 3D
000031C0 : 7A 00 7F 36 8B 76 04 8A 9C AD 16 30 FF 3B C3 74
000031D0 : 24 8B 46 06 3D 61 00 7D 0A 8B F0 8A 84 2A 1B 30
000031E0 : E4 EB 03 8B 46 06 8B 76 04 88 84 8A 16 FF 76 32
000031F0 : E8 3A 04 8B E5 FF 46 06 EB C2 8B 76 04 8A 84 AD Block 25
00003200 : 16 88 84 8A 16 FF 4E 04 EB A6 83 C4 2E 5D C3 55
```

```
00003210 : 83 EC 12 72 06 3B 26 18 00 77 03 E9 E5 D1 8B EC
00003220 : C7 46 0E 00 00 8B 76 1A 8B 04 3D 48 00 7E 03 E9
00003230 : 3E 01 8B F0 8A 9C 8B 1B 30 FF 8A 8C F3 1C 30 ED
00003240 : 2B CB 8B 1E 72 16 03 D9 83 FB 0E 89 46 08 89 4E
00003250 : 10 7E 03 E9 0B 01 8B 76 1C 8B 04 89 46 0A 8B 46
00003260 : 0A 3B 06 72 16 7C 03 E9 F7 00 C7 46 0C 00 00 8B
00003270 : 46 0C 8B 5E 0A 03 D8 8B 4E 08 D1 E1 D1 E1 8B F1
00003280 : 03 F0 8A 84 D0 1B 30 E4 8A 8F 74 16 30 ED 3B C8
00003290 : 89 5E 00 74 03 E9 C3 00 3B 1E 72 16 7C 03 E9 BA
000032A0 : 00 8B 76 08 8A 84 8B 1B 30 E4 48 8B 5E 0C 3B C3
000032B0 : 74 03 E9 A0 00 B8 01 00 8B 4E 0A 03 CB 41 8B 76
000032C0 : 1C 89 0C 8B 1E 72 16 03 5E 10 8B 76 18 89 1C BB
000032D0 : 74 16 53 FF 76 16 89 46 0E E8 F8 27 8B E5 C7 46
000032E0 : 0C 00 00 8B 76 08 8A 84 F3 1C 30 E4 8B 5E 0C 3B
000032F0 : C3 7E 1F 8B 46 0A 03 C3 8B 7E 16 03 F8 8B C6 D1
00003300 : E0 D1 E0 8B F0 03 F3 8A 84 38 1D 88 05 FF 46 0C
00003310 : EB D1 83 7E 10 00 74 2A 8B 46 0C 8B 5E 0A 03 D8
00003320 : 8B 4E 10 2B D9 3B 1E 72 16 7D 17 8B 5E 0A 03 D8
00003330 : 8B 76 16 03 F3 2B D9 8A 87 74 16 88 04 FF 46 0C
00003340 : EB D6 8B 76 16 8B 7E 18 03 35 C6 04 00 8B 46 0E
00003350 : 83 C4 12 5D C3 FF 46 0C E9 14 FF FF 46 0A E9 FD
00003360 : FE 8B 76 1A FF 04 8B 76 1C C7 04 00 00 E9 B5 FE
00003370 : 8B 46 0E 83 C4 12 5D C3 55 83 EC 1C 72 06 3B 26
00003380 : 18 00 77 03 E9 7C D0 8B EC C7 46 16 00 00 C6 46
00003390 : 1A 00 83 7E 22 15 7E 08 B8 06 00 83 C4 1C 5D C3
000033A0 : 8B 46 22 48 8B F0 8B 5E 20 03 F3 8A 04 30 E4 3D
000033B0 : 73 00 75 26 8B 46 22 48 48 03 D8 8A 07 30 E4 3D
000033C0 : 27 00 75 16 C6 46 1A 80 8B 46 22 48 48 89 46 22
000033D0 : 7F 31 B8 06 00 83 C4 1C 5D C3 8B 46 22 48 8B 76
000033E0 : 20 03 F0 8A 1C 30 FF 83 FB 73 89 46 00 75 14 C7
000033F0 : 46 16 00 40 85 C0 89 46 22 7F 08 B8 06 00 83 C4
Block 26
00003400 : 1C 5D C3 FF 76 22 FF 76 20 FF 76 24 FF 76 26 E8
00003410 : 22 01 8B E5 8B 76 26 8B 04 25 FF 3F 33 DB 85 C0
00003420 : 79 01 4B 8B 7E 24 8B 4D 02 8B 15 33 C9 81 E2 FF
00003430 : 0F C7 46 14 00 00 89 5E 0A 33 DB 89 46 08 25 FF
00003440 : 00 BB 03 00 2B D8 89 46 12 89 4E 0E 89 56 0C 89
00003450 : 5E 10 8B 46 0C D1 E0 8B 36 66 16 03 F0 8B 04 25
00003460 : FF 3F 33 DB 85 C0 79 01 4B 3B 5E 0A 75 03 3B 46
00003470 : 08 89 76 00 75 6D 8B 04 A9 00 80 75 08 25 00 40
00003480 : 3B 46 16 75 5E B9 08 00 8B 76 24 8B 44 02 8B 1C
00003490 : D1 F8 D1 DB E2 FA 33 C0 81 E3 70 00 8B 4E 22 33
000034A0 : D2 85 C9 79 01 4A 0B C2 0B D9 8B 46 0C 8B 36 68
000034B0 : 16 03 F0 8A 04 30 E4 89 46 00 25 7F 00 3B C3 89
000034C0 : 5E 18 75 1F 8A 46 1A 30 E4 85 C0 89 46 02 74 0B
000034D0 : 8B 5E 00 81 E3 80 00 3B D8 75 08 B8 01 00 83 C4
000034E0 : 1C 5D C3 FF 46 14 8B 46 12 03 46 12 8B 5E 10 03
000034F0 : C3 33 DB 85 C0 79 01 4B 8B 4E 0C 89 46 10 03 C1
00003500 : 8B 56 0E 13 DA 89 46 0C 8B C3 89 5E 0E 8B 5E 0C
00003510 : 33 C9 BA FF 0F E8 3B 29 7E 09 81 6E 0C 00 10 83
00003520 : 5E 0E 00 83 7E 14 02 7F 03 E9 26 FF B8 02 00 83
00003530 : C4 1C 5D C3 55 83 EC 12 72 06 3B 26 18 00 77 03
00003540 : E9 C0 CE 8B EC 8B 76 1A 8A 04 30 E4 33 DB 85 C0
00003550 : 79 01 4B 8B 76 16 89 5C 02 89 04 8B 76 18 89 5C
00003560 : 02 89 04 C7 46 08 01 00 8B 46 08 8B 5E 1C 3B D8
00003570 : 7F 03 E9 B3 00 B9 07 00 8B 76 16 8B 5C 02 8B 14
```

```
00003580 : D1 FB D1 DA E2 FA 33 DB 81 E2 FF 00 8B 4C 02 8B
00003590 : 04 33 C9 25 7F 00 89 4E 02 B9 08 00 89 5E 0C 8B
000035A0 : 5E 02 D1 E0 D1 D3 E2 FA 8B 76 1A 03 76 08 8A 0C
000035B0 : 30 ED 89 56 0A 33 D2 85 C9 79 01 4A 0B DA 0B C1
000035C0 : 8B 4E 0A 89 46 0E 03 C1 8B 56 0C 89 5E 10 13 DA
000035D0 : 03 C1 13 DA 03 C1 13 DA B9 04 00 89 46 00 8B 46
000035E0 : 0A D1 E0 D1 D2 E2 FA 8B 4E 00 03 C8 13 DA 8B 76
000035F0 : 16 89 5C 02 89 0C 8B 76 16 8B 44 02 8B 1C 33 C9
```

Block 27
```
00003600 : BA EC 7F E8 4D 28 7E 0A 81 2C ED 7F 83 5C 02 00
00003610 : EB E4 8B 76 16 8B 44 02 8B 7E 18 31 45 02 8B 1C
00003620 : 31 1D FF 46 08 E9 40 FF 83 C4 12 5D C3 55 83 EC
00003630 : 26 72 06 3B 26 18 00 77 03 E9 C7 CD 8B EC 8B 76
00003640 : 2A 8B 04 3D 19 00 89 46 12 75 05 83 C4 26 5D C3
00003650 : C7 46 0C 00 00 C6 46 14 00 B8 8A 16 50 E8 4E 24
00003660 : 8B E5 3D 1F 00 89 46 0E 89 46 10 7E 05 83 C4 26
00003670 : 5D C3 8D 46 04 50 8D 46 08 50 FF 76 10 B8 8A 16
00003680 : 50 E8 01 0F 8B E5 48 75 35 8D 46 0E 50 8D 46 16
00003690 : 50 B8 8A 16 50 E8 4F EE 8B E5 B8 02 00 50 B8 D0
000036A0 : 16 50 FF 76 10 B8 8A 16 50 FF 76 0E 8D 46 16 50
000036B0 : E8 A0 E7 8B E5 85 C0 7E 05 C7 46 0C 01 00 83 7E
000036C0 : 0C 00 75 5A 8B 76 10 8A 84 89 16 30 E4 3D 73 00
000036D0 : 75 12 56 B8 8A 16 50 8D 46 08 50 8D 46 04 50 E8
000036E0 : 52 FE 8B E5 8D 46 14 50 B8 8A 16 50 8D 46 04 50
000036F0 : 8D 46 08 50 E8 AB EA 8B E5 48 75 22 8B 46 12 BB
00003700 : 2A 00 F7 EB 8B F0 C7 84 D2 16 00 00 C7 84 D0 16
00003710 : 00 00 8A 46 14 88 84 D4 16 C7 46 0C 01 00 83 7E
00003720 : 0C 00 74 23 8B 46 12 BB 2A 00 F7 EB 05 D0 16 05
00003730 : 06 00 BB 8A 16 53 50 E8 9A 23 8B E5 8B 76 2A 8B
00003740 : 04 40 89 04 89 46 12 83 C4 26 5D C3 55 83 EC 0E
00003750 : 72 06 3B 26 18 00 77 03 E9 A8 CC 8B EC FF 76 12
00003760 : E8 4B 23 8B E5 FF 76 14 89 46 0A E8 40 23 8B E5
00003770 : C7 46 06 00 00 89 46 0C 8B 46 0A 2B 46 0C 40 8B
00003780 : 5E 06 3B C3 7F 03 E9 7D 00 85 DB 7E 0F 4B 8B 76
00003790 : 12 03 F3 8A 04 30 E4 3D 20 00 74 06 83 7E 06 00
000037A0 : 75 5E C7 46 08 00 00 8B 46 08 8B 5E 06 03 D8 8B
000037B0 : 4E 12 03 CB 8B 76 14 03 F0 8A 1C 30 FF 8B F1 8A
000037C0 : 14 30 F6 3B D3 75 0A 3B 46 0C 7D 05 FF 46 08 EB
000037D0 : D6 8B 46 08 8B 5E 0C 3B D8 75 25 8B 5E 06 03 D8
000037E0 : 8B 46 0A 3B C3 89 5E 00 74 0E 8B 76 12 03 F3 8A
000037F0 : 04 30 E4 3D 20 00 75 08 8B 46 06 83 C4 0E 5D C3
```

Block 28
```
00003800 : FF 46 06 E9 72 FF B8 FF FF 83 C4 0E 5D C3 55 83
00003810 : EC 0A 72 06 3B 26 18 00 77 03 E9 E6 CB 8B EC 33
00003820 : C0 89 46 08 89 46 06 8B 46 08 8B 76 12 8B 1C 3B
00003830 : D8 7E 44 8B 5E 06 85 DB 7E 26 2B C3 8B F0 8B 5E
00003840 : 0E 89 76 00 03 F3 8B 4E 08 03 D9 8A 17 88 14 D1
00003850 : E0 8B F0 8B 5E 10 03 F3 D1 E1 03 D9 8B 07 89 04
00003860 : 8B 76 0E 03 76 08 8A 04 30 E4 3D 2B 00 75 03 FF
00003870 : 46 06 FF 46 08 EB B0 8B 46 08 2B 46 06 8B 76 0E
00003880 : 03 F0 C6 04 00 FF 76 0E E8 23 22 8B E5 8B 76 12
00003890 : 89 04 48 8B 76 14 89 04 83 7E 06 00 74 20 8B 76
000038A0 : 12 8B 04 89 46 08 8B 46 08 3D 21 00 7D 10 D1 E0
000038B0 : 8B 76 10 03 F0 C7 04 E7 03 FF 46 08 EB E8 83 C4
000038C0 : 0A 5D C3 55 83 EC 12 72 06 3B 26 18 00 77 03 E9
```

```
000038D0 : 31 CB 8B EC 33 C0 8B 76 1A 89 04 C7 46 06 80 02
000038E0 : 89 46 08 89 46 04 83 7E 08 00 74 03 E9 A7 00 8B
000038F0 : 46 04 8B 5E 06 2B D8 83 FB 02 7C 77 8B 5E 06 03
00003900 : D8 D1 FB 33 C0 85 DB 79 01 48 89 5E 0E 83 EB 01
00003910 : 89 46 10 1D 00 00 D1 E3 D1 E3 8B 36 EE 1A 03 F3
00003920 : 8B 44 02 8B 1C 89 46 0C 8B 46 18 89 5E 0A 8B 5E
00003930 : 16 8B 4E 0C 8B 56 0A E8 19 25 7E 08 8B 46 0E 89
00003940 : 46 04 EB A2 8B 46 18 8B 5E 16 8B 4E 0C 8B 56 0A
00003950 : E8 00 25 7D 08 8B 46 0E 89 46 06 EB 89 83 6E 0E
00003960 : 01 83 5E 10 00 B8 01 00 8B 76 1A 89 04 89 46 08
00003970 : E9 73 FF 83 7E 04 00 75 05 B8 01 00 EB 03 8B 46
00003980 : 04 33 DB 85 C0 79 01 4B C7 46 08 01 00 89 46 0E
00003990 : 89 5E 10 E9 50 FF 8B 46 10 8B 5E 0E 83 C4 12 5D
000039A0 : C3 55 81 EC 98 00 72 06 3B 26 18 00 77 03 E9 52
000039B0 : CA 8B EC C7 46 08 00 02 B0 00 C7 46 7C 00 00 C7
000039C0 : 86 BC 00 23 00 C7 86 86 00 01 00 88 46 57 88 46
000039D0 : 56 83 BE 86 00 00 75 03 E9 14 01 82 7E 56 00 74
000039E0 : 03 E9 8A 00 8B 86 A4 00 2D 01 00 8B 9E A6 00 83
000039F0 : DB 00 B9 09 00 D1 E0 D1 D3 E2 FA 33 C9 51 53 50

Block 29
00003A00 : FF 36 E8 00 E8 CC 17 8B E5 B8 00 02 50 B8 95 1E
00003A10 : 50 FF 36 E8 00 E8 B1 12 8B E5 C7 86 80 00 00 00
00003A20 : 8B 86 80 00 3D 23 00 7D 0D 8B F0 C6 84 5C 1E 00
00003A30 : FF 86 80 00 EB EA 33 C0 33 DB 85 C0 79 01 4B 89
00003A40 : 46 50 89 46 54 89 46 42 89 46 48 89 46 40 89 5E
00003A50 : 52 82 7E 57 00 75 08 8B 46 08 89 46 4A D1 F8 C7
00003A60 : 46 44 0E 00 C7 46 46 23 00 89 46 4C EB 09 33 C0
00003A70 : 88 46 56 89 86 86 00 C7 86 80 00 00 00 8B 86 80
00003A80 : 00 3D 23 00 7D 10 8B F0 8A 84 5C 1E 88 84 95 20
00003A90 : FF 86 80 00 EB E7 8B 46 52 8B 5E 50 8B 4E 54 8B
00003AA0 : 56 42 89 46 5E 8B 46 40 89 46 7C 8B 46 44 89 86
00003AB0 : 8A 00 8B 46 46 89 86 8C 00 8B 46 7C 89 46 00 40
00003AC0 : 8B 76 00 89 5E 5C 8A 9C 95 1E 30 FF 89 4E 78 B1
00003AD0 : 08 D3 E3 89 46 02 89 46 7C 40 8B 76 02 8A 8C 95
00003AE0 : 1E 30 ED 0B D9 89 46 7C 89 56 76 89 9E 8E 00 8B
00003AF0 : 86 8E 00 A9 00 80 75 03 E9 89 00 33 DB 25 E0 7F
00003B00 : B1 05 D3 E8 48 89 86 90 00 D1 E0 8B 36 EA 1A 03
00003B10 : F0 B1 0A 8B 04 D3 F8 25 3F 00 B1 06 8B 14 D3 FA
00003B20 : 81 E2 0F 00 8B 0C 81 E1 3F 00 89 4E 00 B1 0A 89
00003B30 : 46 6A 8B 46 00 D3 E0 33 C9 85 C0 79 01 49 89 46
00003B40 : 58 8B 86 8E 00 D1 E8 25 0F 00 89 5E 68 8B 9E 8E
00003B50 : 00 81 E3 01 00 C7 86 96 00 06 00 C7 46 6C 00 00
00003B60 : 89 86 92 00 89 46 70 89 4E 5A 89 56 66 89 9E 94
00003B70 : 00 8B 86 92 00 3D 03 00 7D 03 E9 CC 00 83 AE 92
00003B80 : 00 03 EB ED B1 09 8B 86 8E 00 D3 E8 25 3F 00 8B
00003B90 : 9E 8E 00 81 E3 07 00 8B 8E 8E 00 33 D2 33 D2 81
00003BA0 : E1 F8 01 89 4E 00 B9 07 00 89 46 6A 8B 46 00 D1
00003BB0 : E0 D1 D2 E2 FA 8B 4E 7C 89 4E 00 41 8B 76 00 89
00003BC0 : 46 58 8A 84 95 1E 30 E4 89 4E 7C B1 08 D3 E0 8B
00003BD0 : 4E 7C FF 46 7C 8B F1 8A 8C 95 1E 30 ED 0B C1 B1
00003BE0 : 0B 89 86 8E 00 D3 E8 25 1F 00 B1 06 89 5E 68 8B
00003BF0 : 9E 8E 00 D3 EB 81 E3 1F 00 8B 8E 8E 00 81 E1 01

Block 30
00003C00 : 00 C7 86 96 00 06 00 C7 46 6C 00 00 89 86 92 00
00003C10 : 89 46 70 89 8E 94 00 89 56 5A 89 5E 66 8B 86 92
```

```
00003C20 : 00 3D 03 00 7C 07 83 AE 92 00 03 EB F0 83 BE 92
00003C30 : 00 01 75 15 8B 46 6C FF 46 6C 8B F0 8B 86 8E 00
00003C40 : D1 E8 25 1F 00 88 84 80 1E 8B 86 92 00 8B 5E 6C
00003C50 : 3B D8 7C 03 E9 D6 00 48 75 47 8B 46 7C FF 46 7C
00003C60 : 8B F0 8A 84 95 1E 30 E4 FF 46 6C B1 03 89 86 8E
00003C70 : 00 D3 E8 25 1F 00 88 87 80 1E 8B 86 8E 00 25 06
00003C80 : 00 B1 07 D3 E0 33 DB 09 5E 5A 09 46 58 8B 86 8E
00003C90 : 00 25 01 00 C7 86 96 00 08 00 89 86 94 00 E9 8C
00003CA0 : 00 83 BE 92 00 02 74 03 E9 82 00 8B 46 7C 89 46
00003CB0 : 00 40 8B 76 00 8A 9C 95 1E 30 FF B1 08 D3 E3 89
00003CC0 : 46 02 89 46 7C 40 8B 76 02 8A 8C 95 1E 30 ED 0B
00003CD0 : D9 8B 4E 6C 89 4E 00 41 8B 76 00 89 4E 6C B1 0B
00003CE0 : 89 9E 8E 00 D3 EB 81 E3 1F 00 88 9C 80 1E 8B 5E
00003CF0 : 6C FF 46 6C B1 06 8B 96 8E 00 D3 EA 81 E2 1F 00
00003D00 : 88 97 80 1E 8B 9E 8E 00 81 E3 3E 00 B1 04 D3 E3
00003D10 : 33 C9 09 4E 5A 09 5E 58 8B 9E 8E 00 81 E3 01 00
00003D20 : C7 86 96 00 0B 00 89 46 7C 89 9E 94 00 8B 46 6C
00003D30 : 8B 5E 70 3B D8 7F 03 E9 D8 00 8B 5E 7C 89 5E 00
00003D40 : 43 8B 76 00 8A 8C 95 1E 30 ED F7 C1 80 00 89 8E
00003D50 : 8E 00 89 5E 7C 75 60 B1 08 8B 96 8E 00 D3 E2 FF
00003D60 : 46 7C 8A 8F 95 1E 30 ED 0B D1 89 46 00 40 8B 76
00003D70 : 00 B1 0A 89 96 8E 00 D3 EA 81 E2 1F 00 88 94 80
00003D80 : 1E 89 46 00 89 46 6C 40 8B 76 00 B1 05 8B 9E 8E
00003D90 : 00 D3 EB 81 E3 1F 00 88 9C 80 1E 89 46 00 89 46
00003DA0 : 6C 40 8B 76 00 8B 9E 8E 00 81 E3 1F 00 88 9C 80
00003DB0 : 1E 89 46 6C E9 76 FF 8B 86 8E 00 25 7F 00 48 8B
00003DC0 : 5E 6C 89 5E 00 43 8B 76 00 89 86 90 00 D1 E0 8B
00003DD0 : 3E EC 1A 03 F8 B1 0A 8B 05 D3 F8 25 1F 00 88 84
00003DE0 : 80 1E 89 5E 04 89 5E 6C 43 8B 76 04 B1 05 8B 05
00003DF0 : D3 F8 25 1F 00 88 84 80 1E 89 5E 04 89 5E 6C 43

Block 31
00003E00 : 8B 76 04 8B 05 25 1F 00 88 84 80 1E 89 5E 6C E9
00003E10 : 1B FF 83 BE 94 00 00 74 03 E9 87 00 8B 46 7C FF
00003E20 : 46 7C 8B F0 8A 84 95 1E 30 E4 8B 9E 96 00 83 FB
00003E30 : 08 89 86 8E 00 7F 14 25 FE 00 B9 08 00 2B CB D3
00003E40 : E0 33 DB 09 5E 5A 09 46 58 EB 1A 8B 86 8E 00 25
00003E50 : FE 00 8B 9E 96 00 83 EB 08 8B CB D3 E8 33 DB 09
00003E60 : 5E 5A 09 46 58 8B 86 96 00 05 07 00 8B 9E 8E 00
00003E70 : 81 E3 01 00 89 86 96 00 75 29 8B 5E 7C FF 46 7C
00003E80 : 8A 8F 95 1E 30 ED 89 8E 8E 00 81 E1 FE 00 2D 08
00003E90 : 00 89 4E 00 8B C8 8B 5E 00 D3 EB 33 C0 09 46 5A
00003EA0 : 09 5E 58 B9 10 00 8B 46 5A 8B 5E 58 D1 E3 D1 D0
00003EB0 : E2 FA 8B 4E 66 8B 56 70 03 D1 89 56 74 83 C2 0E
00003EC0 : 83 C1 0E C7 86 80 00 00 00 89 46 5A 89 8E 82 00
00003ED0 : 89 96 8C 00 89 5E 58 8B 86 80 00 8B 5E 70 3B D8
00003EE0 : 7E 18 8B F0 8A 84 80 1E 8B B6 82 00 88 84 95 20
00003EF0 : FF 86 80 00 FF 86 82 00 EB DD 8B B6 82 00 C6 84
00003F00 : 95 20 00 8B 46 5A 8B 5E 58 8B 4E 6A 8B 56 68 C7
00003F10 : 86 84 00 01 00 83 BE 9E 00 00 89 46 5E 89 4E 78
00003F20 : 89 56 76 89 5E 5C 74 03 E9 3D 03 8B 46 7C 3B 46
00003F30 : 4C 7D 09 C7 86 84 00 00 00 E9 2C 03 C7 46 7E 00
00003F40 : 00 C7 86 80 00 0E 00 8B 46 7E 8B 5E 74 3B D8 7E
00003F50 : 6C 8B B6 80 00 8A 9C 95 20 30 FF 83 FB 1B 75 0B
00003F60 : FF 46 7E 8B F0 C6 42 10 27 EB 4C 8B B6 80 00 8A
00003F70 : 84 95 20 30 E4 3D 1B 00 7E 25 8A 84 95 20 30 E4
00003F80 : 3D 1F 00 7D 1A 8B 46 7E FF 46 7E 8B F0 8B BE 80
```

```
00003F90 : 00 8A 85 95 20 30 E4 05 11 00 88 42 10 EB 18 8B
00003FA0 : 46 7E FF 46 7E 8B F0 8B BE 80 00 8A 85 95 20 30
00003FB0 : E4 05 60 00 88 42 10 FF 86 80 00 EB 8A 8B 46 74
00003FC0 : 33 DB 8B 4E 6A F7 C1 15 00 89 46 0C 89 5E 0E 74
00003FD0 : 76 81 E1 03 00 49 75 0B FF 46 0C 8B F0 C6 42 10
00003FE0 : 73 EB 64 8B 46 6A 25 0C 00 3D 04 00 75 21 8B 46
00003FF0 : 0C 89 46 00 40 8B 76 00 C6 42 10 27 89 46 00 89
```

Block 32
```
00004000 : 46 0C 40 8B 76 00 C6 42 10 73 89 46 0C EB 38 8B
00004010 : 46 6A 25 30 00 3D 10 00 75 2D 8B 46 0C 89 46 00
00004020 : 40 8B 76 00 C6 42 10 69 89 46 00 89 46 0C 40 8B
00004030 : 76 00 C6 42 10 6E 89 46 00 89 46 0C 40 8B 76 00
00004040 : C6 42 10 67 89 46 0C 8B 76 0C C6 42 10 00 8D 46
00004050 : 0C 50 8D 46 31 30 8D 46 10 50 E8 8A E4 8B E5 8B
00004060 : 46 6A 25 03 00 48 75 10 8B 76 0C 8A 42 30 30 E4
00004070 : 3D 73 00 75 03 FF 4E 0C 8B 46 6A 25 0C 00 3D 04
00004080 : 00 75 1B 8B 76 0C 8A 42 2F 30 E4 3D 27 00 75 0E
00004090 : 8A 42 30 30 E4 3D 73 00 75 04 83 6E 0C 02 8B 46
000040A0 : 6A 25 30 00 3D 10 00 75 1B 8B 76 0C 8A 42 2F 30
000040B0 : E4 3D 6E 00 75 0E 8A 42 30 30 E4 3D 67 00 75 04
000040C0 : 83 6E 0C 02 8B 76 0C C6 42 31 00 8B C6 8B 9E AC
000040D0 : 00 3B D8 89 46 72 89 86 8A 00 7C 03 8B 5E 72 C7
000040E0 : 46 7E 00 00 89 5E 4E 8B 46 7E 8B 5E 72 3B D8 7E
000040F0 : 19 8B F0 8A 42 31 30 E4 8B F0 8A 84 F6 1A 8B 7E
00004100 : 7E 88 85 95 20 FF 46 7E EB DD 8B 46 4C 3B 46 48
00004110 : 7E 03 E9 7F 00 C7 46 7E 00 00 8B 46 7E 8B 5E 4E
00004120 : 3B D8 7E 42 8B 9E 9C 00 03 D8 8B F0 8A 84 95 20
00004130 : 30 E4 8A 0F 30 ED 3B C8 7D 06 81 C4 98 00 5D C3
00004140 : 8B 46 7E 8B 9E 9C 00 03 D8 8B F0 8A 84 95 20 30
00004150 : E4 8A 0F 30 ED 3B C8 7E 08 C7 86 84 00 00 00 EB
00004160 : 05 FF 46 7E EB B4 83 BE 84 00 00 75 03 E9 F8 00
00004170 : 8B 86 AC 00 3B 46 72 7D 06 81 C4 98 00 5D C3 8B
00004180 : 86 AC 00 3B 46 72 7F 03 E9 DD 00 C7 86 84 00 00
00004190 : 00 E9 D4 00 C7 46 7E 00 00 8B 46 4E 48 8B 5E 7E
000041A0 : 3B C3 7E 1B 8B 86 9C 00 03 C3 8A 9F 95 20 30 FF
000041B0 : 8B F0 8A 0C 30 ED 3B CB 75 05 FF 46 7E EB DA 8B
000041C0 : 46 7E 8B 9E 9C 00 03 D8 8B F0 8A 8C 95 20 30 ED
000041D0 : 8A 17 30 F6 3B CA 89 56 04 7F 13 8A 84 95 20 30
000041E0 : E4 3B D0 75 24 8B 86 AC 00 3B 46 72 7F 1B 8B 46
000041F0 : 4C 89 46 4A 03 46 48 D1 F8 BB 01 00 89 46 4C 88
```

Block 33
```
00004200 : 5E 56 89 9E 86 00 E9 C8 F7 8B 46 7C 89 46 48 03
00004210 : 46 4A D1 F8 8B 5E 7C 8B 4E 5E 8B 56 5C 89 46 4C
00004220 : 8B 46 78 89 46 54 8B 46 76 89 46 42 8B 86 8A 00
00004230 : 89 46 44 8B 86 8C 00 C7 86 80 00 00 00 89 46 46
00004240 : 89 4E 52 89 56 50 89 5E 40 8B 86 80 00 3D 23 00
00004250 : 7D 10 8B F0 8A 84 95 20 88 84 5C 1E FF 86 80 00
00004260 : EB E7 C7 86 84 00 00 00 83 BE 84 00 00 75 03 E9
00004270 : 7F 02 C6 46 57 01 8B 46 74 05 0E 00 83 BE A2 00
00004280 : 00 89 46 0A 75 18 8B 46 6A F7 D0 D1 F8 23 46 6A
00004290 : 25 15 00 74 09 C7 86 84 00 00 00 E9 53 02 8B 86
000042A0 : A2 00 85 C0 74 10 8B 5E 6A 23 D8 75 09 C7 86 84
000042B0 : 00 00 00 E9 3B 02 83 BE 9E 00 00 74 4F 8B 46 74
000042C0 : 3B 86 AE 00 74 09 C7 86 84 00 00 00 E9 22 02 C7
000042D0 : 46 7E 0E 00 8B 46 7E 8B 5E 0A 3B D8 7E 24 8B B6
```

```
000042E0 : 9C 00 03 F0 8A 04 30 E4 8B 76 7E 8A 9C 95 20 30
000042F0 : FF 3B D8 74 08 C7 86 84 00 00 00 EB 05 FF 46 7E
00004300 : EB D2 83 BE 84 00 00 75 03 E9 E5 01 C7 86 84 00
00004310 : 00 00 83 BE 9E 00 02 75 32 B8 2A 00 8B B6 A8 00
00004320 : F7 2C 8B B6 AA 00 03 F0 8B 46 5A 8B 5E 58 89 44
00004330 : 02 89 1C 8B 46 6A 88 44 05 8B 46 68 88 44 04 8B
00004340 : B6 A8 00 FF 04 81 C4 98 00 5D C3 C7 46 7E 00 00
00004350 : C7 86 80 00 0E 00 8B 46 7E 8B 5E 74 3B D8 7F 03
00004360 : E9 A9 00 8B B6 80 00 8A 9C 95 20 30 FF 83 FB 1B
00004370 : 75 21 8B B6 A8 00 8B 04 BB 2A 00 F7 EB 8B 9E AA
00004380 : 00 03 D8 8B 46 7E FF 46 7E 83 C3 06 03 D8 C6 07
00004390 : 27 EB 72 8B B6 80 00 8A 84 95 20 30 E4 3D 1B 00
000043A0 : 7E 38 8A 84 95 20 30 E4 3D 1F 00 7D 2D 8B B6 A8
000043B0 : 00 8B 04 BB 2A 00 F7 EB 8B 9E AA 00 03 D8 8B 46
000043C0 : 7E FF 46 7E 83 C3 06 03 D8 8B B6 80 00 8A 84 95
000043D0 : 20 30 E4 05 11 00 88 07 EB 2B 8B B6 A8 00 8B 04
000043E0 : BB 2A 00 F7 EB 8B 9E AA 00 03 D8 8B 46 7E FF 46
000043F0 : 7E 83 C3 06 03 D8 8B B6 80 00 8A 84 95 20 30 E4

Block 34
00004400 : 05 60 00 88 07 FF 86 80 00 E9 4A FF 8B B6 A8 00
00004410 : 8B 04 BB 2A 00 F7 EB 8B 9E AA 00 03 D8 89 5E 00
00004420 : 83 C3 06 03 5E 7E C6 07 00 8B 46 5A 8B 5E 58 8B
00004430 : 76 00 89 44 02 89 1C 8B 46 6A 88 44 05 8B 46 68
00004440 : 88 44 04 83 BE A2 00 03 75 12 8B C6 05 06 00 BB
00004450 : DD 20 53 50 E8 86 19 8B E5 E9 7F 00 83 BE A2 00
00004460 : 0C 75 20 8B B6 A8 00 8B 04 BB 2A 00 F7 EB 8B 9E
00004470 : AA 00 03 D8 83 C3 06 B8 DF 20 50 53 E8 5E 19 8B
00004480 : E5 EB 58 83 BE A2 00 30 75 51 8B B6 A8 00 8B 04
00004490 : BB 2A 00 F7 EB 8B 9E AA 00 03 D8 83 C3 06 B8 E2
000044A0 : 20 50 53 E8 37 19 8B E5 8B 46 6A 25 20 00 74 2B
000044B0 : 8B B6 A8 00 8B 04 BB 2A 00 F7 EB 8B B6 AA 00 03
000044C0 : F0 B8 20 00 2B 46 74 8B C8 33 DB BA 01 00 E3 06
000044D0 : D1 E2 D1 D3 E2 FA 09 5C 02 09 14 8B B6 A8 00 FF
000044E0 : 04 83 BE 9E 00 01 74 03 E9 7D FD 81 C4 98 00 5D
000044F0 : C3 8B 46 7C 89 46 00 40 8B 76 00 8A 9C 95 1E 30
00004500 : FF B1 08 D3 E3 89 46 02 89 46 7C 40 8B 76 02 8A
00004510 : 8C 95 1E 30 ED 0B D9 89 9E 8E 00 43 89 46 7C 74
00004520 : 0E 3D 01 02 7D 09 C7 86 86 00 00 00 E9 A2 F4 83
00004530 : BE 9E 00 00 75 25 8B 46 7C 3B 46 4C 7D 1D 3B 46
00004540 : 48 7C 18 89 46 4A 03 46 48 D1 F8 BB 01 00 89 46
00004550 : 4C 88 5E 56 89 9E 86 00 E9 76 F4 8B B6 A0 00 83
00004560 : 3C 00 75 06 81 C4 98 00 5D C3 8B B6 A0 00 C7 04
00004570 : 00 00 83 86 A4 00 01 83 96 A6 00 00 C7 86 86 00
00004580 : 01 00 E9 4C F4 55 83 EC 0E 72 06 3B 26 18 00 77
00004590 : 03 E9 6F BE 8B EC 83 7E 14 15 7C 08 B8 02 00 83
000045A0 : C4 0E 5D C3 8B 46 14 48 8B F0 8B 5E 12 03 F3 8A
000045B0 : 04 30 E4 3D 73 00 75 14 8B 46 14 48 48 03 D8 8A
000045C0 : 07 30 E4 3D 27 00 75 04 83 6E 14 02 8B 46 14 48
000045D0 : 8B 76 12 03 F0 8A 1C 30 FF 83 FB 73 89 46 00 75
000045E0 : 03 89 46 14 FF 76 14 FF 76 12 FF 76 16 FF 76 18
000045F0 : E8 41 EF 8B E5 8B 76 18 8B 44 02 8B 1C 33 C0 81

Block 35
00004600 : E3 FF 00 8B 7E 16 8B 45 02 8B 0D 33 C0 81 E1 FF
00004610 : 0F 8B 3E 6C 16 03 F9 88 5E 0C 30 FF 8A 15 30 F6
00004620 : 3B D3 89 46 0A 89 4E 08 75 08 B8 01 00 83 C4 0E
```

```
00004630 : 5D C3 8A 46 0C 30 E4 33 DB 85 C0 79 01 4B 05 03
00004640 : 00 83 D3 00 8B 4E 08 03 C1 8B 56 0A 13 DA 89 46
00004650 : 08 8B C3 89 5E 0A 8B 5E 08 33 C9 BA FF 0F E8 F2
00004660 : 17 7E 09 81 6E 08 00 10 83 5E 0A 00 8B 46 08 8B
00004670 : 36 6E 16 03 F0 8A 46 0C 30 E4 8A 1C 30 FF 3B D8
00004680 : 75 08 B8 01 00 83 C4 0E 5D C3 8A 46 0C 30 E4 33
00004690 : DB 85 C0 79 01 4B 89 46 00 05 03 00 89 5E 02 83
000046A0 : D3 00 8B 4E 00 03 C1 8B 56 02 13 DA 03 C1 13 DA
000046B0 : 8B 4E 08 03 C1 8B 56 0A 13 DA 89 46 08 8B C3 89
000046C0 : 5E 0A 8B 5E 08 33 C9 BA FF 0F E8 86 17 7E 09 81
000046D0 : 6E 08 00 10 83 5E 0A 00 8B 46 08 8B 36 6E 16 03
000046E0 : F0 8A 46 0C 30 E4 8A 1C 30 FF 3B D8 75 08 B8 01
000046F0 : 00 83 C4 0E 5D C3 B8 02 00 83 C4 0E 5D C3 55 83
00004700 : EC 10 8B EC 8D 46 16 C7 46 04 00 00 89 46 0C 8B
00004710 : 76 14 8A 04 30 E4 85 C0 75 03 E9 16 01 FF 46 14
00004720 : 8A 04 30 E4 8B F0 8A 9C E9 20 30 FF 81 E3 08 00
00004730 : 89 46 06 75 DA 3D 25 00 74 03 E9 C1 00 8B 76 14
00004740 : 8A 04 30 E4 3D 25 00 75 2F A1 5E 23 48 85 C0 A3
00004750 : 5E 23 78 0E 8B 36 5C 23 FF 06 5C 23 8A 04 30 E4
00004760 : EB 09 B8 5C 23 50 E8 23 0C 8B E5 3D 25 00 74 9F
00004770 : 8B 46 04 83 C4 10 5D C3 8B 76 14 8A 04 30 E4 3D
00004780 : 2A 00 74 0C 8B 46 0C 83 46 0C 02 89 46 0E EB 08
00004790 : C7 46 0E 00 00 FF 46 14 C7 46 08 00 00 FF 76 0E
000047A0 : 8D 46 08 50 8B 06 E6 20 50 FF 76 14 E8 E2 18 8B
000047B0 : E5 85 C0 89 46 0A 74 03 89 46 14 83 7E 08 FF 75
000047C0 : 1D 83 7E 0A 00 74 03 FF 46 04 8B 46 04 85 C0 7E
000047D0 : 05 83 C4 10 5D C3 B8 FF FF 83 C4 10 5D C3 83 7E
000047E0 : 08 00 74 0C B8 5C 23 50 FF 76 08 E8 09 2A 8B E5
000047F0 : 83 7E 0A 00 75 37 8B 46 04 83 C4 10 5D C3 A1 5E
Block 36
00004800 : 23 48 85 C0 A3 5E 23 78 0E 8B 36 5C 23 FF 06 5C
00004810 : 23 8A 04 30 E4 EB 09 B8 5C 23 50 E8 6E 0B 8B E5
00004820 : 3B 46 06 74 08 8B 46 04 83 C4 10 5D C3 FF 46 04
00004830 : E9 DC FE 8B 46 04 83 C4 10 5D C3 55 83 EC 04 8B
00004840 : EC A1 5E 23 48 85 C0 A3 5E 23 78 0E 8B 36 5C 23
00004850 : FF 06 5C 23 8A 04 30 E4 EB 09 B8 5C 23 50 E8 2B
00004860 : 0B 8B E5 83 C4 04 5D C3 55 83 EC 04 8B EC C7 46
00004870 : 02 00 00 8B 46 02 3D 14 00 7D 13 BB 0E 00 F7 EB
00004880 : 05 5C 23 50 E8 73 10 8B E5 FF 46 02 EB E5 C7 46
00004890 : 02 00 00 83 7E 02 14 7D 0D FF 76 02 E8 28 0A 8B
000048A0 : E5 FF 46 02 EB ED FF 76 0A FF 76 08 E8 5A 17 8B
000048B0 : E5 83 C4 04 5D C3 55 83 EC 06 8B EC 83 7E 0A 00
000048C0 : 75 07 33 C0 83 C4 06 5D C3 83 46 0A 02 FF 76 0A
000048D0 : E8 40 26 8B E5 85 C0 89 46 02 75 07 33 C0 83 C4
000048E0 : 06 5D C3 8B 76 02 8B 46 0A 89 04 8B C6 89 46 04
000048F0 : 40 40 83 C4 06 5D C3 55 83 EC 08 8B EC 8B 46 0C
00004900 : F7 66 0E 50 89 46 02 E8 AC FF 8B E5 85 C0 89 46
00004910 : 06 75 07 33 C0 83 C4 08 5D C3 33 C0 50 FF 76 02
00004920 : FF 76 06 E8 F7 24 8B E5 8B 46 06 83 C4 08 5D C3
00004930 : 55 83 EC 04 8B EC 8B 46 08 48 48 8B F0 FF 34 50
00004940 : 89 46 08 89 76 02 E8 0E 27 8B E5 83 C4 04 5D C3
00004950 : 55 81 EC 0E 01 8B EC 8D 86 14 01 89 46 0C 8B B6
00004960 : 12 01 8A 04 30 E4 85 C0 75 03 E9 F0 00 8B C6 89
00004970 : 46 00 40 8A 1C 30 FF 83 FB 25 89 86 12 01 89 5E
00004980 : 06 74 03 E9 AB 00 8B F0 8A 1C 30 FF 83 FB 25 75
00004990 : 34 FF 86 12 01 8A 04 30 E4 8B 1E 6E 23 4B 85 DB
```

```
000049A0 : 89 46 06 89 1E 6E 23 78 0E 8B 36 6A 23 FF 06 6A
000049B0 : 23 88 04 30 E4 EB A7 B8 6A 23 50 FF 76 06 E8 D7
000049C0 : 0A 8B E5 EB 99 8D 46 08 50 8D 46 0C 50 8D 46 0E
000049D0 : 50 FF B6 12 01 E8 A1 1C 8B E5 85 C0 89 46 0A 75
000049E0 : 03 E9 7A FF C7 46 04 00 00 89 86 12 01 8B 46 04
000049F0 : 8B 5E 08 3B D8 7F 03 E9 64 FF 8B 1E 6E 23 4B 85
```

Block 37
```
00004A00 : DB 89 1E 6E 23 78 13 8B 36 6A 23 FF 06 6A 23 8B
00004A10 : F8 8A 43 0E 88 04 30 E4 EB 12 8B 76 04 8A 42 0E
00004A20 : 30 E4 BB 6A 23 53 50 E8 6E 0A 8B E5 FF 46 04 EB
00004A30 : BC A1 6E 23 48 85 C0 A3 6E 23 78 12 8B 36 6A 23
00004A40 : FF 06 6A 23 8B 46 06 88 04 30 E4 E9 10 FF B8 6A
00004A50 : 23 50 FF 76 06 E8 40 0A 8B E5 E9 01 FF 81 C4 0E
00004A60 : 01 5D C3 55 83 EC 02 8B EC 8B 46 06 85 C0 78 18
00004A70 : 3B 06 14 25 7D 12 BB 2A 00 F7 EB 8B F0 8A 84 16
00004A80 : 25 30 E4 25 80 00 75 0D C7 06 EE 24 09 00 33 C0
00004A90 : 83 C4 02 5D C3 8B 46 06 BB 2A 00 F7 EB 05 16 25
00004AA0 : 83 C4 02 5D C3 55 83 EC 0C 8B EC C7 46 04 00 00
00004AB0 : 8B 46 04 8B 1E 14 25 3B D8 7E 16 BB 2A 00 F7 EB
00004AC0 : 8B F0 8A 84 16 25 30 E4 85 C0 74 05 FF 46 04 EB
00004AD0 : DF 8B 46 04 3B 06 14 25 75 0E C7 06 EE 24 18 00
00004AE0 : B8 FF FF 83 C4 0C 5D C3 8B 46 04 BB 2A 00 F7 EB
00004AF0 : 05 16 25 8B F0 A1 F4 24 25 00 80 8B 5E 12 33 C3
00004B00 : 89 46 12 25 00 80 89 76 0A 74 05 B8 10 00 EB 02
00004B10 : 33 C0 0D 80 00 8B 76 0A 88 04 8B 46 12 25 03 00
00004B20 : EB 60 8B 76 0A 8A 04 30 E4 0D 40 00 88 04 EB 63
00004B30 : 8B 46 12 25 08 00 74 05 B8 08 00 EB 02 33 C0 0D
00004B40 : 20 00 8B 76 0A 8A 1C 30 FF 0B D8 88 1C EB 44 8B
00004B50 : 46 12 25 08 00 74 05 B8 08 00 EB 02 33 C0 0D 60
00004B60 : 00 8B 76 0A 8A 1C 30 FF 0B D8 88 1C EB 25 8B 76
00004B70 : 0A C6 04 00 C7 06 EE 24 16 00 B8 FF FF 83 C4 0C
00004B80 : 5D C3 3D 02 00 74 C8 3D 01 00 74 A4 3D 00 00 74
00004B90 : 91 EB DB 8B 76 10 8A 04 30 E4 85 C0 75 0F 8B 76
00004BA0 : 0A C6 44 01 01 8B 46 04 83 C4 0C 5D C3 C7 46 06
00004BB0 : 00 00 8B 46 06 3D 18 00 7D 37 BB 0A 00 F7 EB 05
00004BC0 : EA 21 40 50 FF 76 10 E8 48 11 8B E5 85 C0 75 1C
00004BD0 : 8B 46 06 BB 0A 00 F7 EB 8B F0 8A 84 EA 21 8B 7E
00004BE0 : 0A 88 45 01 8B 46 04 83 C4 0C 5D C3 FF 46 06 EB
00004BF0 : C1 8B 76 0A C6 44 01 00 A0 10 00 30 E4 3D 01 00
```

Block 38
```
00004C00 : 7F 03 E9 97 00 8B 46 12 25 00 02 74 08 FF 76 10
00004C10 : E8 93 13 8B E5 8B 46 12 25 08 00 74 05 B8 02 00
00004C20 : EB 06 8B 46 12 25 03 00 50 FF 76 10 E8 E4 12 8B
00004C30 : E5 8B 76 0A 89 44 02 83 3E EC 24 00 74 34 8B 46
00004C40 : 12 25 00 03 74 11 33 C0 50 FF 76 10 E8 AA 12 8B
00004C50 : E5 8B 76 0A 89 44 02 83 3E EC 24 00 74 3E C7 06
00004C60 : EE 24 02 00 8B 76 0A C6 04 00 B8 FF FF 83 C4 0C
00004C70 : 5D C3 8B 46 12 25 00 05 3D 00 05 75 1F 8B 76 0A
00004C80 : FF 74 02 E8 A7 12 8B E5 C7 06 EE 24 11 00 8B 76
00004C90 : 0A C6 04 00 B8 FF FF 83 C4 0C 5D C3 8B 46 04 83
00004CA0 : C4 0C 5D C3 55 83 EC 06 8B EC 8B 46 0C 25 00 80
00004CB0 : 0D 01 03 8B 5E 0C 81 E3 FF 7F 53 50 FF 76 0A E8
00004CC0 : E3 FD 8B E5 83 C4 06 5D C3 55 83 EC 16 8B EC 8B
00004CD0 : 46 1E 85 C0 79 0E C7 06 EE 24 16 00 B8 FF FF 83
```

```
00004CE0 : C4 16 5D C3 FF 76 1A E8 79 FD 8B E5 85 C0 89 46
00004CF0 : 12 75 08 B8 FF FF 83 C4 16 5D C3 8B 76 12 8A 44
00004D00 : 01 30 E4 E9 AA 02 8B 46 1E 3D 01 00 7F 03 E9 86
00004D10 : 00 3D 80 00 7E 05 B8 80 00 EB 03 8B 46 1E BB DA
00004D20 : 22 53 A2 DA 22 E8 06 21 8B E5 C7 46 06 00 00 C7
00004D30 : 46 08 02 00 A0 DA 22 30 E4 8B 5E 06 3B C3 7E 46
00004D40 : 8B 46 08 FF 46 08 8B F0 8A 84 DA 22 88 46 04 30
00004D50 : E4 3D 0D 00 75 0D FF 46 06 8B 76 1C 03 F3 C6 04
00004D60 : 0A EB 23 8A 46 04 30 E4 3D 1A 00 75 07 C7 46 06
00004D70 : 00 00 EB 12 8B 46 06 FF 46 06 8B 76 1C 03 F0 8A
00004D80 : 46 04 88 04 EB AE B8 0A 00 50 E8 B4 12 8B E5 8B
00004D90 : 46 06 83 C4 16 5D C3 B8 19 5E BB 41 5E 89 46 0E
00004DA0 : 89 5E 10 EB 0C B8 55 5E BB 69 5E 89 46 0E 89 5E
00004DB0 : 10 8B 76 12 8A 04 30 E4 25 10 00 74 2D C7 46 06
00004DC0 : 00 00 8B 46 06 3B 46 1E 7D 18 8B 46 06 FF 46 06
00004DD0 : 8B 5E 1C 03 D8 89 5E 00 FF 56 0E 8B 76 00 88 04
00004DE0 : EB E0 8B 46 06 83 C4 16 5D C3 C7 46 06 00 00 8B
00004DF0 : 46 06 3B 46 1E 7C 03 E9 D6 00 FF 56 0E 88 46 04

Block 39
00004E00 : 30 E4 E9 B5 00 B8 0D 00 50 FF 56 10 8B E5 B8 0A
00004E10 : 00 50 FF 56 10 8B E5 8B 46 06 89 46 00 40 8B 76
00004E20 : 1C 03 76 00 C6 04 0A 89 46 06 83 C4 16 5D C3 83
00004E30 : 7E 06 00 74 BA B8 08 00 50 FF 56 10 8B E5 B8 20
00004E40 : 00 50 FF 56 10 8B E5 B8 08 00 50 FF 56 10 8B E5
00004E50 : EB 9D B8 0D 00 50 FF 56 10 8B E5 B8 0A 00 50 FF
00004E60 : 56 10 8B E5 33 C0 83 C4 16 5D C3 8B 46 06 FF 46
00004E70 : 06 8B 76 1C 03 F0 8A 46 04 88 04 30 E4 3D 20 00
00004E80 : 7D 1A B8 5E 00 50 FF 56 10 8B E5 8A 46 04 30 E4
00004E90 : 05 40 00 50 FF 56 10 8B E5 E9 53 FF 8A 46 04 30
00004EA0 : E4 50 FF 56 10 8B E5 E9 45 FF 1A 00 52 4C 08 00
00004EB0 : 2F 4C 0D 00 05 4C 0A 00 05 4C BE 0C 00 2E 3B 84
00004EC0 : AA 4C 75 05 2E FF A4 AC 4C 83 EE 04 79 EF EB 9B
00004ED0 : 8B 46 06 83 C4 16 5D C3 33 C0 83 C4 16 5D C3 A0
00004EE0 : 10 00 30 E4 3D 01 00 7E 23 FF 76 1E FF 76 1C 8B
00004EF0 : 76 12 FF 74 02 E8 4C 10 8B E5 89 46 06 83 3E EC
00004F00 : 24 00 74 08 B8 FF FF 83 C4 16 5D C3 8B 76 12 8A
00004F10 : 04 30 E4 25 10 00 74 08 8B 46 06 83 C4 16 5D C3
00004F20 : 33 C0 89 46 08 89 46 0A 8B 46 08 8B 5E 06 3B D8
00004F30 : 7E 55 FF 46 08 8B 76 1C 03 F0 8A 04 88 46 04 30
00004F40 : E4 EB 38 8B 46 08 2B 46 06 48 33 DB 85 C0 79 01
00004F50 : 4B B9 01 00 51 53 50 FF 76 1A E8 76 02 8B E5 8B
00004F60 : 46 0A 83 C4 16 5D C3 EB BF 8B 46 0A FF 46 0A 8B
00004F70 : 76 1C 03 F0 8A 46 04 88 04 EB AD 3D 0D 00 74 A8
00004F80 : 3D 1A 00 74 BE EB E2 83 7E 0A 00 75 09 83 7E 06
00004F90 : 00 74 03 E9 49 FF 8B 46 0A 83 C4 16 5D C3 B8 FF
00004FA0 : FF 83 C4 16 5D C3 DF 4C 06 4B D8 4C A5 4B D8 4C
00004FB0 : 8B F0 83 FE 05 73 07 D1 E6 2E FF A4 A6 4D EB DE
00004FC0 : 55 83 EC 14 8B EC 8B 46 1C 85 C0 79 0E C7 06 EE
00004FD0 : 24 16 00 B8 FF FF 83 C4 14 5D C3 FF 76 18 E8 82
00004FE0 : FA 8B E5 85 C0 89 46 10 75 08 B8 FF FF 83 C4 14
00004FF0 : 5D C3 8B 76 10 8A 44 01 30 E4 E9 C6 01 B8 41 5E Block 40
00005000 : 89 46 06 EB 0E B8 7D 5E 89 46 06 EB 06 B8 69 5E
00005010 : 89 46 06 C7 46 08 00 00 8B 46 08 8B 5E 1C 3B D8
00005020 : 7E 36 FF 46 08 8B 76 1A 03 F0 8A 04 88 46 04 30
```

```
00005030 : E4 3D 0A 00 75 15 8B 76 10 8A 04 30 E4 25 10 00
00005040 : 75 09 B8 0D 00 50 FF 56 06 8B E5 8A 46 04 30 E4
00005050 : 50 FF 56 06 8B E5 EB C0 8B 46 08 83 C4 14 5D C3
00005060 : 8B 76 10 8A 04 30 E4 25 08 00 74 12 B8 02 00 50
00005070 : 33 C0 50 33 DB 53 FF 76 18 E8 57 01 8B E5 A0 10
00005080 : 00 30 E4 3D 01 00 7E 34 8B 76 10 8A 04 30 E4 25
00005090 : 10 00 74 28 FF 76 1C FF 76 1A FF 74 02 E8 C3 0E
000050A0 : 8B E5 89 46 08 83 3E EC 24 00 74 08 B8 FF FF 83
000050B0 : C4 14 5D C3 8B 46 08 83 C4 14 5D C3 C6 46 05 00
000050C0 : 33 C0 89 46 08 89 46 0A 89 46 0C 8B 46 08 8B 5E
000050D0 : 1C 3B D8 7F 03 E9 83 00 FF 46 08 8B 76 1A 03 F0
000050E0 : 8A 04 88 46 04 30 E4 3D 0A 00 75 11 8A 46 05 30
000050F0 : E4 3D 0D 00 74 07 C6 46 04 0D FF 4E 08 8B 46 0A
00005100 : 89 46 00 40 8B 76 00 8A 5E 04 88 9C DA 22 3D 80
00005110 : 00 89 46 0A 88 5E 05 7C B2 A0 10 00 30 E4 3D 01
00005120 : 00 7E 30 FF 76 0A B8 DA 22 50 8B 76 10 FF 74 02
00005130 : E8 30 0E 8B E5 3B 46 0A 89 46 0E 74 07 33 C0 83
00005140 : C4 14 5D C3 83 3E EC 24 00 74 08 B8 FF FF 83 C4
00005150 : 14 5D C3 C7 46 0A 00 00 E9 70 FF 83 7E 0A 00 74
00005160 : 3A A0 10 00 30 E4 3D 01 00 7E 30 FF 76 0A B8 DA
00005170 : 22 50 8B 76 10 FF 74 02 E8 E8 0D 8B E5 3B 46 0A
00005180 : 89 46 0E 74 07 33 C0 83 C4 14 5D C3 83 3E EC 24
00005190 : 00 74 08 B8 FF FF 83 C4 14 5D C3 8B 46 08 83 C4
000051A0 : 14 5D C3 8B 46 1C 83 C4 14 5D C3 C7 06 EE 24 13
000051B0 : 00 B8 FF FF 83 C4 14 5D C3 60 4E FD 4D 05 4E 0D
000051C0 : 4E A3 4F 8B F0 83 FE 05 73 07 D1 E6 2E FF A4 B9
000051D0 : 4F EB D8 55 83 EC 12 8B EC FF 76 16 E8 84 F8 8B
000051E0 : E5 85 C0 89 46 0E 75 0B B8 FF FF BB FF FF 83 C4
000051F0 : 12 5D C3 8B 76 0E 8A 44 01 30 E4 85 C0 74 09 33
```

Block 41
```
00005200 : C0 33 DB 83 C4 12 5D C3 A0 10 00 30 E4 3D 01 00
00005210 : 7E 32 FF 76 1C FF 76 1A FF 76 18 8B 76 0E FF 74
00005220 : 02 E8 5E 0D 8B E5 89 46 07 89 5E 05 83 3E EC 24
00005230 : 00 74 11 C7 06 EE 24 16 00 B8 FF FF BB FF FF 83
00005240 : C4 12 5D C3 83 7E 1C 02 75 72 8B 46 07 0B 46 05
00005250 : 74 6A 8B 76 0E 8A 04 30 E4 25 10 00 75 5E 8B 46
00005260 : 05 2D 01 00 8B 5E 07 83 DB 00 89 46 09 89 5E 0B
00005270 : 8B 46 0B 85 C0 78 33 33 C0 50 FF 76 0B FF 76 09
00005280 : FF 76 16 E8 4D FF 8B E5 0B C3 74 1E B8 01 00 50
00005290 : 8D 46 04 50 FF 76 16 E8 2F FA 8B E5 85 C0 75 0A
000052A0 : 83 6E 09 01 83 5E 0B 00 EB C6 8B 46 09 05 01 00
000052B0 : 8B 5E 0B 83 D3 00 93 83 C4 12 5D C3 8B 46 07 8B
000052C0 : 5E 05 83 C4 12 5D C3 55 83 EC 08 8B EC FF 76 0C
000052D0 : E8 90 F7 8B E5 85 C0 89 46 04 75 08 B8 FF FF 83
000052E0 : C4 08 5D C3 33 C0 8B 76 04 8A 5C 01 30 FF 85 DB
000052F0 : 89 46 02 75 1E A0 10 00 30 E4 3D 01 00 7E 14 FF
00005300 : 74 02 E8 28 0C 8B E5 83 3E EC 24 00 74 05 C7 46
00005310 : 02 FF FF 8B 76 04 C6 04 00 8B 46 02 83 C4 08 5D
00005320 : C3 55 83 EC 28 8B EC A0 10 00 30 E4 3D 01 00 7E
00005330 : 1E FF 76 2C E8 6F 0C 8B E5 83 3E EC 24 00 74 08
00005340 : B8 FF FF 83 C4 28 5D C3 33 C0 83 C4 28 5D C3 83
00005350 : C4 28 5D C3 55 83 EC 02 8B EC FF 76 06 E8 C1 FF
00005360 : 8B E5 83 C4 02 5D C3 55 83 EC 4E 8B EC A0 10 00
00005370 : 30 E4 3D 01 00 7E 10 FF 76 54 FF 76 52 E8 6B 0C
00005380 : 8B E5 83 C4 4E 5D C3 83 C4 4E 5D C3 55 83 EC 08
00005390 : 8B EC 8B 76 0C 8A 44 08 30 E4 25 30 00 74 08 B8
```

```
000053A0 : FF FF 83 C4 08 5D C3 8B 76 0C 83 7C 0A 00 75 1C
000053B0 : 8A 44 08 30 E4 25 04 00 75 12 56 E8 C3 02 8B E5
000053C0 : 85 C0 74 08 B8 FF FF 83 C4 08 5D C3 8B 76 0C 8A
000053D0 : 44 08 30 E4 25 04 00 74 07 C7 46 06 01 00 EB 29
000053E0 : 8B 76 0C 8A 44 08 30 E4 25 02 00 74 08 B8 FF FF
000053F0 : 83 C4 08 5D C3 8B 76 0C 8A 44 08 30 E4 0D 01 00
```

Block 42
```
00005400 : 88 44 08 8B 44 0A 89 46 06 8B 76 0C 8A 44 09 30
00005410 : E4 FF 76 06 FF 74 06 50 E8 AE F8 8B E5 85 C0 89
00005420 : 46 04 79 0E 8B 76 0C 8A 44 08 30 E4 0D 20 00 88
00005430 : 44 08 83 7E 04 00 75 0E 8B 76 0C 8A 44 08 30 E4
00005440 : 0D 10 00 88 44 08 8B 46 04 85 C0 7E 0B 8B 76 0C
00005450 : 89 44 02 8B 44 06 89 04 8B 76 0C 8A 44 08 30 E4
00005460 : 25 30 00 74 08 B8 FF FF 83 C4 08 5D C3 8B 76 0C
00005470 : 8B 44 02 48 89 44 02 85 C0 78 0C 8B 04 FF 04 8B
00005480 : F8 8A 1D 30 FF EB 0A FF 76 0C E8 FF FE 8B E5 8B
00005490 : D8 8B C3 83 C4 08 5D C3 55 83 EC 0C 8B EC 8B 46
000054A0 : 10 8B 76 12 8A 5C 08 30 FF 81 E3 30 00 89 46 07
000054B0 : 74 08 B8 FF FF 83 C4 0C 5D C3 8B 76 12 83 7C 0A
000054C0 : 00 75 6A 8A 44 08 30 E4 25 04 00 75 60 83 7E 10
000054D0 : FF 75 07 33 C0 83 C4 0C 5D C3 FF 76 12 E8 A1 01
000054E0 : 8B E5 85 C0 74 08 B8 FF FF 83 C4 0C 5D C3 8B 76
000054F0 : 12 8A 44 08 30 E4 0D 02 00 88 44 08 8B 44 0A 89
00005500 : 44 04 48 89 44 04 85 C0 78 0F 8B 04 FF 04 8B 5E
00005510 : 10 8B F8 88 1D 30 FF EB 0D FF 76 12 FF 76 10 E8
00005520 : 76 FF 8B E5 8B D8 8B C3 83 C4 0C 5D C3 8B 76 12
00005530 : 8A 44 08 30 E4 25 04 00 74 38 83 7E 10 FF 75 07
00005540 : 33 C0 83 C4 0C 5D C3 8B 46 10 8B 76 12 8A 5C 09
00005550 : 30 FF C7 46 09 01 00 FF 76 09 8D 4E 04 51 53 88
00005560 : 46 04 E8 5B FA 8B E5 C7 46 10 FF FF 89 46 05 E9
00005570 : 83 00 8B 76 12 8A 44 08 30 E4 25 01 00 74 08 B8
00005580 : FF FF 83 C4 0C 5D C3 8B 76 12 8A 44 08 30 E4 0D
00005590 : 02 00 88 44 08 83 7E 10 FF 74 32 83 7C 04 00 7E
000055A0 : 2C 8B 44 04 48 89 44 04 85 C0 78 0F 8B 04 FF 04
000055B0 : 8B 5E 10 8B F8 88 1D 30 FF EB 0D FF 76 12 FF 76
000055C0 : 10 E8 D4 FE 8B E5 8B D8 C7 46 10 FF FF 8B 76 12
000055D0 : 8B 04 2B 44 06 89 46 09 74 16 8A 44 09 30 E4 FF
000055E0 : 76 09 FF 74 06 50 E8 D7 F9 8B E5 89 46 05 EB 05
000055F0 : C7 46 05 00 00 83 7E 05 FF 75 10 8B 76 12 8A 44
```

Block 43
```
00005600 : 08 30 E4 0D 20 00 88 44 08 EB 16 8B 46 05 3B 46
00005610 : 09 74 0E 8B 76 12 8A 44 08 30 E4 0D 10 00 88 44
00005620 : 08 8B 76 12 8B 44 0A 89 44 04 8B 44 06 89 04 8B
00005630 : 46 10 3D FF FF 74 20 8B 5C 04 4B 89 5C 04 85 DB
00005640 : 78 0A 8B 1C FF 04 88 07 30 E4 EB 0B FF 76 12 FF
00005650 : 76 10 E8 43 FE 8B E5 8B 76 12 8A 44 08 30 E4 25
00005660 : 30 00 74 08 B8 FF FF 83 C4 0C 5D C3 83 7E 07 FF
00005670 : 75 07 33 C0 83 C4 0C 5D C3 8B 46 07 83 C4 0C 5D
00005680 : C3 55 83 EC 02 8B EC 8B 76 06 83 7C 0A 00 74 11
00005690 : 8A 44 08 30 E4 25 08 00 75 07 33 C0 83 C4 02 5D
000056A0 : C3 FF 36 10 25 E8 6B 18 8B E5 8B 76 06 89 04 89
000056B0 : 44 06 85 C0 75 0E C7 06 EE 24 0C 00 B8 FF FF 83
000056C0 : C4 02 5D C3 A1 10 25 8B 76 06 89 44 0A 8A 44 08
000056D0 : 30 E4 25 F3 FF 88 44 08 33 C0 89 44 04 89 44 02
000056E0 : 83 C4 02 5D C3 55 83 EC 06 8B EC B8 5C 23 89 46
```

```
000056F0 : 02 B8 74 24 8B 5E 02 3B D8 73 0F 8A 47 08 30 E4
00005700 : 85 C0 74 06 83 46 02 0E EB E7 8B 46 02 3D 74 24
00005710 : 75 07 33 C0 83 C4 06 5D C3 FF 76 02 FF 76 0C FF
00005720 : 76 0A E8 07 00 8B E5 83 C4 06 5D C3 55 83 EC 0E
00005730 : 8B EC 8B 76 16 8A 44 08 84 C0 74 1F 30 E4 25 02
00005740 : 00 74 0A 56 B8 FF FF 50 E8 4D FD 8B E5 8B 76 16
00005750 : 8A 44 09 30 E4 50 E8 6E FB 8B E5 A1 12 25 8B 76
00005760 : 14 8A 5C 01 30 FF 89 46 08 89 76 0A EB 11 C7 46
00005770 : 08 00 00 EB 05 C7 46 08 00 80 FF 46 0A EB 0A 83
00005780 : FB 62 74 F1 83 FB 61 74 E5 8B 76 0A 8A 44 01 30
00005790 : E4 3D 2B 00 74 04 33 DB EB 03 33 DB 43 8B 76 14
000057A0 : 8A 04 30 E4 88 5E 0C E9 EA 00 8B 46 08 0D 08 00
000057B0 : 89 46 00 82 7E 0C 00 74 05 B8 02 00 EB 03 B8 01
000057C0 : 00 8B 5E 00 0B D8 81 CB 00 01 B8 A4 01 50 53 FF
000057D0 : 76 12 E8 D0 F2 8B E5 89 46 06 40 75 07 33 C0 83
000057E0 : C4 0E 5D C3 B8 02 00 50 33 C0 50 33 DB 53 FF 76
000057F0 : 06 E8 DF F9 8B E5 82 7E 0C 00 74 05 B8 80 00 EB
```

Block 44
```
00005800 : 03 B8 02 00 89 46 04 E9 A1 00 82 7E 0C 00 74 05
00005810 : B8 02 00 EB 02 33 C0 8B 5E 08 0B D8 53 FF 76 12
00005820 : E8 82 F2 8B E5 89 46 06 40 75 07 33 C0 83 C4 0E
00005830 : 5D C3 82 7E 0C 00 74 05 B8 80 00 EB 03 B8 01 00
00005840 : 89 46 04 EB 66 82 7E 0C 00 74 05 B8 02 00 EB 03
00005850 : B8 01 00 8B 5E 08 0B D8 81 CB 00 01 81 CB 00 02
00005860 : B8 A4 01 50 53 FF 76 12 E8 3A F2 8B E5 89 46 06
00005870 : 40 75 07 33 C0 83 C4 0E 5D C3 82 7E 0C 00 74 05
00005880 : B8 80 00 EB 03 B8 02 00 89 46 04 EB 1E 33 C0 83
00005890 : C4 0E 5D C3 3D 77 00 74 AC 3D 72 00 75 03 E9 69
000058A0 : FF 3D 61 00 75 03 E9 01 FF EB E2 8B 46 06 BB 2A
000058B0 : 00 F7 EB 8B F0 82 BC 17 25 00 74 13 81 4E 04 04
000058C0 : 00 8B 46 16 05 0C 00 8B 76 16 89 44 06 EB 08 8B
000058D0 : 76 16 C7 44 06 00 00 8B 46 06 8B 76 16 88 44 09
000058E0 : 8B 44 06 89 04 33 C0 89 44 04 89 44 02 8B 46 04
000058F0 : 88 44 08 8B C6 83 C4 0E 5D C3 55 83 EC 04 8B EC
00005900 : 8B 76 08 8A 44 08 30 E4 25 02 00 74 0A 56 B8 FF
00005910 : FF 50 E8 83 FB 8B E5 8B 76 08 8A 44 08 30 E4 25
00005920 : 0C 00 75 11 83 7C 0A 00 74 0B FF 74 0A FF 74 06
00005930 : E8 24 17 8B E5 33 C0 8B 76 08 89 44 06 89 44 0A
00005940 : C6 44 08 00 8A 44 09 30 E4 50 E8 7A F9 8B E5 83
00005950 : C4 04 5D C3 55 83 EC 0C 8B EC 8B 46 12 8B 5E 10
00005960 : 8B 0E 68 00 8B 16 66 00 E8 E8 04 7E 69 A0 10 00
00005970 : 30 E4 3D 02 00 7D 07 33 C0 83 C4 0C 5D C3 8B 46
00005980 : 10 05 0F 00 8B 5E 12 83 D3 00 89 5E 0A 81 E3 F0
00005990 : FF 89 46 08 33 C0 0B D8 74 07 33 C0 83 C4 0C 5D
000059A0 : C3 B9 04 00 8B 46 0A 8B 5E 08 D1 F8 D1 DB E2 FA
000059B0 : 53 89 5E 06 E8 FE 04 8B E5 85 C0 74 07 33 C0 83
000059C0 : C4 0C 5D C3 8B 46 0A 8B 5E 08 81 E3 F0 FF 01 1E
000059D0 : 66 00 11 06 68 00 A1 16 00 8B 1E 62 00 03 C3 8B
000059E0 : 4E 10 01 0E 62 00 29 0E 66 00 8B 5E 12 19 1E 68
000059F0 : 00 89 46 04 83 C4 0C 5D C3 55 83 EC 08 8B EC 8B
```

Block 45
```
00005A00 : 46 0C 33 DB 53 50 E8 4B FF 8B E5 89 46 06 85 C0
00005A10 : 74 05 83 C4 08 5D C3 B8 FF FF 83 C4 08 5D C3 55
00005A20 : 83 EC 0A 8B EC A0 10 00 30 E4 3D 02 00 7D 18 A1
00005A30 : 62 00 2B 06 5E 00 33 DB 85 C0 79 01 4B 01 06 66
```

```
00005A40 : 00 11 1E 68 00 EB 5A A1 F0 24 05 0F 00 8B 1E F2
00005A50 : 24 83 D3 00 89 5E 08 81 E3 F0 FF 89 46 06 33 C0
00005A60 : 0B D8 74 08 B8 FF FF 83 C4 0A 5D C3 B9 04 00 8B
00005A70 : 46 08 8B 5E 06 D1 F8 D1 DB E2 FA 53 89 5E 04 EB
00005A80 : EE 03 8B E5 85 C0 74 08 B8 FF FF 83 C4 0A 5D C3
00005A90 : 8B 46 08 8B 5E 06 81 E3 F0 FF A3 68 00 89 1E 66
00005AA0 : 00 A1 5E 00 A3 62 00 33 C0 83 C4 0A 5D C3 55 83
00005AB0 : EC 04 8B EC C7 46 02 00 00 8B 76 08 03 76 02 8A
00005AC0 : 04 30 E4 85 C0 74 05 FF 46 02 EB ED 8B 46 02 83
00005AD0 : C4 04 5D C3 55 83 EC 08 8B EC 8B 46 0C 89 46 06
00005AE0 : 8B 76 06 FF 46 06 8B 7E 0E FF 46 0E 8A 05 88 04
00005AF0 : 84 C0 75 EC 8B 46 0C 83 C4 08 5D C3 55 83 EC 06
00005B00 : 8B EC 8B 46 0A 89 46 04 83 7E 0E 00 7E 1B 8B 76
00005B10 : 0C FF 46 0C 8A 04 8B 7E 04 88 05 84 C0 74 0A FF
00005B20 : 46 04 EB 00 FF 4E 0E EB DF 8B 76 04 C6 04 00 8B
00005B30 : 46 0A 83 C4 06 5D C3 55 83 EC 0E 8B EC C7 06 74
00005B40 : 24 00 00 83 3E 74 24 20 7D 6E 8B 76 12 8A 04 30
00005B50 : E4 40 8B F8 8A 85 E8 20 30 E4 25 08 00 74 05 FF
00005B60 : 46 12 EB E6 8B 76 12 8A 04 30 E4 85 C0 74 49 A1
00005B70 : 74 24 FF 06 74 24 D1 E0 8B F0 8B 46 12 89 84 76
00005B80 : 24 8B 76 12 8A 04 30 E4 85 C0 89 46 00 74 13 40
00005B90 : 8B F8 8A 85 E8 20 30 E4 25 08 00 75 05 FF 46 12
00005BA0 : EB DF 8B 76 12 8A 04 FF 46 12 C6 04 00 88 46 04
00005BB0 : 30 E4 85 C0 75 8D EB 00 A0 10 00 30 E4 3D 02 00
00005BC0 : 7C 03 E9 C5 00 B8 5C 23 50 B8 B6 24 50 B8 1A 00
00005BD0 : 50 E8 58 FB 8B E5 8A 1E 3A 00 30 FF 83 FB 3E 89
00005BE0 : 46 08 74 16 B8 6A 23 50 B8 B8 24 50 B9 3A 00 50
00005BF0 : E8 39 FB 8B E5 89 46 0A EB 14 B8 6A 23 50 B8 BA

00005C00 : 24 50 B8 3B 00 50 E8 23 FB 8B E5 89 46 0A B8 78
00005C10 : 23 50 B8 BA 24 50 B8 BC 24 50 E8 0F FB 8B E5 85
00005C20 : C0 89 46 0C 75 09 B8 01 00 50 E8 DC 03 8B E5 83
00005C30 : 7E 08 00 75 15 FF 76 0C B8 BD 24 50 E8 A1 16 8B
00005C40 : E5 B8 01 00 50 E8 20 EC 8B E5 FF 36 10 25 E8 C2
00005C50 : 12 8B E5 50 FF 76 08 E8 D9 09 8B E5 8B 76 08 8A
00005C60 : 44 08 30 E4 25 F7 FF 88 44 08 83 7E 0A 00 74 03
00005C70 : E9 85 00 FF 76 0C B8 D4 24 50 E8 63 16 8B E5 B8
00005C80 : 01 00 50 E8 E2 EB 8B E5 EB 6E C6 06 65 23 00 B0
00005C90 : 01 B3 02 C6 06 80 23 06 8B 0E 12 25 33 0E F4 24
00005CA0 : 81 E1 00 80 A2 73 23 A2 64 23 88 1E 81 23 88 1E
00005CB0 : 72 23 74 05 B8 10 00 EB 02 33 C0 89 46 05 0D C0
00005CC0 : 00 C7 06 42 25 01 00 8B 5E 05 81 CB A0 00 C7 06
00005CD0 : 6C 25 02 00 B9 01 00 51 A2 16 25 88 1E 6A 25 88
00005CE0 : 1E 40 25 E8 F6 02 8B E5 25 80 00 74 0B A0 72 23
00005CF0 : 30 E4 0D 04 00 A2 72 23 B8 76 24 50 FF 36 74 24
00005D00 : E8 35 A7 8B E5 33 C0 50 E8 5D EB 8B E5 83 C4 0E
00005D10 : 5D C3 55 83 EC 08 8B EC 8B 76 0C 82 3C 00 74 28
00005D20 : 8B 7E 0E 82 3D 00 74 20 8B C6 FF 46 0C FF 46 0E
00005D30 : 8A 1D 30 FF 8B F0 8A 0C 30 ED 2B CB 89 4E 06 74
00005D40 : D7 8B C1 83 C4 08 5D C3 8B 76 0C 82 3C 00 74 08
00005D50 : B8 FF FF 83 C4 08 5D C3 8B 76 0E 82 3C 00 74 08
00005D60 : B8 01 00 83 C4 08 5D C3 33 C0 83 C4 08 5D C3 55
00005D70 : 83 EC 08 8B EC 83 7E 10 00 74 35 8B 76 0C 82 3C
00005D80 : 00 74 2D 8B 7E 0E 82 3D 00 74 25 8B C6 FF 46 0C
00005D90 : FF 46 0E 8A 1D 30 FF 8B F0 8A 0C 30 ED 2B CB 89
```

```
00005DA0 : 4E 06 74 07 8B C1 83 C4 08 5D C3 FF 4E 10 EB C5
00005DB0 : 83 7E 10 00 74 20 8B 76 0C 82 3C 00 74 08 B8 FF
00005DC0 : FF 83 C4 08 5D C3 8B 76 0E 82 3C 00 74 08 B8 01
00005DD0 : 00 83 C4 08 5D C3 33 C0 83 C4 08 5D C3 55 83 EC
00005DE0 : 08 8B EC FF 76 0C E8 C5 FC 8B E5 8B 5E 0C 03 D8
00005DF0 : 89 5E 06 8B 76 06 FF 46 06 8B 7E 0E FF 46 0E 8A
```

Block 47
```
00005E00 : 05 88 04 84 C0 75 EC 8B 46 0C 83 C4 08 5D C3 55
00005E10 : 83 EC 06 8B EC FF 76 0A E8 93 FC 8B E5 8B 5E 0A
00005E20 : 03 D8 89 5E 04 8B 46 0E FF 4E 0E 85 C0 7E 16 8B
00005E30 : 76 0C FF 46 0C 8A 04 8B 7E 04 88 05 84 C0 74 05
00005E40 : FF 46 04 EB E0 8B 76 04 C6 04 00 8B 46 0A 83 C4
00005E50 : 06 5D C3 50 33 C1 58 50 78 0F 2B C1 75 0E 33 C0
00005E60 : 3B DA 74 08 77 03 48 EB 03 0D FF 7F 85 C0 58 C3
00005E70 : 55 8B EC 06 C7 06 EC 24 00 00 8B 1E 60 00 2B 1E
00005E80 : 5C 00 89 1E 6A 00 8B 56 04 8B 0E 60 00 8C D8 2B
00005E90 : C8 03 CA 72 1A 03 DA 53 C4 06 5A 00 B4 4A CD 21
00005EA0 : 5B 72 09 89 1E 6A 00 33 C0 07 5D C3 A3 EC 24 B8
00005EB0 : FF FF 07 5D C3 55 8B EC 06 C7 06 EC 24 00 00 8C
00005EC0 : DB 2B 1E 5C 00 A1 6A 00 2B C3 03 46 04 A9 00 F0
00005ED0 : 75 21 8B 1E 6A 00 03 5E 04 72 18 C4 06 5A 00 53
00005EE0 : B4 4A CD 21 5B 72 09 89 1E 6A 00 33 C0 07 5D C3
00005EF0 : A3 EC 24 B8 FF FF 07 5D C3 55 8B EC C7 06 EC 24
00005F00 : 00 00 8B 56 04 8B 4E 06 B4 3C CD 21 73 03 A3 EC
00005F10 : 24 5D C3 55 8B EC C7 06 EC 24 00 00 8B 56 04 8B
00005F20 : 46 06 B4 3D CD 21 73 03 A3 EC 24 5D C3 55 8B EC
00005F30 : C7 06 EC 24 00 00 8B 5E 04 B4 3E CD 21 73 03 A3
00005F40 : EC 24 5D C3 55 8B EC C7 06 EC 24 00 00 8B 5E 04
00005F50 : 8B 4E 08 8B 56 06 B4 3F CD 21 73 05 A3 EC 24 33
00005F60 : C0 5D C3 55 8B EC C7 06 EC 24 00 00 8B 5E 04 8B
00005F70 : 4E 08 8B 56 06 B4 40 CD 21 73 05 A3 EC 24 33 C0
00005F80 : 5D C3 55 8B EC C7 06 EC 24 00 00 8B 46 0A B4 42
00005F90 : 8B 5E 04 8B 4E 08 8B 56 06 CD 21 73 03 A3 EC 24
00005FA0 : 8B D8 8B C2 5D C3 55 8B EC C7 06 EC 24 00 00 8B
00005FB0 : 56 04 B4 41 CD 21 73 03 A3 EC 24 5D C3 55 8B EC
00005FC0 : C7 06 EC 24 00 00 8B 56 04 8B 46 06 B4 43 8B 4E
00005FD0 : 08 CD 21 73 03 A3 EC 24 8B C1 5D C3 55 8B EC 8B
00005FE0 : 5E 04 B8 00 44 CD 21 8B C2 5D C3 55 8B EC C7 06
00005FF0 : EC 24 00 00 8B 56 04 8B 7E 06 B4 56 CD 21 73 05
```

Block 48
```
00006000 : A3 EC 24 5D C3 33 C0 5D C3 55 8B EC FF 76 06 FF
00006010 : 76 04 E8 0A A4 8B E5 5D C3 55 83 EC 02 8B EC B8
00006020 : 08 00 50 E8 77 13 8B E5 83 C4 02 5D C3 55 83 EC
00006030 : 02 8B EC B8 01 00 50 E8 63 13 8B E5 83 C4 02 5D
00006040 : C3 55 8B EC FF 76 04 B8 02 00 50 E8 4F 13 8B E5
00006050 : 8B 46 04 5D C3 55 83 EC 02 8B EC B8 03 00 50 E8
00006060 : 3B 13 8B E5 83 C4 02 5D C3 55 8B EC FF 76 04 B8
00006070 : 04 00 50 E8 27 13 8B E5 8B 46 04 5D C3 55 8B EC
00006080 : FF 76 04 B8 05 00 50 E8 13 13 8B E5 8B 46 04 5D
00006090 : C3 55 83 EC 1E 8B EC 33 C0 8B 76 22 8A 1C 30 FF
000060A0 : 43 8A 8F E8 20 30 ED 81 E1 04 00 89 46 0C 89 46
000060B0 : 0E 74 30 8B 46 0E BB 0A 00 F7 EB 8B 76 22 FF 46
000060C0 : 22 8A 1C 30 FF 81 E3 0F 00 03 C3 89 46 0E 8B 76
000060D0 : 22 8A 04 30 E4 40 8B F0 8A 84 E8 20 30 E4 25 04
000060E0 : 00 75 D0 8B 76 22 8A 04 30 E4 3D 6C 00 75 08 FF
```

```
000060F0 : 46 22 C7 46 0C 01 00 FF 56 24 8B 76 22 8A 1C 30
00006100 : FF 83 FB 63 89 46 08 74 16 8B 76 08 8A 84 E9 20
00006110 : 30 E4 25 08 00 74 08 FF 56 24 89 46 08 EB EA 8B
00006120 : 46 08 3D FF FF 75 0C 8B 76 26 89 04 33 C0 83 C4
00006130 : 1E 5D C3 8B 76 22 8A 04 30 E4 E9 CF 04 33 C0 8B
00006140 : 5E 0E 85 DB 89 46 10 74 05 83 FB 01 7E 26 8B 46
00006150 : 08 3D 2D 00 74 05 3D 2B 00 75 19 83 7E 08 2D 75
00006160 : 05 B8 FF FF EB 02 33 C0 89 46 10 FF 56 24 FF 4E
00006170 : 0E 89 46 08 8B 76 08 8A 84 E9 20 30 E4 25 04 00
00006180 : 75 0E 8B C6 8B 76 26 89 04 33 C0 83 C4 1E 5D C3
00006190 : C7 46 14 00 00 C7 46 12 00 00 8B 46 14 8B 5E 12
000061A0 : 33 C9 BA 0A 00 E8 84 11 8B 4E 08 81 E1 0F 00 33
000061B0 : D2 85 C9 79 01 4A 03 D9 13 C2 89 46 14 89 5E 12
000061C0 : FF 56 24 89 46 08 8B 46 0E 48 85 C0 89 46 0E 74
000061D0 : 0E 8B 76 08 8A 84 E9 20 30 E4 25 04 00 75 BB 83
000061E0 : 7E 28 00 75 03 E9 3A 04 8B 46 10 85 C0 79 0A F7
000061F0 : 56 14 F7 5E 12 83 5E 14 FF 83 7E 0C 00 75 0D 8B

Block 49
00006200 : 7E 28 8B 35 8B 46 12 89 04 E9 16 04 8B 7E 28 8B
00006210 : 35 8B 46 14 8B 5E 12 89 44 02 89 1C E9 03 04 8B
00006220 : 46 08 3D 30 00 7C 05 3D 37 00 7E 0F 8B 46 08 8B
00006230 : 76 26 89 04 33 C0 83 C4 1E 5D C3 C7 46 14 00 00
00006240 : C7 46 12 00 00 B9 03 00 8B 46 14 8B 5E 12 D1 E3
00006250 : D1 D0 E2 FA 8B 4E 08 81 E1 07 00 33 D2 85 C9 79
00006260 : 01 4A 03 D9 13 C2 89 46 14 89 5E 12 FF 56 24 89
00006270 : 46 08 8B 46 0E 48 85 C0 89 46 0E 74 0C 83 7E 08
00006280 : 30 7C 06 83 7E 08 37 7E BC 83 7E 28 00 75 03 E9
00006290 : 90 03 83 7E 0C 00 75 0D 8B 7E 28 8B 35 8B 46 12
000062A0 : 89 04 E9 7D 03 8B 7E 28 8B 35 8B 46 14 8B 5E 12
000062B0 : 89 44 02 89 1C E9 6A 03 8B 76 08 8A 84 E9 20 30
000062C0 : E4 25 80 00 75 0E 8B C6 8B 76 26 89 04 33 C0 83
000062D0 : C4 1E 5D C3 8B 46 08 89 46 0A FF 56 24 8B 5E 0E
000062E0 : 85 DB 89 46 08 74 05 83 FB 02 7E 42 83 7E 0A 30
000062F0 : 75 3C 8B 46 08 3D 78 00 74 05 3D 58 00 75 2F FF
00006300 : 56 24 8B F0 8A 9C E9 20 30 FF 81 E3 80 00 89 46
00006310 : 08 75 0C 8B 76 26 89 04 33 C0 83 C4 1E 5D C3 C7
00006320 : 46 14 00 00 C7 46 12 00 00 FF 4E 0E EB 60 8B 76
00006330 : 0A 8A 84 E9 20 30 E4 25 04 00 74 12 8B C6 2D 30
00006340 : 00 33 DB 85 C0 79 01 4B 89 46 12 89 5E 14 8B 76
00006350 : 0A 8A 84 E9 20 30 E4 25 01 00 74 12 8B C6 2D 37
00006360 : 00 33 DB 85 C0 79 01 4B 89 46 12 89 5E 14 8B 76
00006370 : 0A 8A 84 E9 20 30 E4 25 02 00 74 12 8B C6 2D 57
00006380 : 00 33 DB 85 C0 79 01 4B 89 46 12 89 5E 14 8B 46
00006390 : 0E 48 85 C0 89 46 0E 75 03 E9 8A 00 8B 76 08 8A
000063A0 : 84 E9 20 30 E4 25 80 00 74 7C B9 04 00 8B 46 14
000063B0 : 8B 5E 12 D1 E3 D1 D0 E2 FA 8A 8C E9 20 30 ED 81
000063C0 : E1 04 00 89 46 14 89 5E 12 74 12 8B CE 83 E9 30
000063D0 : 33 D2 85 C9 79 01 4A 09 56 14 09 4E 12 8B 76 08
000063E0 : 8A 84 E9 20 30 E4 25 01 00 74 12 8B C6 2D 37 00
000063F0 : 33 DB 85 C0 79 01 4B 09 5E 14 09 46 12 8B 76 08

Block 50
00006400 : 8A 84 E9 20 30 E4 25 02 00 74 12 8B C6 2D 57 00
00006410 : 33 DB 85 C0 79 01 4B 09 5E 14 09 46 12 FF 56 24
00006420 : 89 46 08 E9 68 FF 83 7E 28 00 75 03 E9 F3 01 83
00006430 : 7E 0C 00 75 0D 8B 7E 28 8B 35 8B 46 12 89 04 E9
```

```
00006440 : E0 01 8B 7E 28 8B 35 8B 46 14 8B 5E 12 89 44 02
00006450 : 89 1C E9 CD 01 8B 76 08 8A 84 E9 20 30 E4 25 04
00006460 : 00 75 0E 8B C6 8B 76 26 89 04 33 C0 83 C4 1E 5D
00006470 : C3 C7 46 10 00 00 8B 46 10 BB 0A 00 F7 EB 8B 5E
00006480 : 08 81 E3 0F 00 03 C3 89 46 10 FF 56 24 89 46 08
00006490 : 8B 46 0E 48 85 C0 89 46 0E 74 0E 8B 76 08 8A 84
000064A0 : E9 20 30 E4 25 04 00 75 CD 83 7E 28 00 75 03 E9
000064B0 : 70 01 8B 7E 28 8B 35 8B 46 10 89 04 E9 63 01 83
000064C0 : 7E 28 00 74 0E 8B 76 28 8B 04 FF 04 8B 5E 08 8B
000064D0 : F0 88 1C 8B 46 0E 48 85 C0 89 46 0E 7E 1F FF 56
000064E0 : 24 89 46 08 40 74 16 83 7E 28 00 74 E6 8B 76 28
000064F0 : 8B 04 FF 04 8B 5E 08 8B F0 88 1C EB D6 8B 46 08
00006500 : 3D FF FF 75 0C 8B 76 26 89 04 33 C0 83 C4 1E 5D
00006510 : C3 8B 46 22 40 83 C4 1E 5D C3 83 7E 28 00 74 0E
00006520 : 8B 76 28 8B 04 FF 04 8B 5E 08 8B F0 88 1C FF 56
00006530 : 24 89 46 08 40 74 19 8B 46 0E 48 85 C0 89 46 0E
00006540 : 74 0E 8B 76 08 8A 84 E9 20 30 E4 25 08 00 74 CA
00006550 : 8B 7E 28 8B 35 C6 04 00 E9 C7 00 8B 46 08 3D 2D
00006560 : 00 74 1E 3D 2E 00 74 19 3D 30 00 7C 05 3D 39 00
00006570 : 7E 0F 8B 46 08 8B 76 26 89 04 33 C0 83 C4 1E 5D
00006580 : C3 8D 46 16 50 8D 46 10 50 FF 76 24 FF 76 0E FF
00006590 : 76 08 E8 B5 10 8B E5 83 7E 10 00 89 46 08 75 0C
000065A0 : 8B 76 26 89 04 33 C0 83 C4 1E 5D C3 83 7E 28 00
000065B0 : 74 70 83 7E 0C 00 75 1B 8B 7E 28 8B 35 8B 46 1C
000065C0 : 8B 5E 1A 8B 4E 18 8B 56 16 E8 FD 12 89 44 02 89
000065D0 : 1C EB 4F 8B 7E 28 8B 35 89 76 00 8D 76 16 8B 7E
000065E0 : 00 B9 04 00 FC F3 A5 EB 39 33 C0 83 C4 1E 5D C3
000065F0 : 66 00 5B 63 73 00 1A 63 63 00 BF 62 68 00 55 62

Block 51
00006600 : 78 00 B8 60 6F 00 1F 60 64 00 3D 5F BE 18 00 2E
00006610 : 3B 84 F0 63 75 05 2E FF A4 F2 63 83 EE 04 79 EF
00006620 : EB C7 8B 46 08 8B 76 26 89 04 8B 46 22 40 83 C4
00006630 : 1E 5D C3 55 83 EC 02 8B EC FF 76 06 E8 70 0D 8B
00006640 : E5 83 7E 08 00 75 07 33 C0 83 C4 02 5D C3 8B 76
00006650 : 06 8A 44 08 30 E4 25 FB FF 88 44 08 30 E4 0D 08
00006660 : 00 88 44 08 8B 46 08 89 04 89 44 06 A1 10 25 89
00006670 : 44 0A 33 C0 83 C4 02 5D C3 55 83 EC 36 8B EC 33
00006680 : C0 C7 46 12 FF FF C7 46 14 20 00 8B 76 3A 8A 1C
00006690 : 30 FF 83 FB 2D 89 46 0C 89 46 16 89 46 0E 89 46
000066A0 : 10 75 09 B8 01 00 FF 46 3A 89 46 0C 8B 76 3A 8A
000066B0 : 04 30 E4 89 46 00 40 8B F0 8A 84 E8 20 30 E4 25
000066C0 : 04 00 74 4A 83 7E 00 30 75 05 C7 46 14 30 00 8B
000066D0 : 76 3A FF 46 3A 8A 04 30 E4 25 0F 00 89 46 16 8B
000066E0 : 76 3A 8A 04 30 E4 40 8B F8 8A 85 E8 20 30 E4 25
000066F0 : 04 00 74 1A 8B 46 16 BB 0A 00 F7 EB FF 46 3A 8A
00006700 : 1C 30 FF 81 E3 0F 00 03 C3 89 46 16 EB D1 8B 76
00006710 : 3A 8A 04 30 E4 3D 2E 00 75 37 FF 46 3A C7 46 12
00006720 : 00 00 8B 76 3A 8A 04 30 E4 40 8B F8 8A 85 E8 20
00006730 : 30 E4 25 04 00 74 1A 8B 46 12 BB 0A 00 F7 EB FF
00006740 : 46 3A 8A 1C 30 FF 81 E3 0F 00 03 C3 89 46 12 EB
00006750 : D1 8B 76 3A 8A 04 30 E4 3D 6C 00 75 09 B8 01 00
00006760 : FF 46 3A 89 46 0E C7 46 1C 00 00 8B 76 3A 8A 04
00006770 : 30 E4 E9 B0 02 83 7E 0E 00 74 17 8B 76 3E 8B 04
00006780 : 83 04 04 8B F0 8B 5C 02 8B 0C 89 4E 1E 89 5E 20
00006790 : EB 19 8B 76 3E 8B 04 83 04 02 8B F0 8B 1C 33 C9
000067A0 : 85 DB 79 01 49 89 4E 20 89 5E 1E 8B 46 20 85 C0
```

```
000067B0 : 79 42 F7 56 20 F7 5E 1E 83 5E 20 FF C7 46 10 01
000067C0 : 00 EB 31 83 7E 0E 00 74 17 8B 76 3E 8B 04 83 04
000067D0 : 04 8B F0 8B 5C 02 8B 0C 89 4E 1E 89 5E 20 EB 14
000067E0 : 8B 76 3E 8B 04 83 04 02 8B F0 8B 1C 33 C0 89 46
000067F0 : 20 89 5E 1E C7 46 06 0B 00 8B 46 06 48 8B F0 89
```

Block 52
```
00006800 : 46 06 8B 46 20 8B 5E 1E 33 C9 BA 0A 00 89 76 00
00006810 : E8 FB 0B 83 C2 30 83 D1 00 8B 76 00 88 52 22 8B
00006820 : 46 20 8B 5E 1E 33 C9 BA 0A 00 E8 E1 0B 89 46 20
00006830 : 89 5E 1E 8B 46 20 0B 46 1E 75 BE 83 7E 10 01 75
00006840 : 0D 8B 46 06 48 8B F0 C6 42 22 2D 89 46 06 8D 46
00006850 : 22 8B 5E 06 03 D8 B8 0B 00 2B 46 06 89 46 0A 89
00006860 : 5E 1C E9 D6 01 83 7E 0E 00 74 17 8B 76 3E 8B 04
00006870 : 83 04 04 8B F0 8B 5C 02 8B 0C 89 4E 1E 89 5E 20
00006880 : EB 14 8B 76 3E 8B 04 83 04 02 8B F0 8B 1C 33 C0
00006890 : 89 46 20 89 5E 1E C7 46 06 08 00 8B 46 06 48 8B
000068A0 : F0 8B 5E 20 8B 4E 1E 33 DB 81 E1 0F 00 8B F9 8A
000068B0 : 9D F6 24 88 5A 22 B9 04 00 8B 5E 20 8B 56 1E D1
000068C0 : FB D1 DA E2 FA 89 5E 20 81 E3 FF 0F 89 46 06 89
000068D0 : 56 1E 89 5E 20 8B 46 20 0B 46 1E 75 BE 8D 46 22
000068E0 : 8B 5E 06 03 D8 B8 08 00 2B 46 06 89 46 0A 89 5E
000068F0 : 1C E9 47 01 83 7E 0E 00 74 17 8B 76 3E 8B 04 83
00006900 : 04 04 8B F0 8B 5C 02 8B 0C 89 4E 1E 89 5E 20 EB
00006910 : 14 8B 76 3E 8B 04 83 04 02 8B F0 8B 1C 33 C0 89
00006920 : 46 20 89 5E 1E C7 46 06 0B 00 8B 46 06 48 8B F0
00006930 : 8B 5E 20 8B 4E 1E 33 DB 81 E1 07 00 83 C1 30 83
00006940 : D3 00 88 4A 22 B9 03 00 8B 5E 20 8B 56 1E D1 FB
00006950 : D1 DA E2 FA 89 5E 20 81 E3 FF 1F 89 46 06 89 56
00006960 : 1E 89 5E 20 8B 46 20 0B 46 1E 75 BE 8D 46 22 8B
00006970 : 5E 06 03 D8 B8 0B 00 2B 46 06 89 46 0A 89 5E 1C
00006980 : E9 BB 00 83 7E 12 FF 75 05 C7 46 12 C8 00 8B 76
00006990 : 3E 8B 04 83 04 02 8B F0 8B 1C 85 DB 89 5E 1C 75
000069A0 : 06 B8 06 25 89 46 1C C7 46 0A 00 00 8B 46 0A 8B
000069B0 : 5E 12 3B D8 7F 03 E9 82 00 8B 76 1C 03 F0 8A 04
000069C0 : 30 E4 85 C0 74 75 FF 46 0A EB E1 8D 46 22 C7 46
000069D0 : 0A 01 00 8B 76 3E 8B 1C 83 04 02 8B 0F 89 46 1C
000069E0 : 88 4E 22 EB 56 C7 46 1A 02 00 EB 4F C7 46 1A 00
000069F0 : 00 EB 48 C7 46 1A 01 00 EB 41 33 C0 83 C4 36 5D
```

Block 53
```
00006A00 : C3 66 00 F3 67 65 00 EC 67 67 00 E5 67 63 00 CB
00006A10 : 67 73 00 83 67 6F 00 F4 66 78 00 65 66 75 00 C3
00006A20 : 65 64 00 75 65 BE 20 00 2E 3B 84 01 68 75 05 2E
00006A30 : FF A4 03 68 83 EE 04 79 EF EB BF 83 7E 1C 00 75
00006A40 : 03 E9 B2 00 8B 46 16 85 C0 74 05 3B 46 0A 7D 06
00006A50 : 8B 46 0A 89 46 16 8B 46 0A 29 46 16 C7 46 06 00
00006A60 : 00 83 7E 0C 00 74 3F 8B 46 0A 48 85 C0 89 46 0A
00006A70 : 78 17 8B 46 06 FF 46 06 8B 76 3C 03 F0 8B 7E 1C
00006A80 : FF 46 1C 8A 05 88 04 EB DE 8B 46 16 48 85 C0 89
00006A90 : 46 16 78 51 8B 46 06 FF 46 06 8B 76 3C 03 F0 8B
00006AA0 : 46 14 88 04 EB E3 8B 46 16 48 85 C0 89 46 16 78
00006AB0 : 12 8B 46 06 FF 46 06 8B 76 3C 03 F0 8B 46 14 88
00006AC0 : 04 EB E3 8B 46 0A 48 85 C0 89 46 0A 78 17 8B 46
00006AD0 : 06 FF 46 06 8B 76 3C 03 F0 8B 7E 1C FF 46 1C 8A
00006AE0 : 05 88 04 EB DE 8B 46 06 8B 76 40 89 04 8B 46 3A
00006AF0 : 40 83 C4 36 5D C3 83 7E 12 FF 75 05 C7 46 12 06
```

```
00006B00 : 00 83 7E 12 14 7C 05 B8 13 00 EB 03 8B 46 12 89
00006B10 : 46 0A 40 83 7E 1A 01 74 04 33 DB EB 03 33 DB 43
00006B20 : 8D 4E 22 51 8D 4E 10 51 8D 4E 18 51 53 50 8B 76
00006B30 : 3E FF 34 E8 8B 09 8B E5 8B 76 3E 83 04 08 8D 5E
00006B40 : 22 8B 4E 18 85 C9 89 46 0A 89 4E 06 89 5E 1C 79
00006B50 : 03 F7 5E 06 83 7E 1A 02 75 16 83 7E 0A 00 74 0A
00006B60 : 83 7E 06 06 7C 04 33 C0 EB 03 33 C0 40 89 46 1A
00006B70 : 83 7E 0A 00 74 03 FF 4E 18 33 C0 89 46 06 83 7E
00006B80 : 10 00 74 03 FF 46 06 83 7E 1A 00 74 21 8B 46 12
00006B90 : 40 8B 5E 06 03 C3 8B 5E 18 85 DB 89 46 06 78 03
00006BA0 : 01 5E 06 83 7E 12 00 74 31 FF 46 06 EB 2C 8B 46
00006BB0 : 12 05 06 00 01 46 06 8B 46 18 85 C0 79 04 F7 D8
00006BC0 : EB 03 8B 46 18 3D 63 00 89 46 08 7E 03 FF 46 06
00006BD0 : 81 7E 08 E7 03 7E 03 FF 46 06 83 7E 0C 00 75 29
00006BE0 : 8B 46 16 3B 46 06 7E 21 8B 46 06 29 46 16 8B 46
00006BF0 : 16 48 85 C0 89 46 16 78 10 8B 76 3C FF 46 3C 8B

Block 54
00006C00 : 46 14 88 04 FF 46 06 EB E5 83 7E 10 00 74 09 8B
00006C10 : 76 3C FF 46 3C C6 04 2D 83 7E 1A 00 75 03 E9 E2
00006C20 : 00 8B 46 18 85 C0 79 64 8B 76 3C 8B C6 89 46 00
00006C30 : 40 C6 04 30 8B F0 89 46 3C 40 C6 04 2E 89 46 3C
00006C40 : 8B 46 12 48 85 C0 89 46 12 79 03 E9 8F 01 8B 46
00006C50 : 18 40 85 C0 89 46 18 79 0B 8B 76 3C FF 46 3C C6
00006C60 : 04 30 EB DC 8B 46 0A 48 85 C0 89 46 0A 78 12 8B
00006C70 : 76 3C FF 46 3C 8B 7E 1C FF 46 1C 8A 05 88 04 EB
00006C80 : BF 8B 76 3C FF 46 3C C6 04 30 EB B4 8B 46 18 FF
00006C90 : 4E 18 85 C0 78 28 8B 46 0A 48 85 C0 89 46 0A 78
00006CA0 : 12 8B 76 3C FF 46 3C 8B 7E 1C FF 46 1C 8A 05 88
00006CB0 : 04 EB D9 8B 76 3C FF 46 3C C6 04 30 EB CE 83 7E
00006CC0 : 12 00 74 09 8B 76 3C FF 46 3C C6 04 2E 8B 46 12
00006CD0 : 48 85 C0 89 46 12 79 03 E9 02 01 8B 46 0A 48 85
00006CE0 : C0 89 46 0A 78 12 8B 76 3C FF 46 3C 8B 7E 1C FF
00006CF0 : 46 1C 8A 05 88 04 EB D5 8B 76 3C FF 46 3C C6 04
00006D00 : 30 EB CA 8B 46 0A 48 85 C0 89 46 0A 78 12 8B 76
00006D10 : 3C FF 46 3C 8B 7E 1C FF 46 1C 8A 05 88 04 EB 09
00006D20 : 8B 76 3C FF 46 3C C6 04 30 8B 76 3C FF 46 3C C6
00006D30 : 04 2E 8B 46 12 48 85 C0 89 46 12 78 28 8B 46 0A
00006D40 : 48 85 C0 89 46 0A 78 12 8B 76 3C FF 46 3C 8B 7E
00006D50 : 1C FF 46 1C 8A 05 88 04 EB D8 8B 76 3C FF 46 3C
00006D60 : C6 04 30 EB CD 8B 76 3C 8B C6 89 46 00 40 C6 04
00006D70 : 45 8B 5E 18 85 DB 89 46 3C 79 0D 8B F0 FF 46 3C
00006D80 : C6 04 2D F7 5E 18 EB 09 8B 76 3C FF 46 3C C6 04
00006D90 : 2B C7 46 0A 0B 00 8B 46 0A 48 8B F0 89 46 0A 8B
00006DA0 : 46 18 BB 0A 00 99 F7 FB 83 C2 30 88 52 22 8B 46
00006DB0 : 18 99 F7 FB 89 46 18 83 7E 0A 09 7F D9 83 7E 18
00006DC0 : 00 75 D3 8B 46 0A 3D 0B 00 7D 12 8B 76 3C FF 46
00006DD0 : 3C FF 46 0A 8B F8 8A 43 22 88 04 EB E6 83 7E 0C
00006DE0 : 01 75 29 8B 46 16 3B 46 06 7E 21 8B 46 06 29 46
00006DF0 : 16 8B 46 16 48 85 C0 89 46 16 78 10 8B 76 3C FF Block 55
00006E00 : 46 3C 8B 46 14 88 04 FF 46 06 EB E5 8B 46 06 8B
00006E10 : 76 40 89 04 8B 46 3A 40 83 C4 36 5D C3 55 8B EC
00006E20 : 8B 7E 04 8B 4E 06 8B 46 08 FC F3 AA 5D C3 55 8B
00006E30 : EC 8B 56 04 B4 0A CD 21 5D C3 55 83 EC 02 8B EC
00006E40 : A1 08 25 8B 1E 0A 25 85 DB A3 0C 25 89 1E 0E 25
```

```
00006E50 : 75 08 B8 FF FF 83 C4 02 5D C3 8B 36 0C 25 33 C0
00006E60 : 89 04 A1 0E 25 89 44 02 33 C0 83 C4 02 5D C3 55
00006E70 : 83 EC 02 8B EC 33 C0 50 E8 07 00 8B E5 83 C4 02
00006E80 : 5D C3 55 83 EC 06 8B EC 8B 46 0A 85 C0 79 08 B8
00006E90 : FF FF 83 C4 06 5D C3 C7 06 08 25 00 00 C7 06 0A
00006EA0 : 25 00 00 C7 46 04 00 01 33 C0 50 BB 00 04 53 E8
00006EB0 : A2 EA 8B E5 85 C0 89 46 02 75 08 B8 FF FF 83 C4
00006EC0 : 06 5D C3 8B 46 02 8B 5E 04 A3 08 25 89 1E 0A 25
00006ED0 : 8B 46 0A 48 89 46 0A 85 C0 74 19 33 C0 50 BB 00
00006EE0 : 04 53 E8 6F EA 8B E5 85 C0 74 09 8B 46 04 01 06
00006EF0 : 0A 25 EB DC E8 43 FF 33 C0 83 C4 06 5D C3 55 83
00006F00 : EC 04 8B EC A1 0E 25 D1 E0 D1 E0 33 DB 93 83 C4
00006F10 : 04 5D C3 55 83 EC 08 8B EC 8B 46 0C 33 DB 53 50
00006F20 : 89 46 04 89 5E 06 E8 07 00 8B E5 83 C4 08 5D C3
00006F30 : 55 83 EC 10 8B EC 8B 46 16 8B 5E 14 33 C9 33 D2
00006F40 : E8 10 EF 7F 07 33 C0 83 C4 10 5D C3 8B 46 14 05
00006F50 : 04 00 8B 5E 16 83 D3 00 2D 01 00 83 DB 00 89 46
00006F60 : 00 8B C3 8B 5E 00 33 C9 BA 04 00 E8 A0 04 BE 0C
00006F70 : 25 8B 0C 89 46 0E 89 4E 06 89 5E 0C 89 76 08 83
00006F80 : 7E 06 00 74 6E 8B 76 06 8B 44 02 33 DB 89 46 00
00006F90 : 8B C3 89 5E 02 8B 5E 00 8B 4E 0E 8B 56 0C E8 B2
00006FA0 : EE 7C 41 3B C1 75 02 3B DA 75 09 8B 04 8B 76 08
00006FB0 : 89 04 EB 18 8B 76 06 8B 44 02 33 DB 2B 46 0C 1B
00006FC0 : 5E 0E 89 44 02 D1 E0 D1 E0 01 46 06 A1 0E 25 33
00006FD0 : DB 2B 46 0C 1B 5E 0E 8B 5E 06 A3 0E 25 8B C3 83
00006FE0 : C4 10 5D C3 8B 46 06 8B F0 8B 1C 89 46 08 89 5E
00006FF0 : 06 EB 8C B9 02 00 8B 46 0E 8B 5E 0C D1 E3 D1 D0

Block 56
00007000 : E2 FA 50 53 E8 4D E9 8B E5 89 46 0A 85 C0 74 40
00007010 : 83 3E 0A 25 00 75 0C 8B 5E 0C A3 08 25 89 1E 0A
00007020 : 25 EB 25 A1 0A 25 D1 E0 D1 E0 8B 1E 08 25 03 D8
00007030 : 8B 46 0A 3B C3 89 5E 06 75 0E A1 0A 25 33 DB 03
00007040 : 46 0C 13 5E 0E A3 0A 25 8B 46 0A 83 C4 10 5D C3
00007050 : 33 C0 83 C4 10 5D C3 55 83 EC 08 8B EC 8B 46 0E
00007060 : 33 DB 53 50 FF 76 0C 89 46 04 89 5E 06 E8 07 00
00007070 : 8B E5 83 C4 08 5D C3 55 83 EC 14 8B EC 8B 46 1C
00007080 : 8B 5E 1A 33 C9 33 D2 E8 C9 ED 7F 08 B8 FF FF 83
00007090 : C4 14 5D C3 8B 46 18 8B 5E 1A 83 C3 04 8B 4E 1C
000070A0 : 83 D1 00 83 EB 01 83 D9 00 89 46 0C 8B C1 33 C9
000070B0 : BA 04 00 E8 58 03 89 5E 10 D1 E3 D1 E3 8B 4E 0C
000070C0 : 03 CB 8B 1E 0E 25 33 D2 03 5E 10 13 D0 BE 0C 25
000070D0 : 8B 14 89 46 12 89 4E 0E 89 56 04 89 1E 0E 25 89
000070E0 : 76 08 8B 46 04 85 C0 75 03 E9 F0 00 8B F0 8B 5C
000070F0 : 02 D1 E3 D1 E3 03 D8 8B 4E 0E 3B C8 89 5E 06 73
00007100 : 19 8B 76 0C 89 04 8B 46 10 89 44 02 8B C6 8B 76
00007110 : 08 89 04 33 C0 83 C4 14 5D C3 8B 46 04 3B 46 0E
00007120 : 75 29 8B F0 8B 1C 8B 7E 0C 89 1D 8B 44 02 33 DB
00007130 : 8B 4E 10 03 C8 8B 56 12 13 D3 89 4D 02 8B C7 8B
00007140 : 76 08 89 04 33 C0 83 C4 14 5D C3 8B 46 0C 3B 46
00007150 : 06 73 16 A1 0E 25 33 DB 2B 46 10 1B 5E 12 A3 0E
00007160 : 25 B8 FF FF 83 C4 14 5D C3 8B 46 0C 3B 46 06 75
00007170 : 55 8B 76 04 8B 04 85 C0 74 1D 8B 5E 0E 3B D8 76
00007180 : 16 A1 0E 25 33 DB 2B 46 10 1B 5E 12 A3 0E 25 B8
00007190 : FF FF 83 C4 14 5D C3 8B 76 04 8B 44 02 33 DB 03
000071A0 : 46 10 13 5E 12 89 44 02 8B 04 85 C0 74 11 8B 5E
000071B0 : 0E 3B D8 75 0A 8B 47 02 01 44 02 8B 07 89 04 33
```

```
000071C0 : C0 83 C4 14 5D C3 8B 46 04 8B 5E 06 8B F0 8B 0C
000071D0 : 89 46 08 89 4E 04 89 5E 0A E9 06 FF 8B 46 0C 8B
000071E0 : 76 08 89 04 33 DB 8B F0 89 1C 8B 46 10 89 44 02
000071F0 : 8B C3 83 C4 14 5D C3 55 83 EC 04 8B EC 83 7E 08
```

Block 57
```
00007200 : FF 75 08 B8 FF FF 83 C4 04 5D C3 8B 76 0A 8A 44
00007210 : 08 30 E4 A9 01 00 89 46 00 74 05 25 30 00 74 08
00007220 : B8 FF FF 83 C4 04 5D C3 8B 76 0A 8A 44 08 30 E4
00007230 : 25 04 00 74 17 8B 46 08 88 44 0C 8B DE 83 C3 0C
00007240 : 89 1C C7 44 02 01 00 83 C4 04 5D C3 8B 7E 0A 8B
00007250 : 35 4E 8A 04 30 E4 3B 46 08 74 08 B8 FF FF 83 C4
00007260 : 04 5D C3 8B 76 0A FF 0C FF 44 02 8B 46 08 83 C4
00007270 : 04 5D C3 55 83 EC 06 8B EC 8B 76 0A FF 46 0A 8A
00007280 : 04 30 E4 85 C0 89 46 04 74 29 8B 1E 6E 23 4B 85
00007290 : DB 89 1E 6E 23 78 0E 8B 36 6A 23 FF 06 6A 23 88
000072A0 : 04 30 E4 EB D4 B8 6A 23 50 FF 76 04 E8 E9 E1 8B
000072B0 : E5 EB C6 A1 6E 23 48 85 C0 A3 6E 23 78 10 8B 36
000072C0 : 6A 23 FF 06 6A 23 B0 0A 88 04 30 E4 EB 0D B8 6A
000072D0 : 23 50 B8 0A 00 50 E8 BF E1 8B E5 83 C4 06 5D C3
000072E0 : 55 83 EC 08 8B EC C7 46 06 00 00 8B 76 0C FF 46
000072F0 : 0C 8A 04 30 E4 85 C0 89 46 04 74 28 8B 76 0E 8B
00007300 : 5C 04 4B 89 5C 04 85 DB 78 0A 8B 1C FF 04 88 07
00007310 : 30 E4 EB 0B FF 76 0E FF 76 04 E8 7B E1 8B E5 89
00007320 : 46 06 EB C7 8B 46 06 83 C4 08 5D C3 55 83 EC 04
00007330 : 8B EC 89 46 00 0B C3 74 5F 89 4E 02 0B CA 74 54
00007340 : 8B 46 00 8B 4E 02 8B F0 85 F6 79 07 F7 D0 F7 DB
00007350 : 1D FF FF 33 F1 89 76 00 85 C9 79 07 F7 D1 F7 DA
00007360 : 83 D9 FF BE 20 00 89 76 02 33 F6 33 FF D1 EE D1
00007370 : DF D1 D8 D1 DB 73 04 03 FA 13 F1 FF 4E 02 75 ED
00007380 : D1 E8 D1 DB 8B 76 00 85 F6 79 0D F7 D0 F7 DB 1D
00007390 : FF FF EB 04 33 C0 33 DB 83 C4 04 5D C3 55 8B EC
000073A0 : 8A 66 04 8A 46 08 8B 56 06 CD 21 B4 00 5D C3 55
000073B0 : 83 EC 02 8B EC 8B 76 06 8A 44 08 30 E4 25 04 00
000073C0 : 74 07 33 C0 83 C4 02 5D C3 8B 76 06 83 7C 0A 00
000073D0 : 74 15 8A 44 08 30 E4 25 08 00 75 0B FF 74 0A FF
000073E0 : 74 06 E8 72 FC 8B E5 8B 46 06 05 0C 00 8B 76 06
000073F0 : 89 44 06 8A 44 08 30 E4 0D 04 00 88 44 08 33 C0
```

Block 58
```
00007400 : 89 44 0A 89 44 04 89 44 02 83 C4 02 5D C3 55 83
00007410 : EC 04 8B EC 89 4E 00 0B CA 75 07 33 C0 33 DB E9
00007420 : 9A 00 89 46 02 0B C3 75 07 33 C9 33 D2 E9 8C 00
00007430 : 8B 4E 00 8B 46 02 8B F0 85 F6 79 12 F7 D0 F7 DB
00007440 : 1D FF FF 79 09 33 C0 33 C9 33 D2 EB 6F 90 33 F1
00007450 : 89 76 00 33 F6 85 C9 79 07 F7 D1 F7 DA 83 D9 FF
00007460 : 75 1D 85 D2 78 19 BF 20 00 D1 E3 D1 D0 D1 D6 3B
00007470 : F2 72 03 2B F2 43 4F 75 F0 33 C9 8B D6 EB 21 BF
00007480 : 10 00 D1 E3 D1 D0 D1 D6 3B F1 72 0B 75 04 3B C2
00007490 : 72 05 2B C2 1B F1 43 4F 75 E8 8B CE 8B D0 33 C0
000074A0 : F7 46 00 00 80 74 07 F7 D0 F7 DB 1D FF FF F7 46
000074B0 : 02 00 80 74 07 F7 D1 F7 DA 83 D9 FF 83 C4 04 5D
000074C0 : C3 55 83 EC 28 8B EC C7 46 00 00 00 C7 46 0C 00
000074D0 : 00 8B 76 2C 8B 44 06 85 C0 79 05 81 4E 00 00 80
000074E0 : 25 FF 7F 75 13 8B F8 0B 7C 04 75 0C 0B 7C 02 75
000074F0 : 07 0B 3C 75 03 EB 7D 90 B1 04 D3 E8 2D FE 03 89
00007500 : 46 0E 8B 0C 8B 5C 02 8B 44 04 8B 74 06 33 D2 BF
```

```
00007510 : 05 00 D1 EE D1 D8 D1 DB D1 D9 D1 DA 4F 75 F3 0D
00007520 : 00 80 89 46 04 89 5E 06 89 4E 08 89 56 0A C7 46
00007530 : 0C 00 00 8B 76 0E 8B CE 85 F6 74 69 79 10 83 C6
00007540 : 03 78 13 BE 01 00 E8 31 03 FF 46 0E EB E5 E8 A0
00007550 : 02 FF 46 0C EB 0F BE 04 00 01 76 0E E8 1B 03 E8
00007560 : FA 02 FF 4E 0C F7 46 04 00 80 75 C7 FF 4E 0E E8
00007570 : B3 02 EB F1 33 F6 81 4E 00 00 40 33 C9 F7 46 00
00007580 : 00 40 75 21 8B 46 04 0B 46 06 75 08 8B 46 08 0B
00007590 : 46 0A 74 11 E8 C5 02 85 C9 75 0A 83 FE 01 75 05
000075A0 : FF 4E 0C EB EF 80 C1 30 88 4A 14 46 83 FE 14 7C
000075B0 : CA C7 46 10 01 00 8B 46 30 8B 76 2E 85 C0 74 0B
000075C0 : B9 01 00 8B 46 0C 48 03 F0 78 2D B9 14 00 83 FE
000075D0 : 12 7D 25 8B CE 8A 42 15 04 05 3C 3A 7C 1A C6 42
000075E0 : 15 30 FE 42 14 8A 42 14 4E 79 EF FF 46 0C FF 4E
000075F0 : 10 83 7E 30 00 74 01 41 8B 7E 36 8B 76 10 33 DB

Block 59
00007600 : 8A 42 14 88 05 43 47 3B D9 7D 11 46 83 FE 14 7C
00007610 : EF B0 30 88 05 47 43 3B 5E 2E 7C F7 33 C0 F7 46
00007620 : 00 00 80 74 08 F7 46 00 00 40 75 01 48 8B 76 34
00007630 : 89 04 8B 46 0C 8B 76 32 89 04 F7 46 00 00 40 74
00007640 : 02 33 C9 8B C1 83 C4 28 5D C3 55 83 EC 28 8B EC
00007650 : 33 C0 89 46 00 89 46 0C 89 46 02 89 46 0E 89 46
00007660 : 04 89 46 06 89 46 08 89 46 0A E8 31 02 3C 30 75
00007670 : 07 81 4E 00 00 20 EB F2 3C 2D 75 08 81 4E 00 00
00007680 : 80 E8 1A 02 3C 30 7C 38 3C 39 7F 34 81 4E 00 00
00007690 : 20 89 46 10 8B 46 02 29 46 0C F7 46 04 00 F0 74
000076A0 : 05 FF 46 0C EB DB E8 B3 01 8B 46 10 25 0F 00 01
000076B0 : 46 0A 83 56 08 00 83 56 06 00 83 56 04 00 EB C1
000076C0 : 3C 2E 75 0C 8B 46 02 85 C0 75 42 FF 46 02 EB B1
000076D0 : 3C 45 74 04 3C 65 75 35 E8 C3 01 3C 2B 74 09 3C
000076E0 : 2D 75 08 81 4E 00 00 10 E8 B3 01 3C 30 7C 1E 3C
000076F0 : 39 7F 1A 24 0F 89 46 10 8B 46 0E E8 48 01 03 46
00007700 : 10 89 46 0E 3D FF 0F 72 DF D1 E8 EB F4 F7 46 00
00007710 : 00 20 75 0F 33 C0 8B 76 32 89 04 8B 46 12 83 C4
00007720 : 28 5D C3 8B 46 0E F7 46 00 00 10 74 02 F7 D8 01
00007730 : 46 0C 8B 46 04 0B 46 06 0B 46 08 0B 46 0A 75 03
00007740 : E9 80 00 C7 46 0E 3E 04 F7 46 04 00 80 75 08 E8
00007750 : D3 00 FF 4E 0E EB F1 8B 46 0C 85 C0 74 1B 78 11
00007760 : BE 04 00 01 76 0E E8 11 01 E8 F0 00 FF 4E 0C EB
00007770 : D7 E8 7D 00 FF 46 0C EB CF 8B 46 0E 85 C0 78 41
00007780 : 3D FF 07 7F 37 B1 04 D3 E0 89 46 0E 8B 46 04 8B
00007790 : 5E 06 8B 4E 08 8B 56 0A 8A D6 8A F1 8A CD 8A EB
000077A0 : 8A DF 8A F8 8A C4 BF 03 00 D1 E8 D1 DB D1 D9 D1
000077B0 : DA 4F 75 F5 25 0F 00 0B 46 0E EB 0D B8 F0 7F EB
000077C0 : 02 33 C0 33 DB 33 C9 33 D2 8B 76 34 F7 46 00 00
000077D0 : 80 74 03 0D 00 80 89 44 06 89 5C 04 89 4C 02 89
000077E0 : 14 B8 01 00 8B 76 32 89 04 8B 46 12 83 C4 28 5D
000077F0 : C3 BE 40 00 33 C0 8B 5E 04 8B 4E 06 8B 56 08 8B Block 60
00007800 : 7E 0A D1 E7 D1 D2 D1 D1 D1 D3 D1 D0 3D 0A 00 72
00007810 : 04 2D 0A 00 47 4E 75 EA 89 5E 04 89 4E 06 89 56
00007820 : 08 89 7E 0A C3 8B 46 0A D1 E0 89 46 0A 8B 46 08
00007830 : D1 D0 89 46 08 8B 46 06 D1 D0 89 46 06 8B 46 04
00007840 : D1 D0 89 46 04 C3 8B D8 33 C9 D1 E0 D1 D1 D1 E0
00007850 : D1 D1 03 C3 83 D1 00 D1 E0 D1 D1 C3 33 C9 BF 06
```

```
00007860 : 00 8B 43 04 89 4B 04 E8 DC FF 8B 5B 04 03 C3 83
00007870 : D1 00 89 43 04 4F 4F 79 E8 C3 8B 46 04 8B 5E 06
00007880 : 8B 4E 08 8B 56 0A D1 E8 D1 DB D1 D9 D1 DA 4E 75
00007890 : F5 89 46 04 89 5E 06 89 4E 08 89 56 0A C3 83 7E
000078A0 : 2C 00 74 09 8B 46 2C C7 46 2C 00 00 C3 FF 56 30
000078B0 : 89 46 12 FF 4E 2E 75 06 81 4E 00 00 08 C3 F7 46
000078C0 : 00 00 08 74 03 B8 FF FF C3 F7 06 5E 28 01 00 75
000078D0 : 08 E8 1B 00 73 03 E9 32 00 55 8B EC 50 53 51 52
000078E0 : 9B DD 46 F8 9B D9 5E F8 9B 5B 58 8B E5 5D C3 C7
000078F0 : 06 60 28 FF FF DD 3E 60 28 81 3E 60 28 FF FF F9
00007900 : 74 08 FF 06 5E 28 9B DB E3 F8 C3 56 57 8B F8 81
00007910 : E7 FF 7F 75 07 33 C0 33 DB 5F 5E C3 50 E8 7E 00
00007920 : 5F E8 03 00 5F 5E C3 81 E7 00 80 57 83 EE 08 85
00007930 : C0 75 0D 83 EE 10 8B C3 85 C0 75 02 5F C3 33 DB
00007940 : A9 00 FF 74 1D 46 D1 E8 D1 DB D1 DF A9 00 FF 75
00007950 : F4 85 FF 79 0D 83 C3 01 15 00 00 EB E3 4E D1 E3
00007960 : D1 D0 A9 80 00 74 F6 5F 83 C6 7F 7E 14 81 FE FF
00007970 : 00 7D 1B 51 25 7F 00 B1 07 D3 E6 0B F7 0B C6 59
00007980 : C3 B8 01 00 50 E8 48 00 58 33 C0 33 DB C3 B8 02
00007990 : 00 50 E8 3B 00 58 B8 80 7F 0B C7 33 DB C3 51 8B
000079A0 : F0 81 E6 F0 7F B1 04 D3 EE 81 EE FF 03 59 8A E0
000079B0 : 8A C7 8A FB 8A DD 8A E9 8A CE 8A F2 32 D2 BF 03
000079C0 : 00 D1 E2 D1 D1 D1 D3 D1 D0 4F 75 F5 0D 00 80 C3
000079D0 : C3 00 FF FF 00 00 00 00 00 00 00 00 00 00 00 00
000079E0 : 00 00 4C 61 74 74 69 63 65 20 43 20 32 2E 31 30
000079F0 : 00 00 00 00 00 00 00 00 C0 28 00 00 00 00 00 00

Block 61
00007A00 : 00 00 00 00 00 00 00 00 00 00 00 00 00 00 00 00
00007A10 : 00 00 00 00 00 00 00 00 00 00 00 00 00 00 00 00
00007A20 : 00 00 00 00 00 00 00 00 00 00 00 00 00 00 00 00
00007A30 : 00 00 00 00 00 00 00 00 00 00 00 00 00 00 00 00
00007A40 : 00 00 00 00 00 00 00 00 00 00 00 00 00 00 00 00
00007A50 : 00 00 49 6E 76 61 6C 69 64 20 73 74 61 63 6B 20
00007A60 : 73 69 7A 65 0D 0A 24 49 6E 76 61 6C 69 64 20 49
00007A70 : 2F 4F 20 72 65 64 69 72 65 63 74 69 6F 6E 0D 0A
00007A80 : 24 49 6E 73 75 66 66 69 63 69 65 6E 74 20 6D 65
00007A90 : 6D 6F 72 79 0D 0A 24 2A 2A 2A 20 53 54 41 43 4B
00007AA0 : 20 4F 56 45 52 46 4C 4F 57 20 2A 2A 2A 0D 0A 24
00007AB0 : 64 69 73 6B 2E 33 38 34 00 72 61 6D 2E 33 38 34
00007AC0 : 00 00 00 00 00 00 00 00 00 00 48 6F 75 67 68 74
00007AD0 : 6F 6E 20 4D 69 66 66 6C 69 6E 20 53 70 65 6C 6C
00007AE0 : 69 6E 67 20 56 65 72 69 66 69 65 72 2F 43 6F 72
00007AF0 : 72 65 63 74 6F 72 2E 0A 00 0A 0A 44 65 6D 6F 6E
00007B00 : 73 74 72 61 74 69 6F 6E 20 50 72 6F 67 72 61 6D
00007B10 : 20 2D 20 53 69 6E 67 6C 65 20 57 6F 72 64 20 50
00007B20 : 72 6F 63 65 73 73 69 6E 67 2E 0A 0A 00 55 6E 61
00007B30 : 62 6C 65 20 74 6F 20 69 6E 69 74 69 61 6C 69 7A
00007B40 : 65 20 64 69 63 74 69 6F 6E 61 72 79 2E 2E 2E 0A
00007B50 : 00 50 6C 65 61 73 65 20 49 6E 73 65 72 74 20 44
00007B60 : 69 63 74 69 6F 6E 61 72 79 20 44 69 73 6B 65 74
00007B70 : 74 65 2E 0A 00 54 6F 75 63 68 20 61 6E 79 20 6B
00007B80 : 65 79 20 77 68 65 6E 20 63 6F 6D 70 6C 65 74 65
00007B90 : 2E 0A 0A 00 50 6C 65 61 73 65 20 65 6E 74 65 72
00007BA0 : 20 74 68 65 20 77 6F 72 64 20 74 6F 20 56 45 52
00007BB0 : 49 46 59 2F 43 4F 52 52 45 43 54 20 28 25 30 32
00007BC0 : 64 29 20 3D 3D 3E 20 00 25 73 00 0A 0A 00 61 75
```

```
00007BD0 : 74 6F 00 41 75 74 6F 6D 61 74 69 63 20 64 65 6C
00007BE0 : 65 74 69 6F 6E 20 69 73 20 4F 4E 0A 54 75 72 6E
00007BF0 : 20 69 74 20 6F 66 66 00 41 75 74 6F 6D 61 74 69
```

Block 62
```
00007C00 : 63 20 64 65 6C 65 74 69 6F 6E 20 69 73 20 4F 46
00007C10 : 46 0A 54 75 72 6E 20 69 74 20 6F 6E 00 00 68 79
00007C20 : 70 68 65 6E 73 00 48 79 70 68 65 6E 61 74 69 6F
00007C30 : 6E 20 69 73 20 4F 4E 0A 54 75 72 6E 20 69 74 20
00007C40 : 6F 66 66 3F 00 48 79 70 68 65 6E 61 74 69 6F 6E
00007C50 : 20 69 73 20 4F 46 46 0A 54 75 72 6E 20 69 74 20
00007C60 : 6F 6E 3F 00 64 75 6D 70 00 55 73 65 72 20 44 69
00007C70 : 63 74 69 6F 6E 61 72 79 20 69 73 20 65 6D 70 74
00007C80 : 79 2E 0A 0A 00 4E 75 6D 62 65 72 20 6F 66 20 77
00007C90 : 6F 72 64 73 20 74 6F 20 70 72 69 6E 74 3A 20 28
00007CA0 : 31 20 2D 20 25 64 29 20 20 00 25 64 00 0A 4F 70
00007CB0 : 74 69 6F 6E 20 61 62 6F 72 74 65 64 2E 0A 0A 00
00007CC0 : 0A 44 6F 20 79 6F 75 20 77 61 6E 74 20 74 6F 20
00007CD0 : 73 6F 72 74 20 74 68 65 20 6C 69 73 74 00 43 6F
00007CE0 : 6E 74 65 6E 74 73 20 6F 66 20 55 73 65 72 20 44
00007CF0 : 69 63 74 69 6F 6E 61 72 79 20 69 6E 20 73 6F 72
00007D00 : 74 65 64 20 6F 72 64 65 72 3A 0A 0A 00 43 6F 6E
00007D10 : 74 65 6E 74 73 20 6F 66 20 55 73 65 72 20 44 69
00007D20 : 63 74 69 6F 6E 61 72 79 3A 0A 0A 00 25 34 64 20
00007D30 : 3A 20 27 25 73 27 0A 00 25 34 64 20 3A 20 27 25
00007D40 : 73 0A 00 57 6F 75 6C 64 20 79 6F 75 20 6C 69 6B
00007D50 : 65 20 74 6F 20 64 65 6C 65 74 65 20 74 68 69 73
00007D60 : 20 77 6F 72 64 00 0A 55 73 65 72 20 44 69 63 74
00007D70 : 69 6F 6E 61 72 79 20 53 74 61 74 75 73 20 53 75
00007D80 : 6D 6D 61 72 79 3A 0A 00 2D 2D 2D 2D 2D 2D 2D 2D
00007D90 : 2D 2D 2D 2D 2D 2D 2D 2D 2D 2D 2D 2D 2D 2D 2D 2D
00007DA0 : 2D 2D 2D 2D 2D 2D 0A 00 25 36 64 20 77 6F 72 64
00007DB0 : 73 20 64 65 66 69 6E 65 64 2E 0A 00 25 36 64 20
00007DC0 : 77 6F 72 64 73 20 61 76 61 69 6C 61 62 6C 65 2E
00007DD0 : 0A 00 25 36 64 20 62 79 74 65 73 20 75 6E 75 73
00007DE0 : 65 64 2E 0A 0A 00 73 74 6F 70 00 57 6F 72 64 20
00007DF0 : 66 6F 75 6E 64 20 69 6E 20 75 73 65 72 20 64 69
```

Block 63
```
00007E00 : 63 74 69 6F 6E 61 72 79 3A 0A 00 57 6F 72 64 20
00007E10 : 69 73 20 63 6F 72 72 65 63 74 6C 79 20 73 70 65
00007E20 : 6C 6C 65 64 3A 0A 00 0A 00 44 65 6C 65 74 65 20
00007E30 : 77 6F 72 64 20 66 72 6F 6D 20 55 73 65 72 20 44
00007E40 : 69 63 74 69 6F 6E 61 72 79 00 44 45 4C 45 54 45
00007E50 : 20 55 4E 53 55 43 43 45 53 53 46 55 4C 21 20 28
00007E60 : 52 65 61 73 6F 6E 20 25 64 29 0A 0A 00 44 45 4C
00007E70 : 45 54 45 44 0A 0A 00 54 68 65 20 77 6F 72 64 20
00007E80 : 27 25 73 27 20 69 73 20 73 70 65 6C 6C 65 64 20
00007E90 : 69 6E 63 6F 72 72 65 63 74 6C 79 21 0A 0A 00 57
00007EA0 : 6F 75 6C 64 20 79 6F 75 20 6C 69 6B 65 20 74 6F
00007EB0 : 20 63 6F 72 72 65 63 74 20 69 74 2C 0A 00 61 64
00007EC0 : 64 20 69 74 20 74 6F 20 74 68 65 20 75 73 65 72
00007ED0 : 20 64 69 63 74 69 6F 6E 61 72 79 2C 0A 00 6F 72
00007EE0 : 20 74 72 79 20 61 6E 6F 74 68 65 72 20 28 43 2F
00007EF0 : 41 2F 54 29 20 3F 20 00 41 44 44 20 54 4F 20 55
00007F00 : 53 45 52 20 44 49 43 54 49 4F 4E 41 52 59 0A 0A
00007F10 : 00 4E 4F 54 20 41 44 44 45 44 20 28 52 65 61 73
```

```
00007F20 :  6F 6E 20 25 64 29 0A 0A 00 41 44 44 45 44 0A 0A
00007F30 :  00 43 4F 52 52 45 43 54 20 49 54 0A 0A 00 0A 44
00007F40 :  6F 20 79 6F 75 20 77 61 6E 74 20 6D 6F 72 65 20
00007F50 :  61 6C 74 65 72 6E 61 74 69 76 65 73 00 54 52 59
00007F60 :  20 41 4E 4F 54 48 45 52 0A 0A 00 20 28 59 2F 4E
00007F70 :  29 20 3F 20 00 59 45 53 0A 0A 00 4E 4F 0A 0A 00
00007F80 :  20 57 6F 72 64 20 20 20 20 2D 2D 3E 20 25 73
00007F90 :  0A 20 28 00 6E 6F 74 20 75 73 75 61 6C 6C 79 20
00007FA0 :  63 61 70 69 74 61 6C 69 7A 65 64 00 63 61 70 69
00007FB0 :  74 61 6C 69 7A 65 64 00 61 6C 6C 20 75 70 70 65
00007FC0 :  72 63 61 73 65 00 63 61 70 69 74 61 6C 69 7A 65
00007FD0 :  64 20 61 74 20 62 65 67 69 6E 6E 69 6E 67 20 61
00007FE0 :  6E 64 20 61 66 74 65 72 20 68 79 70 68 65 6E 00
00007FF0 :  63 61 70 69 74 61 6C 69 7A 65 64 20 61 66 74 65
```

Block 64
```
00008000 :  72 20 68 79 70 68 65 6E 00 6E 6F 6E 2D 73 74 61
00008010 :  6E 64 61 72 64 20 63 61 70 69 74 61 6C 69 7A 61
00008020 :  74 69 6F 6E 00 29 0A 00 00 00 64 00 F4 01 58 02
00008030 :  C8 00 2C 01 90 01 BC 02 64 00 C8 00 2C 01 90 01
00008040 :  F4 01 58 02 BC 02 00 00 00 00 00 00 00 00 00 00
00008050 :  00 00 00 00 00 00 00 00 00 00 00 00 00 00 00 00
00008060 :  00 00 00 00 00 00 00 00 00 00 00 00 00 00 00 00
00008070 :  00 00 00 00 00 00 00 00 00 00 00 00 00 00 00 00
00008080 :  00 00 00 00 00 00 00 00 00 00 00 00 00 00 00 00
00008090 :  00 00 00 00 00 00 00 00 00 00 00 00 00 00 00 00
000080A0 :  00 00 00 00 00 00 00 00 00 00 00 00 00 00 00 00
000080B0 :  00 00 00 00 00 00 00 00 00 00 00 00 00 00 00 00
000080C0 :  00 00 00 00 00 00 00 00 00 00 00 00 00 00 00 00
000080D0 :  00 00 00 00 00 00 00 00 00 00 00 00 00 00 00 00
000080E0 :  00 00 00 00 00 00 00 00 00 00 00 00 00 00 00 00
000080F0 :  00 00 00 00 00 00 00 00 00 00 00 00 00 00 00 00
00008100 :  00 00 00 00 00 00 00 00 00 00 00 00 00 00 00 00
00008110 :  00 00 00 00 00 00 00 00 00 00 00 00 00 00 00 00
00008120 :  00 00 00 00 00 00 00 00 00 00 00 00 00 00 00 00
00008130 :  00 00 00 00 00 00 00 00 00 00 00 00 00 00 00 00
00008140 :  00 00 00 00 00 00 00 00 00 00 00 00 00 00 00 00
00008150 :  00 00 00 00 00 00 00 00 00 00 00 00 00 00 00 00
00008160 :  00 00 00 00 00 00 00 00 00 00 00 00 00 00 00 00
00008170 :  00 00 00 00 00 00 00 00 00 00 00 00 00 00 00 00
00008180 :  00 00 00 00 00 00 00 00 00 00 00 00 00 00 00 00
00008190 :  00 00 00 00 00 00 00 00 00 00 00 00 00 00 00 00
000081A0 :  00 00 00 00 00 00 00 00 00 00 00 00 00 00 00 00
000081B0 :  00 00 00 00 00 00 00 00 00 00 00 00 00 00 00 00
000081C0 :  00 00 00 00 00 00 00 00 00 00 00 00 00 00 00 00
000081D0 :  00 00 00 00 00 00 00 00 00 00 00 00 00 00 00 00
000081E0 :  00 00 00 00 00 00 00 00 00 00 00 00 00 00 00 00
000081F0 :  00 00 00 00 00 00 00 00 00 00 00 00 00 00 00 00
```

Block 65
```
00008200 :  00 00 00 00 00 00 00 00 00 00 00 00 00 00 00 00
00008210 :  00 00 00 00 00 00 00 00 00 00 00 00 00 00 00 00
00008220 :  00 00 00 00 00 00 00 00 00 00 00 00 00 00 00 00
00008230 :  00 00 00 00 00 00 00 00 00 00 00 00 00 00 00 00
00008240 :  00 00 00 00 00 00 00 00 00 00 00 00 00 00 00 00
00008250 :  00 00 00 00 00 00 00 00 00 00 00 00 00 00 00 00
00008260 :  00 00 00 00 00 00 00 00 00 00 00 00 00 00 00 00
```

```
00008270 : 00 00 00 00 00 00 00 00 00 00 00 00 00 00 00 00
00008280 : 00 00 00 00 00 00 00 00 00 00 00 00 00 00 00 00
00008290 : 00 00 00 00 00 00 00 00 00 00 00 00 00 00 00 00
000082A0 : 00 00 00 00 00 00 00 00 00 00 00 00 00 00 00 00
000082B0 : 00 00 00 00 00 00 00 00 00 00 00 00 00 00 00 00
000082C0 : 00 00 00 00 00 00 00 00 00 00 00 00 00 00 00 00
000082D0 : 00 00 00 00 00 00 00 00 00 00 00 00 00 00 00 00
000082E0 : 00 00 00 00 00 00 00 00 00 00 00 00 00 00 00 00
000082F0 : 00 00 00 00 00 00 00 00 00 00 00 00 00 00 00 00
00008300 : 00 00 00 00 00 00 00 00 00 00 00 00 00 00 00 00
00008310 : 00 00 00 00 00 00 00 00 00 00 00 00 00 00 00 00
00008320 : 00 00 00 00 00 00 00 00 00 00 00 00 00 00 00 00
00008330 : 00 00 00 00 00 00 00 00 00 00 00 00 00 00 00 00
00008340 : 00 00 00 00 00 00 00 00 00 00 00 00 00 00 00 00
00008350 : 00 00 00 00 00 00 00 00 00 00 00 00 00 00 00 00
00008360 : 00 00 00 00 00 00 00 00 00 00 00 00 00 00 00 00
00008370 : 00 00 00 00 00 00 00 00 00 00 00 00 00 00 00 00
00008380 : 00 00 00 00 00 00 00 00 00 00 00 00 00 00 00 00
00008390 : 00 00 00 00 00 00 00 00 00 00 00 00 00 00 00 00
000083A0 : 00 00 00 00 00 00 00 00 00 00 00 00 00 00 00 00
000083B0 : 00 00 00 00 00 00 00 00 00 00 00 00 00 00 00 00
000083C0 : 00 00 00 00 00 00 00 00 00 00 00 00 00 00 00 00
000083D0 : 00 00 00 00 00 00 00 00 00 00 00 00 00 00 00 00
000083E0 : 00 00 00 00 00 00 00 00 00 00 00 00 00 00 00 00
000083F0 : 00 00 00 00 00 00 00 00 00 00 00 00 00 00 00 00

Block 66
00008400 : 00 00 00 00 00 00 00 00 00 00 00 00 00 00 00 00
00008410 : 00 00 00 00 00 00 00 00 00 00 00 00 00 00 00 00
00008420 : 00 00 00 00 00 00 00 00 00 00 00 00 00 00 00 00
00008430 : 00 00 00 00 00 00 00 00 00 00 00 00 00 00 00 00
00008440 : 00 00 00 00 00 00 00 00 00 00 00 00 00 00 00 00
00008450 : 00 00 00 00 00 00 00 00 00 00 00 00 00 00 00 00
00008460 : 00 00 00 00 00 00 00 00 00 00 00 00 00 00 00 00
00008470 : 00 00 00 00 00 00 00 00 00 00 00 00 00 00 00 00
00008480 : 00 00 00 00 00 00 00 00 00 00 00 00 00 00 00 00
00008490 : 00 00 00 00 00 00 00 00 00 00 00 00 00 00 00 00
000084A0 : 00 00 00 00 00 00 00 00 00 00 00 00 00 00 00 00
000084B0 : 00 00 00 00 00 00 00 00 00 00 00 00 00 00 00 00
000084C0 : 00 00 00 00 00 00 00 00 00 00 00 00 00 00 00 00
000084D0 : 00 00 00 00 00 00 00 00 00 00 00 00 00 00 00 00
000084E0 : 00 00 00 00 00 00 00 00 00 00 00 00 00 00 00 00
000084F0 : 00 00 00 00 00 00 00 00 00 00 00 00 00 00 00 00
00008500 : 00 00 00 00 00 00 00 00 00 00 00 00 00 00 00 00
00008510 : 00 00 00 00 00 00 00 00 00 00 00 00 00 00 00 00
00008520 : 00 00 00 00 00 00 00 00 00 00 00 00 00 00 00 00
00008530 : 00 00 00 00 00 00 00 00 00 00 00 00 00 00 00 00
00008540 : 00 00 00 00 00 00 00 00 00 00 00 00 00 00 00 00
00008550 : 00 00 00 00 00 00 00 00 00 00 00 00 00 00 00 00
00008560 : 00 00 00 00 00 00 00 00 00 00 00 00 00 00 00 00
00008570 : 00 00 00 00 00 00 00 00 00 00 00 00 00 00 00 00
00008580 : 00 00 00 00 00 00 00 00 00 00 00 00 00 00 00 00
00008590 : 00 00 00 00 00 00 00 00 00 00 00 00 00 00 00 00
000085A0 : 00 00 00 00 00 00 00 00 00 00 00 00 00 00 00 00
000085B0 : 00 00 00 00 00 00 00 00 00 00 00 00 00 00 00 00
000085C0 : 00 00 00 00 00 00 00 00 00 00 00 00 00 00 00 00
```

```
000085D0 : 00 00 00 00 00 00 00 00 00 00 00 00 00 00 00 00
000085E0 : 00 00 00 00 00 00 00 00 00 00 00 00 00 00 00 00
000085F0 : 00 00 00 00 00 00 00 00 00 00 00 00 00 00 00 00

Block 67
00008600 : 00 00 00 00 00 00 00 00 00 00 00 00 00 00 00 00
00008610 : 00 00 00 00 00 00 00 00 00 00 00 00 00 00 00 00
00008620 : 00 00 00 00 00 00 00 00 00 00 00 00 00 00 00 00
00008630 : 00 00 00 00 00 00 00 00 00 00 00 00 00 00 00 00
00008640 : 00 00 00 00 00 00 00 00 00 00 00 00 00 00 00 00
00008650 : 00 00 00 00 00 00 00 00 00 00 00 00 00 00 00 00
00008660 : 00 00 00 00 00 00 00 00 00 00 00 00 00 00 00 00
00008670 : 00 00 00 00 00 00 00 00 00 00 00 00 00 00 00 00
00008680 : 00 00 00 00 00 00 00 00 00 00 00 00 00 00 00 00
00008690 : 00 00 00 00 00 00 00 00 00 00 00 00 00 00 00 00
000086A0 : 00 00 00 00 00 00 00 00 00 00 00 00 00 00 00 00
000086B0 : 00 00 00 00 00 00 00 00 00 00 00 00 00 00 00 00
000086C0 : 00 00 00 00 00 00 00 00 00 00 00 00 00 00 00 00
000086D0 : 00 00 00 00 00 00 00 00 00 00 00 00 00 00 00 00
000086E0 : 00 00 00 00 00 00 00 00 00 00 00 00 00 00 00 00
000086F0 : 00 00 00 00 00 00 00 00 00 00 00 00 00 00 00 00
00008700 : 00 00 00 00 00 00 00 00 00 00 00 00 00 00 00 00
00008710 : 00 00 00 00 00 00 00 00 00 00 00 00 00 00 00 00
00008720 : 00 00 00 00 00 00 00 00 00 00 00 00 00 00 00 00
00008730 : 00 00 00 00 00 00 00 00 00 00 00 00 00 00 00 00
00008740 : 00 00 00 00 00 00 00 00 00 00 00 00 00 00 00 00
00008750 : 00 00 00 00 00 00 00 00 00 00 00 00 00 00 00 00
00008760 : 00 00 00 00 00 00 00 00 00 00 00 00 00 00 00 00
00008770 : 00 00 00 00 00 00 00 00 00 00 00 00 00 00 00 00
00008780 : 00 00 00 00 00 00 00 00 00 00 00 00 00 00 00 00
00008790 : 00 00 00 00 00 00 00 00 00 00 00 00 00 00 00 00
000087A0 : 00 00 00 00 00 00 00 00 00 00 00 00 00 00 00 00
000087B0 : 00 00 00 00 00 00 00 00 00 00 00 00 00 00 00 00
000087C0 : 00 00 00 00 00 00 00 00 00 00 00 00 00 00 00 00
000087D0 : 00 00 00 00 00 00 00 00 00 00 00 00 00 00 00 00
000087E0 : 00 00 00 00 00 00 00 00 00 00 00 00 00 00 00 00
000087F0 : 00 00 00 00 00 00 00 00 00 00 00 00 00 00 00 00

Block 68
00008800 : 00 00 00 00 00 00 00 00 00 00 00 00 00 00 00 00
00008810 : 00 00 00 00 00 00 00 00 00 00 00 00 00 00 00 00
00008820 : 00 00 00 00 00 00 00 00 00 00 00 00 00 00 00 00
00008830 : 00 00 00 00 00 00 00 00 00 00 00 00 00 00 00 00
00008840 : 00 00 00 00 00 00 00 00 00 00 00 00 00 00 00 00
00008850 : 00 00 00 00 00 00 00 00 00 00 00 00 00 00 00 00
00008860 : 00 00 00 00 00 00 00 00 00 00 00 00 00 00 00 00
00008870 : 00 00 00 00 00 00 00 00 00 00 00 00 00 00 00 00
00008880 : 00 00 00 00 00 00 00 00 00 00 00 00 00 00 00 00
00008890 : 00 00 00 00 00 00 00 00 00 00 00 00 00 00 00 00
000088A0 : 00 00 00 00 00 00 00 00 00 00 00 00 00 00 00 00
000088B0 : 00 00 00 00 00 00 00 00 00 00 00 00 00 00 00 00
000088C0 : 00 00 00 00 00 00 00 00 00 00 00 00 00 00 00 00
000088D0 : 00 00 00 00 00 00 00 00 00 00 00 00 00 00 00 00
000088E0 : 00 00 00 00 00 00 00 00 00 00 00 00 00 00 00 00
000088F0 : 00 00 00 00 00 00 00 00 00 00 00 00 00 00 00 00
00008900 : 00 00 00 00 00 00 00 00 00 00 00 00 00 00 00 00
00008910 : 00 00 00 00 00 00 00 00 00 00 00 00 00 00 00 00
```

```
00008920 : 00 00 00 00 00 00 00 00 00 00 00 00 00 00 00 00
00008930 : 00 00 00 00 00 00 00 00 00 00 00 00 00 00 00 00
00008940 : 00 00 00 00 00 00 00 00 00 00 00 00 00 00 00 00
00008950 : 00 00 00 00 00 00 00 00 00 00 00 00 00 00 00 00
00008960 : 00 00 00 00 00 00 00 00 00 00 00 00 00 00 00 00
00008970 : 00 00 00 00 00 00 00 00 00 00 00 00 00 00 00 00
00008980 : 00 00 00 00 00 00 00 00 00 00 00 00 00 00 00 00
00008990 : 00 00 00 00 00 00 00 00 00 00 00 00 00 00 00 00
000089A0 : 00 00 00 00 00 00 00 00 00 00 00 00 00 00 00 00
000089B0 : 00 00 00 00 00 00 00 00 00 00 00 00 00 00 00 00
000089C0 : 00 00 00 00 00 00 00 00 00 00 00 00 00 00 00 00
000089D0 : 00 00 00 00 00 00 00 00 00 00 00 00 00 00 00 00
000089E0 : 00 00 00 00 00 00 00 00 00 00 00 00 00 00 00 00
000089F0 : 00 00 00 00 00 00 00 00 00 00 00 00 00 00 00 00

Block 69
00008A00 : 00 00 00 00 00 00 00 00 00 00 00 00 00 00 00 00
00008A10 : 00 00 00 00 00 00 00 00 00 00 00 00 00 00 00 00
00008A20 : 00 00 00 00 00 00 00 00 00 00 00 00 00 00 00 00
00008A30 : 00 00 00 00 00 00 00 00 00 00 00 00 00 00 00 00
00008A40 : 00 00 00 00 00 00 00 00 00 00 00 00 00 00 00 00
00008A50 : 00 00 00 00 00 00 00 00 00 00 00 00 00 00 00 00
00008A60 : 00 00 00 00 00 00 00 00 00 00 00 00 00 00 00 00
00008A70 : 00 00 00 00 00 00 00 00 00 00 00 00 00 00 00 00
00008A80 : 00 00 00 00 00 00 00 00 00 00 00 00 00 00 00 00
00008A90 : 00 00 00 00 00 00 00 00 00 00 00 00 00 00 00 00
00008AA0 : 00 00 00 00 00 00 00 00 00 00 00 00 00 00 00 00
00008AB0 : 00 00 00 00 00 00 00 00 00 00 00 00 00 00 00 00
00008AC0 : 00 00 00 00 00 00 00 00 00 00 00 00 00 00 00 00
00008AD0 : 00 00 00 00 00 00 00 00 00 00 00 00 00 00 00 00
00008AE0 : 00 00 00 00 00 00 00 00 00 00 00 00 00 00 00 00
00008AF0 : 00 00 00 00 00 00 00 00 00 00 00 00 00 00 00 00
00008B00 : 00 00 00 00 00 00 00 00 00 00 00 00 00 00 00 00
00008B10 : 00 00 00 00 00 00 00 00 00 00 00 00 00 00 00 00
00008B20 : 00 00 00 00 00 00 00 00 00 00 00 00 00 00 00 00
00008B30 : 00 00 00 00 00 00 00 00 00 00 00 00 00 00 00 00
00008B40 : 00 00 00 00 00 00 00 00 00 00 00 00 00 00 00 00
00008B50 : 00 00 00 00 00 00 00 00 00 00 00 00 00 00 00 00
00008B60 : 00 00 00 00 00 00 00 00 00 00 00 00 00 00 00 00
00008B70 : 00 00 00 00 00 00 00 00 00 00 00 00 00 00 00 00
00008B80 : 00 00 00 00 00 00 00 00 00 00 00 00 00 00 00 00
00008B90 : 00 00 00 00 00 00 00 00 00 00 00 00 00 00 00 00
00008BA0 : 00 00 00 00 00 00 00 00 00 00 00 00 00 00 00 00
00008BB0 : 00 00 00 00 00 00 00 00 00 00 00 00 00 00 00 00
00008BC0 : 00 00 00 00 00 00 00 00 00 00 00 00 00 00 00 00
00008BD0 : 00 00 00 00 00 00 00 00 00 00 00 00 00 00 00 00
00008BE0 : 00 00 00 00 00 00 00 00 00 00 00 00 00 00 00 00
00008BF0 : 00 00 00 00 00 00 00 00 00 00 00 00 00 00 00 00

Block 70
00008C00 : 00 00 00 00 00 00 00 00 00 00 00 00 00 00 00 00
00008C10 : 00 00 00 00 00 00 00 00 00 00 00 00 00 00 00 00
00008C20 : 00 00 00 00 00 00 00 00 00 00 00 00 00 00 00 00
00008C30 : 00 00 00 00 00 00 00 00 00 00 00 00 00 00 00 00
00008C40 : 00 00 00 00 00 00 00 00 00 00 00 00 00 00 00 00
00008C50 : 00 00 00 00 00 00 00 00 00 00 00 00 00 00 00 00
```

```
00008C60 : 00 00 00 00 00 00 00 00 00 00 00 00 00 00 00 00
00008C70 : 00 00 00 00 00 00 00 00 00 00 00 00 00 00 00 00
00008C80 : 00 00 00 00 00 00 00 00 00 00 00 00 00 00 00 00
00008C90 : 00 00 00 00 00 00 00 00 00 00 00 00 00 00 00 00
00008CA0 : 00 00 00 00 00 00 00 00 00 00 00 00 00 00 00 00
00008CB0 : 00 00 00 00 00 00 00 00 00 00 00 00 00 00 00 00
00008CC0 : 00 00 00 00 00 00 00 00 00 00 00 00 00 00 00 00
00008CD0 : 00 00 00 00 00 00 00 00 00 00 00 00 00 00 00 00
00008CE0 : 00 00 00 00 00 00 00 00 00 00 00 00 00 00 00 00
00008CF0 : 00 00 00 00 00 00 00 00 00 00 00 00 00 00 00 00
00008D00 : 00 00 00 00 00 00 00 00 00 00 00 00 00 00 00 00
00008D10 : 00 00 00 00 00 00 00 00 00 00 00 00 00 00 00 00
00008D20 : 00 00 00 00 00 00 00 00 00 00 00 00 00 00 00 00
00008D30 : 00 00 00 00 00 00 00 00 00 00 00 00 00 00 00 00
00008D40 : 00 00 00 00 00 00 00 00 00 00 00 00 00 00 00 00
00008D50 : 00 00 00 00 00 00 00 00 00 00 00 00 00 00 00 00
00008D60 : 00 00 00 00 00 00 00 00 00 00 00 00 00 00 00 00
00008D70 : 00 00 00 00 00 00 00 00 00 00 00 00 00 00 00 00
00008D80 : 00 00 00 00 00 00 00 00 00 00 00 00 00 00 00 00
00008D90 : 00 00 00 00 00 00 00 00 00 00 00 00 00 00 00 00
00008DA0 : 00 00 00 00 00 00 00 00 00 00 00 00 00 00 00 00
00008DB0 : 00 00 00 00 00 00 00 00 00 00 00 00 00 00 00 00
00008DC0 : 00 00 00 00 00 00 00 00 00 00 00 00 00 00 00 00
00008DD0 : 00 00 00 00 00 00 00 00 00 00 00 00 00 00 00 00
00008DE0 : 00 00 00 00 00 00 00 00 00 00 00 00 00 00 00 00
00008DF0 : 00 00 00 00 00 00 00 00 00 00 00 00 00 00 00 00

Block 71
00008E00 : 00 00 00 00 00 00 00 00 00 00 00 00 00 00 00 00
00008E10 : 00 00 00 00 00 00 00 00 00 00 00 00 00 00 00 00
00008E20 : 00 00 00 00 00 00 00 00 00 00 00 00 00 00 00 00
00008E30 : 00 00 00 00 00 00 00 00 00 00 00 00 00 00 00 00
00008E40 : 00 00 00 00 00 00 00 00 00 00 00 00 00 00 00 00
00008E50 : 00 00 00 00 00 00 00 00 00 00 00 00 00 00 00 00
00008E60 : 00 00 00 00 00 00 00 00 00 00 00 00 00 00 00 00
00008E70 : 00 00 00 00 00 00 00 00 00 00 00 00 00 00 00 00
00008E80 : 00 00 00 00 00 00 00 00 00 00 00 00 00 00 00 00
00008E90 : 00 00 00 00 00 00 00 00 00 00 00 00 00 00 00 00
00008EA0 : 00 00 00 00 00 00 00 00 00 00 00 00 00 00 00 00
00008EB0 : 00 00 00 00 00 00 00 00 00 00 00 00 00 00 00 00
00008EC0 : 00 00 00 00 00 00 00 00 00 00 00 00 00 00 00 00
00008ED0 : 00 00 00 00 00 00 00 00 00 00 00 00 00 00 00 00
00008EE0 : 00 00 00 00 00 00 00 00 00 00 00 00 00 00 00 00
00008EF0 : 00 00 00 00 00 00 00 00 00 00 00 00 00 00 00 00
00008F00 : 00 00 00 00 00 00 00 00 00 00 00 00 00 00 00 00
00008F10 : 00 00 00 00 00 00 00 00 00 00 00 00 00 00 00 00
00008F20 : 00 00 00 00 00 00 00 00 00 00 00 00 00 00 00 00
00008F30 : 00 00 00 00 00 00 00 00 00 00 00 00 00 00 00 00
00008F40 : 00 00 00 00 00 00 00 00 00 00 00 00 00 00 00 00
00008F50 : 00 00 00 00 00 00 00 00 00 00 00 00 00 00 00 00
00008F60 : 00 00 00 00 00 00 00 00 00 00 00 00 00 00 00 00
00008F70 : 00 00 00 00 00 00 00 00 00 00 00 00 00 00 00 00
00008F80 : 00 00 00 00 00 00 00 00 00 00 00 00 00 00 00 00
00008F90 : 00 00 00 00 00 00 00 00 00 00 00 00 00 00 00 00
00008FA0 : 00 00 00 00 00 00 00 00 00 00 00 00 00 00 00 00
00008FB0 : 00 00 00 00 00 00 00 00 00 00 00 00 00 00 00 00
00008FC0 : 00 00 00 00 00 00 00 00 00 00 00 00 00 00 00 00
```

```
00008FD0 : 00 00 00 00 00 00 00 00 00 00 00 00 00 00 00 00
00008FE0 : 00 00 00 00 00 00 00 00 00 00 00 00 00 00 00 00
00008FF0 : 00 00 00 00 00 00 00 00 00 00 00 00 00 00 00 00

Block 72
00009000 : 00 00 00 00 00 00 00 00 00 00 00 00 00 00 00 00
00009010 : 00 00 00 00 00 00 00 00 00 00 00 00 00 00 00 00
00009020 : 00 00 00 00 00 00 00 00 00 00 00 00 00 00 00 00
00009030 : 00 00 00 00 00 00 00 00 00 00 00 00 00 00 00 00
00009040 : 00 00 00 00 00 00 00 00 00 00 00 00 00 00 00 00
00009050 : 00 00 00 00 00 00 00 00 00 00 00 00 00 00 00 00
00009060 : 00 00 00 00 00 00 00 00 00 00 00 00 00 00 00 00
00009070 : 00 00 00 00 00 00 00 00 00 00 00 00 00 00 00 00
00009080 : 00 00 00 00 00 00 00 00 00 00 00 00 00 00 00 00
00009090 : 00 00 00 00 00 00 00 00 00 00 00 00 00 00 00 00
000090A0 : 00 00 00 00 00 00 00 00 00 00 00 00 00 00 00 00
000090B0 : 00 00 00 00 00 00 00 00 00 00 00 00 00 00 00 00
000090C0 : 00 00 00 00 00 00 00 00 00 00 00 00 00 00 00 00
000090D0 : 00 00 00 00 00 00 00 00 00 00 00 00 00 00 00 00
000090E0 : 00 00 00 00 00 00 00 00 00 00 00 00 00 00 00 00
000090F0 : 00 00 00 00 00 00 00 00 00 00 00 00 00 00 00 00
00009100 : 00 00 00 00 00 00 00 00 00 00 00 00 00 00 00 00
00009110 : 00 00 00 00 00 00 00 00 00 00 00 00 00 00 00 00
00009120 : 00 00 00 00 00 00 00 00 00 00 00 00 00 00 00 00
00009130 : 00 00 00 00 00 00 00 00 00 00 00 00 00 00 00 00
00009140 : 00 00 00 00 00 00 00 00 00 00 00 00 00 00 00 00
00009150 : 00 00 00 00 00 00 00 00 00 00 00 00 00 00 00 00
00009160 : 00 00 00 00 00 00 00 00 00 00 00 00 00 00 00 00
00009170 : 00 00 00 00 00 00 00 00 00 00 00 00 00 00 00 00
00009180 : 00 00 00 00 00 00 00 00 00 00 00 00 00 00 00 00
00009190 : 00 00 00 00 00 00 00 00 00 00 00 00 00 00 00 00
000091A0 : 00 00 00 00 00 00 00 00 00 00 00 00 00 00 00 00
000091B0 : 00 00 00 00 00 00 00 00 00 00 00 00 00 00 00 00
000091C0 : 00 00 00 00 00 00 00 00 00 00 00 00 00 00 00 00
000091D0 : 00 00 00 00 00 00 00 00 00 00 00 00 00 00 00 00
000091E0 : 00 00 00 00 00 00 00 00 00 00 00 00 00 00 00 00
000091F0 : 00 00 00 00 00 00 00 00 00 00 00 00 00 00 00 00

Block 73
00009200 : 00 00 00 00 00 00 00 00 00 00 00 00 00 00 00 00
00009210 : 00 00 00 00 00 00 00 00 00 00 00 00 00 00 00 00
00009220 : 00 00 00 00 00 00 00 00 00 00 00 00 00 00 00 00
00009230 : 00 00 00 00 00 00 00 00 00 00 00 00 00 00 00 00
00009240 : 00 00 00 00 00 00 00 00 00 00 00 00 00 00 00 00
00009250 : 00 00 00 00 00 00 00 00 00 00 00 00 00 00 00 00
00009260 : 00 00 00 00 00 00 00 00 00 00 00 00 00 00 00 00
00009270 : 00 00 00 00 00 00 00 00 00 00 00 00 00 00 00 00
00009280 : 00 00 00 00 00 00 00 00 00 00 00 00 00 00 00 00
00009290 : 00 00 00 00 00 00 00 00 00 00 00 00 00 00 00 00
000092A0 : 00 00 00 00 00 00 00 00 00 00 00 00 00 00 00 00
000092B0 : 00 00 00 00 00 00 00 00 00 00 00 00 00 00 00 00
000092C0 : 00 00 00 00 00 00 00 00 00 00 00 00 00 00 00 00
000092D0 : 00 00 00 00 00 00 00 00 00 00 00 00 00 00 00 00
000092E0 : 00 00 00 00 00 00 00 00 00 00 00 00 00 00 00 00
000092F0 : 00 00 00 00 00 00 00 00 00 00 00 00 00 00 00 00
00009300 : 00 00 00 00 00 00 00 00 00 00 00 00 00 00 00 00
00009310 : 00 00 00 00 00 00 00 00 00 00 00 00 00 00 00 00
```

```
00009320 : 00 00 00 00 00 00 00 00 00 00 00 00 00 00 00 00
00009330 : 00 00 00 00 00 00 00 00 00 00 00 00 00 00 00 00
00009340 : 00 00 00 00 00 00 00 00 00 00 00 00 00 00 00 00
00009350 : 00 00 00 00 00 00 00 00 00 00 00 00 00 00 00 00
00009360 : 00 00 00 00 00 00 00 00 00 00 00 00 00 00 00 00
00009370 : 00 00 00 00 00 00 00 00 00 00 00 00 00 00 00 00
00009380 : 00 00 00 00 00 00 00 00 00 00 00 00 00 00 00 00
00009390 : 00 00 00 00 00 00 00 00 00 00 00 00 00 00 00 00
000093A0 : 00 00 00 00 00 00 00 00 00 00 00 00 00 00 00 00
000093B0 : 00 00 00 00 00 00 00 00 00 00 00 00 00 00 00 00
000093C0 : 00 00 00 00 00 00 00 00 00 00 00 00 00 00 00 00
000093D0 : 00 00 00 00 00 00 00 00 00 00 00 00 00 00 00 00
000093E0 : 00 00 00 00 00 00 00 00 00 00 00 00 00 00 00 00
000093F0 : 00 00 00 00 00 00 00 00 00 00 00 00 00 00 00 00

Block 74
00009400 : 00 00 00 00 00 00 00 00 00 00 00 00 00 00 00 00
00009410 : 00 00 00 00 00 00 00 00 00 00 00 00 00 00 00 00
00009420 : 00 00 00 00 00 00 00 00 00 00 00 00 00 00 00 00
00009430 : 00 00 00 00 00 00 00 00 00 00 00 00 00 00 00 00
00009440 : 00 00 00 00 00 00 00 00 00 00 00 00 00 00 00 00
00009450 : 00 00 00 00 00 00 00 00 00 00 00 00 00 00 00 00
00009460 : 00 00 00 00 00 00 00 00 00 00 00 00 00 00 00 00
00009470 : 00 00 00 00 00 00 00 00 00 00 00 00 00 00 00 00
00009480 : 00 00 00 00 00 00 00 00 00 00 00 00 00 00 00 00
00009490 : 00 00 00 00 00 00 00 00 00 00 00 00 00 00 00 00
000094A0 : 00 00 00 00 00 00 00 00 00 00 00 00 00 00 00 00
000094B0 : 00 00 00 00 00 00 00 00 00 00 00 00 00 00 00 00
000094C0 : 00 00 00 00 00 00 00 00 00 00 00 00 00 00 00 00
000094D0 : 00 00 00 00 00 10 00 00 00 00 00 00 00 00 00 00
000094E0 : 00 00 00 00 00 00 00 00 00 00 00 00 00 00 00 00
000094F0 : 00 00 00 00 00 00 00 00 00 00 00 00 00 1B 00 00
00009500 : 00 00 00 1C 1D 1E 00 00 00 00 00 00 00 00 00 00
00009510 : 00 00 00 00 00 00 00 00 00 00 00 05 00 00 00 09
00009520 : 00 00 00 00 00 0F 00 00 00 00 00 00 00 15 00 01
00009530 : 00 00 00 00 00 1F 00 00 02 00 04 00 06 07 08 00
00009540 : 0A 0B 0C 0D 0E 00 10 11 12 13 14 00 16 17 18 19
00009550 : 1A 00 00 00 00 00 00 00 00 00 00 00 00 00 00 00
00009560 : 00 00 20 00 2D 27 2E 00 2D 27 2E 00 01 01 01 01
00009570 : 02 02 01 01 01 01 02 01 02 02 02 01 02 01 03 02
00009580 : 01 02 01 02 02 02 02 02 03 02 02 02 02 02 02 01
00009590 : 02 02 01 01 02 02 02 03 03 01 01 01 02 02 01 02
000095A0 : 01 01 01 01 02 02 02 02 02 01 01 01 01 01 01 01
000095B0 : 01 01 01 03 45 20 20 20 4F 20 20 20 49 20 20 20
000095C0 : 57 20 20 20 72 49 20 20 57 72 20 20 45 20 20 20
000095D0 : 4F 20 20 20 57 20 20 20 49 20 20 20 72 45 20 20
000095E0 : 49 20 20 20 57 72 20 20 4F 72 20 20 4F 72 20 20
000095F0 : 45 20 20 20 66 73 20 20 6B 20 20 20 72 74 6B 20

Block 75
00009600 : 6D 74 20 20 67 20 20 20 4F 66 20 20 6A 20 20 20
00009610 : 6E 62 20 20 6E 70 20 20 6E 66 20 20 73 6D 20 20
00009620 : 73 68 20 20 6B 68 74 20 45 64 20 20 4F 64 20 20
00009630 : 6A 6C 20 20 73 68 20 20 73 68 20 20 72 45 20 20
00009640 : 6B 20 20 20 6B 59 20 20 6B 59 20 20 59 20 20 20
00009650 : 6A 20 20 20 57 66 20 20 67 73 20 20 73 6C 20 20
00009660 : 6B 68 6E 20 72 6D 6E 20 57 20 20 20 45 20 20 20
```

```
00009670 : 4F 20 20 20 72 4F 20 20 4F 72 20 20 67 20 20 20
00009680 : 6E 73 20 20 6D 20 20 20 6D 20 20 20 59 20 20 20
00009690 : 74 20 20 20 73 6E 20 20 73 45 20 20 6B 6D 20 20
000096A0 : 73 68 20 20 74 6E 20 20 4F 20 20 20 45 20 20 20
000096B0 : 49 20 20 20 5F 20 20 20 5F 20 20 20 72 20 20 20
000096C0 : 4F 20 20 20 4F 20 20 20 70 20 20 20 6B 20 20 20
000096D0 : 6E 74 68 20 01 01 01 01 02 02 01 01 01 01 02 01
000096E0 : 02 02 02 02 02 02 04 03 02 03 01 02 02 02 04 02
000096F0 : 03 02 02 02 01 01 03 02 02 03 01 02 03 01 03 02
00009700 : 04 02 02 02 02 01 01 03 02 02 00 02 03 03 02 02
00009710 : 03 03 03 02 01 01 01 02 00 02 02 04 49 20 20 20
00009720 : 57 20 20 20 45 20 20 20 4F 20 20 20 57 72 20 20
00009730 : 72 45 20 20 4F 20 20 20 45 20 20 20 49 20 20 20
00009740 : 57 20 20 20 4F 72 20 20 4F 20 20 20 45 72 20 20
00009750 : 72 4F 20 20 72 45 20 20 4F 72 20 20 76 73 20 20
00009760 : 6B 68 20 20 72 6B 74 6B 6D 70 74 20 67 68 20 20
00009770 : 4F 67 68 20 67 20 20 20 6D 62 20 20 6D 70 20 20
00009780 : 6D 66 20 20 73 74 68 6D 6B 68 20 20 73 68 74 20
00009790 : 45 74 20 20 4F 74 20 20 64 6C 20 20 73 20 20 20
000097A0 : 74 20 20 20 72 45 5F 20 6B 77 20 20 6B 77 20 20
000097B0 : 6B 77 74 20 74 20 20 20 64 6A 20 20 4F 67 6B 20
000097C0 : 78 20 20 20 73 74 6C 20 74 6E 20 20 72 6E 6D 6E
000097D0 : 57 72 20 20 45 5F 20 20 4F 72 20 20 4F 72 20 20
000097E0 : 4F 20 20 20 6A 20 20 20 6E 73 77 20 6D 6E 20 20
000097F0 : 6D 62 20 20 20 20 20 20 74 59 20 20 73 74 6E 20

Block 76
00009800 : 73 6B 45 20 73 6D 20 20 78 68 20 20 73 68 6E 20
00009810 : 4F 67 68 20 45 67 68 20 49 6C 20 20 4F 20 20 20
00009820 : 72 20 20 20 5F 20 20 20 4F 4F 20 20 20 20 20 20
00009830 : 70 74 20 20 6B 74 20 20 6E 67 74 68 00 00 00 00
00009840 : 00 00 00 00 00 00 00 00 00 00 00 00 00 00 00 00
00009850 : 00 00 00 00 00 00 00 00 00 00 00 00 00 00 00 00
00009860 : 00 00 00 00 00 00 00 00 00 00 00 00 00 00 00 00
00009870 : 00 00 00 00 00 00 00 00 00 00 00 00 00 00 00 00
00009880 : 00 00 00 00 00 00 00 00 00 00 00 00 00 00 00 00
00009890 : 00 00 00 00 00 00 00 00 00 00 00 00 00 00 00 00
000098A0 : 00 00 00 00 00 00 00 00 00 00 00 00 00 00 00 00
000098B0 : 00 00 00 00 00 00 00 00 00 00 00 00 00 00 00 00
000098C0 : 00 00 00 00 00 00 00 00 00 00 00 00 00 00 00 00
000098D0 : 00 00 00 00 00 00 00 00 00 00 00 00 00 00 00 00
000098E0 : 00 00 00 00 00 00 00 00 00 00 00 00 00 00 00 00
000098F0 : 00 00 00 00 00 00 00 00 00 00 00 00 00 00 00 00
00009900 : 00 00 00 00 00 00 00 00 00 00 00 00 00 00 00 00
00009910 : 00 00 00 00 00 00 00 00 00 00 00 00 00 00 00 00
00009920 : 00 00 00 00 00 00 00 00 00 00 00 00 00 00 00 00
00009930 : 00 00 00 00 00 00 00 00 00 00 00 00 00 00 00 00
00009940 : 00 00 00 00 00 00 00 00 00 00 00 00 00 00 00 00
00009950 : 00 00 00 00 00 00 00 00 00 00 00 00 00 00 00 00
00009960 : 00 00 00 00 00 00 00 00 00 00 00 00 00 00 00 00
00009970 : 00 00 00 00 00 00 00 00 00 00 00 00 00 00 00 00
00009980 : 00 00 00 00 00 00 00 00 00 00 00 00 00 00 00 00
00009990 : 00 00 00 00 00 00 00 00 00 00 00 00 00 00 00 00
000099A0 : 00 00 00 00 00 00 00 00 00 00 00 00 00 00 00 00
000099B0 : 00 00 00 00 00 00 00 00 00 00 00 00 00 00 00 00
000099C0 : 00 00 00 00 00 00 00 00 00 00 00 00 00 00 00 00
000099D0 : 00 00 00 00 00 00 00 00 00 00 00 00 00 00 00 00
```

```
000099E0 : 00 00 00 00 00 00 00 00 00 00 00 00 00 00 00 00
000099F0 : 00 00 00 00 00 00 00 00 00 00 00 00 00 00 00 00

Block 77
00009A00 : 00 00 00 00 00 00 00 00 00 00 00 00 00 00 00 00
00009A10 : 00 00 00 00 00 00 00 00 00 00 00 00 00 00 00 00
00009A20 : 00 00 00 00 00 00 00 00 00 00 00 00 00 00 00 00
00009A30 : 00 00 00 00 00 00 00 00 00 00 00 00 00 00 00 00
00009A40 : 00 00 00 00 00 00 00 00 00 00 00 00 00 00 00 00
00009A50 : 00 00 00 00 00 00 00 00 00 00 00 00 00 00 00 00
00009A60 : 00 00 00 00 00 00 00 00 00 00 00 00 00 00 00 00
00009A70 : 00 00 00 00 00 00 00 00 00 00 00 00 00 00 00 00
00009A80 : 00 00 00 00 00 00 00 00 00 00 00 00 00 00 00 00
00009A90 : 00 00 00 00 00 00 00 00 00 00 00 00 00 00 00 00
00009AA0 : 00 00 00 00 00 00 00 00 00 00 00 00 00 00 00 00
00009AB0 : 00 00 00 00 00 00 00 00 00 00 00 00 00 73 00 27
00009AC0 : 73 00 69 6E 67 00 3B 46 00 20 20 20 20 20 20 20
00009AD0 : 20 20 28 28 28 28 28 20 20 20 20 20 20 20 20 20
00009AE0 : 20 20 20 20 20 20 20 20 20 48 10 10 10 10 10 10
00009AF0 : 10 10 10 10 10 10 10 10 10 84 84 84 84 84 84 84
00009B00 : 84 84 84 10 10 10 10 10 10 10 81 81 81 81 81 81
00009B10 : 01 01 01 01 01 01 01 01 01 01 01 01 01 01 01 01
00009B20 : 01 01 01 01 10 10 10 10 10 10 82 82 82 82 82 82
00009B30 : 02 02 02 02 02 02 02 02 02 02 02 02 02 02 02 02
00009B40 : 02 02 02 02 10 10 10 10 20 20 20 20 20 20 20 20
00009B50 : 20 20 28 28 28 28 28 20 20 20 20 20 20 20 20 20
00009B60 : 20 20 20 20 20 20 20 20 20 48 10 10 10 10 10 10
00009B70 : 10 10 10 10 10 10 10 10 10 84 84 84 84 84 84 84
00009B80 : 84 84 84 10 10 10 10 10 10 10 81 81 81 81 81 81
00009B90 : 01 01 01 01 01 01 01 01 01 01 01 01 01 01 01 01
00009BA0 : 01 01 01 01 10 10 10 10 10 10 82 82 82 82 82 82
00009BB0 : 02 02 02 02 02 02 02 02 02 02 02 02 02 02 02 02
00009BC0 : 02 02 02 02 10 10 10 10 20 00 01 63 6F 6E 3A 00
00009BD0 : 00 00 00 00 01 43 4F 4E 3A 00 00 00 00 00 02 70
00009BE0 : 72 6E 3A 00 00 00 00 00 02 50 52 4E 3A 00 00 00
00009BF0 : 00 00 02 6C 73 74 3A 00 00 00 00 00 02 4C 53 54

Block 78
00009C00 : 3A 00 00 00 00 00 02 6C 70 74 3A 00 00 00 00 00
00009C10 : 02 4C 50 54 3A 00 00 00 00 00 02 6C 70 74 31 3A
00009C20 : 00 00 00 00 02 4C 50 54 31 3A 00 00 00 00 03 61
00009C30 : 75 78 3A 00 00 00 00 00 03 41 55 58 3A 00 00 00
00009C40 : 00 00 03 63 6F 6D 3A 00 00 00 00 00 03 43 4F 4D
00009C50 : 3A 00 00 00 00 00 03 63 6F 6D 31 3A 00 00 00 00
00009C60 : 03 43 4F 4D 31 3A 00 00 00 00 03 72 64 72 3A 00
00009C70 : 00 00 00 00 03 52 44 52 3A 00 00 00 00 03 70
00009C80 : 75 6E 3A 00 00 00 00 00 03 50 55 4E 3A 00 00 00
00009C90 : 00 00 04 6E 75 6C 3A 00 00 00 00 00 04 4E 55 4C
00009CA0 : 3A 00 00 00 00 00 04 6E 75 6C 6C 3A 00 00 00 00
00009CB0 : 04 4E 55 4C 4C 3A 00 00 00 00 00 00 00 00 00 00
00009CC0 : 00 00 00 00 00 00 00 00 00 00 00 00 00 00 00 00
00009CD0 : 00 00 00 00 00 00 00 00 00 00 00 00 00 00 00 00
00009CE0 : 00 00 00 00 00 00 00 00 00 00 00 00 00 00 00 00
00009CF0 : 00 00 00 00 00 00 00 00 00 00 00 00 00 00 00 00
00009D00 : 00 00 00 00 00 00 00 00 00 00 00 00 00 00 00 00
00009D10 : 00 00 00 00 00 00 00 00 00 00 00 00 00 00 00 00
00009D20 : 00 00 00 00 00 00 00 00 00 00 00 00 00 00 00 00
```

```
00009D30 : 00 00 00 00 00 00 00 00 00 00 00 00 00 00 00 00
00009D40 : 00 00 00 00 00 00 00 00 00 00 00 00 00 00 00 00
00009D50 : 00 00 00 00 00 00 00 00 00 00 00 00 00 00 00 00
00009D60 : 00 00 00 00 00 00 00 00 00 00 00 00 00 00 00 00
00009D70 : 00 00 00 00 00 00 00 00 00 00 00 00 00 00 00 00
00009D80 : 00 00 00 00 00 00 00 00 00 00 00 00 00 00 00 00
00009D90 : 00 00 00 00 00 00 00 00 00 00 00 00 00 00 00 00
00009DA0 : 00 00 00 00 00 00 00 00 00 00 00 00 00 00 00 00
00009DB0 : 00 00 00 00 00 00 00 00 00 00 00 00 00 00 00 00
00009DC0 : 00 00 00 00 00 00 00 00 00 00 00 00 00 00 00 00
00009DD0 : 00 00 00 00 00 00 00 00 00 00 00 00 00 00 00 00
00009DE0 : 00 00 00 00 00 00 00 00 00 00 00 00 00 00 00 00
00009DF0 : 00 00 00 00 00 00 00 00 00 00 00 00 00 00 00 00

Block 79
00009E00 : 00 00 00 00 00 00 00 00 00 00 00 00 00 00 00 00
00009E10 : 00 00 00 00 00 00 00 00 00 00 00 00 00 00 00 00
00009E20 : 00 00 00 00 00 00 00 00 00 00 00 00 00 00 00 00
00009E30 : 00 00 00 00 00 00 00 00 00 00 00 00 00 00 00 00
00009E40 : 00 00 00 00 00 00 00 00 00 00 00 00 00 00 00 00
00009E50 : 00 00 00 00 00 00 00 00 00 00 00 00 00 00 00 00
00009E60 : 00 00 00 00 00 00 00 00 00 00 00 00 00 00 00 00
00009E70 : 00 00 00 00 00 00 00 00 00 00 00 00 00 00 00 00
00009E80 : 00 00 00 00 00 00 00 00 00 00 00 00 00 00 00 00
00009E90 : 00 00 00 00 00 00 72 00 77 00 61 00 00 43 61 6E
00009EA0 : 27 74 20 6F 70 65 6E 20 73 74 64 69 6E 20 66 69
00009EB0 : 6C 65 0A 00 43 61 6E 27 74 20 6F 70 65 6E 20 73
00009EC0 : 74 64 6F 75 74 20 66 69 6C 65 0A 00 00 00 00 00
00009ED0 : 00 00 00 00 00 00 30 31 32 33 34 35 36 37 38 39
00009EE0 : 41 42 43 44 45 46 00 00 00 00 00 00 00 00 00 00
00009EF0 : 00 02 00 00 14 00 00 00 00 00 00 00 00 00 00 00
00009F00 : 00 00 00 00 00 00 00 00 00 00 00 00 00 00 00 00
00009F10 : 00 00 00 00 00 00 00 00 00 00 00 00 00 00 00 00
00009F20 : 00 00 00 00 00 00 00 00 00 00 00 00 00 00 00 00
00009F30 : 00 00 00 00 00 00 00 00 00 00 00 00 00 00 00 00
00009F40 : 00 00 00 00 00 00 00 00 00 00 00 00 00 00 00 00
00009F50 : 00 00 00 00 00 00 00 00 00 00 00 00 00 00 00 00
00009F60 : 00 00 00 00 00 00 00 00 00 00 00 00 00 00 00 00
00009F70 : 00 00 00 00 00 00 00 00 00 00 00 00 00 00 00 00
00009F80 : 00 00 00 00 00 00 00 00 00 00 00 00 00 00 00 00
00009F90 : 00 00 00 00 00 00 00 00 00 00 00 00 00 00 00 00
00009FA0 : 00 00 00 00 00 00 00 00 00 00 00 00 00 00 00 00
00009FB0 : 00 00 00 00 00 00 00 00 00 00 00 00 00 00 00 00
00009FC0 : 00 00 00 00 00 00 00 00 00 00 00 00 00 00 00 00
00009FD0 : 00 00 00 00 00 00 00 00 00 00 00 00 00 00 00 00
00009FE0 : 00 00 00 00 00 00 00 00 00 00 00 00 00 00 00 00
00009FF0 : 00 00 00 00 00 00 00 00 00 00 00 00 00 00 00 00

Block 80
0000A000 : 00 00 00 00 00 00 00 00 00 00 00 00 00 00 00 00
0000A010 : 00 00 00 00 00 00 00 00 00 00 00 00 00 00 00 00
0000A020 : 00 00 00 00 00 00 00 00 00 00 00 00 00 00 00 00
0000A030 : 00 00 00 00 00 00 00 00 00 00 00 00 00 00 00 00
0000A040 : 00 00 00 00 00 00 00 00 00 00 00 00 00 00 00 00
0000A050 : 00 00 00 00 00 00 00 00 00 00 00 00 00 00 00 00
0000A060 : 00 00 00 00 00 00 00 00 00 00 00 00 00 00 00 00
0000A070 : 00 00 00 00 00 00 00 00 00 00 00 00 00 00 00 00
```

```
0000A080 : 00 00 00 00 00 00 00 00 00 00 00 00 00 00 00 00
0000A090 : 00 00 00 00 00 00 00 00 00 00 00 00 00 00 00 00
0000A0A0 : 00 00 00 00 00 00 00 00 00 00 00 00 00 00 00 00
0000A0B0 : 00 00 00 00 00 00 00 00 00 00 00 00 00 00 00 00
0000A0C0 : 00 00 00 00 00 00 00 00 00 00 00 00 00 00 00 00
0000A0D0 : 00 00 00 00 00 00 00 00 00 00 00 00 00 00 00 00
0000A0E0 : 00 00 00 00 00 00 00 00 00 00 00 00 00 00 00 00
0000A0F0 : 00 00 00 00 00 00 00 00 00 00 00 00 00 00 00 00
0000A100 : 00 00 00 00 00 00 00 00 00 00 00 00 00 00 00 00
0000A110 : 00 00 00 00 00 00 00 00 00 00 00 00 00 00 00 00
0000A120 : 00 00 00 00 00 00 00 00 00 00 00 00 00 00 00 00
0000A130 : 00 00 00 00 00 00 00 00 00 00 00 00 00 00 00 00
0000A140 : 00 00 00 00 00 00 00 00 00 00 00 00 00 00 00 00
0000A150 : 00 00 00 00 00 00 00 00 00 00 00 00 00 00 00 00
0000A160 : 00 00 00 00 00 00 00 00 00 00 00 00 00 00 00 00
0000A170 : 00 00 00 00 00 00 00 00 00 00 00 00 00 00 00 00
0000A180 : 00 00 00 00 00 00 00 00 00 00 00 00 00 00 00 00
0000A190 : 00 00 00 00 00 00 00 00 00 00 00 00 00 00 00 00
0000A1A0 : 00 00 00 00 00 00 00 00 00 00 00 00 00 00 00 00
0000A1B0 : 00 00 00 00 00 00 00 00 00 00 00 00 00 00 00 00
0000A1C0 : 00 00 00 00 00 00 00 00 00 00 00 00 00 00 00 00
0000A1D0 : 00 00 00 00 00 00 00 00 00 00 00 00 00 00 00 00
0000A1E0 : 00 00 00 00 00 00 00 00 00 00 00 00 00 00 00 00
0000A1F0 : 00 00 00 00 00 00 00 00 00 00 00 00 00 00 00 00

Block 81
0000A200 : 00 00 00 00 00 00 00 00 00 00 00 00 00 00 00 00
0000A210 : 00 00 00 00 00 00 00 00 00 00 00 00 00 00 00 00
0000A220 : 00 00 00 00 00 00 00 00 00 00 00 00 00 00 00 00
0000A230 : 00 00 00 00 00 00 00 00 00 00 00 00 00 00 00 00
0000A240 : 00 00 00 00 00 00 00 00 00 00 00 00 00 00 00 00
0000A250 : 00 00 00 00 00 00 00 00 00 00 00 00 00 00 00 00
0000A260 : 00 00 00 00 00 00 00 00 00 00 00 00 00 00 00 00
0000A270 : 00 00 00 00 00 00 00 00 00 00 00 00 00 00 00 00
0000A280 : 00 00 00 00 00 00 00 00 00 00 00 00 00 00 00 00
0000A290 : 00 00 00 00 00 00 00 00 00 00 00 00 00 00 00 00
0000A2A0 : 00 00 00 00 00 00 00 00 00 00 00 00 00 00 00 00
0000A2B0 : 00 00 00 00 00 00 00 00 00 00 00 00 00 00 00 00
0000A2C0 : 00 00 00 00 00 00 00 00 00 00 00 00 00 00 00 00
0000A2D0 : 00 00 00 00 00 00 00 00 00 00 00 00 00 00 00 00
0000A2E0 : 00 00 00 00 00 00 00 00 00 00 00 00 00 00 00 00
0000A2F0 : 00 00 00 00 00 00 00 00 00 00 00 00 00 00 00 00
0000A300 : 00 00 00 00 00 00 00 00 00 00 00 00 00 00 00 00
0000A310 : 00 00 00 00 00 00 00 00 00 00 00 00 00 00 00 00
0000A320 : 00 00 00 00 00 00 00 00 00 00 00 00 00 00 00 00
0000A330 : 00 00 00 00 00 00 00 00 00 00 00 00 00 00 00 00
0000A340 : 00 00 00 00 00 00 00 00 00 00 00 00 00 00 00 00
0000A350 : 00 00 00 00 00 00 00 00 00 00 00 00 00 00 00 00
0000A360 : 00 00 00 00 00 00 00 00 00 00 00 00 00 00 00 00
0000A370 : 00 00 00 00 00 00 00 00 00 00 00 00 00 00 00 00
0000A380 : 00 00 00 00 00 00 00 00 00 00 00 00 00 00 00 00
0000A390 : 00 00 00 00 00 00 00 00 00 00 00 00 00 00 00 00
0000A3A0 : 00 00 00 00 00 00 00 00 00 00 00 00 00 00 00 00
0000A3B0 : 00 00 00 00 00 00 00 00 00 00 00 00 00 00 00 00
0000A3C0 : 00 00 00 00 00 00 00 00 00 00 00 00 00 00 00 00
0000A3D0 : 00 00 00 00 00 00 00 00 00 00 00 00 00 00 00 00
0000A3E0 : 00 00 00 00 00 00 00 00 00 00 00 00 00 00 00 00
0000A3F0 : 00 00 00 00 00 00 00 00 00 00 00 00 00 00 00 00
```

Master Lexicon

The listing on the following pages is the hexadecimal representation of the data for a portion of a preferred Master Lexicon. This lexicon is intended for use in conjunction with the Executable Module, _supra_. Ten blocks of the Master Lexicon are listed; the lexicon may be extended in accord with the teachings provided in the Specification.

```
Block 0
00000000 : 80 27 08 9D CA A5 0E 41 F6 43 29 CB A5 0D 41 D9
00000010 : 43 29 98 E5 48 41 81 A3 C9 AE 03 29 F6 45 0E 41
00000020 : 9C C5 7D 41 84 E5 29 01 82 AB 2E 41 3D C4 BE AB
00000030 : 0E 41 BE FE E9 79 38 B4 8B C5 29 01 86 83 A9 82
00000040 : AF 49 64 A1 49 99 D7 C7 04 45 9D 25 49 41 48 80
00000050 : 08 F3 AC 8D 64 BC 0B 25 81 A7 04 59 AE A9 79 08
00000060 : 22 84 49 11 B5 E7 AD 67 82 24 84 B5 85 2C 81 E8
00000070 : 29 09 08 4C B3 03 29 DB A5 2B 01 99 E9 49 8F 9C
00000080 : 89 A9 31 F5 10 81 10 C1 61 41 82 4D 04 42 CE D8
00000090 : 75 49 09 89 3E 08 B7 A1 CE 3C 48 30 21 25 81 C9
000000A0 : 02 CC 81 94 60 A1 92 A5 48 C1 95 C4 0B 00 81 BC
000000B0 : 04 2C A9 89 07 90 8D E5 66 41 A0 0C 3D A1 39 21
000000C0 : 41 92 A2 1B 94 44 0B 13 94 42 9A 41 92 A0 41 00
000000D0 : 21 30 41 04 59 31 EE 00 29 19 C1 AF 02 29 02 80
000000E0 : 41 AD CD 24 45 31 F4 AD 6B 08 81 3D EE 9B 4F C9
000000F0 : 8E EB 8C 03 C9 D8 4F 29 14 52 97 83 0D 04 59 C3
00000100 : 9D 4B AC C1 21 61 8E 01 84 EB CF 01 4C 34 B4 05
00000110 : 4D 01 F2 23 A1 00 41 20 C5 26 94 AF 95 C9 6E 7C
00000120 : 0A 45 06 88 FD A7 97 E9 C5 21 01 9D 25 2D C1 E8
00000130 : 25 49 01 EB 43 21 9E 45 49 41 C0 C3 C9 AF 83 29
00000140 : 81 A9 29 04 99 81 A9 49 10 99 F8 CB 29 01 06 A2
00000150 : 8A C5 29 01 DB 47 0A A7 83 49 09 95 83 E9 21 95
00000160 : 81 A9 49 95 99 B1 29 01 18 AC 31 F7 8F 61 AD 58
00000170 : 25 E4 14 F2 04 81 8F 21 94 62 C8 81 82 11 29 01
00000180 : 15 0F FD F7 65 1A C1 8A C5 29 01 B0 2E 1D 20 2D
00000190 : 8E 9E 4B 63 C1 51 05 D9 C9 09 11 85 AF 07 10 AC
000001A0 : 81 A9 09 11 99 D8 4B 29 01 30 2D 99 8D 04 8C 87
000001B0 : 84 F3 71 A1 39 C5 E8 DB 6D 35 2E 51 EE FA 69 79
000001C0 : 56 88 8D A5 29 01 9C C7 DA 82 4B 49 01 10 AE 02
000001D0 : 11 30 41 14 8F 55 2E 00 41 01 C1 D8 0F 09 11 2E
000001E0 : 83 CB 0D 14 84 BE CB 0D 24 84 BE BE AD 04 8E A2
000001F0 : 82 F1 49 01 9E 8D 82 A9 29 10 B7 B0 27 40 2E FF Block 1
00000200 : D6 EF 11 14 90 3E 74 83 AB 09 01 B6 D8 4B 49 01
00000210 : 96 82 71 29 01 49 24 10 AE ED 69 09 1C EC B8 03
00000220 : 29 8F C3 21 87 27 DC B3 05 63 01 DE 25 7B 41 88
00000230 : C7 94 81 BB 49 70 89 48 A3 F8 D4 D8 4D 14 93 B4
```

```
00000240 : EB E9 09 6B 4C B6 A3 29 8E 43 21 E3 48 6B 9E 44
00000250 : A0 20 D3 68 AE 8C C5 29 01 EB 47 4E 12 DF C7 97
00000260 : 0C 40 19 81 BE B1 A7 E0 83 8D 04 89 A3 AE AD 12
00000270 : 74 97 AD 69 49 10 B4 D8 4D 14 94 25 A5 81 B7 09
00000280 : 01 72 85 36 05 E8 82 AD 14 85 59 2C A3 C1 F1 E0
00000290 : 81 8C A5 29 01 B6 A8 6D 9E ED 83 B9 89 25 29 01
000002A0 : 83 AD 04 97 3E 4B 84 4B 21 41 94 FE 45 29 81 86
000002B0 : 83 C9 86 85 29 01 82 54 4D 3C C5 14 82 81 92 82
000002C0 : 9D E8 CD 14 D5 10 8C B6 A3 29 8E 43 21 B8 28 6B
000002D0 : 9E B0 85 79 C1 EF 03 39 8A C5 29 01 D9 0D 24 CF
000002E0 : 90 E8 29 09 18 CC B3 03 29 F8 CB 29 81 86 85 E7
000002F0 : 9B FA 07 3E AC 82 4D 04 C6 CE 82 AF 29 19 F5 CE
00000300 : 85 EB 0B 01 30 AE 9A CD 14 C9 DA 88 85 2C 81 AF
00000310 : 09 31 E0 8A E9 41 87 AD B4 4D 1A B2 91 C0 F3 20
00000320 : 41 B8 23 29 8F E3 21 F8 CF 29 1A 49 9D 8E 05 29
00000330 : 01 D8 56 4B D1 41 19 4D 23 C5 81 EF 29 14 C9 A3
00000340 : D4 8B 9D 01 14 2B 8F 03 99 82 52 25 F0 23 33 B3
00000350 : 81 AD 69 29 19 34 EF 03 A1 8B 05 29 01 D7 C9 09
00000360 : 10 E5 E9 C5 39 C1 E8 27 14 E7 AE 07 24 E5 81 A9
00000370 : 09 1C F9 98 F5 49 1F 82 56 69 DA 81 AB 09 C1 A6
00000380 : 81 AB 29 C1 A6 D8 4D 04 E7 83 AD 0D 24 E8 3E 4E
00000390 : 84 F1 E2 01 98 F3 AD 69 09 1C AC AE AB C9 C1 86
000003A0 : AD 0B 28 41 1D 85 EA 49 39 55 2C B5 03 29 8C 63
000003B0 : 21 8C 63 91 A5 41 99 4D 24 E1 35 25 9F A5 7D 41
000003C0 : 88 C3 C9 B2 C7 C5 99 CF 09 1C E9 DA 82 A9 29 1C
000003D0 : 2E B0 85 4B 81 EF 03 71 9D 89 79 39 21 B0 89 A9
000003E0 : BD 87 83 71 AD 6B C9 C1 DF BE AD 14 E7 BE CC CD
000003F0 : 25 CE BE E0 65 2C 81 99 90 4B E1 1C AE 16 69 FF

Block 2
00000400 : 81 6F 11 14 EF 39 21 D8 4D 04 F0 26 05 8C 03 91
00000410 : A4 E1 83 49 21 A7 A1 41 EF E1 83 EB 39 C1 B6 FD
00000420 : EB 29 C1 1C 32 82 4B 49 C1 A7 82 0F 09 10 E5 E8
00000430 : 82 4F 29 1C E1 E8 FA 07 26 44 9A 73 25 E7 4B 30
00000440 : 21 25 C5 C3 C9 90 21 8D A5 48 C1 90 E4 0B 09 E3
00000450 : 85 2C 81 E8 8C 14 F2 54 87 81 B6 63 29 8E 03 21
00000460 : ED 65 4B 41 B5 03 29 8C 63 21 85 E7 26 54 82 BF
00000470 : 09 1C E9 A3 82 4D 24 E7 A3 AD 6F 09 1E A5 FA 82
00000480 : A9 29 1C 34 B0 85 2D 01 EF 03 A1 85 E5 7D 01 81
00000490 : A9 49 1D F4 CD C1 88 C5 29 01 D8 11 09 C1 8D 31
000004A0 : 85 82 EF 29 1D F4 F4 B0 CB 2D 01 F5 99 CF 49 1D
000004B0 : F4 EB C2 A3 C9 8C 01 B0 27 5D 27 F8 CB 2A 01 97
000004C0 : 8A C5 29 01 85 E7 3D E6 85 E7 15 84 FA 07 3D 84
000004D0 : 8A C5 2B 81 8C 63 91 CF 81 D4 07 05 86 A0 45 B1
000004E0 : 41 02 A1 28 41 0A 01 05 A1 00 A1 19 41 AF 02 A9
000004F0 : 02 01 D9 0F 29 20 AD 3E 88 00 81 28 41 0A 01 05
00000500 : A1 D8 AB 2A 01 BC 8A E9 41 87 00 41 30 41 05 12
00000510 : 85 AD 6B 2A 01 A3 D9 CB 2A 01 C9 EA 67 20 36 B3
00000520 : 63 29 EB C7 3D F6 B5 03 29 85 E9 09 58 A4 85 EB
00000530 : 7B C1 58 A4 DB EB 0D 81 25 F2 8E 45 0B 01 91 B4
00000540 : 66 51 B8 26 C4 41 BB 02 A3 20 41 10 81 4A 81 82
00000550 : A9 49 29 F5 82 AD 15 45 5C AC A3 C1 F1 E0 81 8C
00000560 : A5 29 01 82 AB 4A 81 3E B8 E7 E7 81 E9 C3 59 AF
00000570 : 83 29 81 A7 14 2B E8 25 4A C1 AF 83 29 D8 0F 09
00000580 : 0D 62 DF B4 67 89 EE 28 90 14 2B 81 F7 85 4D 01
00000590 : B5 C3 29 EB C6 F4 81 8B C5 2C 81 A6 00 81 86 85
000005A0 : 29 01 83 47 CA 81 AB 28 41 CA 81 A9 49 CA D8 0F
```

```
000005B0 : 09 0D 64 49 F0 B1 4E 0D 10 34 C0 EC A6 10 34 81
000005C0 : B1 6B 32 41 15 84 EF C2 95 B5 C3 29 8D 63 21 B1
000005D0 : 35 E1 19 F2 34 34 C0 B1 6C 1C 2D 35 EE 81 DD EB
000005E0 : 93 C1 FB E9 67 F2 9F 43 29 FC E9 29 04 68 9F 43
000005F0 : 29 D3 07 14 68 9F 43 29 E7 C9 49 F2 9F 43 29 FF
```

Block 3
```
00000600 : 02 41 30 01 08 23 0D 15 81 AB 4D 01 0D 19 81 AD
00000610 : 06 83 AB 81 AD 14 23 AB DD C9 41 97 81 AD 26 83
00000620 : AB 81 F5 29 04 68 0D ED 8E A8 C0 21 D7 EF 09 0D
00000630 : 05 31 F2 AD 93 24 69 31 F2 B4 04 00 80 43 0D 05
00000640 : 31 F2 6E 7C 0A B4 51 EE AD 14 4B 3C 68 15 A9 90
00000650 : AF 6B A5 41 34 AE A0 C9 49 39 F5 AE B0 78 E1 20
00000660 : AD C5 A7 C6 EB A1 92 82 CC 81 9A AF A1 0D 09 DA
00000670 : AC CF 09 0D 68 87 8D 65 29 01 B0 4D 0D 01 D4 8F
00000680 : 66 AF 41 92 A0 41 AC AF 29 14 68 3A B4 81 EF 49
00000690 : F2 B6 08 41 30 41 04 63 22 B3 81 D1 4D 01 0D 09
000006A0 : A3 AC CF 09 0D 61 0D 25 F8 CD 14 6C 3E A4 8C 65
000006B0 : 29 01 D8 0D 81 31 E7 F1 22 3D 8D 65 29 01 F8 CB
000006C0 : 28 C1 05 8D 8A C5 29 01 82 AD 24 6F 31 F2 A3 C1
000006D0 : AD 58 04 63 05 81 FC 8D 51 D3 CB 5B 01 06 68 A4
000006E0 : 83 29 00 A1 30 81 2C AC C6 9D 69 61 06 C1 8C 61
000006F0 : 82 AB 28 C1 05 A5 EB E5 7B 41 B3 63 29 CD E7 BE
00000700 : 82 F1 48 C1 05 A5 E6 D8 A9 09 0D EE D8 4B 28 41
00000710 : 0D EE 83 49 19 2D EE A1 41 EF E1 CB 8B 4A C1 25
00000720 : C9 8A C1 82 0F 29 0D 6F D8 CA ED 81 BE BF A9 59
00000730 : BE AD 31 28 41 0D EE 83 82 F1 48 C1 3D C3 06 C5
00000740 : 08 28 40 41 28 C1 2D EE BE 82 EF 49 0D EE 58 B8
00000750 : 81 AB 08 C1 2E B0 A1 41 B1 27 72 B0 88 27 40 39
00000760 : 50 20 21 21 81 8D 65 29 01 82 51 29 41 2C A5 E5
00000770 : A6 40 81 82 11 08 C1 2E 01 94 86 85 2C 81 CE 21
00000780 : 83 47 CB CD C1 A0 25 49 41 C1 83 C9 81 AB 28 41
00000790 : CB CE 21 81 AB 48 C1 CB A1 41 EF E1 83 47 CB 0C
000007A0 : 80 01 41 82 4B 0A C1 A1 D8 F4 4B 0C 32 09 EE 8D
000007B0 : D8 0F 09 0D 79 89 82 0F 49 0D 65 E8 44 28 40 41
000007C0 : 08 C1 2D F2 96 8F 25 29 01 08 28 40 41 48 C1 CB
000007D0 : BE AC CF 09 0D 72 A3 B0 6B 18 41 E7 82 AD 14 61
000007E0 : FD AD AF 49 0E B3 41 24 81 B1 08 C1 2F 93 99 40
000007F0 : 20 29 01 A4 81 81 8F 05 29 01 85 CD F5 AE FF FF
```

Block 4
```
00000800 : 98 3A 14 82 16 49 DD A9 41 92 C2 CC 81 92 C4 48
00000810 : D1 95 E4 0B 10 81 04 50 13 00 9D 25 8C 45 AB 41
00000820 : C6 A0 81 B6 48 1D B4 91 24 0B 21 85 4F 59 52 41
00000830 : 94 85 CB A1 41 49 21 84 F3 2F 94 3F 97 3E 4B 99
00000840 : 4D 25 65 FF 8B C1 99 4F 09 0D 77 3D E4 8D 68 98
00000850 : D2 81 90 A4 2B 89 B2 C7 89 A4 86 DA 41 B7 4A 0D
00000860 : 09 C0 8A 25 9A 01 A4 83 29 D8 AD 16 35 A3 FB 07
00000870 : 06 88 8E 05 29 01 AC F1 08 C1 2E E1 F5 FE 45 4B
00000880 : 01 86 85 29 41 A1 41 E9 C3 61 DA C3 29 99 E9 29
00000890 : 30 39 9D 25 49 41 EB 03 61 DC 43 29 9E 45 49 41
000008A0 : 9E 45 7D C1 FC 03 C9 9D 25 7D C1 EC 03 C9 99 89
000008B0 : 49 05 99 D9 45 61 41 9C C7 C1 EB 03 61 9E 45 49
000008C0 : 41 9E 45 7D C1 99 E9 C9 30 37 F6 A9 29 30 39 85
000008D0 : E5 49 41 84 E5 62 41 86 83 C9 82 A9 49 05 99 83
000008E0 : 47 D1 00 01 18 41 05 89 82 AD 15 81 64 A4 CC 69
000008F0 : 61 09 F9 99 8B 4B 01 09 E5 82 0D 9B 09 F9 82 0F
```

```
00000900 : 09 25 81 8F 44 A0 30 41 15 81 09 F2 8C C5 29 01
00000910 : D8 11 4B 01 30 4F 89 83 AF 29 30 52 24 A6 AD 12
00000920 : 05 82 49 27 1C 2E 81 BF 32 15 81 09 F2 BE 81 AF
00000930 : EE 65 09 F4 51 ED B1 EE CB 0A B4 51 EE 81 AB 0A
00000940 : 41 CE E9 85 61 01 84 E5 29 01 DB 47 30 24 86 85
00000950 : 29 01 82 AB 2B 01 B5 84 E7 CE 87 27 B5 81 AB 4B
00000960 : 01 CE 81 B3 05 84 70 C1 92 86 ED 20 A1 95 B1 EB
00000970 : 08 C1 21 2E 86 85 66 41 AD 0B 2B 01 10 2D 99 4D
00000980 : 05 84 DA 99 D2 9B 04 8F 39 C1 41 BE 8F 09 30 8E
00000990 : A2 82 93 9B 04 8F 39 C1 AC CF 09 30 90 8D 86 85
000009A0 : 2C 81 B0 4D 30 24 14 B2 A1 A7 EB 8C 03 C9 85 AF
000009B0 : 21 16 44 06 68 A7 E3 29 87 27 EA 8C 03 99 86 E7
000009C0 : A3 D9 8B 4B 01 24 C6 D8 AB 2B 01 24 A6 82 0D 05
000009D0 : 85 A5 AC CF 49 31 86 3D 84 82 13 9B 19 BF 5C B2
000009E0 : A7 80 41 9C C9 31 EB C1 63 C9 8A 61 9D 87 54 E1
000009F0 : E7 E7 25 87 DC 43 29 9B CD DD A9 C2 E3 C9 8C C1

Block 5
00000A00 : 80 2D 09 2C A6 83 ED DD 1D 23 8D A4 0B 21 90 E4
00000A10 : 66 61 00 41 30 41 15 87 C8 04 41 11 41 0B 81 FA
00000A20 : 2D 14 27 54 B2 8F E5 29 01 DB 72 31 27 A0 D6 41
00000A30 : A9 24 49 55 92 A2 CB BA 82 A3 92 A4 66 51 D8 F1
00000A40 : 4B C1 31 E7 C5 82 AB 2B 01 54 E1 4C 50 38 43 D1
00000A50 : 21 EF 8D E5 29 01 82 0F 49 31 88 3D EB 82 8F C9
00000A60 : D1 21 EF D8 0D 9B 21 F0 82 11 4B 01 31 0F 3D 73
00000A70 : E7 E7 05 8B E7 E7 25 8B 81 A9 09 31 79 86 85 29
00000A80 : 01 81 AB 4B 01 CA E7 C9 29 30 68 9F 43 29 EB 8A
00000A90 : 66 51 04 68 B7 C3 29 84 E9 19 AB 85 CF 61 64 23
00000AA0 : AB C0 0B 1A 01 BE 99 CF 09 30 6F 39 25 C2 A3 C9
00000AB0 : 9C 6B 5A 41 DA 04 41 11 01 0B 81 85 89 19 3D D9
00000AC0 : C0 0D 2D 2E A2 88 85 2C 81 82 91 2B 01 31 23 3E
00000AD0 : 65 81 EF 09 31 69 A3 99 D6 2B 09 31 23 3E 69 F7
00000AE0 : C7 C2 C8 81 92 C0 41 82 5A 4C 3C AC 9A EA C7 21
00000AF0 : 99 50 0B 21 05 81 25 61 8F 01 82 4B 2B 01 32 AD
00000B00 : 82 4B 4B 01 30 2D 81 A9 09 31 B9 9D E9 49 DA AD
00000B10 : 5C 4B E5 32 AD BD 4C 65 D6 95 E2 A4 41 AC CF 09
00000B20 : 25 8D 9E 83 AB 63 41 B6 8A 05 9D 01 B0 87 14 AE
00000B30 : FF 09 61 3D EE AD 0D 14 AC BD 82 A9 49 30 2E DB
00000B40 : 49 61 C0 E7 AB CF 01 31 2E DF 23 29 82 51 0B 01
00000B50 : 31 EF DB 81 AF C9 71 89 DB BE 8D 84 BE F8 CB 2B
00000B60 : 01 3D C7 CA ED B9 BE 82 AF 29 31 EE A6 AD B1 4B
00000B70 : 01 BE 54 2C 0C 88 40 41 2B 01 3D C7 BE AD 16 4B
00000B80 : 11 31 2E 1E 67 8D B3 0C 3D C1 26 45 81 AC 8F C9
00000B90 : 71 89 D9 E8 4B 0B 01 05 C3 DF C3 29 00 A1 28 C1
00000BA0 : 4B 81 16 65 85 8B 0B 81 92 C2 87 BE B0 2E 65 3D
00000BB0 : EE C5 AD 11 4B 01 31 2F 3A 88 81 A9 29 31 8F 88
00000BC0 : C3 B9 85 E5 7D C1 82 4B 4B 01 31 F7 82 A9 C9 30
00000BD0 : 37 82 13 86 41 81 64 B2 D0 A0 41 B1 2D 72 0F BF
00000BE0 : 83 49 49 CF A1 41 86 85 7C 81 A1 41 83 47 CF 9F
00000BF0 : E1 DB 4F 49 31 89 89 D8 0F 09 31 92 3D ED FF FF Block 6
00000C00 : 0C 50 48 00 08 2C CF BB 81 8F 81 9C C5 98 41 00
00000C10 : 81 28 41 2B 01 27 45 00 A9 38 8B 33 45 0A A2 9A
00000C20 : 97 63 01 16 7C 30 B4 52 45 D8 4B 0B 01 4C 2D DB
00000C30 : 49 61 8C B6 47 93 87 4B 4C C1 F6 B0 6B AC C1 F5
00000C40 : E0 09 91 04 85 B0 52 31 33 F6 AF 41 8F 63 99 B4
```

```
00000C50 : E5 98 41 AE 6B 4B 01 E3 D9 C9 61 30 B4 FF 65 7D
00000C60 : 01 E7 E7 15 94 FD EB 4B 01 30 B4 82 4F 09 31 8F
00000C70 : F3 82 AD 15 81 F3 84 E7 F3 82 4F 49 31 85 F3 82
00000C80 : F1 2B 01 8D 11 99 A3 C6 DA 81 81 B5 49 31 85 53
00000C90 : 84 3E B8 00 41 28 41 0B 01 F6 E8 CD 15 89 52 8C
00000CA0 : B6 A3 29 8E 43 21 B8 28 6B 9E D8 54 0D 31 85 51
00000CB0 : ED 05 C5 A7 C4 48 69 94 20 A1 00 51 30 C1 51 2D
00000CC0 : E0 BE 8D 15 94 BE 82 F1 4B 01 8D E6 84 F3 30 B4
00000CD0 : 4F 84 3E B8 E8 AB 2B 01 24 B6 B5 03 29 8A E9 09
00000CE0 : 8F 8F C3 C9 8A C5 29 01 85 E9 79 58 A4 CF 01 B0
00000CF0 : 6D 58 A4 A0 82 4D 86 26 CF 82 AF 29 31 25 FE CF
00000D00 : 81 48 40 18 C1 31 F7 FB EB 4B 01 31 F7 BF 09 C9
00000D10 : 30 37 82 4D B9 3E F9 82 4F 29 31 8F 5C A4 82 4F
00000D20 : 49 31 8F 5C A4 81 F1 0A 41 31 37 B2 82 13 9B 5C
00000D30 : B4 AC D0 A0 41 81 F3 84 26 E9 94 AC 95 C9 70 AC
00000D40 : 9A C0 FD A7 14 2D AD 69 49 DE 99 8B 0B 41 09 EF
00000D50 : 8A 61 F0 25 D3 01 B7 A3 29 8F 63 21 B9 23 91 81
00000D60 : AB 28 41 D3 AD 14 4D DE 11 23 BD F8 CB 2B 41 3C
00000D70 : 2E 8A C5 29 01 99 F2 25 AF 3A 88 31 25 81 8E 03
00000D80 : C9 E8 C9 29 35 32 B3 63 29 8A C3 21 EB E5 AC C1
00000D90 : B3 63 29 8A C3 21 82 AD 25 A5 F0 A3 C1 8C C6 31
00000DA0 : 23 81 B9 A4 9B 61 BB 02 A5 84 11 7B 41 16 92 B3
00000DB0 : 82 AB 2B 41 06 81 86 81 AC 87 05 C5 EB 43 71 FD
00000DC0 : A7 14 2E 9E 05 49 41 83 45 2B 81 83 45 71 41 9C
00000DD0 : C7 39 25 98 E7 24 AE 81 AB 28 41 39 25 83 47 39
00000DE0 : D9 AE 6B 0B 81 08 27 E7 E7 87 9E 47 14 35 9E 45
00000DF0 : 49 41 ED 23 C9 84 E7 D8 81 AB 28 41 D8 FF FF FF

Block 7
00000E00 : E6 69 11 9D E7 E7 BC 81 A9 09 38 99 98 F3 67 81
00000E10 : 38 9C 09 25 A4 23 C9 8E A1 82 0D 87 09 F8 A2 E3
00000E20 : 29 86 85 29 01 87 27 B5 04 03 21 39 05 24 ED 05
00000E30 : 09 C1 DF C3 29 8C 03 21 C2 87 BE B1 EB 48 C1 3D
00000E40 : F4 00 21 50 4A D8 24 74 BD 81 81 B7 0B 81 13 3C
00000E50 : 30 A7 A6 DD 0B 7B 01 14 B2 B1 6C 34 33 F5 81 9E
00000E60 : 69 09 39 C1 BE 8D 9D BE CA ED BC BE 82 4F 09 38
00000E70 : 81 39 C1 87 27 14 35 81 AB 2B 81 96 A1 41 81 AB
00000E80 : 4B 81 96 CE 21 A1 65 49 41 8A 23 C9 AD 51 0B 81
00000E90 : 96 3D 85 DC 8B 9D 01 87 DC C5 4D 01 A1 A7 EB 8C
00000EA0 : 03 C9 AC CF 49 38 97 14 A4 82 11 0B 81 12 E1 1D
00000EB0 : EE CF E0 81 87 29 29 06 B8 D8 14 2D D8 24 74 C0
00000EC0 : DC 8C 18 23 F9 81 A4 86 E9 81 A8 E4 99 61 82 0D
00000ED0 : 05 C5 A5 AC CF 29 38 A6 B1 8B E7 AE 8D 85 AB 41
00000EE0 : A4 A8 0A EB 41 C7 62 CA 41 92 60 41 8D 88 78 4A
00000EF0 : AD 81 E1 E9 29 D6 8F C3 A1 8B E5 48 41 FF E3 A1
00000F00 : 8B C5 29 01 B2 CC 82 C0 81 E7 E7 05 C7 CB 49 29
00000F10 : BE D7 C9 49 38 E5 9E 43 79 81 AB 0B 81 A6 00 21
00000F20 : 19 01 2D EB DC C5 61 41 00 41 30 41 15 C7 05 89
00000F30 : 00 29 48 41 05 C7 30 24 16 68 C0 A7 BE E8 74 4C
00000F40 : 3C AE 1D 2E 14 B2 21 83 47 38 EF 81 AD 05 C7 72
00000F50 : B0 CC 85 53 C1 88 21 B3 47 C5 9C C5 1B C1 9E 43
00000F60 : A9 EB 03 59 86 E9 11 3D EB 86 E9 09 8F 86 EB 13
00000F70 : C1 3D 73 86 85 29 01 E7 C9 29 D7 9F 43 29 89 C3
00000F80 : 21 D4 C9 69 06 4B 8E E3 99 AD 4F 49 39 C1 0D 85
00000F90 : B0 4D 3C 75 CC 81 A9 09 38 6F 84 E7 CB CE 21 FA
00000FA0 : 49 91 3D 8C 8D 65 29 01 FA C7 56 14 8D 65 29 01
00000FB0 : A4 86 93 41 C6 22 CB 90 A1 FF 09 89 54 B4 B6 05
```

```
00000FC0 : A1 41 8C 05 29 01 C3 A6 BE 81 85 E5 0B 01 83 0F
00000FD0 : 49 05 CE 54 2C 84 AD 15 CE AE A5 A1 8E 85 66 41
00000FE0 : 9A 11 0B 81 05 89 F7 8C A3 C9 00 21 30 41 15 C5
00000FF0 : 32 B8 FA 07 55 A2 8A C5 29 01 83 0F 49 39 ED AE
```

Block 8
```
00001000 : 98 D1 12 41 39 ED AE 99 EB 0B 81 05 C1 C2 E1 B0
00001010 : 27 64 2E 82 AB 2B 81 24 EE 00 81 09 1D BE AD 05
00001020 : CE BE 82 F1 2B 81 24 EE 88 A2 28 4D F7 8E 43 C9
00001030 : 82 AB 0B 81 05 C1 AC CF 29 05 D0 3D 85 FD EB 0B
00001040 : 81 D9 9A 4D BB EB 89 23 C9 82 4F 09 39 C5 E8 81
00001050 : EF 49 38 35 E6 82 4F 09 39 C5 48 B4 A4 E1 00 51
00001060 : 48 41 15 DA 14 92 BD F6 8B 0B 81 C3 A1 83 29 DB
00001070 : 49 99 20 A5 85 8B 4C C1 AB DF E9 69 9E 82 4D 15
00001080 : DA 3D 23 B3 03 61 AF E9 49 4D EE DB 49 D1 15 C5
00001090 : B1 A7 BD B1 E9 79 8D 83 AF 09 3A 74 05 8B 8F 03
000010A0 : 99 D8 8F 09 39 33 F5 82 8F 29 3B 4F B3 85 ED 24
000010B0 : E8 F3 A6 A6 DA A1 85 E9 29 06 88 9C C7 51 0F 88
000010C0 : C5 48 C1 9F E7 3E 65 AD 0B 0B 81 50 2D B4 CD 5C
000010D0 : A9 A8 FF 65 2C 81 8A 65 29 01 D8 D5 29 38 B6 3D
000010E0 : 85 D6 8F C3 A1 91 65 66 41 83 0D C0 B3 81 A7 14
000010F0 : 35 FE 45 2C 01 99 E9 C9 40 33 9A 89 E1 40 33 81
00001100 : AB 29 41 E4 AD 69 49 E4 98 ED 67 90 30 39 BB 61
00001110 : D8 AD 26 0C 05 C5 86 49 79 CC 81 AB 29 41 E5 AC
00001120 : 93 67 90 49 E4 54 74 AD B4 4D 40 32 51 34 C0 B6
00001130 : A6 4C 2E 81 BB 06 C4 91 8C A5 A1 41 9B EB 7C 01
00001140 : 4D 25 C1 C3 C9 E8 AB CC 01 06 73 A1 E3 29 E9 2B
00001150 : E4 01 06 73 A2 83 29 82 AB 4B C1 42 79 82 AF C9
00001160 : 40 33 EC 83 4F E1 40 33 EC 83 0D 25 F0 4D 23 AC
00001170 : 8D 67 90 06 88 E8 4B 0C 01 51 3A B4 A3 29 8C 03
00001180 : 21 DE 25 9B 41 8C 25 0B 01 04 41 09 A9 A3 48 28
00001190 : EB 81 C6 82 C8 81 91 01 E9 C3 91 AF 83 29 EB 43
000011A0 : 91 9E 45 4B C1 9E 45 7D C1 FD A7 98 D9 45 2C 81
000011B0 : 9B 29 91 EB C0 C3 C9 AC 87 B6 AC 87 66 45 81 A9
000011C0 : 29 4A 59 82 0F 09 48 A2 81 82 0F 29 06 41 8F 8B
000011D0 : C3 C9 9A ED 49 22 16 49 C4 A0 81 8D 61 81 A9 09
000011E0 : E8 84 E7 E8 FD A9 29 89 D8 AB CC 81 3C 24 81 AD
000011F0 : 98 95 9F 87 D0 82 11 0C 81 14 C1 92 88 87 3D F4
```

Block 9
```
00001200 : 81 0D 8E 14 D4 E8 4B 0C 81 48 27 DF C3 29 8C 03
00001210 : 21 AF ED 3C F2 06 08 85 4F 29 20 A1 95 88 BB 0B
00001220 : 81 95 86 8F E1 20 2E 95 EB 8A 92 51 0C 24 E2 E3
00001230 : 29 8F 83 21 84 ED 70 6F 95 85 CD 48 23 54 81 B0
00001240 : 8B 7D 41 0D 05 87 87 46 A5 FF 07 48 AC 81 A9 29
00001250 : 4B 2C 9F E1 81 AB 0C 81 9C 85 8B 91 41 CE B4 CB
00001260 : 43 C1 FD 82 F1 2C 81 65 8C C8 D0 60 81 CA EB 0C
00001270 : 81 C8 8A 61 B0 29 91 3D ED B0 AD DE F5 A3 A7 EB
00001280 : 8E 23 C9 8D 64 48 E1 AE 07 26 4E 9A EB 91 41 DA
00001290 : 84 E5 7B 81 CD C1 A0 25 2C C1 A0 A3 49 A1 43 29
000012A0 : C1 43 C9 B0 27 48 AE A1 A7 DA 9C 87 65 EE 8A 61
000012B0 : 85 87 3D D9 CA ED 98 BE 83 0F 09 49 EE AE 88 C5
000012C0 : AB 41 C1 87 A2 A5 03 29 9C F1 91 41 39 C5 EF AD
000012D0 : D1 28 41 49 C1 C2 82 4D 06 4F 38 B4 A3 61 85 87
000012E0 : 49 2F 87 25 7D C1 84 E5 2C 81 85 89 91 B6 CE E1
000012F0 : 81 AB 28 41 48 B2 CE 21 86 E7 C3 83 0F 49 48 23
00001300 : AE B8 46 C4 41 AC CF 29 06 53 2D 2E 82 4B 0C 81
```

```
00001310 : A3 B0 4D 49 33 F5 B0 27 C6 B0 2B 91 41 FA E8 C9
00001320 : 29 E7 B3 63 29 B0 85 2D 01 9A 2D 26 45 52 81 82
00001330 : AD 9F F3 AD 11 4B C1 49 19 51 0D BF 44 48 D1 D8
00001340 : 0F 09 49 34 DF B0 6B 90 41 F9 A1 C7 EB A3 65 7D
00001350 : 41 B1 E9 29 F9 A1 C7 EB 87 69 09 52 59 87 69 29
00001360 : 52 59 82 AD 26 45 52 81 E8 AB 2C 81 14 36 B5 03
00001370 : 29 8C 63 21 E1 C8 6D 9E 82 4F 09 4A 41 94 AE 07
00001380 : 27 45 E9 C3 99 DA C3 29 9D 23 49 9C 25 99 41 9E
00001390 : 43 79 48 80 18 41 24 33 9E A3 29 9B 6D 3C 33 4C
000013A0 : 39 99 89 C9 4E 75 40 50 38 53 3C 33 4C 39 8D E5
000013B0 : 29 01 D8 0F 09 4C A2 86 B2 C9 79 89 BA 25 93 81
000013C0 : 86 83 21 AD 6B 2C C1 B4 82 AB 48 41 EC AE AF 79
000013D0 : 4E 08 A0 E8 AB 2C C1 24 A7 B5 03 29 8C 63 21 E7
000013E0 : E7 06 68 9D C3 29 88 23 21 86 E7 A5 8B C5 66 41
000013F0 : A2 E6 DA 81 82 4D A3 AE A3 68 4B F7 8F 82 CD FF
```

Common Expression Verification Table

The listing on the following pages is the hexadecimal representation of the VERTAB section of data for a portion of a preferred Common Expression Verification Table. This table is intended for use with the Executable Module, *supra*. Ten blocks of the table are listed; the table may be extended in accord with the teachings provided in the Specification.

March 26, 86

Block 0
```
00000000 : 9C 05 B9 8A 52 10 44 9C 47 14 30 B5 20 96 56 10
00000010 : 3A A2 22 B9 5E A7 8D 86 1E B7 51 A0 FA A3 AD AB
00000020 : 02 21 66 D9 A3 23 43 10 9D 7B 94 AE 9B 07 BB BF
00000030 : 6E 85 66 85 85 7D BC 9C 56 1E 51 AD 53 A4 3F BA
00000040 : AE 0D 64 12 86 3A AC 14 54 AE F8 B0 FC 0A C1 BA
00000050 : 04 15 EE 04 E1 20 E3 B9 FD BD 05 B3 B8 8D 60 00
00000060 : 89 37 4B 12 49 D8 F9 FE 97 BA 3D 94 32 24 FD BE
00000070 : B6 9B 78 14 EA 9F A9 43 A0 1A A7 5D 23 03 F2 15
00000080 : 0F BF 50 84 A6 90 43 00 21 EF CB BF DB 9D C1 91
00000090 : 1F BE 49 00 9E 2B 4B 00 0E 83 38 89 A0 15 1E 8A
000000A0 : E4 9B 82 03 E6 90 61 24 8A 1E CE 3B 4F 9E 1F FD
000000B0 : F4 A0 C5 A0 6C 05 9D 14 D3 84 53 84 2E 30 11 20
000000C0 : B7 1A 61 80 27 80 29 0F E1 2C 58 18 98 37 F5 AC
000000D0 : 1B 91 69 40 26 9A 58 16 27 02 68 B0 0B 85 62 4D
000000E0 : 63 32 55 32 2C 1F 2F AD 5D 11 75 40 F2 37 C4 B5
000000F0 : 64 9E 0B 11 85 0A 26 37 0B BB B5 09 D2 06 E1 F3
00000100 : 87 06 C4 2C 6B A2 B5 9B 90 9D 9B 1F D6 0A C2 2C
00000110 : 72 02 BC 34 D3 90 D6 62 ED D4 42 86 71 8A CF 3C
00000120 : 3E 0D 43 07 77 39 5D AA 16 9C BB A5 B1 02 A1 B5
00000130 : 52 04 45 36 B7 EC 96 0C 43 14 75 20 0D 56 F7 EF
00000140 : 3F 3D 64 8E 07 29 9C 3D 1C 27 70 0A 5A 32 1B 20
00000150 : 53 9E A4 35 0B 82 E3 0A 77 B3 3A AC 10 1F C4 D2
00000160 : 02 96 8E A2 80 35 73 BB E4 8A 49 26 B1 29 DF AE
```

```
00000170 : E0 A8 6F B4 8C 14 A2 30 38 29 61 9A DF 14 41 B6
00000180 : 11 B2 68 A7 06 9F 2B 89 A7 9F 6F AB 62 21 42 2F
00000190 : CC 0E B5 98 3F 39 66 A7 AE 30 96 03 52 B9 96 A1
000001A0 : 3D B9 07 B2 76 28 90 39 71 99 34 9D 99 3C 38 87
000001B0 : DA B1 CA 67 7E 01 10 37 DD B8 F3 A8 62 04 3B B6
000001C0 : 7F BA BB 0B 2C 90 D6 8B 1A 28 D3 82 39 8D D1 1B
000001D0 : 8A 24 DC 8B A9 B6 1F 11 1B 37 47 92 95 37 1E 43
000001E0 : 15 37 63 91 DC 15 8D 98 66 11 7A 93 B2 24 29 A8
000001F0 : 99 3D FF 3A 6E 3F 2A 16 A0 B9 22 31 D6 AC 4A 2B
```

Block 1
```
00000200 : A2 AD 31 0D 9F 0C 7E 60 C9 3B 81 32 71 29 52 9E
00000210 : 49 01 64 10 26 AB 31 13 6D 21 95 30 C9 28 6E 21
00000220 : DB B9 B0 05 DB 78 93 2F A6 26 74 21 D8 0D C3 AD
00000230 : BC B5 1A 23 D9 A5 32 B8 5D 31 19 65 EA 2C 54 85
00000240 : 15 A1 95 B2 51 B1 0E D3 1A A1 9A 3C 41 B9 D1 24
00000250 : F6 BD 71 36 5F BD 86 20 6E 00 03 29 8E 3B 83 82
00000260 : 3D A0 72 81 E5 B2 5E 81 49 18 DF 01 B1 99 D7 5D
00000270 : 4B A9 F0 B3 9C 1B 4D 8C 20 8E 79 3B 99 2C 08 19
00000280 : A5 BE 60 1D B5 0E 0D 71 94 9E 6D BC 22 32 C4 0E
00000290 : 1B BD 7F 72 EB A1 D4 1F 7C 82 94 2C C9 94 38 1F
000002A0 : 53 0F 53 02 31 DB 9D 9C AC 90 F3 29 E0 29 DD 8E
000002B0 : CF BA 58 B1 E5 A0 CB 19 1E 12 F6 A9 09 A5 EB 2C
000002C0 : 66 8B 6F 32 AC B1 4A 2A 49 B2 F1 1C B7 AD D5 8A
000002D0 : C8 7D 11 9A BB AD 6B 29 64 A1 E9 2F FD 0C 4C 27
000002E0 : AF A2 7F 8C 02 32 F4 1C 07 0F 00 1D AB 8B 2F 32
000002F0 : FC BE BE 02 98 A0 3F 10 EF BB 3B 9D AF 2D 2B A4
00000300 : 19 0D 69 1E 1E 84 82 3F 8A 00 49 30 E5 9C 81 87
00000310 : 89 1B 5D A2 21 B1 31 BC A4 B9 06 27 A4 2B 72 83
00000320 : 94 34 12 2E 67 13 7C 9C 86 32 A2 93 72 9D CB B1
00000330 : 2F 37 8B B2 BC 8F 89 B2 F0 1C 77 B8 1C 01 94 98
00000340 : C9 3B D5 26 B3 BD A1 8A 65 B2 80 03 C7 84 F4 97
00000350 : B2 2F CC 0B 2A 1E 34 A9 D1 02 32 A9 57 A3 3E 26
00000360 : 9A 30 20 A7 A5 B6 3B 8E 9E 13 29 1C 70 A7 3A 10
00000370 : 3F 12 38 1D 9E 35 B0 30 F6 90 29 BC 59 9E 3E 8F
00000380 : 67 80 48 91 52 2D 3F 1E 17 13 E1 00 60 A3 C6 3F
00000390 : BD 0D C8 BF CB 3F 4A 87 E4 BB DE 00 7B B0 FF 38
000003A0 : D6 84 1D 53 2E 27 B3 0B AF 19 61 01 6E 9A 51 8A
000003B0 : CD 9E 07 86 78 9C D0 AE 0E 89 E4 81 DF BE 9A 3C
000003C0 : 4F 39 B8 8A 3B A9 5C 1C E1 27 67 A3 B4 87 59 BF
000003D0 : 42 20 1F 8E 6C 9B F2 A1 E7 08 66 7F E0 06 02 15
000003E0 : 52 B3 54 AD 18 B0 08 2E 92 65 E6 C0 78 12 F0 B3
000003F0 : 94 88 6D 1D 0A D0 37 4C 57 A3 4F 8E AE AB 8D 20
```

Block 2
```
00000400 : C7 8E 9A 7C 13 72 82 2F 20 D2 58 9B D6 13 65 22
00000410 : 7F 31 20 2D 41 B2 23 BC CF 4B F2 8C 05 B0 88 0C
00000420 : 44 B2 41 BB 3B 19 8F 9A 59 BF 67 1E 95 9F 75 62
00000430 : 25 31 64 A0 0A 3E 79 22 07 58 70 84 8D 05 2C 30
00000440 : 35 A9 67 A1 21 12 62 AD 19 B2 E8 1B 79 89 0F A9
00000450 : 4C B7 58 A5 1F A8 A2 16 43 A6 5B 3F 62 A0 52 91
00000460 : 05 CF 35 16 BD 8A E4 33 33 33 05 C1 95 0A CA 2E
00000470 : 3C AF 30 0C 47 06 D5 0E 6C A7 63 85 0F 2B 87 24
00000480 : 48 05 6E 80 F4 BC 70 B8 46 B9 27 83 6A F7 B1 0C
00000490 : 9A 01 65 2C 7F 28 F5 C1 A7 10 F1 94 83 A6 65 27
000004A0 : A9 1A DA 1A 80 37 ED 91 69 14 FA AE 57 0B 19 98
000004B0 : 13 0C B0 3C 1B 34 66 21 FD 1C B4 0C 03 8A CC 89
```

```
000004C0 : AB 20 A8 02 03 0C D4 C5 33 69 93 02 9D 23 BE 05
000004D0 : D4 23 8D 76 F7 05 57 22 F8 9F 6B A2 4E 8B 37 18
000004E0 : 4A 88 C7 88 13 8C A1 19 0D A4 A5 25 FA 9B 31 24
000004F0 : 28 45 FD A6 61 16 2E 0B AE 9E A8 FE 52 A5 F6 B9
00000500 : 31 1B 43 BE 66 1B 8C 0E EB 0D FD 21 DE 28 5F 3A
00000510 : 16 F5 1B 9D E9 8D 88 B4 0E 96 BA 2B AF B9 C9 2B
00000520 : BE 92 FF A0 8A 27 89 27 1D B9 AA B3 7D 2E B2 98
00000530 : 9B 34 40 06 98 17 62 31 2C 0B 2D B8 10 15 E8 24
00000540 : B5 41 86 A4 31 BA 32 1F 7C 1C A7 AE A5 34 11 0C
00000550 : 20 89 A0 1A 75 05 1A 6F AD 86 61 14 DC 80 D8 08
00000560 : F2 E6 65 0E 1D A9 F3 41 BE 27 65 23 A5 84 A6 B6
00000570 : 5F 05 FF A4 94 BC 41 B1 B3 3F 2F BB 31 16 FB A4
00000580 : C5 04 10 B2 7B 30 D5 A3 72 22 A0 34 53 3F EC 11
00000590 : 7E 05 18 23 47 03 2E BD B1 0F C6 32 51 B0 18 2B
000005A0 : DE 8B 2B B7 64 B4 82 B0 B6 5D 08 36 CC 87 06 30
000005B0 : 37 CE 4A BF 30 26 BA 2B 07 88 48 AC 62 81 3D 3B
000005C0 : A8 8B 3C 0F 4C BE 67 1D 76 80 62 A3 CF C7 DC 89
000005D0 : 20 CF D6 02 74 10 06 3F BE 09 35 8C ED 80 18 8D
000005E0 : 64 A1 3C 5A 62 B7 0E 8F D8 09 25 AA 77 2F 76 2F
000005F0 : F3 17 AC 9F 77 11 DA B4 57 86 96 86 04 88 6C 19

Block 3
00000600 : 05 8F A7 B2 DF 92 7D 3F 49 77 C6 10 76 F9 F3 34
00000610 : C4 0C F7 9E C5 BB BE 92 99 D6 10 B0 FE 0F 4F 90
00000620 : 01 4F B4 36 0B 0E 08 82 6B 27 60 9A 55 03 F5 8D
00000630 : 05 30 C8 84 21 02 95 11 6F 33 C4 89 B1 B9 56 A9
00000640 : 43 04 04 89 20 B0 17 86 83 AC 39 34 24 B0 E5 A6
00000650 : AF 2D E5 98 21 90 38 02 BF A1 82 AC 0D 16 2A AD
00000660 : 23 BC 1D 80 0C 35 B3 05 26 13 81 67 A9 90 C4 C4
00000670 : FB 22 79 23 15 8D 02 B3 CA A2 2E BC 62 9B D0 06
00000680 : 74 26 C9 8A 76 32 25 3A 99 36 A2 80 58 62 F5 B4
00000690 : 2A 04 27 AE 33 1C 81 83 2F 29 2E 23 76 3F D8 32
000006A0 : A6 02 25 20 7E AB DA 15 19 19 AE AB 3E 69 BB 0A
000006B0 : D8 9B 97 02 A2 A6 57 38 D5 05 DB 1D AC B8 0E 20
000006C0 : DC 88 0B 80 95 8C E0 12 0B 3A 49 38 79 BF 99 82
000006D0 : 9E 82 59 A8 5F 31 01 0B 41 3D F3 77 6C 01 CE AC
000006E0 : 1F 15 DC AB F7 A4 20 8E AC 91 2A 2C 12 81 C3 12
000006F0 : 7B 7F C8 86 7E B3 B7 37 7F BF 7D A7 7E A7 7C BF
00000700 : 16 06 39 A5 E6 A5 51 10 B9 91 C6 03 F8 35 82 AB
00000710 : A6 10 35 29 51 E7 E4 B6 64 B0 3A B0 CE CD 93 80
00000720 : C9 17 35 38 A3 F2 CE 9C 21 84 11 1D 88 2B 7A 0E
00000730 : 6D BE 31 30 C7 07 7C BA 71 8E 74 1F 23 DC 9E 87
00000740 : BD E4 46 0D 9C 3E BA 31 B7 02 B8 85 C5 06 9D A2
00000750 : 9C B2 AA 2F C8 10 CF 87 59 17 B0 85 BC 2D CA 91
00000760 : 65 00 4B 2F E8 B4 58 2B 93 00 A8 1A 83 21 96 A1
00000770 : E0 19 28 9C A4 96 03 47 BE B4 7D 93 23 B6 CE 9F
00000780 : F7 24 BA 33 46 BB 2B 1D CB B7 78 81 6E 52 72 1A
00000790 : 06 08 F3 90 00 25 49 99 21 1F B3 82 5F 45 CA B2
000007A0 : 76 31 0B 15 41 95 58 AE 8E 27 A7 84 EA 97 E4 AD
000007B0 : E7 BA CB 84 34 0F 77 37 C9 0F DE 3C B7 A1 E1 B2
000007C0 : CC 88 7D 99 16 8C CF 33 58 18 7C 9C CF A1 8C 48
000007D0 : 5F B1 FA 9B A2 21 04 1A 6A 0E 78 8A 92 B5 1C 8E
000007E0 : A1 2E AA A6 D3 D1 C2 2B 57 23 D5 91 0D 2D 4B 6C
000007F0 : 8B 07 B3 19 93 AE 26 AF E9 35 09 B0 CF 22 50 A4
```

```
Block 4
00000800 : 3D 8C 65 24 56 14 C2 13 D1 AA 33 9B D2 9F 6C A2
00000810 : 24 A7 C0 33 1C B3 6F 24 87 97 C6 A7 1E 93 64 79
00000820 : 07 24 FE 1D FE 95 F0 4B 12 1D 9F 37 BD 14 11 12
00000830 : D7 2F B1 B4 D0 2D 6F 34 6E 94 6D 37 1E B2 19 A9
00000840 : F4 35 48 D3 D2 37 51 65 D6 0F 0E AB 1B 9C 8B 9B
00000850 : 04 1A AF A8 91 91 EB 20 3E 9D 78 C3 89 B7 78 BE
00000860 : 07 02 0E 83 29 1D 53 07 EB 19 23 B3 FB B6 34 53
00000870 : 49 14 75 BD B0 8F CD 33 B7 33 8B 2C 18 16 CC 95
00000880 : 34 A2 48 0E A7 20 F9 AA 07 32 32 B0 BA AD 50 B6
00000890 : 6A B5 CC 8A 59 1C 9D 16 4A 1F 2F 1B 54 03 58 90
000008A0 : 78 8C 9A 9D 10 AF FF 12 51 B0 E1 B9 E7 1F 63 15
000008B0 : 5C 39 2F A5 FA 27 4C 35 D2 2D 31 94 85 80 36 84
000008C0 : 80 91 3D 0C 06 AF C4 25 46 BD 2D E8 67 AE C2 BA
000008D0 : 6D 94 79 A2 6D 86 5E 1B F9 B3 FB 91 8E A7 42 15
000008E0 : A1 08 EC 87 AC 84 13 A2 1F 94 FF 21 BA 98 44 BC
000008F0 : 94 C3 E7 0D 34 B8 CC BA 1F B7 38 03 94 32 CE BA
00000900 : 79 2B 01 B2 0E A0 B9 3F 70 9E 10 36 AC A4 CA 11
00000910 : 4E A6 5F 85 CB B9 DC 51 4D 41 D2 0C 65 31 47 9C
00000920 : 09 FF 52 15 29 B5 D1 0B 81 9E 7F 27 58 AB 1E 23
00000930 : 54 B9 8B 83 5A 8C B5 8B 17 36 D6 84 CB 8A 20 2E
00000940 : BB 80 BA 00 DA 39 1A 8A 2A A6 37 13 AE A8 6A 04
00000950 : BB 93 39 AC 9B D1 03 7A DE 02 1C 09 21 91 F6 1F
00000960 : F8 B0 A2 8C 45 93 A6 BA 89 F4 CF 9B 03 B6 FD 99
00000970 : 7D 1C EB BD 3D 0E AC 2A 4D 2C 1E 80 FE 85 73 99
00000980 : 25 91 10 22 27 9C C4 3D 7D AB B1 F7 54 8D C2 AE
00000990 : AB 25 7C BB 9A B9 0F E6 A7 86 CB B5 92 6B 43 2F
000009A0 : 0C 84 D1 20 15 18 4B 06 82 38 18 14 FD B7 35 2C
000009B0 : FA 73 E3 1A 56 B7 8E 97 47 A8 B5 39 3E B7 00 A5
000009C0 : 3D A6 A5 93 29 27 B8 A2 6E 11 83 16 C2 90 AF 28
000009D0 : F9 23 16 48 02 AF C1 28 52 1B 18 8B DC 79 6B B5
000009E0 : A4 BC 98 19 1D 99 D4 97 18 A2 FA 01 8A 65 0C 89
000009F0 : C4 BE BE 12 A8 20 BD 96 63 5B 23 10 F6 A0 ED 1E Block 5
00000A00 : BC 8D 28 B8 B6 20 CA BF 6C 06 70 B5 D1 19 4B 05
00000A10 : 58 96 82 1A FC 37 D9 B6 02 BC 90 BE 3E 11 53 BA
00000A20 : EE B7 80 13 AD AF 6C BE 13 8F 6E 90 7D 80 EC 89
00000A30 : 60 11 CC 3A B0 02 1E BF 8F CB 78 25 74 A8 DB 0B
00000A40 : 94 A6 3A 37 05 B6 C6 A9 1A 82 7B 15 77 A3 58 06
00000A50 : 11 13 19 22 6E A2 4A D9 B9 27 08 AA 5A 94 24 80
00000A60 : 35 BF DE 29 23 BA 14 B6 96 9C DA 9C DD 88 E8 AE
00000A70 : 7F AD CF B4 08 36 05 24 E5 0B 2F AD 0F 8D 09 9C
00000A80 : 80 94 95 B9 A9 95 97 33 C1 95 7B 3B 06 61 97 06
00000A90 : 83 AC 48 02 85 9C 5E 8D FB B7 6B 12 74 A5 A1 0E
00000AA0 : A9 1F 7B 39 40 9E 83 86 40 81 74 BE 2B AA A6 A8
00000AB0 : D5 24 93 1C 0B 32 8B 86 5D 91 3F 8A 82 39 6F 13
00000AC0 : 62 0B 77 B6 6E 60 A4 21 FB 39 73 B6 21 1F 64 00
00000AD0 : 76 80 6C B9 1C 00 D4 A8 F4 1B 69 1B DA 10 D5 37
00000AE0 : FA 98 03 90 F6 8D 74 01 70 F0 7E 16 6E 00 65 03
00000AF0 : 3B AC 5C 18 42 BC BC 20 F1 38 DC 3D A9 D3 1E 3D
00000B00 : 96 22 9A B1 A0 18 23 80 79 72 62 03 B2 9C F6 32
00000B10 : 04 BA CF 13 61 97 F7 8E 6B 35 DD 9E A1 24 B1 5E
00000B20 : 86 B6 84 10 B6 1F BD A6 B3 C0 93 86 9D 88 EE 3E
00000B30 : 42 37 5E 8F 2B 8C D1 A7 23 02 62 E8 73 13 A9 BE
00000B40 : AD 20 FC 9B 41 25 96 23 0C 9B 0D BE 46 BF 2C 80
00000B50 : D8 92 31 AB E7 03 D5 35 74 03 AC 22 E0 14 5B A1
```

```
00000B60 : E0 19 5E 7F AD 23 48 23 CC 9D 0E B8 9B BF 22 1A
00000B70 : FA F0 AD 04 D1 B6 77 B1 7E 84 D8 29 29 35 02 31
00000B80 : 97 89 F3 3A 5E 17 4C 91 4F 2B 03 00 F3 B3 AE CF
00000B90 : 62 B1 35 F2 1F AD 2C B3 19 2D 17 DE 6A 92 96 84
00000BA0 : F5 9B 66 17 7C 35 7F 08 69 5B 7F B7 56 2D 4C 5E
00000BB0 : 6D B9 0E 97 D2 0A 9D 10 72 03 1F AE C6 B4 99 50
00000BC0 : FC 11 EF 2A 8C AF C0 32 91 29 A9 1E BA 18 D2 08
00000BD0 : 46 34 77 A2 33 04 35 3C 55 BD 79 37 52 2D A5 31
00000BE0 : A6 22 FA B7 9E 30 F2 12 52 B7 1D 09 E0 1F 47 88
00000BF0 : F3 37 26 80 DF A6 0F 03 B5 99 FE 62 83 61 07 B7

Block 6
00000C00 : 2F 92 31 0A 67 8F 94 B9 13 84 8C 2F E4 90 12 36
00000C10 : B9 8D E0 4D AA 82 A0 9A D7 98 00 B4 A6 33 18 84
00000C20 : 1E 0A B6 16 3C 2E A8 38 1D AD 6D 93 C6 BD E7 89
00000C30 : 97 BD 23 1E 8D 01 50 14 5A A6 7A 8A 01 F6 66 95
00000C40 : 18 AD 65 B3 27 86 05 B5 58 89 F2 5E EF 17 00 86
00000C50 : 91 21 A1 BA 16 F6 D2 91 46 05 70 AF 9F 12 E2 BC
00000C60 : 50 AD 89 8E B9 34 76 64 6D 38 EE 10 C3 8B DD 1F
00000C70 : 9E AE 2A 37 AD 94 BE A6 CD AA 18 20 FE A1 6C 3A
00000C80 : E4 35 DE 40 A2 9A 54 17 8B 09 29 1F A7 AF 37 AC
00000C90 : DF 0B 57 22 BC B5 8F A0 D7 81 74 A6 71 07 CC 1B
00000CA0 : 92 3D F4 29 57 8C 15 02 66 6E 48 BC 6C 61 DD 39
00000CB0 : 81 82 0E B6 05 35 36 B5 87 A6 A5 5E 2A 3B 69 17
00000CC0 : 87 A1 2B 01 60 A4 C9 9D 27 03 50 9E E6 1F 4D 40
00000CD0 : 20 11 50 A6 CB AE A0 99 45 2F E5 A6 A2 CE 99 8C
00000CE0 : 77 A2 4B 10 5D AF FF 8D 62 04 50 36 84 0B FE 0C
00000CF0 : 09 2E 4F B6 29 BF E6 26 8A 19 B9 A6 1D B4 E5 0C
00000D00 : 4D BC 78 24 71 B2 E4 81 A7 8E E6 9D 6E 0F CE 98
00000D10 : 69 3D B8 AA AC B1 8D E0 AE 12 01 06 88 1D 89 2B
00000D20 : CD 85 96 30 09 9F 03 25 89 8E 4D B7 1A 95 34 D0
00000D30 : 71 A1 E8 10 C5 DC AD 7D D2 B0 50 A0 0A BD 98 B0
00000D40 : 19 47 60 93 08 A0 58 BA 20 BF B0 32 45 16 77 82
00000D50 : C6 D1 BA 84 99 01 3E AA 28 A8 2C BB 10 AD 66 93
00000D60 : 3B A6 2C 97 86 1F 96 B4 D0 B0 D2 BF 50 B5 9E 9D
00000D70 : 8B 8F 58 37 6C 48 A6 BF 99 74 A8 B2 BE 0B 1E 89
00000D80 : B8 A1 17 A4 61 34 88 9E 5E BD 92 80 FF A7 03 9C
00000D90 : B7 21 50 A8 9D B8 3D AF 9C 3B 1F B6 57 19 2D 5E
00000DA0 : D8 B7 48 A8 62 B1 C9 8F 3D 35 41 1E E2 36 51 AD
00000DB0 : C3 09 6C BD 46 80 D4 A9 55 9D A9 95 18 11 0F 17
00000DC0 : E7 3E EC 16 DB AD E4 BE 21 1A 58 93 37 04 D4 29
00000DD0 : B7 1C 5F 37 5D BE A9 2A 5C 5D FC 9F 06 9B 11 8F
00000DE0 : 98 BE 03 AC 77 2B 78 15 53 0F 3F 83 2C B0 6D FD
00000DF0 : 7D 2B 2C 3F E1 06 2C 13 38 97 04 8B 9C A6 72 31

Block 7
00000E00 : 0B 8B 46 25 94 9E 80 A6 C3 9D 95 9E 61 67 A8 3A
00000E10 : 6F 27 81 14 E5 1D 19 11 72 97 6C 0B D7 82 64 11
00000E20 : F7 14 69 A0 65 37 F0 11 FB AC A4 36 61 77 EC 10
00000E30 : DB 73 79 8D 31 3E 73 06 1E 9A BD C0 1B 84 62 3C
00000E40 : 24 19 50 85 42 A1 35 84 31 1E B5 83 E5 B3 65 3D
00000E50 : 46 03 E1 AF 92 F0 F2 30 EA 80 68 BB 4D 34 39 84
00000E60 : 45 9F BE 9D 41 4B ED 89 2D 0E DD 13 44 B2 89 91
00000E70 : 83 96 D6 37 D3 1E DE 0E A9 97 99 30 DF 88 2A 3D
00000E80 : 16 98 71 A1 AE AB 7C B6 72 B0 0C BD 00 8B 56 2E
00000E90 : D6 AE 2C B7 81 2E A7 AA 19 A2 EC 3E 5F 97 A6 24
```

```
00000EA0 : A6 BB 1D 21 27 82 E6 20 2C 2E 30 37 45 97 1C E9
00000EB0 : C6 B9 2C 02 FB 83 E1 A4 EA F0 35 97 89 28 DC 04
00000EC0 : 90 0A 0E 2F 19 A8 78 F9 BC 4E B4 3C CD 1C C5 12
00000ED0 : 13 29 66 93 FA A0 3C A5 89 17 08 32 3D 24 6F 84
00000EE0 : C5 35 D6 8B FF 89 1C 91 20 2F BC 9E AF 15 63 BC
00000EF0 : 6B EE 8C 26 55 01 BC 86 B4 CF 32 B9 CC 8B BF B7
00000F00 : CE 32 58 B0 47 A5 33 46 1D 2F 09 B3 FA 25 10 5E
00000F10 : 1F A1 5D A3 D6 B3 3B 98 57 A7 51 94 09 2E CA B7
00000F20 : 33 BE 96 10 5D 0F 8B 4C 77 23 1D 9F 22 18 16 0A
00000F30 : AD 14 5F B4 64 33 6C A8 E2 08 0B 12 79 43 AD 1F
00000F40 : 50 22 AF 28 D9 33 63 9A B1 31 B7 3F 13 37 46 BE
00000F50 : 54 A5 AE 31 95 93 6F 86 F3 13 2B BE 99 1C 23 A3
00000F60 : 84 BC 72 13 EA 14 19 31 1C B0 38 AB 38 36 92 B5
00000F70 : 35 27 23 08 8A 86 DD 00 5B 2E 8E 05 23 9D 90 99
00000F80 : 17 AF 97 B0 64 95 B8 96 61 BD EC 0A C1 AE B2 33
00000F90 : 99 84 E6 B9 8A 36 FD E0 FD 9D 1A AF 96 AF 57 A9
00000FA0 : 2B 79 FE B1 F8 94 18 82 DC 0C 9A 22 52 13 82 3D
00000FB0 : E7 A2 6D BD 72 48 02 F6 BE 8D 30 0F C3 2F AB 8A
00000FC0 : F0 BD 5A 13 E4 40 07 3F F3 9F E0 34 A9 8C 10 2B
00000FD0 : 51 16 3E AB A5 8D 0B A7 E1 32 A2 26 C1 B5 B0 98
00000FE0 : 28 0C E3 BA 42 20 9B 98 7A 19 1D 1D B1 17 B2 23
00000FF0 : C8 2F 6D 8B 34 27 6F 35 1D 3E 15 9D 7C 04 0F 67

Block 8
00001000 : 7B 9D 69 E8 FD 2E 7D 8D CB 1E CA B3 41 60 AC 7E
00001010 : 41 41 61 68 28 35 3C 8E 54 18 65 28 64 89 AA 3C
00001020 : 37 BE 42 B4 16 A8 2A B6 85 39 85 01 4C 9A 50 67
00001030 : 10 27 B2 BE D7 B2 3B B1 C3 8B 10 AF A8 89 2B 24
00001040 : 9B A9 39 09 9B B6 BB 1D 1A 1E AF 9A C8 AA 91 90
00001050 : 64 41 C8 0B 76 27 03 8E 97 A9 52 AF C1 B7 28 1C
00001060 : 9B BE D0 24 0E 0F 2D 35 F3 97 BF 1A EA 3F E0 20
00001070 : 09 B8 80 19 9B 92 58 90 85 24 B7 9A C1 A9 8F 37
00001080 : 5F 92 63 02 5A 9A 7F EE 8A 0C FF 34 01 9B 03 14
00001090 : 50 1A 04 98 D3 36 26 07 48 91 2F 80 82 02 82 36
000010A0 : 24 89 C1 2B 31 0E ED BE DA 8E DB 22 67 5D E2 26
000010B0 : 0E 06 CA 84 DD A0 FF 81 98 BC 47 A3 20 88 59 33
000010C0 : 73 32 B7 BA 42 95 B2 B3 A9 06 3E BD 22 A2 57 B9
000010D0 : 7E 01 62 BD 82 A6 FA 05 9B BC 86 97 35 12 4C 33
000010E0 : 46 3C 6D 1A 5C AC 74 98 E0 26 CA A1 82 9A 72 15
000010F0 : AB 11 BA B0 C8 1D 00 2C 01 07 20 91 38 18 4C 63
00001100 : 8C A5 7A 99 2C 33 AB 3E 14 66 CB BB 7C 9C 12 2B
00001110 : 92 A5 C4 03 DC 2F C3 B0 66 B8 E2 21 74 0C 82 A2
00001120 : 89 AE 95 00 D9 AA 4C B9 9C 35 1F 9E D0 AA 06 39
00001130 : 8E 1D 7A 81 24 27 6F 16 65 9D 5A D9 24 2A 96 3E
00001140 : D8 3B 5D B4 0E 3C F7 E3 B8 89 9B 2D E8 8A 40 39
00001150 : 66 E8 AC 2E A2 35 09 B6 F0 23 5F 3D 12 E2 25 9E
00001160 : 7E 35 D4 3C 43 22 3F 38 69 22 A2 3B A6 FE D3 32
00001170 : BD AA A5 1B 0E AC 18 8F A4 EF BD 72 AF 1A CD A1
00001180 : B5 92 E3 A1 CA 18 59 88 36 8C 40 94 23 08 DE 2F
00001190 : A2 6D E0 81 31 20 73 3E B5 29 29 91 C8 AB CA A1
000011A0 : 90 3B B9 33 85 03 FD 33 DD B0 BF 1B 6F B9 EE 13
000011B0 : 75 A1 66 1A 6D D8 FA B5 54 0E D4 30 01 40 37 3A
000011C0 : E2 46 D7 2B 1C 0C FB 87 88 A9 D5 9C 3D 01 42 BD
000011D0 : A7 1A DD 31 BF 96 F9 95 CC 22 E4 B0 4B 3D 3E 2F
000011E0 : 53 1F 35 0B 59 BA 49 BF E4 31 22 1B F4 B2 00 8B
000011F0 : 9B A6 6A 1F 4B D8 CB 12 91 29 9A D9 0B 35 EF 1F
```

Block 9
```
00001200 : BA 9E 16 00 AC 89 36 81 FB 10 88 0E 98 4F 6E A9
00001210 : 66 36 7A B6 43 09 CC 2D 48 00 20 B4 8D 20 66 A9
00001220 : 8B BE 18 82 A5 AE 65 AB 13 13 85 93 81 95 C0 46
00001230 : 51 09 59 81 80 93 01 86 9A 94 74 A9 DE 1B 24 14
00001240 : 33 1A 74 9B 46 17 C9 D2 07 94 FB 39 F6 3E 4F 2D
00001250 : 3E 03 B5 88 33 14 C6 FC 94 B7 3E 1A F0 AB FC 0A
00001260 : F0 AB 32 20 28 34 83 90 FE 39 0D 37 76 3D 2A 36
00001270 : B6 BD 0F 97 DF E0 A0 3E 6A 1E 8B B7 A6 AA 8A 11
00001280 : 3E 84 4B B9 90 9B ED 25 0A 28 5C 9D 74 BE B2 1C
00001290 : 01 1D D5 CF CA A9 56 F2 05 9D E6 31 F3 61 49 AC
000012A0 : A8 86 9C 9D FD 18 00 13 47 1A AB B0 CF 01 1E BE
000012B0 : 39 15 A9 EA 06 8A 70 1C E4 B4 A2 18 47 14 64 94
000012C0 : 01 CD 6E EC FB 2A 4B 95 79 1B 6C 35 19 12 7A 13
000012D0 : 75 1B D0 AC 0E 9E 20 81 D0 A3 1F 05 C7 02 67 9C
000012E0 : A6 3C 06 08 7B 75 77 16 AA 81 87 30 CD 00 8A 2D
000012F0 : AE 1D A2 8F CA A2 45 8C 99 20 1C 16 D6 B1 94 30
00001300 : 09 01 E5 41 82 B4 10 8D 65 F9 CA 00 5B 19 58 8A
00001310 : 19 1D A6 3B 55 AF 18 91 04 AB E6 AE 16 B4 33 B5
00001320 : 8A 3A A5 14 B2 17 64 0A 23 B9 62 18 89 22 37 14
00001330 : CD 2B 7B 28 80 BA 3D 98 E1 3C 4B A9 DD AC 64 BF
00001340 : E7 BC B2 82 64 A6 C3 3E 14 3B 69 85 91 AF AF 7E
00001350 : 1A 0E D2 07 50 94 B1 01 B5 A2 B5 30 4C 16 94 CD
00001360 : 0F B4 3A B0 87 37 81 A0 6F 3D 94 13 BE 3E 2D 51
00001370 : 75 14 DE 33 58 39 1F 29 47 8D 8A AF 80 F1 AB 89
00001380 : DF 9B F0 B7 CA 32 C9 A6 5E 9A 81 B1 70 B8 D1 13
00001390 : 54 3E ED 81 FA 22 4D 10 E9 B0 44 AB 8C 0D 2E 95
000013A0 : 84 21 7A 81 7D B3 33 2F 3D 18 39 2D 9D 9D AF AB
000013B0 : AC 84 E1 A1 BB BF 88 16 72 20 E0 2B 40 2F 7F AF
000013C0 : 04 3F E5 81 7B 24 C4 92 3E E9 00 96 49 95 7D 93
000013D0 : F0 B0 E0 36 86 0C 67 AA 70 A4 1A 85 31 A3 FE 3C
000013E0 : C6 A5 DD 00 DB A9 E0 A6 7C B5 DC 3D 7C 2F BE AD
000013F0 : AA 8D B2 2D 79 39 F0 98 9C 7A 84 36 AF 71 D2 A0
```

Modified Suspect Expression Verification Table

The listing on the following pages is the hexadecimal representation of the data for a portion of a preferred Modified Suspect Expression Verification Table. This table is intended for use with the Executable Module, supra. Ten blocks of the table are listed; the table may be extended in accord with the teachings provided in the Specification.

Block 0
```
00000000 : 97 A2 B1 44 86 6D CF EA 5A 22 39 8D 1E 51 C5 AD
00000010 : 02 66 A3 D1 9D 94 9B C9 6E 66 5A 64 56 0F 53 67
00000020 : 8E 3E 52 AC 54 F8 FC C1 04 EE E1 8F 12 49 D7 60
```

```
00000030 : 9D EA 49 43 98 8A 32 FD 27 78 1B A9 A0 9D 23 2D
00000040 : FD 50 8F 2C F6 CB 6D C1 0B 5A 9E 43 0E DE 40 1E
00000050 : 5F 82 53 3E B1 02 4F 1F F4 C5 D5 9D D3 85 2E 11
00000060 : B7 61 87 63 E1 BB 98 F5 CC 69 26 6B 27 83 0B 62
00000070 : 63 9B E5 2F A7 75 E4 C4 64 0B 85 26 0C 4E 60 E1
00000080 : 13 C4 7E B5 90 9B D6 C2 72 BC D3 D6 ED 42 71 B6
00000090 : 28 24 77 5D 16 DB B1 A1 07 55 B0 10 AE 43 4D F7
000000A0 : 49 24 A0 A7 14 C7 49 36 53 B8 0B E3 0E 3A 8B C4
000000B0 : 02 44 80 73 E4 FA 13 DF E0 6F 8C A2 38 61 DF 4F
000000C0 : 11 49 06 0A A7 6F 62 8A F9 B5 3F 38 AE 96 52 25
000000D0 : 7B 5C 51 9D 71 34 99 38 DA CA 7E E2 DD F3 62 3B
000000E0 : 6F E1 34 D6 81 E4 F4 5F DE DC A9 1F C5 47 70 EB
000000F0 : 15 63 4C 8D 66 7A B2 29 99 85 6E 57 A0 6B 58 4A
00000100 : A2 23 CA 35 6B 81 71 65 15 64 3B CC 6D 95 C9 6E
00000110 : DB B0 DB 93 A6 74 D8 D4 48 1A D9 32 0F 9C 52 54
00000120 : F6 25 51 0E 07 CA 23 D1 49 E5 1B 85 5F 03 DA 83
00000130 : CF 27 E5 5E E2 DF 5F D7 4B 3F 9C 4D 20 D7 02 08
00000140 : A5 60 E4 70 51 73 DE 79 9E 7F EB D4 7C 94 11 EC
00000150 : 53 53 31 9D AC F3 55 31 CF F1 64 CB F0 F6 C9 EB
00000160 : 66 6F AC 60 49 F1 B7 D5 C8 11 BB C2 53 02 FD 4C
00000170 : F7 DF C5 30 34 49 AB 2F FC BE 55 24 EF 3B AF 2B
00000180 : 19 8F 1E 82 8A 7A E5 81 BB BF A9 EF A4 B7 A4 72
00000190 : 94 12 80 7C 86 15 72 73 2F 8B 8C 89 DE 77 1C 56
000001A0 : C9 41 E5 D0 3B 7C DB F4 B2 F7 2A 34 86 32 40 20
000001B0 : 25 91 25 3B E0 29 31 3A 3F B8 DC B0 AC 29 27 D9
000001C0 : 67 69 52 3F 17 01 81 C6 15 C8 CB 4A B1 DE 7B DC
000001D0 : D6 A9 2E B3 AF F4 6E 40 CD 07 C8 D0 0E 0D DF 9A
000001E0 : 4F 86 C4 9A 9B 67 B4 59 34 1F 6C F5 4B BA F8 DE
000001F0 : 52 E5 7D 08 92 E6 78 04 94 6D 26 B1 57 4F AE 88

Block 1
00000200 : C7 A5 13 82 39 58 A0 65 35 2E 41 AD 61 F2 EF 72
00000210 : 83 21 3B DD 28 67 95 75 25 64 AD 79 07 70 8D 0E
00000220 : 35 67 21 62 63 64 81 C0 94 58 17 A2 43 F9 62 52
00000230 : AE 2E 13 7D 0E FD 95 06 3C 2E 6A D5 6C 63 0F 17
00000240 : 48 C4 F4 70 46 27 0B B3 9A 65 7F F5 74 64 83 65
00000250 : 2B 6C 80 ED 01 63 57 19 3E B0 1B E9 FD 6A 03 CC
00000260 : EE 2E 03 5D 33 3F C2 0A DD C3 9A 76 BF 6B 73 37
00000270 : 4A BD 13 A1 0D A5 FA 13 28 67 D2 D4 61 A8 58 79
00000280 : EB F2 66 EA EB FD DE 5F 16 1B E9 88 71 BA AF E3
00000290 : 5B 5E 8A 89 CA AA 7D B2 9B 40 1C 62 2C 63 10 E8
000002A0 : B5 28 31 32 7C A7 A5 08 82 D6 75 1A 75 F2 D2 74
000002B0 : F2 F8 1D B7 8E D0 A5 A6 CA BB A9 23 DF 1C 31 FB
000002C0 : C5 10 DC D5 5B A0 53 EC 96 18 47 04 2B C6 51 18
000002D0 : DA 29 64 82 A9 08 02 2A D2 62 8F 72 07 48 DB 3D
000002E0 : BD DE 4C E8 1C 62 67 DC 20 D6 B8 06 BE 35 E7 18
000002F0 : 03 FA A4 0E D9 25 77 76 F3 AC 77 7E 8E 96 9E B4
00000300 : DA 6D DF 7D 49 C6 76 7C 1B D6 C5 BE 99 10 F7 4F
00000310 : E9 EE CA 08 6B A5 D0 F5 05 35 0F 2A 6F C4 26 58
00000320 : 82 43 20 17 83 4C 24 FC 56 E5 24 BA BF 3D 0D 51
00000330 : 23 1D 0C B3 04 81 55 C4 FB 79 15 47 CA 2E A0 D0
00000340 : 74 C5 BE B3 60 A2 F4 F5 65 27 33 5B 2F 2E 28 46
00000350 : A6 25 A6 DA 19 CC 6E 0A D8 65 A2 57 D5 FA 77 0E
00000360 : DC EC 95 E0 0B 49 79 99 9E CE 5F 01 24 54 6C 6D
00000370 : 1F DC F7 20 AC 2A 12 C3 7B C8 CC 84 7F 7D 7E 7C
00000380 : 16 39 EC 93 B9 C7 77 43 A6 35 51 E4 64 51 CE 93
00000390 : 83 33 52 B6 21 11 88 7A 23 31 C7 57 71 6F 23 7E
```

```
000003A0 : 39 41 C2 E4 B7 0F C5 6B 9C AA C8 CF 50 B0 CE 41
000003B0 : BD 53 E8 58 A2 03 83 80 D7 28 CA 76 BE FE 34 CE
000003C0 : F7 F7 5C 2B D6 60 B8 72 C3 F3 FE DE 24 B3 5F CA
000003D0 : 76 64 41 09 8E A7 22 A2 CA CB 6B 77 AE DE BD 96
000003E0 : CC 7D 16 CF 06 7C CF BC 5F FA A2 D9 F9 3A 2B 1C
000003F0 : A1 D0 E6 E3 16 A8 0D ED A6 93 93 D9 91 0B CF 6E

Block 2
00000400 : 3D 65 B7 C2 D1 33 D2 77 FD C0 1C 6F 87 C6 1E 92
00000410 : 07 51 FE F0 12 16 BD 9B 7A CE FC 6F 1A 6D 1E 6F
00000420 : F4 48 56 18 D6 0E 1B 8B 04 31 69 EB 3E 3C 89 78
00000430 : 07 0E FD 56 EB 23 FB 1C 49 75 B0 CD B6 08 E7 73
00000440 : 57 ED A7 CE 07 32 57 50 BD 1B DD 9D 4A 2F 54 58
00000450 : 78 9A 10 C3 51 E1 E7 63 5C BA 1F 99 58 13 85 36
00000460 : 7B 3D 78 C4 46 2D FB B0 6D 9C 6D 5E DD FB BC 42
00000470 : A1 AC 65 C2 0B BE B7 08 94 5D 3D 0D 72 7D 78 ED
00000480 : 79 01 5F 2F 95 10 AC 54 4E 6C 42 DC DC D2 65 47
00000490 : 09 52 29 D1 81 66 A9 1E 54 8B 5A B5 17 88 75 20
000004A0 : BB BA 38 88 F1 37 AE 6A 5D 39 9A 72 1B B1 21 F6
000004B0 : F8 A6 45 EE A3 60 03 4E 7D EB F8 AC 4D 1E FE 73
000004C0 : F6 F7 83 C4 C7 7E 54 C2 AB 7C 11 EB 60 CB 3E 9B
000004D0 : D5 5A D5 4B 82 18 4F 35 F5 00 96 8E 47 7D 3E 6B
000004E0 : 88 A5 F6 72 FC 83 E7 12 E2 16 4B C1 0D 18 02 6B
000004F0 : A4 C3 1D D4 CD FA 8A 0C 7A BE A8 62 63 23 AC ED
00000500 : BC 28 4B CA 45 70 E7 02 58 82 F9 D9 7E 90 3E 19
00000510 : EE 80 AD 6C 13 6E 7D EC 33 8D 4B 1E 06 78 C4 4D
00000520 : 94 3A 05 C6 1A 79 77 58 71 98 87 3A 13 AB BA 08
00000530 : 35 DE 23 14 91 74 DD E8 31 C4 69 05 F5 2F 0F 09
00000540 : 80 77 C7 B6 C1 7B 06 97 8D CF C7 5E FB 6B 74 7E
00000550 : 5E 7F 40 83 C8 CD 2B 5D D5 93 0B 8B C9 23 82 FD
00000560 : 1D 77 2E 55 82 73 42 9A 76 6C A2 D4 F4 62 DA D5
00000570 : FA BB F6 74 70 00 23 65 3B 78 42 E0 F1 DC 29 7E
00000580 : D1 9A A0 5D B9 16 64 02 04 CF 87 01 A8 A1 A1 93
00000590 : 86 29 B6 93 92 93 AB 41 D2 5E 2B D1 8A 62 73 A9
000005A0 : AD 08 60 96 B7 BC 46 2C E4 31 E7 29 61 6F E0 5B
000005B0 : 5E 45 97 E8 CC 0E 9B 22 FA AD A9 1F 7E E4 8D 02
000005C0 : 27 F3 54 4C 4F 03 71 D2 50 35 1F 2C 19 30 0E E8
000005D0 : 8D 66 B0 BF 58 C8 5A 4C E2 31 71 9D 72 FC D1 99
000005E0 : 5B A4 20 C0 91 A9 BA D2 46 FC 4B 35 B1 79 62 A5
000005F0 : 21 FA 27 F2 52 1D 4D 47 F3 26 DF 0F 79 FE 83 07

Block 3
00000600 : 66 31 67 29 13 8C E4 12 C6 EB 74 88 72 90 3F 18
00000610 : 71 B6 3C A8 1D 6D C6 E7 97 23 8D 0E 5A A8 E1 66
00000620 : 18 65 27 05 58 F2 EF A2 BA A1 16 75 4C 70 9F E2
00000630 : 50 89 37 76 3E EE C3 88 9E 2A AD CE CD 18 28 21
00000640 : E4 DE 6D 54 2E 29 64 37 D0 57 BC E0 C6 74 29 CC
00000650 : 92 F4 57 15 58 D1 6C 7F 81 F6 05 63 87 A5 2A 9C
00000660 : 87 EA 60 25 27 23 C2 6E 97 BD 7B A0 66 E5 A2 99
00000670 : 77 D6 C5 04 62 50 FA FE 09 4F A4 E6 9C 1D 1D 39
00000680 : 4D 78 82 E4 55 CC 6E CE 69 B8 AC 18 39 5C 88 89
00000690 : CD 96 09 3E 89 4D 1A 52 71 C5 09 10 EF 56 6C 98
000006A0 : 19 60 08 58 20 B0 44 77 C6 BA 99 3E 37 2C 39 66
000006B0 : 3B 2C 91 96 2C D2 50 E2 8B 2D 29 8A 99 A8 BE 1E
000006C0 : B8 03 61 8B 75 92 81 6B 57 50 37 3D 9C 1F 57 2D
000006D0 : D8 48 45 C9 52 8D B0 51 88 6C 4F D3 C6 A9 18 0F
000006E0 : E7 EC DB E4 21 3F 6F D4 B7 77 FC 2C A3 43 06 11
```

```
000006F0 : 98 03 73 D9 8D 3F 2C 6D 7D 77 F6 2B 38 04 07 18
00000700 : 1B 6B 94 80 C3 1B 61 E9 6F 81 3D E3 2C B4 66 47
00000710 : 68 D0 65 F0 FB A4 61 0E DB 79 31 73 C0 8B 96 62
00000720 : 24 B0 62 35 3D B5 E5 01 46 E1 67 56 EA C8 75 39
00000730 : 45 CC 41 ED 2D DD 44 C6 04 D6 D3 DE 72 12 DF FD
00000740 : 16 10 65 7C 85 10 00 56 C4 2C FC D2 19 3B 5F FA
00000750 : A6 1D 27 E6 1C 30 45 1C C6 2C FB E1 E7 B4 89 DC
00000760 : 90 0E 5A 16 65 B4 97 C5 DB 66 FA C7 EA 08 3D F3
00000770 : C5 D6 75 EA 19 BC 1F 6C 4E 8C 55 BC 5C 32 CC BF
00000780 : CE B1 47 F3 1D 09 98 75 1F 5D 19 56 57 C1 A8 B4
00000790 : 33 C1 5D 91 77 AF 48 F2 23 5F 5C 26 2A 0B 48 68
000007A0 : 56 C6 BD E5 6B C1 0E 46 3E AE 57 6F F3 42 74 6F
000007B0 : B6 AE BB 19 1C DA 82 92 18 23 C2 DD BA 28 CB 64
000007C0 : 17 97 C4 B8 00 EC DB B2 99 6D AB FD FD 1A 96 57
000007D0 : 2B 9C 45 67 7B 9A 52 1F E7 07 53 63 33 30 C3 72
000007E0 : F0 5A E4 7A E0 E0 B2 10 51 AB 8C CE 3D A2 09 B0
000007F0 : 67 12 9A 77 7A 5D B1 B2 EF 6D 3A E2 1D E0 7C 0F

Block 4
00000800 : 7B 69 85 7D 7A 4E FB AC 41 61 12 3C AF 65 64 BE
00000810 : 87 42 16 2A 85 B9 A8 50 10 B2 A3 3B C3 10 91 15
00000820 : 9B 0E 9B 29 1A AF 70 4C 88 B4 A5 EB 54 52 4D 2B
00000830 : 19 D0 AB 0D BF BF 35 19 09 54 9B 9A 85 B7 C1 CA
00000840 : EE 03 5A 7F 02 72 5E 98 50 97 A7 26 48 2F 82 99
00000850 : 24 49 C9 62 DA DB 67 E2 DF CA DD D1 47 47 BD 71
00000860 : 73 D1 E5 53 50 A4 22 57 7E 62 6D 40 9B 86 35 03
00000870 : A0 3F 5C 74 E0 67 82 D4 BD 2A F2 00 D0 E5 38 4C
00000880 : 8C 6F BB AB 62 54 70 12 92 3A 6E 21 6A B2 2F 83
00000890 : 89 95 D9 4C 9C 1F F9 06 A0 7A 24 88 65 5A 24 96
000008A0 : F8 5D 0E CE B8 9B E8 40 29 AC A2 09 F0 5F 7A 25
000008B0 : 89 D4 9C FA D0 13 20 BB BD 53 0E F1 A4 76 22 CD
000008C0 : E1 E3 CA 2D 23 37 23 DE A2 E0 EA 73 B5 29 C8 CA
000008D0 : 90 75 E9 4A DD 42 6F FB 75 46 86 FA 1F D4 10 30
000008E0 : E9 D7 1C FB BB D5 24 42 E3 A5 C7 4C E4 E4 FE 48
000008F0 : 6E 35 59 4B 2A F0 F4 A6 98 E8 6D 83 DB 04 64 C7
00000900 : 84 16 7D 36 B8 88 B1 6E 18 7A 1A CC 48 20 8D 66
00000910 : D6 DD 8C 65 08 85 1E C0 C0 7E 5F 01 9A 74 19 5E
00000920 : 12 08 E3 C9 A3 F8 C9 4F 3E B5 43 C6 94 BE F0 FC
00000930 : F0 B0 28 19 FE AD DF 2A 51 2E 1A 33 6A BB 85 8A
00000940 : 3E 02 90 C3 0A 5C 74 C6 01 D5 CA 3F 05 E6 F3 3C
00000950 : A8 06 FD 00 D9 88 09 1E A1 A4 C5 A4 E4 A2 47 5B
00000960 : 01 36 B0 4B A3 6C 6F 7A F0 D0 E8 35 D0 1F C7 75
00000970 : A6 06 7B 77 27 87 CD 8A AB 14 A8 5F 99 7C D6 94
00000980 : DA 09 82 10 07 7C 5B B1 82 A6 05 18 04 37 16 33
00000990 : 8A EB B2 64 23 D3 02 AE C5 CA B0 3D 86 4B DD 69
000009A0 : E7 1E 64 94 93 69 91 AF 3D 10 37 B1 B5 8F DB 7D
000009B0 : 0F 3A 9A 13 17 94 BE 84 75 DE 31 1F 65 8A 80 DB
000009C0 : DF 41 6E C9 F9 81 70 9D E7 29 FA 0A DC 44 0D 2E
000009D0 : 84 4B 88 33 D6 39 9D 8D AC 04 3A 88 72 E0 78 8B
000009E0 : 6F 8F 7B 79 3E 00 60 7D 5F E0 86 67 61 9A 6E 6B
000009F0 : 2B DD DB E0 3D DC 47 BE AA B2 79 F0 72 03 9A D2

Block 5
00000A00 : 2B 97 AF 25 55 0F 99 15 F2 5A 22 00 24 14 3C 29
00000A10 : 39 05 5C 9F 1E BE 2D AB 66 51 0D FE 05 DF 76 05
00000A20 : C9 54 8A AA 02 C8 8A E5 B2 72 B0 37 3E 20 23 17
```

```
00000A30 : 18 19 7B 3A 3F 8C 3D 1F 6B 85 AC 91 D8 C4 79 23
00000A40 : 68 1C CE 01 5C 3E 3D 51 AA 53 FC F3 9F 3E 92 30
00000A50 : 0A C9 4C 94 F1 63 8F 31 47 AD 40 2C 67 54 78 DF
00000A60 : 9C AB 8D E1 51 9A F6 3B 35 B0 84 D4 77 8E C5 B7
00000A70 : 3B 7A BA 25 BB AC D1 8C B4 C6 F3 5D 18 A5 A2 FC
00000A80 : 3C B4 69 75 F8 BB 18 29 8E D6 6F F4 19 11 1C B1
00000A90 : 87 6C AA E2 FA FD 4C 6D D5 01 68 52 A4 BD 82 44
00000AA0 : C5 68 B0 C1 9C 14 4A 1B A7 8C F0 64 F6 AF FD 37
00000AB0 : 5C DB E8 9A 1C 52 8B 40 3B 4B A9 09 0B C3 8A 5E
00000AC0 : 77 54 DB 79 26 6B 0D 99 CE 7E 81 96 46 8F 17 0F
00000AD0 : 8A CA DE 86 6A 48 D8 CD E1 9F 47 11 DE 17 3B 10
00000AE0 : F2 78 2D 6B D2 6D 7E E9 2D 6A 0F 58 3D 1F EF 27
00000AF0 : 1C 38 19 5D 65 6A 6E 53 02 54 B8 2F 02 45 22 17
00000B00 : 4B 25 09 A5 29 9D 0E 41 60 70 64 A4 96 6D 24 C9
00000B10 : 19 C9 85 3B 4E EC 9E 3C 2F 77 53 E7 54 3C 49 02
00000B20 : 09 F3 EA F1 CC 00 8D 74 22 8C F1 F8 3C 4C 14 5F
00000B30 : D9 2A CF 90 09 83 3F 28 94 46 72 01 D7 9E B1 AB
00000B40 : 19 EB 9D 00 FB E8 77 C9 42 DE B5 3C A4 EB 62 ED
00000B50 : 7B AF 2D D6 88 58 98 2A 95 4D F2 C5 07 8E DD 6A
00000B60 : DC 61 BF 15 8E FB D4 52 09 7E E1 36 D9 40 95 3C
00000B70 : D8 AA 84 7D B3 0B A4 4A 55 1E B9 43 58 2E E0 8F
00000B80 : 13 C4 A4 3D 62 83 4A A3 E5 5C 91 CB B9 DD 9D 3F
00000B90 : 08 89 F4 54 52 47 7F A8 B0 94 F4 F6 22 B3 C2 6C
00000BA0 : 52 57 55 71 12 73 94 6C F4 FC 57 A7 A4 07 1F 7F
00000BB0 : 10 54 1D 1A 86 CC 3C AD E0 D5 A4 03 4F 42 D2 26
00000BC0 : CB 5E 2D C8 D8 A6 6E 1B 71 0C BB 07 35 A9 3B 48
00000BD0 : 02 F7 1D 5A 34 DE 78 BB 4D 52 0F 01 72 1B EF D2
00000BE0 : 34 E4 47 34 25 FD 34 C0 B6 0F 7E 88 FB FC 73 5A
00000BF0 : 54 FB 4F 2C C0 B2 40 4B B6 B8 42 C3 17 06 49 E5

Block 6
00000C00 : 1E 98 F5 4A 4D DE 18 3A F6 04 18 60 54 C2 B9 8B
00000C10 : 0C 0D 6A 08 14 66 1E 4E CE 10 06 7F 29 0B 6D 47
00000C20 : AD FB 1A C7 94 68 98 AF 4A 71 0C DF E9 1E 47 B1
00000C30 : 3D 3C 80 B1 07 F8 75 7F FA 6C 28 0C 8B 04 2B 4B
00000C40 : 96 A8 5D E3 E3 48 17 49 3B 56 CE 46 84 C8 17 56
00000C50 : F3 BD 75 4E 53 3F 75 48 20 CA 19 12 66 6C 02 4F
00000C60 : 31 A0 20 3A 05 04 86 4C FA 8D 5B 0F 09 B1 D3 32
00000C70 : 92 96 D4 6E 8E B9 35 3B EA B6 B1 A5 41 40 E5 EB
00000C80 : 87 34 88 A8 7D 20 3E F9 93 C8 F9 A7 A4 C8 EA 4F
00000C90 : 9C 0D 2B 1C 16 27 B1 36 CD BB 8A 81 25 E7 92 DC
00000CA0 : 52 13 E8 3A C7 91 06 4B 69 D3 AA A7 61 A1 5D 7C
00000CB0 : 9B 46 90 C1 C8 DF 55 A7 3A BA 41 CC 2A 9F D8 6C
00000CC0 : B8 24 B5 12 C6 CA 8B E4 CA 9D C8 12 D0 38 2D 50
00000CD0 : 1B 5F 6F DE 81 3B 47 48 8F C4 EA 87 E5 B6 62 2E
00000CE0 : B0 1D E0 CB AB 6D C8 4C 39 A3 4C C2 C8 9E 4B E2
00000CF0 : 5D 57 C1 E8 05 A1 50 29 F6 E4 4B D4 38 0D 29 3B
00000D00 : AA B9 B8 D8 BD 1C 19 07 65 15 63 87 15 A4 BA 55
00000D10 : E6 2D 33 83 79 25 59 65 59 61 EC 2A 53 D0 66 EB
00000D20 : 4C 2E 9D 37 62 BB 62 4F 47 80 52 88 FD 45 22 AE
00000D30 : D2 78 97 80 EF 47 13 75 CD 58 4E 60 37 79 BA 6F
00000D40 : 9C A0 A7 3E 83 F9 5A 11 54 FE 4B 1E 34 BA C7 3D
00000D50 : 2A 1E 3D 91 08 66 1B 72 BE 6B B6 E3 57 E3 78 2B
00000D60 : 08 27 AA 37 FB F6 E0 63 48 37 76 F7 81 3C 20 80
00000D70 : 43 9F 7F 80 15 78 09 24 E7 36 77 56 85 AF 09 81
00000D80 : A6 9D 5E 9D 6A 1B 48 83 86 FD AA 1E 81 2C D2 F2
00000D90 : 47 82 CC 36 6A 8A 64 33 7D 50 FB AC 97 78 BC 3C
```

```
00000DA0 : 54 6A 42 52 A6 1C 0E E0 D2 B5 26 07 6C 7E 8F 7D
00000DB0 : B7 AD FD 3E A9 A8 B0 12 9E E2 F3 DF DF A1 5A E6
00000DC0 : F3 62 BA D3 AB CA FE 5D E7 2B 78 B9 41 FE 11 09
00000DD0 : DF E3 97 95 04 BA 6F 49 02 D1 78 50 0F C3 F6 86
00000DE0 : A6 59 9B 77 39 6A 85 0B 44 45 51 8C 28 08 9D 98
00000DF0 : E2 72 78 28 06 09 80 2E 86 83 A3 20 14 FE F1 FC

Block 7
00000E00 : 60 0F CB 8C 3E 18 E8 64 1F D8 67 00 22 4F 72 8D
00000E10 : C2 21 81 5F 65 BA 8A C7 B9 CF 58 12 52 47 79 73
00000E20 : 13 C4 E9 5F AA 26 AA 44 1B 84 01 22 24 51 3B 71
00000E30 : EA 17 CB 44 E2 EA 14 EA 36 93 F2 F0 FB 53 AE 23
00000E40 : 43 93 3D 07 53 BD D8 D5 5E 85 95 16 1D 03 90 E6
00000E50 : 25 79 6D C8 A7 5B 65 49 E8 6D 1E C1 58 5F 87 4E
00000E60 : AD BD 82 BF CC F8 B6 08 D5 04 8B 5F 90 C0 64 E3
00000E70 : E6 6F F3 AF 67 B2 6A 20 6F 38 94 FC 70 1C E1 E6
00000E80 : 9D 49 36 2D 6C 02 F8 5E C9 C1 5B 8A 28 29 76 63
00000E90 : 38 7A 4F D5 A8 EE F9 98 D2 A7 AC 36 5F 2D B2 DF
00000EA0 : 3D 3B 22 34 1A 4E 8B 27 3F A7 A5 84 1E B4 5F 4F
00000EB0 : 94 2B D7 E7 41 A8 B1 27 B9 7E 10 9A 88 E8 9F 04
00000EC0 : 01 EA 5E 88 A5 27 14 26 58 47 77 EB 5E 24 0D 7F
00000ED0 : 3B 22 5D C5 2D 89 75 24 7C 17 A7 39 AC 52 6E 7E
00000EE0 : 0B FC A5 F5 B4 BB D8 26 78 62 19 C4 E0 A5 85 38
00000EF0 : C1 9C C3 33 26 9A 0C 62 20 65 34 8A B5 A7 12 4B
00000F00 : 69 6E 93 D9 10 35 26 68 51 66 19 14 12 F4 50 50
00000F10 : FE 1C D4 58 98 42 05 DF 13 85 9E 68 E2 72 D0 0D
00000F20 : EF EC 9C 50 DD 04 64 F7 E1 3D 11 52 D0 B9 25 C0
00000F30 : 14 EA 75 B0 41 BE E1 68 88 46 22 47 33 9B EF 5D
00000F40 : AE 3D 75 0C 0B E3 FA 5E B4 EC 27 BC 51 00 34 04
00000F50 : 67 D0 A0 6B 3E BA 4E 8F BF CD CF 75 03 C0 89 B0
00000F60 : 9C 9C 5E 4C F8 7A 76 60 E7 2B 66 EF 9B 08 0C F4
00000F70 : 6F 29 64 99 19 AF 89 DC 99 32 8E 48 5F 97 BA B2
00000F80 : A5 E2 17 4B 86 16 4A 18 D8 E1 D0 83 DC 74 F2 82
00000F90 : 3E 7C 46 BB 10 5C 88 5E 6F D4 2A 37 0F 87 DA 07
00000FA0 : 3E 13 CF 1A 49 F8 77 A7 27 18 A7 BA D8 E9 79 7B
00000FB0 : 46 0B C3 2B FA 92 B8 CB 0C 26 47 A8 82 C3 7F 8D
00000FC0 : 5E C5 20 13 D8 B5 7B B4 F7 0E 76 F7 85 E1 E7 3C
00000FD0 : AB 72 6F EC 5C 6E 2B 41 D7 16 96 C8 B0 C8 C4 40
00000FE0 : ED 8A C1 38 91 62 2C A9 7A D8 59 DD 9A 3E C1 34
00000FF0 : F7 21 25 D3 78 3D 25 18 3E F4 9D 05 40 A9 42 21

Block 8
00001000 : 55 B9 5D E2 17 30 20 56 8D 8D 5F DD A1 92 FA 0B
00001010 : 53 9D DC 85 1B D6 A5 00 B2 0C 4D BC 17 51 55 AC
00001020 : F9 4B C5 C6 69 1A 1B 6E 26 EF 6D 66 FD 05 B8 E5
00001030 : 74 C9 B3 7F E5 26 17 96 91 5B 52 00 28 A7 9C F2
00001040 : 64 19 C4 69 21 3B 7A 21 1F 03 83 0A C6 38 92 82
00001050 : E4 E6 E6 61 8A FA 49 3A 0B 80 6C 79 A0 BE 59 21
00001060 : 41 9D B9 29 6A 58 D5 6F 41 05 06 5E 03 68 EB 5D
00001070 : B9 F8 65 71 5D 31 F2 04 6C C0 F7 E3 D4 2A 86 07
00001080 : 28 C1 6B 16 B3 42 D8 2D 42 11 25 A0 DF 77 E9 CF
00001090 : 3E E5 A5 CB 22 BB 4C 65 52 5B F8 F8 B8 75 0D 9B
000010A0 : 3F E7 10 27 1C 70 63 1B 10 A4 83 86 48 00 8F 8C
000010B0 : F8 0C F9 F0 91 49 50 8B 66 3F A6 DB 94 DC C8 41
```

```
000010C0 : AC A0 C4 2B 5D B4 58 2E 2F 34 03 13 C0 63 C3 1C
000010D0 : 71 07 45 90 A3 48 60 94 0A 84 11 EF 9B B5 F5 8C
000010E0 : 58 0B 2C BE 0C D3 39 BC 8A 54 E9 D5 1B 71 7B 1E
000010F0 : 58 14 DC EA 85 E5 86 FC 70 85 16 2A 69 33 D6 1E
00001100 : F4 1A 9F 97 CB 8B F7 52 55 A7 26 A5 86 44 AD 1F
00001110 : 8A 2B FC 99 FE B0 69 F2 BC 0D 3D C1 62 19 A6 08
00001120 : BF 95 F4 A8 1A 9A A9 EA 42 F3 E4 86 6E 14 8E F9
00001130 : 3D 72 FC 73 06 31 DF 29 1D C2 AF A0 18 EE 99 25
00001140 : B2 44 B5 7C 94 6D 22 D2 E7 3D 6E FE 69 2D 6C 38
00001150 : 71 65 82 37 61 F9 E0 DD 46 BB 64 9A 07 64 09 7E
00001160 : 7D 68 D4 57 63 6A 0A AC 96 91 48 8E 64 E9 FC 4B
00001170 : AF 7F ED CB AB 67 99 BC C0 C0 5F BA 97 9B F9 52
00001180 : 5B 89 D1 65 75 DC 8B 51 C0 50 21 74 56 06 34 35
00001190 : 5C 00 53 81 F5 A2 53 CB 33 EC 80 21 CC BD F0 94
000011A0 : 3A 25 CA A1 F0 80 C7 09 89 CC ED BB D1 14 57 3E
000011B0 : 9A 32 B0 C6 9E B4 CB 8F 6C 38 9E 61 25 7C 59 3E
000011C0 : 53 48 F3 D5 66 81 0B D4 BD B5 49 55 75 9D 89 D7
000011D0 : F9 1D 9E 05 20 B9 61 51 FA D7 26 AE FD E4 BA 40
000011E0 : AE AB 28 5C E1 A4 15 FA 42 23 BA F2 E7 1A 6A 18
000011F0 : AE 54 18 F6 57 41 84 32 4A 22 0A F4 C0 2A 82 2B

Block 9
00001200 : 8A 9A D3 8E 4C D8 00 92 43 20 84 23 CF 54 05 88
00001210 : 65 41 F0 C3 59 DA EB 0C 2B AF 0A 43 04 A8 05 2C
00001220 : B4 F6 28 05 19 8A 79 20 61 71 1F 97 5E 5B 45 05
00001230 : 37 3F BD E4 F9 3B 28 AB 1E A7 47 EB 91 8D 2E 87
00001240 : D9 6E AC 76 62 7F 6A 28 46 F9 C4 B4 2A E4 CF 1C
00001250 : A9 12 03 F5 38 FA FC 0F 13 F1 C5 66 62 B4 8D 0E
00001260 : CA 21 D6 D4 56 93 B5 BE A4 8D 64 C2 BD EB 4E D2
00001270 : 3E F6 26 5A 91 7F C2 31 53 FD 48 2E AE 63 52 5D
00001280 : 0A 43 33 90 AC E5 1B 60 BB 6B 98 10 F8 04 D3 6E
00001290 : BE 10 6C 8A 1D 1C 10 00 01 3A 94 54 F3 2D 68 3A
000012A0 : F5 71 9F D9 FB 91 D4 CB 20 72 49 03 55 61 E4 55
000012B0 : F7 32 04 F3 0B 1F 76 B6 3F 06 94 11 B3 2F EB 20
000012C0 : 6F F0 4B C7 72 64 C5 80 7E FB FC AA FD 75 B4 FD
000012D0 : 60 2B 1C D8 13 D6 CC 62 85 9F 30 AB 84 8C 62 03
000012E0 : A8 3C F2 D2 73 74 96 A5 BE A5 F0 0E 57 46 ED 4D
000012F0 : AC 3C 62 7C D6 E6 FA DD 60 9A D7 B1 B9 79 04 46
00001300 : 05 E5 38 D8 CA 1F 57 F3 9E 75 19 52 24 44 53 A2
00001310 : 5B D8 32 43 8C 60 89 38 CD 0A 21 D9 45 D8 6C 65
00001320 : 94 04 D2 88 99 90 56 E5 0B 2B 21 23 09 51 67 2A
00001330 : BB 08 9C D6 26 2A 11 2B 54 DA 78 02 2E E2 B4 60
00001340 : 18 03 76 98 D1 22 58 46 38 64 72 A5 4C 37 50 1F
00001350 : 38 1F 7E 07 25 91 DD 96 9F B8 6C 5F AD DB AC 47
00001360 : 6E 0B FC E9 78 A9 21 C0 F8 59 98 2D 74 70 A9 CE
00001370 : 5D DC 2B 01 78 42 9D 82 CB 83 7E 04 BB D0 65 95
00001380 : 74 8F E6 AD C9 29 46 E4 DB 77 D8 79 85 3A 97 56
00001390 : C9 35 A3 CB 9B 79 BC 7E 6D 87 81 7A EB 74 9D 16
000013A0 : 9A 46 6F BA F3 36 83 2C DF BC 1A 3D 13 57 E3 CA
000013B0 : 17 4B D2 06 2C 42 4E BA CF 56 A4 44 9D 6C 56 E9
000013C0 : 57 BA 26 A4 CB 78 F4 00 CA 2F 26 49 8C 63 C5 65
000013D0 : E6 0B 7F 58 55 56 EA E4 96 58 34 DD 50 96 B7 E1
000013E0 : 1F B0 A9 38 7E 70 F0 8C C9 73 C7 A9 6A 78 92 F4
000013F0 : 0E AA 04 97 69 D5 FC 26 BB 2C EF 26 9D B7 32 53
```

Block Index Table

The listing on the following pages is the hexadecimal representation of the data for a portion of a preferred Block Index Table. This table is intended for use with the Executable Module, *supra*. Five blocks of the table are listed; the table may be extended in accord with the teachings provided in the Specification.

```
Block 0
00000000 : 00 00 00 00 74 42 52 04 E0 BB 53 04 00 A0 55 04
00000010 : 4C D2 55 04 80 1C 56 04 C0 49 56 04 00 10 57 04
00000020 : 80 35 57 04 80 1A 59 04 C0 A1 59 04 00 D0 59 04
00000030 : 60 22 5A 04 D3 31 5B 04 C7 91 C2 04 00 C8 C2 04
00000040 : 6B 92 C7 04 80 D0 C7 04 00 48 F2 04 6E B5 F5 04
00000050 : 64 39 F6 04 EC 10 F7 04 80 09 F9 04 00 2D F9 04
00000060 : 00 50 F9 04 CC D0 F9 04 CE 48 FA 04 04 9D 22 05
00000070 : 74 BA 22 05 00 D8 22 05 80 B4 27 05 00 50 56 05
00000080 : 00 50 51 08 00 00 53 08 8C 3A 53 08 80 4E 53 08
00000090 : D3 35 54 08 0D B6 55 08 87 D1 55 08 F3 2E 56 08
000000A0 : 93 B9 56 08 74 BA 56 08 4C D2 56 08 D4 35 57 08
000000B0 : 46 52 57 08 74 49 58 08 CC 12 59 08 00 B4 59 08
000000C0 : 47 9E 59 08 B0 AD 59 08 6E AE 59 08 00 B4 59 08
000000D0 : 6D B9 59 08 93 C1 59 08 36 C2 59 08 12 CA 59 08
000000E0 : 80 D1 59 08 66 D2 59 08 00 3C 5A 08 68 32 5B 08
000000F0 : 00 C8 5B 08 68 31 F1 08 BB B6 F3 08 00 48 F6 08
00000100 : 44 1E F7 08 81 09 F9 08 81 B2 F9 08 8E 9A 22 09
00000110 : 81 CD 22 09 40 C2 27 09 00 48 51 0C 80 D0 53 0C
00000120 : 4D 22 56 0C C1 4C 56 0C 80 B1 56 0C 00 38 57 0C
00000130 : A2 09 59 0C 00 48 59 0C C7 A1 59 0C 93 D0 59 0C
00000140 : 00 38 5A 0C C0 89 C2 0C 81 BA C2 0C 80 DC C2 0C
00000150 : 00 C0 C7 0C 80 E0 C7 0C 84 09 F6 0C 00 80 F6 0C
00000160 : 92 51 F7 0C 86 1E F9 0C 9F 35 F9 0C 4C 4C F9 0C
00000170 : 13 51 F9 0C 20 B0 F9 0C 00 3C FA 0C 84 AD 22 0D
00000180 : BB BA 22 0D 80 D9 22 0D 0E D1 27 0D 00 00 53 0E
00000190 : C0 51 56 0E 81 19 57 0E 80 51 57 0E 80 5D 59 0E
000001A0 : F4 50 5A 0E 40 B6 C2 0E 00 CC C7 0E 88 36 F2 0E
000001B0 : 80 18 F6 0E 00 00 F9 0E 80 3A F9 0E C4 49 FB 0E
000001C0 : 74 B6 22 0F 80 BA 22 0F 12 D1 22 0F 00 B0 27 0F
000001D0 : 00 A0 59 0F 60 31 52 10 8E 4E 52 10 8E A2 53 10
000001E0 : D4 09 56 10 81 4A 56 10 87 D1 56 10 44 2E 57 10
000001F0 : 64 4A 58 10 40 2E 59 10 80 51 59 10 4B D2 59 10

Block 1
00000200 : 78 4A 5B 10 8B 4A F1 10 00 10 F6 10 80 92 F6 10
00000210 : 80 C9 F6 10 C7 51 F7 10 0E 12 F9 10 20 40 F9 10
00000220 : 4B 8A F9 10 00 04 FA 10 00 00 51 14 C0 AD 56 14
00000230 : 40 B2 5B 14 6B 39 F4 14 00 80 F7 14 00 10 FA 14
00000240 : E0 2F 52 16 00 00 56 16 60 42 56 16 80 C9 56 16
00000250 : 57 2E 57 16 96 51 57 16 92 4E 58 16 80 4D 59 16
00000260 : C0 D0 59 16 60 32 5A 16 44 9A 82 16 C0 B1 82 16
```

```
00000270 : 6C BA 82 16 C7 C9 82 16 4C D2 82 16 40 B6 87 16
00000280 : 6E 16 89 16 00 90 C2 16 6E BA C2 16 4C DA C2 16
00000290 : 00 CC C7 16 74 32 F1 16 00 38 F4 16 00 CC F5 16
000002A0 : 12 2D F6 16 E0 43 F6 16 00 8B F6 16 A0 B9 F6 16
000002B0 : 98 C1 F6 16 82 C2 F6 16 00 00 F7 16 4D 1A F7 16
000002C0 : 53 1E F7 16 F3 2E F7 16 94 4D F7 16 54 4E F7 16
000002D0 : C0 4E F7 16 40 52 F7 16 50 52 F7 16 80 52 F7 16
000002E0 : 00 00 F8 16 54 5E F8 16 E0 11 F9 16 00 34 F9 16
000002F0 : 68 42 F9 16 00 50 F9 16 8C 58 F9 16 0E CD F9 16
00000300 : E0 38 FA 16 00 00 20 17 80 B4 22 17 00 CC 22 17
00000310 : 80 DD 22 17 8E C1 27 17 40 D2 27 17 50 92 72 17
00000320 : 94 BA 72 17 60 D2 72 17 00 30 51 18 00 48 52 18
00000330 : 00 B8 53 18 C4 AD 55 18 00 B8 56 18 40 12 57 18
00000340 : 94 4D 57 18 F4 38 59 18 80 CE 59 18 00 34 5A 18
00000350 : 00 00 5B 18 00 00 92 18 00 38 F2 18 00 B4 F5 18
00000360 : 41 12 F7 18 81 11 F9 18 00 48 FA 18 02 A4 49 1A
00000370 : 80 38 52 1A 0C B2 53 1A AB A1 55 1A AC C9 55 1A
00000380 : 40 12 56 1A 4E 3A 56 1A 00 5C 56 1A 6E 11 57 1A
00000390 : 40 2C 57 1A 94 41 57 1A 81 4E 57 1A 68 52 57 1A
000003A0 : 68 4D 59 1A D3 9D 59 1A 00 B0 59 1A 8E C1 59 1A
000003B0 : C0 D0 59 1A 8B 09 5A 1A 00 48 5A 1A 00 7C 5A 1A
000003C0 : 00 00 F0 1A 00 80 F5 1A D2 50 F6 1A A0 1D F7 1A
000003D0 : 0E 4D F7 1A 41 0A F9 1A 82 2E F9 1A 80 4D F9 1A
000003E0 : 82 AD F9 1A F3 22 FA 1A 00 51 57 1B E0 B0 53 1C
000003F0 : FF CB 55 1C 00 10 58 1C 40 CE 59 1C 14 4E 5A 1C

Block 2
00000400 : 00 00 F0 1C 00 C8 F5 1C 6B 12 F7 1C 46 42 F7 1C
00000410 : CC 2D F9 1C 00 80 F9 1C 00 20 FA 1C 00 84 FB 1C
00000420 : 80 30 52 20 40 92 55 20 00 D0 55 20 E0 38 56 20
00000430 : 80 C1 56 20 12 2D 57 20 0E 4D 57 20 00 00 58 20
00000440 : ED 10 59 20 4C 34 59 20 80 4E 59 20 C6 A1 59 20
00000450 : 4C D2 59 20 82 3A 5A 20 00 50 5A 20 00 8B C2 20
00000460 : 86 BA C2 20 40 D2 C2 20 00 00 F0 20 80 DC F5 20
00000470 : 88 4A F6 20 6E C1 F6 20 9F 4E F7 20 D2 11 F9 20
00000480 : C4 2D F9 20 C4 41 F9 20 D4 4D F9 20 6C 51 F9 20
00000490 : 68 5A F9 20 6E D1 F9 20 20 48 FA 20 74 92 22 21
000004A0 : 68 AE 22 21 6C BA 22 21 84 CC 22 21 53 CE 22 21
000004B0 : 4B DA 22 21 08 93 27 21 12 AD 27 21 80 B8 27 21
000004C0 : 84 CC 27 21 74 D2 27 21 00 00 5A 21 84 09 52 24
000004D0 : D2 32 52 24 92 4E 52 24 F2 48 53 24 C0 B1 53 24
000004E0 : 00 4D 54 24 A4 B1 55 24 74 BA 55 24 76 CA 55 24
000004F0 : BC DE 55 24 4C 4C 56 24 C0 AD 56 24 40 DA 56 24
00000500 : 74 2E 57 24 74 5A 57 24 64 32 58 24 60 4A 58 24
00000510 : 4C 52 58 24 D3 92 59 24 80 B4 59 24 4B C2 59 24
00000520 : 00 D0 59 24 80 20 5A 24 53 48 5A 24 4C 2C 5B 24
00000530 : 62 4A 5B 24 80 A2 95 24 00 00 F2 24 00 80 F5 24
00000540 : 6B BA F6 24 A0 51 F7 24 00 10 FA 24 8D 4E 51 26
00000550 : 80 4E 52 26 80 CA 53 26 84 B0 55 26 84 CA 55 26
00000560 : 92 18 56 26 74 1A 56 26 81 3A 56 26 40 5A 56 26
00000570 : D4 B5 56 26 4B CE 56 26 EB 12 57 26 13 2E 57 26
00000580 : 80 4C 57 26 13 51 57 26 53 52 57 26 00 00 59 26
00000590 : 00 48 59 26 60 B5 59 26 47 22 5A 26 00 50 5A 26
000005A0 : 00 00 5C 26 44 9A 82 26 00 B6 82 26 0E D1 82 26
000005B0 : 40 C2 87 26 80 D2 87 26 00 00 96 26 E7 B2 B2 26
000005C0 : 87 D1 B2 26 00 B0 B4 26 12 CA B7 26 E4 16 B9 26
```

```
000005D0 : 92 95 BB 26 C4 AD C2 26 00 D0 C2 26 60 C1 C7 26
000005E0 : 40 D2 D2 26 00 AC E2 26 00 AE E7 26 B3 2D F1 26
000005F0 : 80 4A F1 26 00 10 F2 26 80 C8 F3 26 81 2D F6 26

Block 3
00000600 : 60 BA F6 26 00 48 F7 26 AE 49 F8 26 80 4E F8 26
00000610 : B0 2D F9 26 00 48 F9 26 00 90 F9 26 74 22 FA 26
00000620 : 0C AD 02 27 44 BA 02 27 00 D0 02 27 92 B2 07 27
00000630 : A0 D1 07 27 81 91 42 27 80 B0 42 27 81 B8 42 27
00000640 : C4 C1 42 27 4D D2 42 27 AE AD 47 27 8C C8 47 27
00000650 : 62 15 49 27 86 16 49 27 84 3E 49 27 00 B4 72 27
00000660 : 80 C0 77 27 00 00 53 28 CC D0 55 28 E0 38 56 28
00000670 : C0 B1 56 28 00 00 57 28 00 48 57 28 80 2D 58 28
00000680 : 6C 39 59 28 AE D1 59 28 80 48 5A 28 EB B0 82 28
00000690 : 00 CC 82 28 A0 C9 87 28 68 26 89 28 00 04 F1 28
000006A0 : 00 DC F5 28 CB 1D F7 28 8B 4E F8 28 20 38 F9 28
000006B0 : C0 A1 F9 28 AE 2D FC 28 74 A9 22 29 00 B8 22 29
000006C0 : 6C BA 22 29 8B C1 22 29 8E D9 22 29 E0 B8 27 29
000006D0 : 00 00 5C 29 92 4A 51 2C A0 D1 55 2C C0 49 56 2C
000006E0 : 8B 2D 57 2C 00 00 59 2C D3 AD 59 2C 00 30 5A 2C
000006F0 : 40 9E F0 2C 93 51 F6 2C BC 4E F9 2C E0 38 52 2E
00000700 : 76 A2 55 2E C0 11 56 2E 0E 51 56 2E 6C 12 57 2E
00000710 : 6E 4A 58 2E 40 5A 59 2E CC D0 59 2E 20 30 5A 2E
00000720 : 44 5E 5A 2E 00 90 9D 2E E0 10 F9 2E 8E 38 F9 2E
00000730 : 00 60 59 30 00 FC D5 32 00 CC 56 34 00 50 16 3E
00000740 : AE CD 22 3E 96 16 26 3E 80 3C 29 3E 44 BE 29 3E
00000750 : 00 00 40 3E 00 BC 42 3E 0E E1 42 3E 53 96 46 3E
00000760 : 00 CC 47 3E 80 89 62 3E 18 CD 62 3E 60 C9 67 3E
00000770 : 40 56 6A 3E 00 3C 76 3E 76 16 79 3E 8E 14 B4 3E
00000780 : 68 3E B6 3E 8E C8 B7 3E 8E 15 BA 3E 13 96 BB 3E
00000790 : AE 3D C1 3E D4 9D C2 3E 92 AE C2 3E 00 BC C2 3E
000007A0 : C4 E1 C2 3E 00 80 C6 3E F3 B8 C7 3E 40 A6 C9 3E
000007B0 : 00 00 D0 3E 68 3D D1 3E CE 9D D2 3E 74 BA D2 3E
000007C0 : 4E 14 D3 3E 87 B9 D7 3E 62 15 D8 3E 8E 16 D8 3E
000007D0 : 4D 3E D8 3E B3 48 D8 3E 8E 15 E1 3E F3 14 E2 3E
000007E0 : 0E 16 E2 3E 70 16 E2 3E 54 3C E2 3E 4B 3E E2 3E
000007F0 : 54 3E E2 3E 94 91 E2 3E C4 AD E2 3E 92 B2 E2 3E Block 4
00000800 : D2 B8 E2 3E 53 C2 E2 3E 00 CF E2 3E 00 E0 E2 3E
00000810 : 84 15 E3 3E B0 30 E3 3E 60 3E E3 3E B3 B0 E3 3E
00000820 : F0 C9 E3 3E AE 3D E4 3E C4 95 E5 3E A0 B0 E5 3E
00000830 : 90 BD E5 3E C2 BD E5 3E D6 BD E5 3E B3 C8 E5 3E
00000840 : CE 16 E6 3E 58 89 E7 3E 68 BA E7 3E 00 CB E7 3E
00000850 : AE 48 E8 3E CC 16 E9 3E AE 95 E9 3E 68 96 E9 3E
00000860 : 45 AE E9 3E 12 BE E9 3E AC D0 E9 3E 4C 14 EA 3E
00000870 : 8B 15 EA 3E 12 16 EA 3E 70 16 EA 3E 87 3D EA 3E
00000880 : 4C 3E EA 3E 53 3E EA 3E B4 48 EA 3E F2 14 EB 3E
00000890 : 73 3D EB 3E C1 99 02 3F 4C C8 02 3F 00 B8 04 3F
000008A0 : 00 CC 07 3F 12 3E 09 3F C4 A5 0B 3F 00 80 22 3F
000008B0 : 20 B0 22 3F 0E CD 22 3F 4E DA 22 3F 80 BA 24 3F
000008C0 : 00 57 26 3F 4E AE 27 3F 93 A6 29 3F 80 C2 2A 3F
000008D0 : 80 B0 32 3F 4C CC 32 3F AD A0 35 3F 53 B6 37 3F
000008E0 : 74 25 38 3F 60 25 3A 3F 40 56 3A 3F 00 B8 42 3F
000008F0 : CD 15 44 3F 00 C8 44 3F 80 B6 47 3F 6B 3E 49 3F
00000900 : 4C B0 62 3F 68 C9 62 3F 0E CD 62 3F 92 C8 67 3F
00000910 : 17 CA 67 3F D3 C9 72 3F 92 AE 82 3F 4C CC 82 3F
```

```
00000920 : 00 B8 84 3F 00 C8 87 3F 92 16 88 3F D3 15 8A 3F
00000930 : 54 56 8A 3F FF FF FF 3F FF FF FF 3F FF FF FF 3F
00000940 : FF FF FF 3F FF FF FF 3F FF FF FF 3F FF FF FF 3F
00000950 : FF FF FF 3F FF FF FF 3F FF FF FF 3F FF FF FF 3F
00000960 : FF FF FF 3F FF FF FF 3F FF FF FF 3F FF FF FF 3F
00000970 : FF FF FF 3F FF FF FF 3F FF FF FF 3F FF FF FF 3F
00000980 : FF FF FF 3F FF FF FF 3F FF FF FF 3F FF FF FF 3F
00000990 : FF FF FF 3F FF FF FF 3F FF FF FF 3F FF FF FF 3F
000009A0 : FF FF FF 3F FF FF FF 3F FF FF FF 3F FF FF FF 3F
000009B0 : FF FF FF 3F FF FF FF 3F FF FF FF 3F FF FF FF 3F
000009C0 : FF FF FF 3F FF FF FF 3F FF FF FF 3F FF FF FF 3F
000009D0 : FF FF FF 3F FF FF FF 3F FF FF FF 3F FF FF FF 3F
000009E0 : FF FF FF 3F FF FF FF 3F FF FF FF 3F FF FF FF 3F
000009F0 : FF FF FF 3F FF FF FF 3F FF FF FF 3F FF FF FF 3F
```

We claim:

1. A digital data processing apparatus for storing digitally encoded linguistic information, said apparatus comprising
   A. input means for accepting a signal representative of linguistic expression,
   B. database storage means for storing a linguistic expression database,
      said database storage means including master lexicon storage means for storing digitally encoded information representative of plural linguistic expressions and including plural addressable lexicon storage blocks, each said block storing one or more lexicon entries, each said lexicon entry storing signals representative of a linguistic expression, each said expression including at least one alphanumeric character,
   C. database access means connected with said input means and with said database storage means for accessing information stored in said linguistic expression database,
      said database access means including master lexicon access means for addressably accessing each said lexicon storage block according to its skeletal collation range, said skeletal collation range being defined by upper and lower bounds of a collation sequence of linguistically salient word skeletons of said one or more linguistic expressions represented within a lexicon storage block, and
   D. output means connected with said database access means for generating a signal representative of linguistic information.

2. A digital data processing apparatus according to claim 1 wherein a first said lexicon entry, which represents a first linguistic expression, comprises differential encoding means for representing a difference in character content between said first expression and a second linguistic expression represented within a second said lexicon entry.

3. A digital data processing apparatus according to claim 1 wherein a first said lexicon entry, which represents a first linguistic expression, comprises differential encoding means for representing a difference in character content between said first expression and a second linguistic expression represented within a second said lexicon entry, said first and second lexicon entries being stored in a common lexicon storage block.

4. A digital data processing apparatus according to claim 2 wherein said differential encoding means comprises at least one of
   A. explicit differential encoding means for explicitly representing an alphanumeric character of said first linguistic expression, and
   B. indirect differential encoding means for representing an alphanumeric character sequence common to said first linguistic expression and to a third linguistic expression represented within a third said lexicon entry.

5. A digital data processing apparatus according to claim 1 wherein at least one said lexicon entry comprises at least one of
   A. suffix encoding means for representing a suffix pattern of a linguistic expression,
   B. hyphenation encoding means for representing a hyphenation pattern of a linguistic expression, and
   C. capitalization encoding means for representing a capitalization pattern of a linguistic expression.

6. A digital data processing apparatus according to claim 1 wherein said linguistic expression database comprises common expression verification table means for storing digitally encoded information representative of plural commonly used linguistic expressions and including plural common-expression entries, each said common-expression entry including means for storing a first hash code of a first common linguistic expression, and wherein said database access means comprises means for addressably accessing each said common-expression entry according to a first selected index.

7. An apparatus according to claim 1 wherein said linguistic expression database comprises modified suspect expression verification table means for storing digitally encoded information representative of substantially all of the linguistic expressions represented in the master lexicon storage means and including plural addressable suspect-expression entries, each said suspect-expression entry including means for storing a second hash code of a common linguistic expression, and wherein said database access means comprises means for addressably accessing each said suspect expression entry according to a second index.

8. An apparatus according to claim 1 wherein said linguistic expression database comprises user expression table means for storing digitally encoded information representative of one or more user-defined expressions and including one or more user-expression entries, each said user-expression entry including means for storing a signal representative of a user-defined expression, and wherein said database access means comprises means for addressably accessing each said user-expression entry.

9. An apparatus according to claim 1 wherein said database access means comprises block index means for storing digitally encoded information representative of collation sequences of lexicon blocks and including plural addressable block-index entries, each said block-index entry including means for storing a signal representative of at least one of a collation sequence lower bound and a collation sequence upper bound.

10. An apparatus accoding to claim 1 wherein said master lexicon is substantially free of digitally encoded information explicitly representative of linguistically salient word skeletons.

11. A digital data processing apparatus for electronic spelling verification comprising
    A. input means for accepting a signal representative of a suspect linguistic expression,
    B. database storage means for storing a linguistic expression database,
        said database storage means including master lexicon storage means for storing digitally encoded information representative of plural linguistic expressions and including plural addressable lexicon storage blocks, each said block storing one or more lexicon entries, each said lexicon entry storing signals representative of a linguistic expression, each said expression including at least one alphanumeric character,
    C. database access means connected with said input means and with said database storage means for accessing information stored in said linguistic expression database,
        said database access means including master lexicon access means for addressably accessing each said lexicon storage block according to its skeletal collation range, said skeletal collation range being defined by upper and lower bounds of a collation sequence of linguistically salient word skeletons of said one or more linguistic expressions represented within a lexicon storage block, and
    D. database verification means connected with said database access means for locating within said linguistic expression database a linguistic expression matching suspect expression,
        said database verification means including master lexicon verification means for matching said suspect expression with a linguistic expression represented within said master lexicon means, and
    E. output means connected with said database verification means for generating a signal indicative of the success of locating a matching database expression.

12. An apparatus according to claim 11 wherein said master lexicon verification means comprises binary search means for identifying a candidate master lexicon block likely to contain an entry representing an expression matching said suspect expression.

13. An apparatus according to claim 12 wherein said binary search means comprises means for generating a linguistically salient word skeleton of said suspect expression.

14. An apparatus according to claim 11 wherein said master lexicon verification means comprises differential decoding means responsive to a differential coding of a first lexicon entry for generating a signal representative of a linguistic expression, said differential encoding being representative of a difference in character content between the linguistic expression represented in said first lexicon entry and a second linguistic expression represented in a second said lexicon entry.

15. An apparatus according to claim 14 wherein said differential decoding means comprises means responsive to at least one of
    i. a differential coding which coding is explicitly representative of an alphanumeric character of said first linguistic expression, and
    ii. a differential coding which is indirectly representative of a character sequence of said first linguistic expression, said character sequence being common to said first linguistic expression and a third linguistic expression represented in a third lexicon entry for generating signals representative of a character sequence of said first expression.

16. An apparatus according to claim 11 wherein said database verification means comprises common expression verification means of identifying said suspect expression as being a commonly used linguistic expression.

17. An apparatus according to claim 15 wherein said common expression verification means comprises means for generating a first hash code representative of said suspect expression.

18. An apparatus according to claim 11 wherein said database verification means comprises user expression verification means for identifying said suspect expression as being a user-defined expression.

19. An digital data processing apparatus for electronic spelling correction comprising
    A. input means for accepting a signal representative of a suspect linguistic expression,
    B. database storage means for storing a linguistic expression database,
        said database storage means including master lexicon storage means for storing digitally encoded information representative of plural linguistic expressions and including plural addressable lexicon storage blocks, each said block storing one or more lexicon entries, each said lexicon entry storing signals representative of a linguistic expression, each said expression including at least one alphanumeric character,
    C. database access means connected with said input means and with said database storage means for accessing information stored in said linguistic expression database,
        said database access means including master lexicon access means for addressably accessing each said lexicon storage block according to its skeletal collation range, said skeletal collation range being defined by upper and lower bounds of a collation sequence of linguistically salient word skeletons of said one or more linguistic expressions represented within a lexicon storage block, and
    D. database verification means connected with said input means for locating within said linguistic expression database an expression substitutable for said suspect linguistic expression, said database matching means including master lexicon matching means for identifying a master lexicon expression substitutable for said suspect expression, and E. output means connected with said database matching means for generating a signal indicative of the success of locating within the database an expression substitutable for the suspect expression.

20. An apparatus according to claim 19 wherein said master lexicon matching means comprises means for generating a linguistically salient word skeleton of said suspect expression and a linguistically salient word skeleton of at least one said master lexicon expression, and for comparing said skeletons to generate a signal indicative of a match thereof.

21. An apparatus according to claim 20 wherein said master lexicon matching means comprises target modification means responsive to the absence of a match of skeletons for A. selectively modifying said suspect word skeleton by replacing one set of one or more skeleton symbols with a different set of such symbols, B. comparing said modified suspect skeleton with a linguistically salient word skeleton of at least one said database alternate expression, and C. selectively repeating said modifying step and said comparing step in response to the continued absence of a match of skeletons.

22. An apparatus according to claim 19 further comprising suspect expression modification means for generating a modified form of said suspect expression and for locating a database expression matching said modified suspect expression.

23. An apparatus according to claim 22 wherein said suspect expression modification means comprises means for at least one of i. generating a signal representative of an expression having a transposed character sequence, ii. generating a signal representative of an expression having a deleted character, iii. generating a signal representative of an expression having an added character, and iv. generating a signal representative of an expression having a replaced character.

24. An apparatus according to claim 22 wherein said suspect expression modification comprises means for identifying said modified expression as a potentially valid linguistic expression.

25. An apparatus according to claim 24 wherein said suspect expression modification means comprises means for generating a linguistically salient word skeleton of said modified suspect expression, and further comprises binary search means for identifying a candidate master lexicon block likely to contain an entry representing an expression matching said modified suspect expression.

26. An apparatus according to claim 19 wherein said master lexicon matching means comprises differential decoding means responsive to a differential coding of a first lexicon entry for generating a signal representative of a linguistic expression, said differential encoding being representative of a difference in character content between the linguistic expression represented in said first lexicon entry and a second linguistic expression represented in a second said lexicon entry.

27. An apparatus according to claim 26 wherein said differential decoding means comprises means responsive to at least one of i. a differential coding which coding is explicitly representative of an alphanumeric character of said first linguistic expression, and ii. a differential coding which is indirectly representative of a character sequence of said first linguistic expression, said character sequence being common to said first linguistic expression and a third linguistic expression represented in a third lexicon entry for generating signals representative of a character sequence of said first expression.

28. An apparatus according to claim 19 further comprising user expression verification means for identifying a suspect expression or modification thereof as matching a user defined expression.

29. A method for storing digitally-encoded linguistic information in a digital data processing apparatus, said method comprising the steps of A. inputting plural linguistic expressions, each said linguistic expression including alphanumeric characters, B. generating signals representing plural master lexicon entries, each said entry representing an input linguistic expression, C. forming plural master lexicon blocks, each said block being formed by the steps of (i) generating a linguistically salient word skeleton for each linguistic expression in the block, (ii) collating said block linguistically salient word skeletons and determining therefrom a block skeletal collation range, and (iii) storing in a storage medium one or more said master lexicon entries, D. forming a master lexicon wherein said blocks are arranged in an addressable sequence determined in accord with their respective skeletal collation ranges.

30. A method according to claim 29 wherein said master lexicon entry-forming step comprises the step of generating a digital code representing a difference in character content between a first input expression represented in a first master lexicon entry and a second input expression represented in a second master lexicon entry.

31. A method according to claim 29 wherein said master lexicon entry-forming step comprises the step of generating a digital code representing a difference in character content between a first input expression represented in a first master lexicon entry and a second input expression represented in a second master lexicon entry, and wherein said block forming step comprises storing said first and second master lexicon entries in a common block.

32. A method according to claim 30 wherein said character differential code generating step comprises at least one step selected from the steps of A. generating an explicit differential code for explicitly representing an alphanumeric character of said first linguistic expression, and B. generating an indirect differential code for representing an alphanumeric character sequence common to said first linguistic expression and to a third linguistic expression represented in a third said lexicon entry.

33. A method according to claim 29 wherein said master lexicon entry-forming step comprises at least one step selected from the steps of A. generating a suffix code for representing a suffix pattern of a linguistic expression, B. generating a hyphenation code for representing a hyphenation pattern of a linguistic expression, and C. generating a capitalization code for representing a capitalization pattern of a linguistic expression.

34. A method according to claim 29 comprising the further step of forming a common expression verification table having digitally encoded information representative of plural common linguistic expressions, said common expression verification table-forming step including the steps of
  (i) generating a first hash code representing a common linguistic expression, and
  (ii) storing said first hash code for addressable access in accord with a first index value.

35. A method according to claim 29 comprising the further step of forming a modified suspect expression verification table having digitally encoded information representative of said input linguistic expressions stored in said master lexicon, said modified suspect expression verification table-forming step including the steps of
  (i) generating a second hash code representative of one or more said input linguistic expressions,
  (ii) storing said second hash code for addressable access in accord with a second index value.

36. A method according to claim 29 comprising the further step of forming a user expression table having digitally encoded information representative of one or more user-defined expressions, said user expression table-forming step comprising the steps of
  (i) inputting a user-defined expression, and
  (ii) storing said user-defined expression for addressable access according to a third index value.

37. A method according to claim 29 further comprising the step of forming a block index table having digitally encoded information representative of collation ranges of plural master lexicon blocks, said block index table forming step including the step of storing, for each master lexicon block, a digital code representative of a skeletal collation range of each said block.

38. A method for spelling verification in a digital data processing apparatus, said method comprising the steps of
  A. inputting plural linguistic expressions, each said linguistic expression including alphanumeric characters,
  B. generating signals representing plural master lexicon entries, each said entry representing an input linguistic expression,
  C. forming plural master lexicon blocks, each said block being formed by the steps of
    (i) generating a linguistically salient word skeleton for each linguistic expression in the block,
    (ii) collating said block linguistically salient word skeletons and determining therefrom a block skeletal collation range,
    (iii) storing in a storage medium one or more master lexicon entries,
  D. forming a master lexicon wherein said blocks are arranged in an addressable sequence determined in accord with their respective skeletal collation ranges,
  E. inputting a signal representative of a suspect linguistic expression,
  F. matching said suspect expression with an expression represented in said master lexicon, and
  G. generating a signal indicative of the success of said matching step.

39. A method according to claim 38 wherein said matching step comprises the step of identifying a candidate master lexicon block likely to include an entry matching said suspect expression.

40. A method according to claim 39 wherein said identifying step comprises the step of generating a linguistically salient word skeleton of said suspect expression.

41. An method according to claim 38 wherein said matching step comprises the step of responding to a differential coding of a first lexicon entry for generating a signal representative of a first linguistic expression, said differential encoding being representative of a difference in character content between the linguistic expression represented in said first lexicon entry and a second linguistic expression represented in a second said lexicon entry.

42. A method according to claim 41 wherein said responding step includes the steps of
  A. generating an alphanumeric character in response to an explicit differential coding representative of an alphanumeric character of said first linguistic expression, and
  B. generating an alphanumeric character sequence in response to an indirect differential code, said indirect differential code representing a character sequence common to said first linguistic expression and to a third linguistic expression represented in a third lexicon entry.

43. A method according to claim 38 further comprising the step of identifying said suspect expression in a digitally encoded table of common linguistic expressions.

44. A method according to claim 43 wherein said common expression identification step comprises the step of generating a first hash code representative of said suspect expression.

45. A method according to claim 38 further comprising the step of identifying said suspect expression as matching an entry in a digitally encoded table of user-defined expressions.

46. A method for electronic spelling correction in a digital data processing apparatus, said method comprising the steps of
  A. inputting plural linguistic expressions for storage, each said linguistic expression including alphanumeric characters,
  B. generating signals representing plural master lexicon entries, each said entry representing an input linguistic expression,
  C. forming plural master lexicon blocks, each said block being formed by the steps of
    (i) generating a linguistically salient word skeleton for each linguistic expression in the block, wherein said skeleton includes skeletal symbols,
    (ii) collating said block linguistically salient word skeletons and determining therefrom a block skeletal collation range, and
    (iii) storing in a storage medium one or more master lexicon entries,
  D. forming a master lexicon wherein said blocks are arranged in an addressable sequence determined in accord with their respective skeletal collation range thereof,
  E. inputting a signal representative of a suspect linguistic expression,
  F. locating within said master lexicon an entry representing an expression substitutable for said suspect expression, and G. generating a signal indicative of the success of said locating step.

47. A method according to claim 46 wherein said master lexicon expression locating step comprises the steps of
   A. generating a linguistically salient word skeleton of said suspect expression and a linguistically salient word skeleton of at least one said master lexicon expression, and
   B. comparing said skeletons to generate a signal indicative of a match thereof.

48. A method according to claim 47 wherein said master lexicon expression locating step comprises the step of responding to the absence of a match of skeletons for executing the steps of
   A. selectively modifying said suspect expression skeleton by replacing one set of one or more skeletal symbols with a different set of such symbols,
   B. comparing said modified suspect expression skeleton with a linguistically salient word skeleton of at least one said master lexicon expression, and
   C. selectively repeating said modifying step and said comparing step in response to the continued absence of a match of skeletons.

49. A method according to claim 46 further comprising the step of generating a signal representative of a modified form of said suspect expression and for locating a linguistic expression matching said modified suspect expression.

50. A method according to claim 49 wherein said suspect expression modification step comprises at least one step selected from the steps of
   i. generating a signal representative of an expression having a transposed character sequence,
   ii. generating a signal representative of an expression having a deleted character,
   iii. generating a signal representative of an expression having an added character, and
   iv. generating a signal representative of an expression having a replaced character.

51. A method according to claim 49 wherein said suspect expression modification step includes the step of identifying said modified expression as being a valid linguistic expression.

52. A method according to claim 51 wherein said suspect expression modification step comprises the steps of
   A. generating a linguistically salient word skeleton of said modified suspect expression, and
   B. identifying a candidate master lexicon block likely to contain an entry representing an expression matching said modified suspect expression.

53. A method according to claim 49 wherein said suspect expression modification step comprises the step of matching said modified suspect expression with a table of user-defined expressions.

54. A method according to claim 46 wherein said matching step comprises the step of responding to a differential coding contained in a first lexicon entry for generating a signal representative of a first linguistic expression, said differential encoding being representative of a difference in character content between the linguistic expression represented in said first lexicon entry and a second linguistic expression represented in a second said lexicon entry.

55. A method according to claim 53 wherein said responding step includes the steps of
   A. generating an alphanumeric character in response to an explicit differential coding representative of an alphanumeric character of said first linguistic expression, and
   B. generating an alphanumeric character sequence in response to an indirect differential code representative of a character sequence of said first linguistic expression, said character sequence being common to said first linguistic expression and a third linguistic expression represented in in a third lexicon entry.

56. In a digital data processing apparatus having a data storage means for storing a linguistic expression database, said data storage means including plural entry means, each for storing a signal representative of a linguistic expression, each expression including at least one alphanumeric character, said digital data processing apparatus further having data access means for accessing linguistic expression information stored in said database, the improvement wherein said data storage means comprises
   differential encoding means for storing a differential coding representative of differences between a first linguistic expression stored in a first entry means and a second linguistic expression stored in a second entry means, said differential encoding means including
   i. explicit differential encoding means for storing a first digital coding pattern explicitly representative of at least one alphanumeric character of said first linguistic expression, and
   ii. indirect differential encoding means for storing a second digital coding pattern representative of an alphanumeric character sequence common to said first linguistic expression and a third linguistic expression stored in a third said entry means of said database.

57. In an apparatus according to claim 56 the further improvement wherein said data access means comprises means responsive to said differential dcoding for generating a signal representative of a linguistic expression character sequence.

58. In an apparatus according to claim 56 the futher improvement wherein each of said indirect differential encoding means and said explicit differential encoding means comprises at least one of
   A. suffix encoding means for storing a digital coding representative of a suffix pattern of a linguistic expression,
   B. hyphenation encoding means for storing a digital coding representative of a hyphenation pattern of a linguistic expression, and
   C. capitalization encoding means for storing a digital coding representative of a capitalization pattern of a linguistic expression.

59. In an apparatus according to claim 58, the further improvement wherein said indirect differential encoding means comprises decompression table means for storing signals representative of linguistic expression information, said decompression table means comprising at least one of
   i. first decompression coding means for storing addressable digital codes representative of linguistic expression hyphenation and suffix patterns, and
   ii. second decompression coding means for storing addressable digital codes representative of linguistic expression alphanumeric character sequences.

60. In a method for storing digitally encoded information forming a linguistic expression database of the type used in a digital data processing apparatus, said method having steps including inputting digital signals representative of plural linguistic expressions, each said expression including alphanumeric characters, and storing each said expression-representative signal to form a database entry, the improvement whereby said storing step includes the steps of storing a differential coding representative of differences between a first linguistic expression stored in a first entry and a second linguistic expression stored in a second entry, said differential coding storing step including the steps of
   i. generating a first digital coding pattern explicitly representative of at least one alphanumeric character of said first linguistic expression, and
   ii. generating a second digital coding pattern representative of an alphanumeric character sequence common to at least two linguistic expressions stored in said database.

61. In a method according to claim 60 the further improvement whereby each of said indirect differential coding step and said explicit differential coding step comprise at least one of the steps of
   A. generating a digital coding representative of a suffix pattern of a linguistic expression,
   B. generating a digital coding representative of a hyphenation pattern of a linguistic expression, and
   C. generating a digital coding representative of a capitalization pattern of a linguistic expression.

62. In a method according to claim 61, the further improvement whereby said indirect differential coding step comprises at least one of the steps of
   i. generating and storing addressable digital codes representative of common linguistic expression hyphenation and suffix pattern, and
   ii. generating and storing addressable digital codes representative of common linguistic expression alphanumeric character sequences.

63. A digital data processing apparatus for electronic spelling correction, said apparatus comprising
   A. input means for accepting a signal representative of a suspect linguistic expression,
   B. database storage means for storing signals representative of a set of valid linguistic expressions,
   C. means for converting at least one said valid linguistic expression to a linguistically salient word skeleton, and for converting said suspect linguistic expression, or a modified form thereof, to a linguistically salient word skeleton, said converting means comprising
      i. means for eliminating from the word skeleton produced thereby a selected alpha set, if any, of the expression being converted which lacks isomorphy with a phonetic representation of that selected set, and
      ii. means for replacing with a different linguistic symbol another selected alpha set, if any, of the expression being converted which lacks isomorphy with a phonetic representation of that other selected set,
   D. means for comparing said suspect expression skeleton with at least one said valid expression skeleton, and
   E. means for responding to a match from said comparison of word skeletons to generate a signal representative of a valid linguistic expression corresponding to a matching skeleton.

64. An apparatus according to claim 63 comprising target modification means for
   A. selectively modifying said suspect word skeleton by replacing one set of one or more skeleton symbols with a different set of such symbols,
   B. comparing said modified suspect skeleton with a linguistically salient word skeleton of at least one said database linguistic expression, and
   C. selectively repeating said modifying step and said comparing step in response to the continued absence of a match of skeletons.

65. An apparatus according to claim 64 comprising means for generating from said input suspect expression a modified form thereof said modified suspect expression-generating means comprising at least one of
   i. means for generating a signal representative of an expression having a transposed character sequence,
   ii. means for generating a signal representative of an expression having a deleted character,
   iii. means for generating a signal representative of an expression having an added character, and
   iv. means for generating a signal representative of an expression having a replaced character.

66. A method of electronic spelling correction in a digital data processing apparatus having a database for storing signals representative of a set of valid linguistic expressions, said method comprising the steps of
   A. accepting a signal representative of a suspect linguistic expression,
   B. converting at least one said valid linguistic expression to a linguistically salient word skeleton and for converting said suspect linguistic expression, or a modified form thereof, to a linguistically salient word skeleton, each said converting step comprising the steps of
      i. eliminating from the word skeleton produced thereby a selected alpha set, if any, of the expression being converted which lacks isomorphy with a phonetic representation of that selected set, and
      ii. replacing with a different linguistic symbol another selected alpha set, if any, of the expression being converted which lacks isomorphy with a phonetic representation of that other selected set,
   C. comparing said suspect expression skeleton with at least one said database expression skeleton, and
   D. responding to a match from said comparison of word skeletons to generate a signal representative of a database expression corresponding to a matching skeleton.

67. A method according to claim 66 comprising the steps of
   A. selectively modifying said suspect word skeleton by replacing one set of one or more skeleton symbols with a different set of such symbols,
   B. comparing said modified suspect skeleton with a linguistically salient word skeleton of at least one said database expression, and
   C. selectively repeating said modifying step and said comparing step in response to the continued absence of a match of skeletons.

68. A method according to claim 66 comprising the step of generating from said input suspect expression a modified form thereof said modified suspect expression-generating step comprising at least one of the steps of
  i. generating a signal representative of an expression having a transposed character sequence,
  ii. generating a signal representative of an expression having a deleted character,
  iii. generating a signal representative of an expression having an added character, and
  iv. generating a signal representative of an expression having a replaced character.

* * * * *

UNITED STATES PATENT AND TRADEMARK OFFICE
CERTIFICATE OF CORRECTION

PATENT NO. : 4,771,401
DATED : September 13, 1988
INVENTOR(S) : Kaufman et al

It is certified that error appears in the above-identified patent and that said Letters Patent is hereby corrected as shown below:

Column 10, line 41, replace "8" with -- 18 --.

Column 16, line 55, replace "Engiish" with -- English --.

Column 16, line 56, replace "spell-" with -- spell- --.

Column 16, line 65, after "linguistically" delete -- , --.

Column 17, line 64, after "preceding" delete -- ; --.

Column 18, line 39, after "d," insert -- 1, --.

Column 18, line 52, after "d," insert -- 1, --.

Column 18, line 67, after "d," insert -- 1, --.

Column 19, line 22, after "d," insert -- 1, --.

UNITED STATES PATENT AND TRADEMARK OFFICE
CERTIFICATE OF CORRECTION

PATENT NO. : 4,771,401

DATED : September 13, 1988

INVENTOR(S) : Kaufman et al

It is certified that error appears in the above-identified patent and that said Letters Patent is hereby corrected as shown below:

Column 210, line 66, replace "verification" with -- matching --.

Column 216, line 41, replace "dcoding" with -- coding --.

Signed and Sealed this

Nineteenth Day of November, 1991

*Attest:*

HARRY F. MANBECK, JR.

*Attesting Officer*   *Commissioner of Patents and Trademarks*